United States Patent [19]

Motoki et al.

[11] Patent Number: 5,479,336
[45] Date of Patent: Dec. 26, 1995

[54] DC POWER-SUPPLY UNIT

[75] Inventors: Takahiro Motoki; Koji Iio, both of Shizuoka; Ikura Suga; Yoshitaka Ohnishi, both of Hyogo; Itsuo Suzuki; Yoshiro Kato, both of Shizuoka, all of Japan

[73] Assignee: Mitsubishi Denki Kabushiki Kaisha, Tokyo, Japan

[21] Appl. No.: 102,103

[22] Filed: Aug. 4, 1993

[30] Foreign Application Priority Data

| Aug. 6, 1992 | [JP] | Japan | 4-210267 |
| Mar. 24, 1993 | [JP] | Japan | 5-087824 |
| Apr. 19, 1993 | [JP] | Japan | 5-091490 |
| Jul. 28, 1993 | [JP] | Japan | 5-186491 |

[51] Int. Cl.⁶ ................................. H02M 7/68
[52] U.S. Cl. ................. 363/89; 363/44; 363/126; 323/210
[58] Field of Search .................. 323/210, 222, 323/282, 285, 299, 351; 363/44, 89, 126

[56] References Cited

U.S. PATENT DOCUMENTS

| 4,238,710 | 12/1980 | Nelson | 315/307 |
| 4,251,752 | 2/1981 | Stolz | 315/206 |
| 4,683,529 | 7/1987 | Bucher | 363/44 |
| 4,688,162 | 8/1987 | Mutch et al. | 363/126 |
| 4,719,552 | 1/1988 | Albach et al. | 363/44 |
| 4,761,725 | 8/1988 | Henze | 323/283 |
| 4,831,508 | 5/1989 | Hunter | 363/89 |
| 5,006,975 | 4/1991 | Neufeld | 323/222 |
| 5,038,267 | 8/1991 | DeDoncker et al. | 363/89 |
| 5,134,355 | 7/1992 | Hastings | 323/222 |
| 5,146,398 | 9/1992 | Vila-Masot et al. | 363/89 |
| 5,181,159 | 1/1993 | Peterson et al. | 363/89 |
| 5,367,247 | 11/1994 | Blocher et al. | 323/222 |

FOREIGN PATENT DOCUMENTS

| 0486875 | 5/1992 | European Pat. Off. | H02M 7/217 |
| 3445501 | 6/1986 | Germany | H02M 3/156 |
| 59-14021 | 1/1984 | Japan | G05F 1/48 |
| 62-45793 | 9/1987 | Japan | H02M 7/06 |
| 63-22148 | 5/1988 | Japan | H02M 7/10 |
| 2-299470 | 12/1990 | Japan | H02M 7/06 |
| 2213614 | 8/1989 | United Kingdom | H02M 1/12 |

OTHER PUBLICATIONS

Ikuro Suga et al., "New Switching Method for Single-Phase AC to DC Converter", published by Mitsubishi Electric Corporation, Aug. 1993.
Shoji Iida, "On the Improvement of Power Factor and the Reduction of Harmonics in Thyristor Power Converters", *Report of the Center for Research*, vol. 3, No. 2, Dec. 1985, pp. 1–95.
"Electric Cooperative Research Paper", vol. 46, No. 2, p. 78 with partial English translation.

*Primary Examiner*—Jeffrey L. Sterrett
*Attorney, Agent, or Firm*—Burns, Doane, Swecker & Mathis

[57] ABSTRACT

A DC power-supply unit convening AC into DC power is provided to, when AC voltage and/or AC current of an AC power supply passes through a zero point, close a switch after a preset first delay time from a passing through time, and open the switch after a preset second delay time from a passing through time. The unit includes a rectifier switch for convening AC power output from the AC power supply into DC power, an inductive element connected to the rectifying element, a switching element connected to the inductive element, and the rectifying element, a smoothing unit connected in parallel with the switching element, and a switch control unit for controlling the switch according to the predetermined delay times.

38 Claims, 106 Drawing Sheets

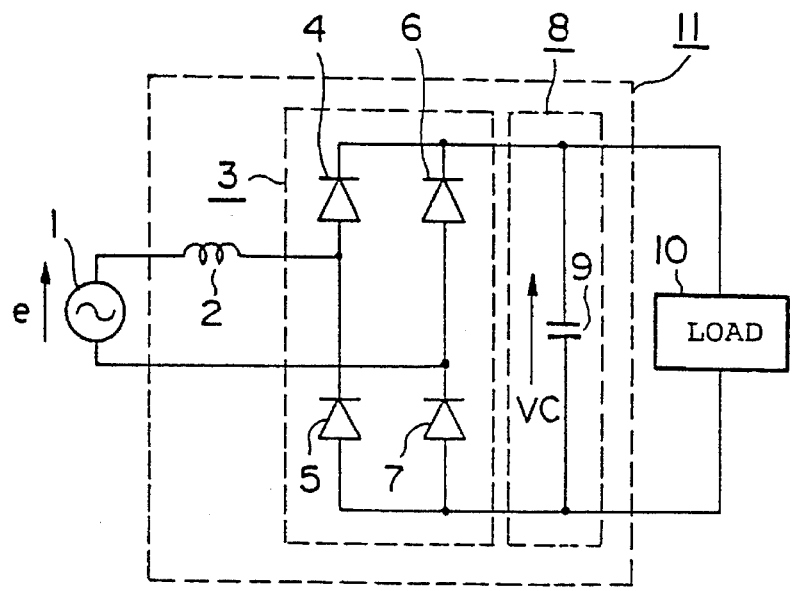
FIG. 1
(PRIOR ART)
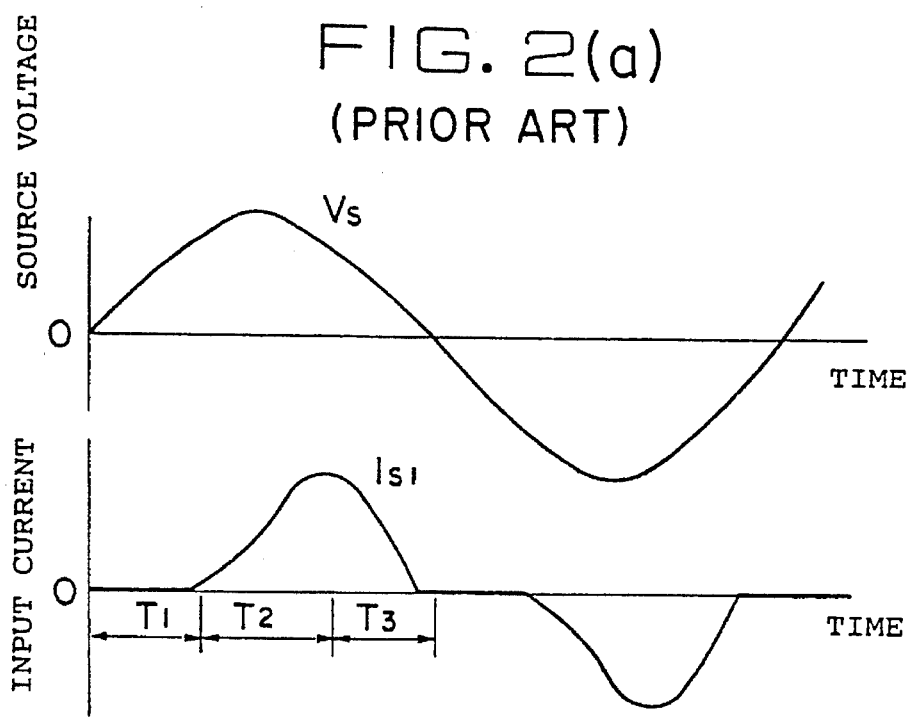
FIG. 2(a)
(PRIOR ART)
FIG. 2(b)
(PRIOR ART)

DC POWER-SUPPLY UNIT

BACKGROUND OF THE INVENTION

1. Field of the Invention

The present invention relates to a dc power-supply unit which converts ac power into dc power, and can reduce a higher harmonic component of input current so as to improve a power factor.

2. Description of the Prior Art

FIG. 1 is a circuit diagram of a choke-input type of dc power-supply unit in the prior art disclosed in, for example, "Electric Cooperative Research Paper" Vol.46, No.2, p.78 (published by Society of Electric Cooperative Research). In FIG. 1, reference numeral 1 is an ac power supply, 2 is a reactor (inductive element) serially connected to the ac power supply 1, 3 is a rectifier circuit (rectifying means) including diode bridges (rectifying devices) 4 to 7 connected to the ac power supply 1 and the reactor 2, 8 is a smoothing circuit (smoothing means) including a capacitor 9 connected in parallel with the rectifier circuit 3, 10 is the load connected to the smoothing circuit 8, and 11 is a dc power-supply unit including the reactor 2, the rectifier circuit 3, and the smoothing circuit 8.

A description will now be given of the operation. When the source voltage shown by a mark e in FIG. 1 exceeds voltage (shown by mark vc in FIG. 1) of the capacitor 9 of the smoothing circuit 8 for half period of source voltage of the ac power supply 1, the diode bridges 4 and 7 of the rectifier circuit 3 cause charging current to flow through the reactor 2 so as to charge the capacitor 9 of the smoothing circuit 8. For a while, a difference of voltage between the source voltage e and the voltage vc of the capacitor 9 increases, and the charging current for the capacitor 9 increases. However, after a time, the difference between the source voltage e and the voltage vc of the capacitor 9 decreases, and the charging current for the capacitor 9 also decreases. When the charging current reaches zero, the diode bridges 4 and 7 of the rectifier circuit 3 are set in a nonconducting state. As in the case of the half period, the diode bridges 5 and 6 of the rectifier circuit 3 cause the same charging current to flow in the capacitor 9 of the smoothing circuit 8 through the reactor 2 for the next half period.

As a result, the source voltage e of the ac power supply 1 and current input into the dc power-supply unit 11 exhibit waveforms as shown in FIGS. 2(a), 2(b). At this time, the voltage charged in the capacitor 9 is applied to the load 10.

FIG. 3 is a circuit diagram of a conventional dc power-supply unit having an enhanced power factor, disclosed in, for example, Japanese Patent Application Laid-Open No. 2-299470. In FIG. 3, descriptions of component parts identical with those of the choke-input type of dc power-supply unit in the prior art are omitted.

In FIG. 3, reference numeral 12 is a transistor serving as switching means for short-circuiting the ac power supply 1 through the reactor 2, and 13 is a diode to prevent countercurrent from the capacitor 9 of the smoothing circuit 8.

A description will now be given of the operation. In FIG. 3, when the polarity of voltage of the ac power supply 1 on the side of the reactor 2 is positive, a current path in a conducting (ON) state of the transistor 12 is established to pass through the ac power supply 1, the reactor 2, the diode bridge 4, the transistor 12, and the diode bridge 7, and return to the ac power supply 1. When the polarity of the voltage of the ac power supply 1 on the side of the reactor 2 is negative, the current path in the conducting (ON) state of the transistor 12 is established to pass through the ac power supply 1, the diode bridge 6, the transistor 12, the diode bridge 5, and the reactor 2, and return to the ac power supply 1. The conducting state is held for an appropriately short period immediately after the voltage of the ac power supply 1 passes through its zero point.

On the other hand, when the polarity of the voltage of the ac power supply 1 on the side of the reactor 2 is positive, the current path in a cutoff (OFF) state of the transistor 12 is established to pass through the ac power supply 1, the reactor 2, the diode bridge 4, the diode 13, the capacitor 9, and the diode bridge 7, and return to the ac power supply 1. When the polarity of the voltage of the ac power supply 1 on the side of the reactor 2 is negative, the current path in the cutoff (OFF) state of the transistor 12 is established to pass through the ac power supply 1, the diode bridge 6, the diode 13, the capacitor 9, the diode bridge 5, and the reactor 2, and return to the ac power supply 1.

The switching operation of the transistor 12 is repeated for each positive or negative half-wave of the voltage of the ac power-supply 1. Thus, it is possible to provide operating waveform diagrams of the source voltage, the ac input current, and the transistor 12.

That is, in FIG. 4, the ac input current $I_{s2}$ (FIG. 4(c)) can serve as the input current with the reactor 2 as the load during the transistor 12 is ON, and it increases for a time period when the transistor 12 is ON. Further, accumulated energy in the reactor 2 is discharged concurrently with the OFF state of the transistor 12, resulting in a damped conducting condition. Therefore, it is possible to combine ac input current $I_{s1}$ (shown in FIG. 2(b)) with the input current $I_{s2}$ of the conventional choke-input type of dc power-supply unit into combined ac input current $I_{s3}$ as shown in FIG. 4(d).

The ac input current $I_{s3}$ is applied over an entire period including time periods T1, T2, and T3 as shown in FIG. 4. Consequently, a power factor between the ac input current $I_{s3}$ and the source voltage $V_s$ (FIG. 4(a)) can be improved greater than that between the source voltage $V_s$ and the input current $I_{s1}$ of the conventional choke-input type of dc power-supply unit.

FIG. 4(b) illustrates the state of the transistor 12.

In addition, FIG. 6 is a circuit diagram in which the reactor 2 of FIG. 1 is connected to the dc side of the rectifier circuit 3. Since an operation of each component part in this circuit diagram is substantially identical with that in case of FIG. 1, it is possible to provide its operating waveform diagram as shown in FIG. 5(a)–(c).

The conventional choke-input type of dc power-supply unit is constructed as set forth above. Accordingly, residual voltage serving as dc voltage is left in the capacitor 9 of the smoothing circuit 8 so that the charging current can flow only during the source voltage exceeds the residual voltage, that is, only during the source voltage is in a vicinity of its peak. As a result, there are problems, for example, in that a large higher harmonic component (in particular, the higher harmonic component of odd-numbered order such as third order, fifth order, seventh order, or eleventh order) is generated in the input current, and the power factor is reduced.

Further, the conventional dc power-supply unit having the enhanced power factor is constructed as set forth above. Therefore, it is possible to improve the power factor in the dc power-supply unit greater than that in the choke-input type of dc power-supply unit. However, there is a problem in that the dc power-supply unit is not particularly useful for the best effect of power factor improvement since the transistor 12 is conducting for a constant period exclusively (i.e., immediately after the source voltage passes through the zero point). In addition, as understood from the operating waveforms shown in FIG. 5, wherein FIG. 5(a) illustrates the source voltage $V_s$ the energy accumulated in the reactor 2 excessively increases when the transistor 12 is conducting (FIG. 5(b)) so that input current can not flow for the period T3 when magnitude of the load is varied (FIG. 5(c)). As a result, there are some problems in that the power factor is reduced, the higher harmonic component of the input current increases disadvantageously, and the energy excessively accumulated in the reactor 2 causes the voltage of the smoothing capacitor 9 to increase, resulting in destruction of devices connected to the load 10 due to the overvoltage.

SUMMARY OF THE INVENTION

In view of the foregoing, it is an object of the present invention to provide a dc power-supply unit which can reduce a higher harmonic component of the input current, and optimally improve a power factor.

It is another object of the present invention to provide a dc power-supply unit which can optimally improve a power factor even if the magnitude of load is varied.

It is a further object of the present invention to provide a dc power-supply unit which can improve a power factor more accurately.

According to the first aspect of the present invention, for achieving the above-mentioned objects, there is provided a dc power-supply unit which, when ac voltage of an ac power supply passes through a zero point, closes the switching means after a preset first delay time from the passing through time, and opens the switching means after a preset second delay time from the passing through time.

Consequently, the dc power-supply unit according to the first aspect of the present invention is provided with switch controlling means for, when the ac voltage of the ac power supply passes through the zero point, closing the switching means after the preset first delay time from the passing through time, and opening the switching means after the preset second delay time from the passing through time. As a result, charging current can flow even if the voltage of the ac power-supply is lower than the capacitor voltage of a smoothing means.

According to the second aspect of the present invention, there is provided a dc power-supply unit which, when ac voltage of an ac power supply passes through a zero point, closes the switching means after a preset delay time from the passing through time, and opens the switching means after a predetermined time period from the closing time.

Consequently, the dc power-supply unit according to the second aspect of the present invention is provided with switch controlling means for, when the ac voltage of the ac power supply passes through the zero point, closing the switching means after the preset delay time from the passing through time, and opening the switching means after the preset time period from the closing time. As a result, charging current can flow even if the voltage of the ac power-supply is lower than the capacitor voltage of a smoothing means.

According to the third aspect of the present invention, there is provided a dc power-supply unit which, when ac voltage of an ac power supply passes through a zero point, closes the switching means after a preset delay time from the passing through time, and opens the switching means when a value of short-circuit current reaches a predetermined value after the closing operation.

Consequently, the dc power-supply unit according to the third aspect of the present invention is provided with switch controlling means for, when the ac voltage of the ac power supply passes through the zero point, closing the switching means after the preset delay time from the passing through time, and opening the switching means when the value of the short-circuit current becomes the predetermined value after the closing operation. As a result, charging current can flow even if the voltage of the ac power-supply is lower than the capacitor voltage of smoothing means.

According to the fourth aspect of the present invention, there is provided a dc power-supply unit which, when ac voltage of an ac power supply passes through a zero point, selects a first delay time or a second delay time depending upon the results of the detection of the load condition detecting means so as to close switching means after the selected delay time from the passing through time, and open the switching means after a third delay time from the passing through time.

Consequently, the dc power-supply unit according to the fourth aspect of the present invention is provided with switch controlling means for, when the ac voltage of the ac power supply passes through the zero point, selecting the first delay time or the second delay time depending upon the results of detection of the load condition detecting means so as to close the switching means after the selected delay time from the passing through time, and open the switching means after the third delay time from the passing through time. As a result, charging current can flow according to magnitude of the load even if the voltage of the ac power-supply is lower than the capacitor voltage of a smoothing means.

According to the fifth aspect of the present invention, there is provided a dc power-supply unit which, when ac voltage of an ac power supply passes through a zero point, selects a first delay time or a second delay time depending upon the results of the detection of the load condition detecting means so as to close switching means after the selected delay time from the passing through time, and open the switching means after a predetermined time from the closing time.

Consequently, the dc power-supply unit according to the fifth aspect of the present invention is provided with switch controlling means for, when the ac voltage of the ac power supply passes through the zero point, selecting the first delay time or the second delay time depending upon the results of the detection of the load condition detecting means so as to close the switching means after the selected delay time from the passing through time, and open the switching means after the predetermined time from the closing time. As a result, charging current can flow according to magnitude of the load even if the voltage of the ac power-supply is lower than the capacitor voltage of a smoothing means.

According to the sixth aspect of the present invention, there is provided a dc power-supply unit which, when ac voltage of an ac power supply passes through a zero point, selects a first delay time or a second delay time depending upon the results of the detection of the load condition detecting means so as to close switching means after the selected delay time from the passing through time, and open the switching means when a value of short-circuit current reaches a predetermined value after the closing operation.

Consequently, the dc power-supply unit according to the sixth aspect of the present invention is provided with switch controlling means for, when the ac voltage of the ac power supply passes through the zero point, selecting the first delay time or the second delay time depending upon the results of the detection of the load condition detecting means so as to close the switching means after the selected delay time from the passing through time, and open the switching means when the value of short-circuit current reaches the predetermined value after the closing operation. As a result, charging current can flow according to the magnitude of the load even if the voltage of the ac power-supply is lower than the capacitor voltage of a smoothing means.

According to the seventh aspect of the present invention, there is provided a dc power-supply unit which, when ac voltage of an ac power supply passes through a zero point, closes switching means after a first delay time from the passing through time, and selects a second delay time or a third delay time depending upon the results of the detection of the load condition detecting means so as to open the switching means after the selected delay time from the passing through time.

Consequently, the dc power-supply unit according to the seventh aspect of the present invention is provided with switch controlling means for, when the ac voltage of the ac power supply passes through the zero point, closing the switching means after the first delay time from the passing through time, and selecting the second delay time or the third delay time depending upon the results of the detection of the load condition detecting means so as to open the switching means after the selected delay time from the passing through time. As a result, charging current can flow according to the magnitude of the load even if the voltage of the ac power-supply is lower than the capacitor voltage of a smoothing means.

According to the eighth aspect of the present invention, there is provided a dc power-supply unit which, when ac voltage of an ac power supply passes through a zero point, closes switching means after a first delay time from the passing through time, and selects a second delay time or a third delay time depending upon the results of the detection of the load condition detecting means so as to open the switching means after the selected delay time from the closing time.

Consequently, the dc power-supply unit according to the eighth aspect of the present invention is provided with switch controlling means for, when the ac voltage of the ac power supply passes through the zero point, closing the switching means after the first delay time from the passing through time, and selecting the second delay time or the third delay time depending upon the results of the detection of the load condition detecting means so as to open the switching means after the selected delay time from the closing time. As a result, charging current can flow according to the magnitude of the load even if the voltage of the ac power-supply is lower than the capacitor voltage of a smoothing means.

According to the ninth aspect of the present invention, there is provided a dc power-supply unit which, when ac voltage of an ac power supply passes through a zero point, closes switching means after a preset delay time from the passing through time, and decides whether or not a value of short-circuit current has reached a predetermined value preset according to the magnitude of the load after the closing operation depending upon the load condition detecting means so as to open the switching means in case a decision is made that the short-circuit current becomes the predetermined value.

Consequently, the dc power-supply unit according to the ninth aspect of the present invention is provided with switch controlling means for, when the ac voltage of the ac power supply passes through the zero point, closing the switching means after the preset delay time from the passing through time, and deciding whether or not the value of the short-circuit current has reached the predetermined value preset according to the magnitude of the load after the closing operation depending upon the load condition detecting means so as to open the switching means in case the decision is made that the short-circuit current has reached the predetermined value. As a result, charging current can flow according to the magnitude of the load even if the voltage of the ac power-supply is lower than the capacitor voltage of a smoothing means.

According to the tenth aspect of the present invention, there is provided a dc power-supply unit to, when ac voltage of an ac power supply passes through a zero point, select a first delay time or a second delay time depending upon the results of the detection of the load condition detecting means so as to closes switching means after the selected delay time from the passing through time, and select a third delay time or a fourth delay time depending upon the results of the detection of the load condition detecting means so as to open the switching means after the selected delay time from the passing through time.

Consequently, the dc power-supply according to the tenth aspect of the present invention is provided with switch controlling means for, when the ac voltage of the ac power supply passes through the zero point, selecting the first delay time or the second delay time depending upon the results of the detection of the load condition detecting means so as to close the switching means after the selected delay time from the passing through time, and selecting the third delay time or the fourth delay time depending upon the results of the detection of the load condition detecting means so as to open the switching means after the selected delay time from the passing through time. As a result, charging current can flow according to the magnitude of the load even if the voltage of the ac power-supply is lower than the capacitor voltage of a smoothing means.

According to the eleventh aspect of the present invention, there is provided a dc power-supply unit which, when ac voltage of an ac power supply passes through a zero point, selects a first delay time or a second delay time depending upon the results of the detection of the load condition detecting means so as to closes switching means after the selected delay time from the passing through time, and select a third delay time or a fourth delay time depending upon the results of the detection of the load condition detecting means so as to open the switching means after the selected delay time from the closing operation.

Consequently, the dc power-supply according to the eleventh aspect of the present invention is provided with switch controlling means for, when the ac voltage of the ac power supply passes through the zero point, selecting the first delay time or the second delay time depending upon the results of the detection of the load condition detecting means so as to close the switching means after the selected delay time from the passing through time, and selecting the third delay time or the fourth delay time depending upon the results of the detection of the load condition detecting means so as to open the switching means after the selected delay time from the closing operation. As a result, charging current can flow according to the magnitude of the load even if voltage of the ac power-supply is lower than the capacitor voltage of a smoothing means.

According to the twelfth aspect of the present invention, there is provided a dc power-supply unit to, when ac voltage of an ac power supply passes through a zero point, select a first delay time or a second delay time depending upon the results of the detection of the load condition detecting means so as to closes switching means after the selected delay time from the passing through time, and decide whether or not a value of short-circuit current reaches a predetermined value preset according to the magnitude of the load after the closing operation depending upon the load condition detecting means so as to open the switching means in case a decision is made that the short-circuit current has reached the predetermined value.

Consequently, the dc power-supply unit according to the twelfth aspect of the present invention is provided with switch controlling means for, when the ac voltage of the ac power supply passes through the zero point, selecting the first delay time or the second delay time depending upon the results of the detection of the load condition detecting means so as to close the switching means after the selected delay time from the passing through time, and deciding whether or not the value of the short-circuit current reaches the predetermined value preset according to the magnitude of the load after the closing operation depending upon the load condition detecting means so as to open the switching means in case the decision is made that the short-circuit current has reached the predetermined value. As a result, charging current can flow according to the magnitude of the load even if the voltage of the ac power-supply is lower than the capacitor voltage of a smoothing means.

According to the thirteenth aspect of the present invention, there is provided a dc power-supply unit to detect a power factor of the ac power output from an ac power supply, and compare the power factor with a predetermined value so as to correct a delay time which is set in switch controlling means to close a switching means depending upon the results of the comparison.

Consequently, the dc power-supply unit according to the thirteenth aspect of the present invention is provided with correcting means for detecting the power factor of the ac power output from the ac power supply, and comparing the power factor with the predetermined value so as to correct the delay time which is set in the switch controlling means to close the switching means depending upon the results of the comparison. As a result, the power factor of the ac power corresponds to the predetermined value.

According to the fourteenth aspect of the present invention, there is provided a dc power-supply unit to detect a power factor of the ac power output from an ac power supply, and compare the power factor with a predetermined value so as to correct a second delay time which is set in the switch controlling means to open the switching means depending upon the results of the comparison.

Consequently, the dc power-supply unit according to the fourteenth aspect of the present invention is provided with correcting means for detecting the power factor of the ac power output from the ac power supply, and comparing the power factor with the predetermined value so as to correct the second delay time which is set in the switch controlling means to open the Switching means depending upon the results of the comparison. As a result, the power factor of the ac power corresponds to the predetermined value.

According to the fifteenth aspect of the present invention, there is provided a dc power-supply unit to detect a relative harmonic content in the ac power output from an ac power supply, and compare the relative harmonic content with a predetermined value so as to correct a delay time which is set in switch controlling means to closes switching means depending upon the results of the comparison.

Consequently, the dc power-supply unit according to the fifteenth aspect of the present invention is provided with correcting means for detecting the relative harmonic content in the ac power output from the ac power supply, and comparing the relative harmonic content with the predetermined value so as to correct the delay time which is set in the switch controlling means to close the switching means depending upon the results of the comparison. As a result, the relative harmonic content in the ac power corresponds to the predetermined value.

According to the sixteenth aspect of the present invention, there is provided a dc power-supply unit to detect a relative harmonic content in the ac power output from an ac power supply, and compare the relative harmonic content with a predetermined value so as to correct a second delay time which is set in switch controlling means to open switching means depending upon the results of the comparison.

Consequently, the dc power-supply unit according to the sixteenth aspect of the present invention is provided with correcting means for detecting the relative harmonic content in the ac power output from the ac power supply, and comparing the relative harmonic content with the predetermined value so as to correct the second delay time which is set in the switch controlling means to open the switching means depending upon the results of the comparison. As a result, the relative harmonic content in the ac power corresponds to the predetermined value.

According to the seventeenth aspect of the present invention, there is provided a dc power-supply unit to detect distortion in a waveform of an ac power supply, and compare the distortion in the waveform with a predetermined value so as to correct a delay time which is set in switch controlling means to closes switching means depending upon the results of the comparison.

Consequently, the dc power-supply unit according to the seventeenth aspect of the present invention is provided with correcting means for detecting the distortion in the waveform of the ac power supply, and comparing the distortion in the waveform with the predetermined value so as to correct the delay time which is set in the switch controlling means to close the switching means depending upon the results of the comparison. As a result, the distortion in the waveform of the ac power corresponds to the predetermined value.

According to the eighteenth aspect of the present invention, there is provided a dc power-supply unit to detect distortion in a waveform of an ac power supply, and compare the distortion in the waveform with a predetermined value so as to correct a second delay time which is set in switch controlling means to open switching means depending upon the results of the comparison.

Consequently, the dc power-supply unit according to the eighteenth aspect of the present invention is provided with correcting means for detecting the distortion in the waveform of the ac power supply, and comparing the distortion in the waveform with the predetermined value so as to correct the second delay time which is set in the switch controlling means to open the switching means depending upon the results of the comparison. As a result, the distortion in the waveform of the ac power corresponds to the predetermined value.

According to the nineteenth aspect of the present invention, there is provided a dc power-supply unit to detect a power factor and a relative harmonic content in the ac power output from an ac power supply, and compare the power factor with a predetermined value so as to correct a first delay time which is set in the switch controlling means to close the switching means depending upon the results of the comparison, and so as to correct a second delay time which is set in the switch controlling means to open the switching means depending upon the results of the comparison.

Consequently, the dc power-supply unit according to the nineteenth aspect of the present invention is provided with correcting means for detecting the power factor and the relative harmonic content in the ac power output from the ac power supply, and comparing the power factor with the predetermined value so as to correct the first delay time which is set in the switch controlling means to close the switching means depending upon the results of the comparison, and so as to correct the second delay time which is set in the switch controlling means to open the switching means depending upon the results of the comparison. As a result, the power factor and the relative harmonic content in the ac power correspond to the respective predetermined values.

According to the twentieth aspect of the present invention, there is provided a dc power-supply unit to detect a power factor and a relative harmonic content in the ac power output from an ac power supply, and compare the relative harmonic content with a predetermined value so as to correct a first delay time which is set in switch controlling means to close the switching means depending upon the results of the comparison, and so as to correct a second delay time which is set in the switch controlling means to open the switching means depending upon the results of the comparison.

Consequently, the dc power-supply unit according to the twentieth aspect of the present invention is provided with correcting means for detecting the power factor and the relative harmonic content in the ac power output from the ac power supply, and comparing the relative harmonic content with the predetermined value so as to correct the first delay time which is set in the switch controlling means to close the switching means depending upon the results of the comparison, and so as to correct the second delay time which is set in the switch controlling means to open the switching means depending upon the results of the comparison. As a result, the power factor and the relative harmonic content in the ac power correspond to the respective predetermined values.

According to the twenty-first aspect of the present invention, there is provided a dc power-supply unit to open switching means when overvoltage is detected by overvoltage detecting means after the Switching means is closed.

Consequently, the dc power-supply unit according to the twenty-first aspect of the present invention is provided with switch controlling means for opening the switching means when the overvoltage is detected by the overvoltage detecting means after the switching means is closed. As a result, charging current can flow even if the voltage of an ac power supply is lower than the capacitor voltage of a smoothing means.

According to the twenty-second aspect of the present invention, there is provided a dc power-supply unit to repeatedly open and closes switching means at predetermined intervals until the switching means is opened after the switching means is closed.

Consequently, the dc power-supply unit according to the twenty-second aspect of the present invention is provided with switch controlling means for repeatedly opening and closing the switching means at predetermined intervals until the switching means is opened after the switching means is closed. As a result, in case the voltage of an ac power supply is lower than the capacitor voltage of the smoothing means, it is possible to feed charging current while preventing excessive short-circuit current from flowing.

According to the twenty-third aspect of the present invention, there is provided a dc power-supply unit including switching means for short-circuiting at least one of a plurality of rectifying devices forming a rectifying means.

Consequently, the dc power-supply unit according to the twenty-third aspect of the present invention is provided with the switching means for short-circuiting at least one of the plurality of rectifying devices forming the rectifying means. As a result, charging current can flow even if the voltage of an ac power supply is lower than the capacitor voltage of the smoothing means.

According to the twenty-fourth aspect of the present invention, there is provided a dc power-supply unit in which an inductive element is connected between one terminal on the ac side of the rectifying means and an ac power supply.

Consequently, in the dc power-supply unit according to the twenty-fourth aspect of the present invention, the inductive element is connected between the one terminal on the ac side of the rectifying means and the ac power supply. As a result, charging current can flow even if the voltage of the ac power supply is lower than the capacitor voltage of the smoothing means as in the case of the first aspect of the present invention.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

BRIEF DESCRIPTION OF THE DRAWINGS

FIG. 1 is a circuit diagram showing a conventional choke-input type of a dc power-supply unit;

FIGS. 2(a) and 2(b) are an operating waveform diagram showing an operating waveform in each part;

FIG. 120 is a circuit diagram in case a microprocessor is employed;

FIG. 121 is a flowchart of a program operating in the microprocessor;

FIG. 122 is a circuit diagram showing another embodiment in case the microprocessor is employed; and FIG. 123 is a flowchart showing the operation of the embodiment shown in FIG. 122.

DETAILED DESCRIPTION OF THE PREFERRED EMBODIMENTS

Preferred embodiments of the invention will now be described in detail referring to the accompanying drawings.

Embodiment 1

Figure 3:
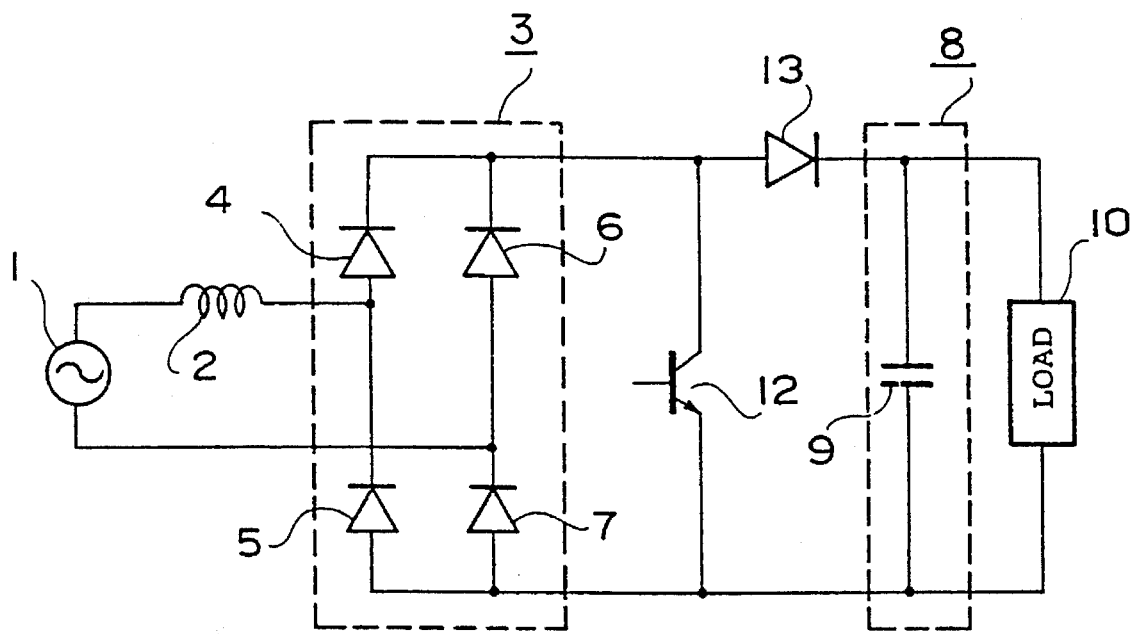
FIG. 3 is a circuit diagram showing a conventional dc power-supply unit having an enhanced power factor.
Figure 4:
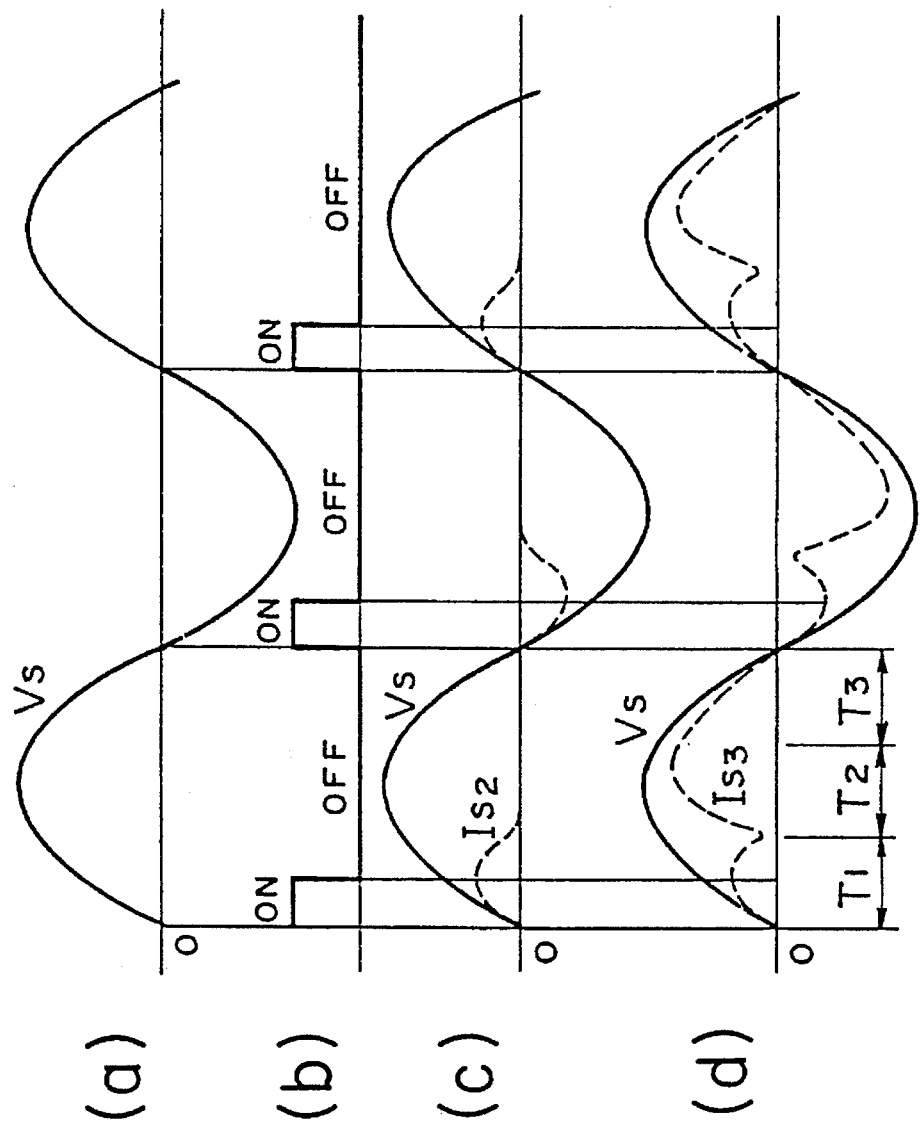
FIG. 4 is an operating waveform diagram showing the operating waveform in each part.
Figure 5:
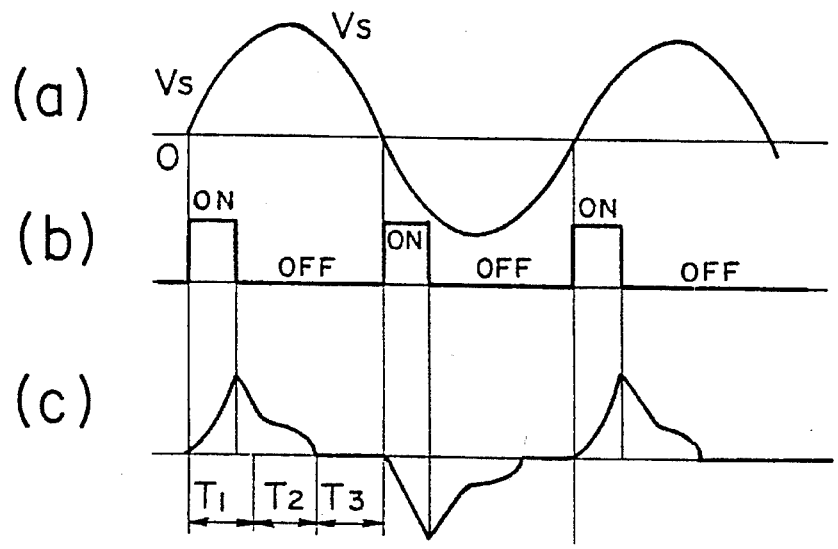
FIG. 5 is an operating waveform diagram showing the operating waveform in each part.
Figure 6:
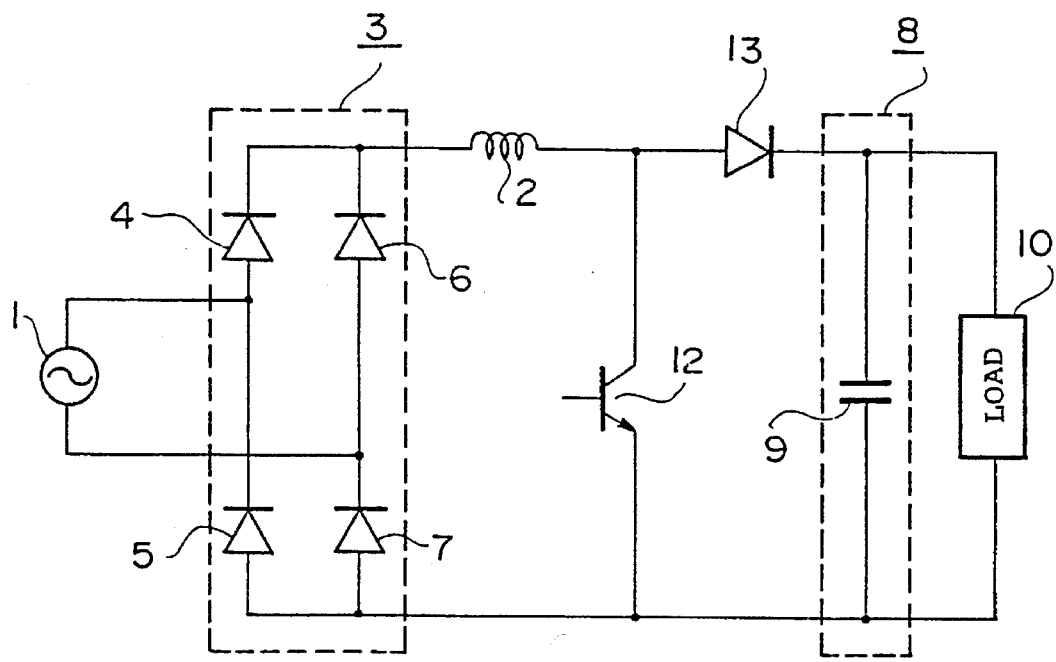
FIG. 6 is a circuit diagram showing the conventional choke-input type of dc power-supply unit.
Figure 7:
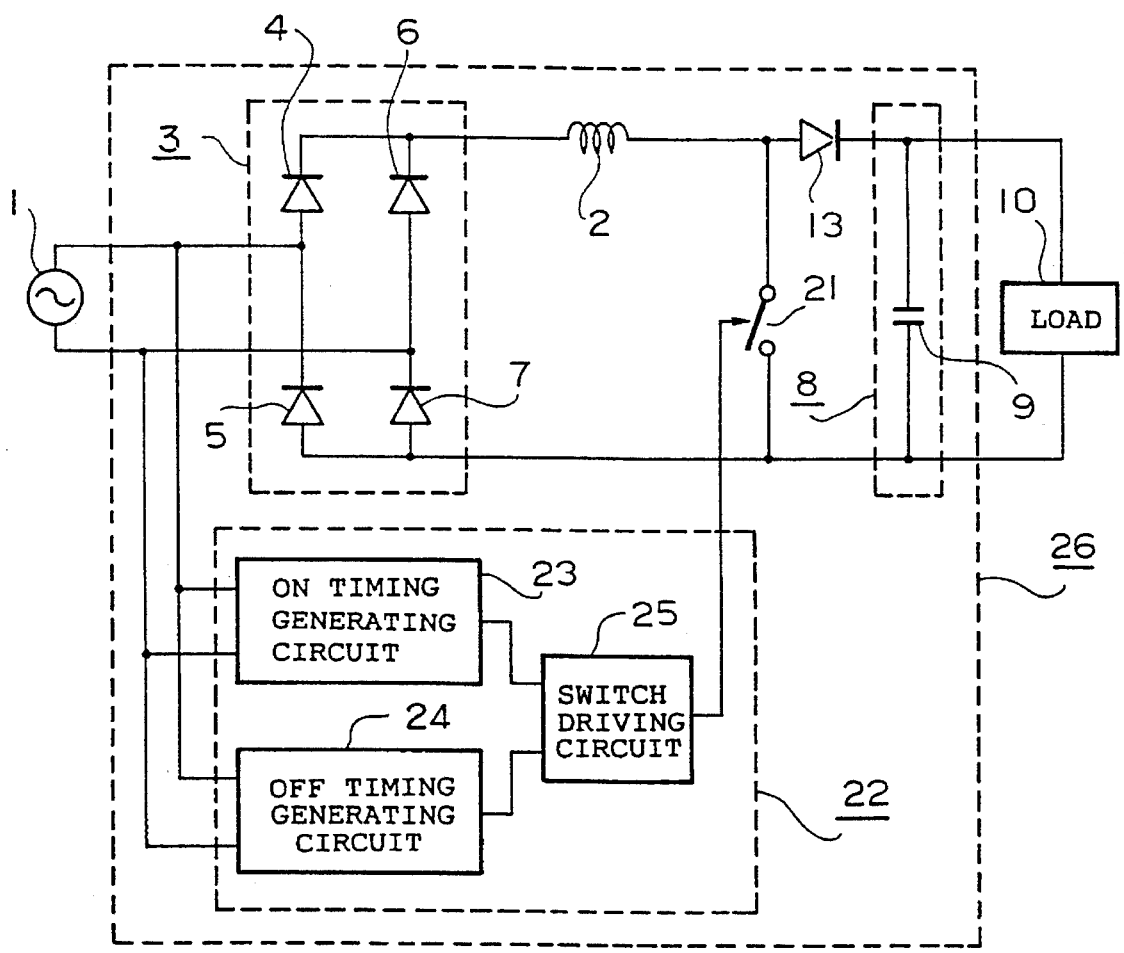
FIG. 7 is a circuit diagram showing one embodiment of a dc power-supply unit according to the first aspect of the present invention.

FIG. 7 is a circuit diagram showing one embodiment of a dc power-supply unit according to the first aspect of the present invention. In FIG. 7, the same reference numerals are used for component parts identical with or equivalent to those of a dc power-supply unit in the prior art, and descriptions thereof are omitted.

In FIG. 7, reference numeral 21 means a switch (switching means) connected between the other end of the reactor (inductive element) 2 and the other terminal on the dc side of the rectifier circuit (rectifying means) 3 to perform a switching operation, and 22 means a switch controlling circuit (switch controlling means) in which first and second delay times are set so as to, when ac voltage of the ac power supply 1 passes through a zero point, close the switch 21 after the first delay time $T_d$ from the passing through time, and open the switch 21 after the second delay time from the passing through time. Further, reference numeral 23 is an ON timing generating circuit to generate an ON signal after the first delay time $T_d$ from the time when the ac voltage of the ac power supply 1 passes through the zero point, 24 is an OFF timing generating circuit to generate an OFF signal after the second delay time from the time when the ac voltage of the ac power supply 1 passes through the zero point, 25 is a switch driving circuit to drive the switch 21 in response to output signals from the ON timing generating circuit 23 and the OFF timing generating circuit 24, and 26 is a dc power-supply unit.

A description will now be given of the operation. In case the ON signal is output from the ON timing generating circuit 23 through the switch driving circuit 25 in synchronization with the source voltage of the ac power supply 1, the switch 21 is closed so that the ac power supply 1 is short-circuited through the reactor 2 and the diode bridges 4, 7 (or the diode bridges 5, 6) to conduct current, and the current gradually increases. Subsequently, in case the OFF signal is output from the OFF timing generating circuit 24 through the switch driving circuit 25 in synchronization with the source voltage, the switch 21 is opened so that the short-circuit current which has been flowing in the reactor 2 passes through the diode 13 to become the charging current in the capacitor 9 of the smoothing circuit (smoothing means) 8, and starts to decrease. Thereafter, when the source voltage of the ac power supply 1 is in the vicinity of peak voltage, the diode bridges 4, 7 (or the diode bridges 5, 6) cause the charging current in the capacitor 9 to flow through the reactor 2 and the diode 13 as in the case of the conventional dc power-supply unit as described before.

Figure 8:
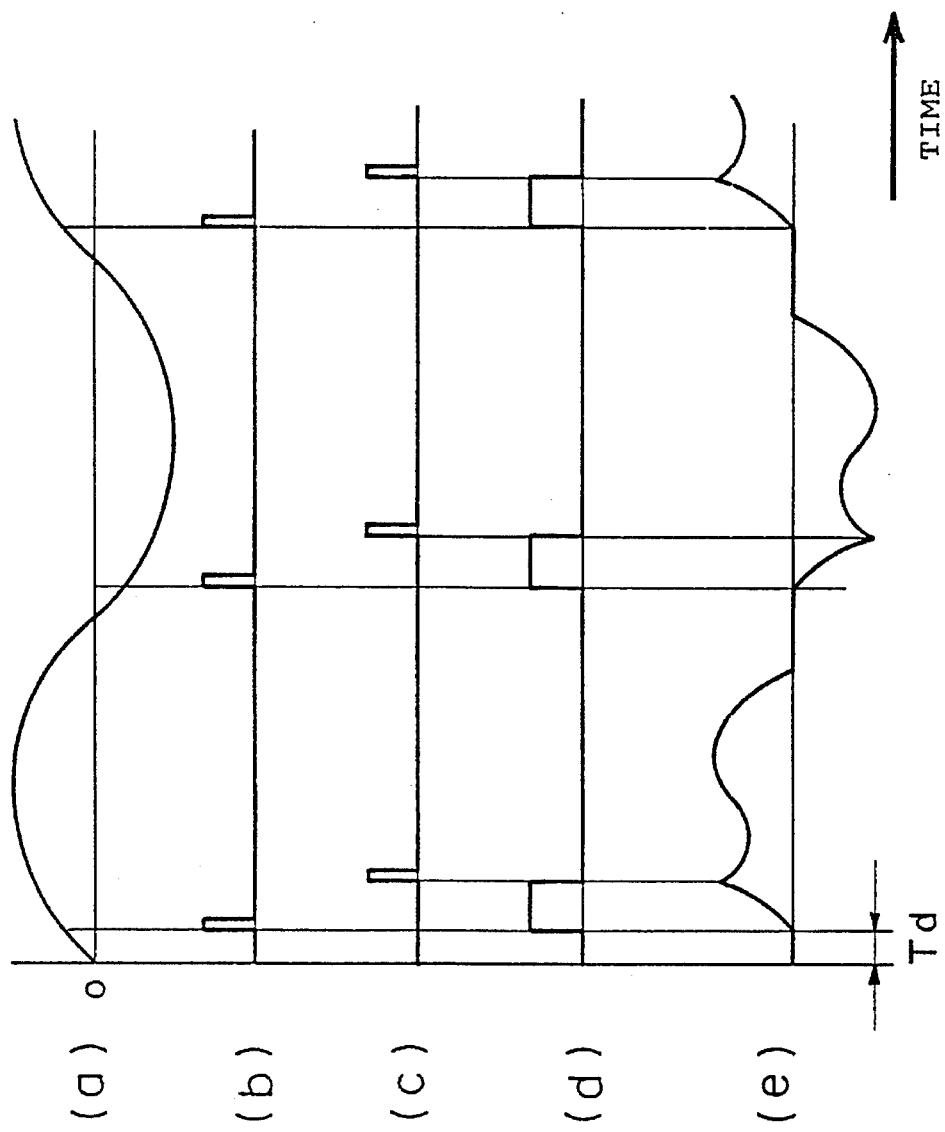
FIG. 8 is an operating waveform diagram showing the operating waveform in each part.

Each operating waveform in each part at this time is shown in FIG. 8. In FIG. 8, (a) shows a source voltage waveform of the ac power supply 1, (b) shows the output signal from the ON timing generating circuit 23, (c) shows the output signal from the OFF timing generating circuit 24, (d) shows an output signal from the switch driving circuit 25, and (e) shows input current of the dc power-supply unit 26.

Figure 9:
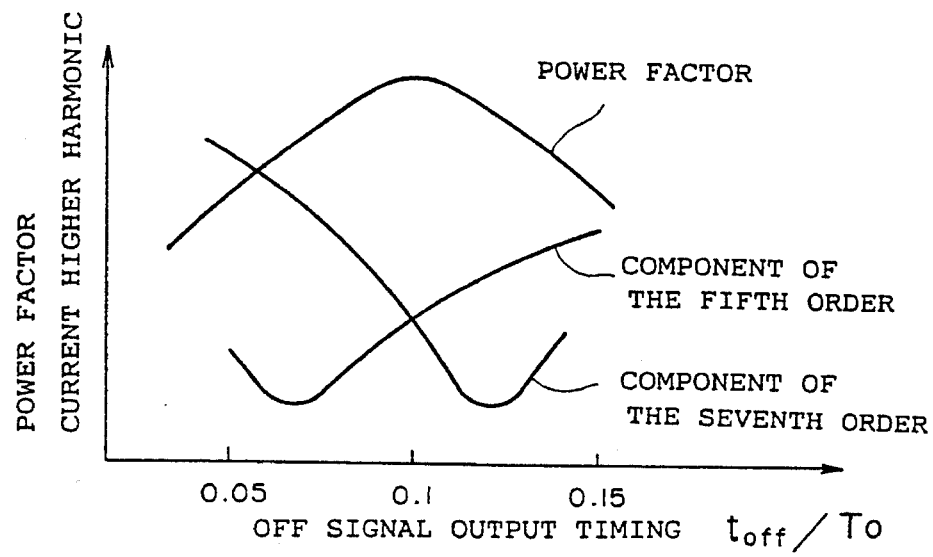
FIG. 9 is a graph diagram showing a relation between OFF timing and a power factor, and a higher harmonic component.

FIG. 9 is a diagram showing the relationships between the OFF signal output timing of the OFF timing generating circuit 24, and a power factor and a higher harmonic component of the input current of the dc power-supply unit 26 in case the ON signal for the switch 21 is generated from the ON timing generating circuit 23 at a certain time point in synchronization with the source voltage of the ac power supply 1 (for example, after a time $T_d$ from a zero crossing point of the source voltage) under a constant load. In FIG. 9, the transverse axis represents a ratio of the OFF signal output timing $t_{off}$ to a power supply period $T_o$ on the basis of the zero crossing point of the source voltage. In this case, as seen from the drawing, it is possible to provide the overall optimal operating point in view of the power factor and a current higher harmonic characteristic by setting the OFF signal output timing to a value of approximately 0.1. Thus, if the ON signal output timing is determined, it is possible to set the optimal value as the OFF signal output timing depending upon the overall decision of the characteristics. In the present invention, the ON timing generating circuit 23 and the OFF timing generating circuit 24 are preset to output the optimal timing in synchronization with the source voltage of the ac power supply 1, respectively.

It must be understood that the OFF signal output timing may be determined in the vicinity of the maximum power factor point with respect to the set ON signal output timing in case a particular weight is given to the power factor. Further, it must be noted that the OFF signal output timing may be determined so as to minimize the higher harmonic component of any desired specific order with respect to the set ON signal output timing in case the higher harmonic component of a specific order in the input current should be particularly reduced.

Figure 10:
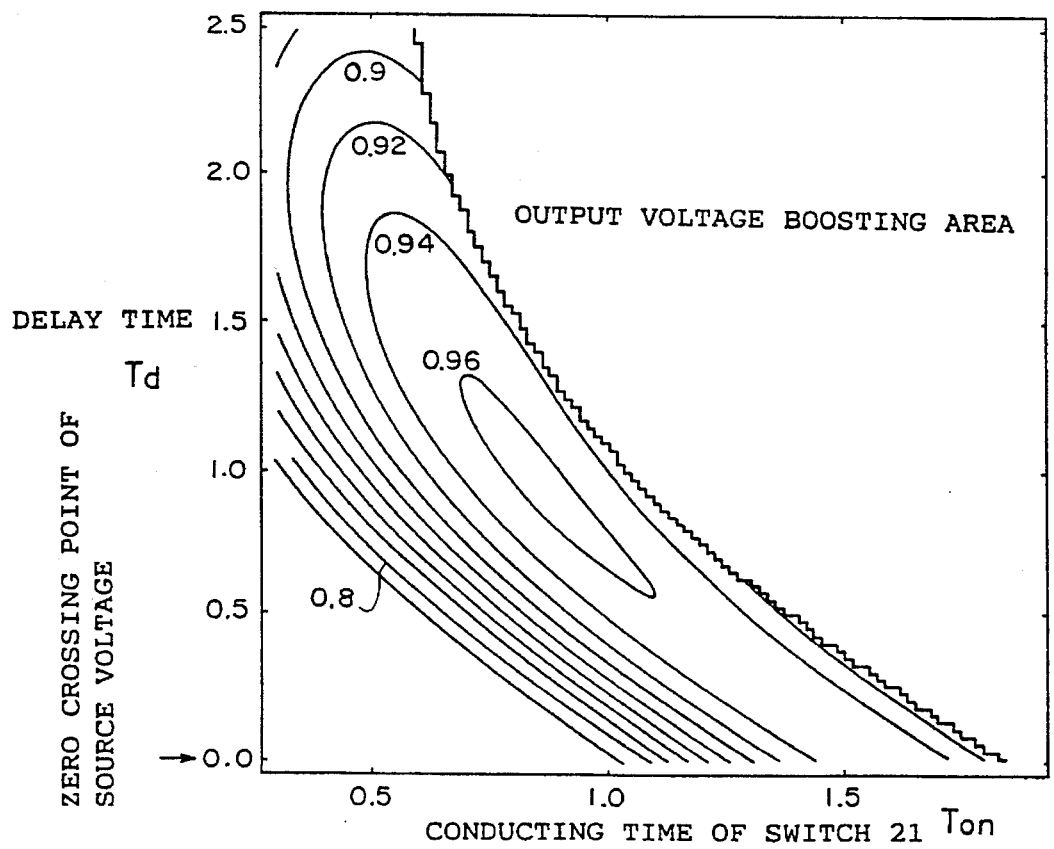
FIG. 10 is a contour map of the power factor with respect to a delay time and a conducting time.

In case the particular weight is given to the power factor, the ON signal for the switch 21 output from the ON timing generating circuit 23 may be set depending upon a power factor characteristic shown in FIG. 10 under a constant load. In FIG. 10, the ordinate axis represents a delay time $T_d$ from the zero crossing point of the source voltage, the transverse axis represents a conducting time $T_{on}$ of the switch 21, that is, a time obtained by subtracting the delay time $T_d$ from the OFF signal output timing $t_{off}$ on the basis of the zero crossing point of the source voltage. FIG. 10 is a contour map showing 0.8% or more power factor. As seen from the illustration, it is possible to enhance a power factor improvement effect when the delay time $T_d$ is in a range from 0.6 to about 1.3 [msec] greater than when the delay time is fixed to the zero crossing point of the source voltage (i.e., $T_d=0$ [msec]) as in the conventional dc power-supply unit 11 having the enhanced power factor. Therefore, the ON signal output timing may be set in the range.

Figure 11:
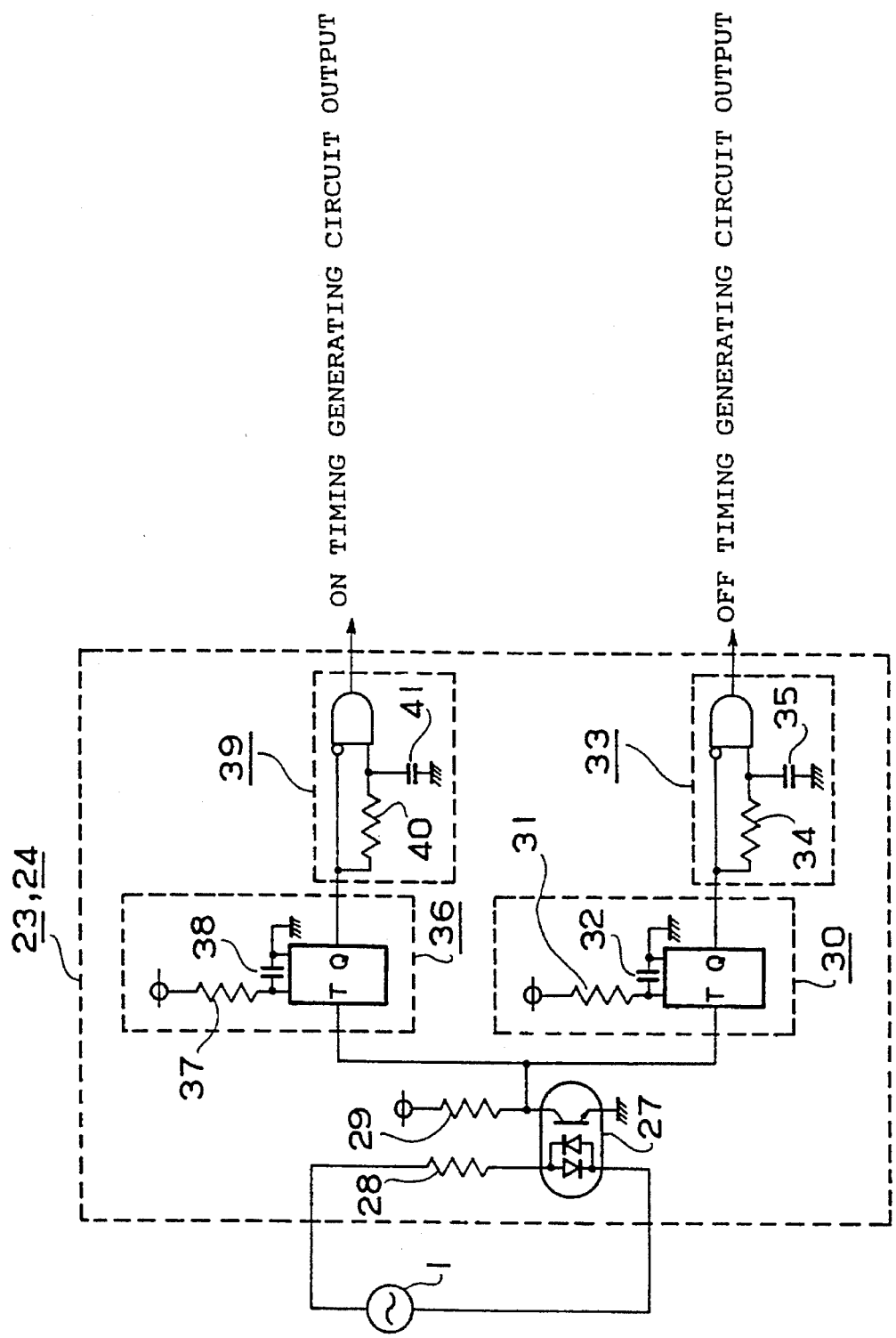
FIG. 11 is a detailed circuit diagram showing an ON timing generating circuit and an OFF timing generating circuit.

For example, the ON timing generating circuit 23 and the OFF timing generating circuit 24 may be constructed as shown in FIG. 11 in case the ON signal output timing for the switch 21 is delayed by a time $T_d$ from the zero crossing point of the source voltage of the ac power supply 1, and the OFF signal output timing is delayed a given period from the zero crossing point. In FIG. 11, reference numeral 27 is a photocoupler whose input is connected to the ac power supply 1, 28 and 29 are input-output bias resistors, 30 is a one-shot multivibrator circuit using an output from the photocoupler 27 as a trigger input, 31 and 32 are respectively a resistor and a capacitor to set an output pulse width of the one-shot multivibrator circuit 30, 33 is a trailing edge detecting circuit, and 34, 35 are respectively a resistor and a capacitor to set a pulse width of a trailing edge detecting signal.

Further, reference numeral 36 is a one-shot multivibrator circuit using the output from the photocoupler 27 as a trigger input, 37 and 38 are respectively a resistor and a capacitor to set an output pulse width of the one-shot multivibrator circuit 36, 39 is a trailing edge detecting circuit, and 40, 41 are respectively a resistor and a capacitor to set a pulse width of a trailing edge detecting signal.

In the circuit shown in FIG. 11, when the source voltage of the ac power supply 1 is in the vicinity of the zero crossing point, the output transistor of the photocoupler 27 is turned OFF so that a high level signal is output. The one-shot multivibrator circuit 36 uses the output as the trigger input, and outputs a signal (high level signal) having the pulse width set by the resistor 37 and the capacitor 38. In this case, if the pulse width is set to the optimal delay time $T_d$ from the zero crossing point of source voltage, an output signal from the trailing edge detecting circuit 39 obtained by an output signal from the one-shot multivibrator circuit 36 can serve as the output signal from the ON timing generating circuit 23. The one-shot multivibrator circuit 30 uses the output from the photocoupler 27 as the trigger input, and outputs a signal (a high level signal) having a pulse width set by the resistor 31 and the capacitor 32. In this case, if the pulse width is set to the optimal OFF timing, an output signal from the trailing edge detecting circuit 33 obtained by an output signal of the one-shot multivibrator circuit 30 can serve as the output signal from the OFF timing generating circuit 24.

Figure 12:
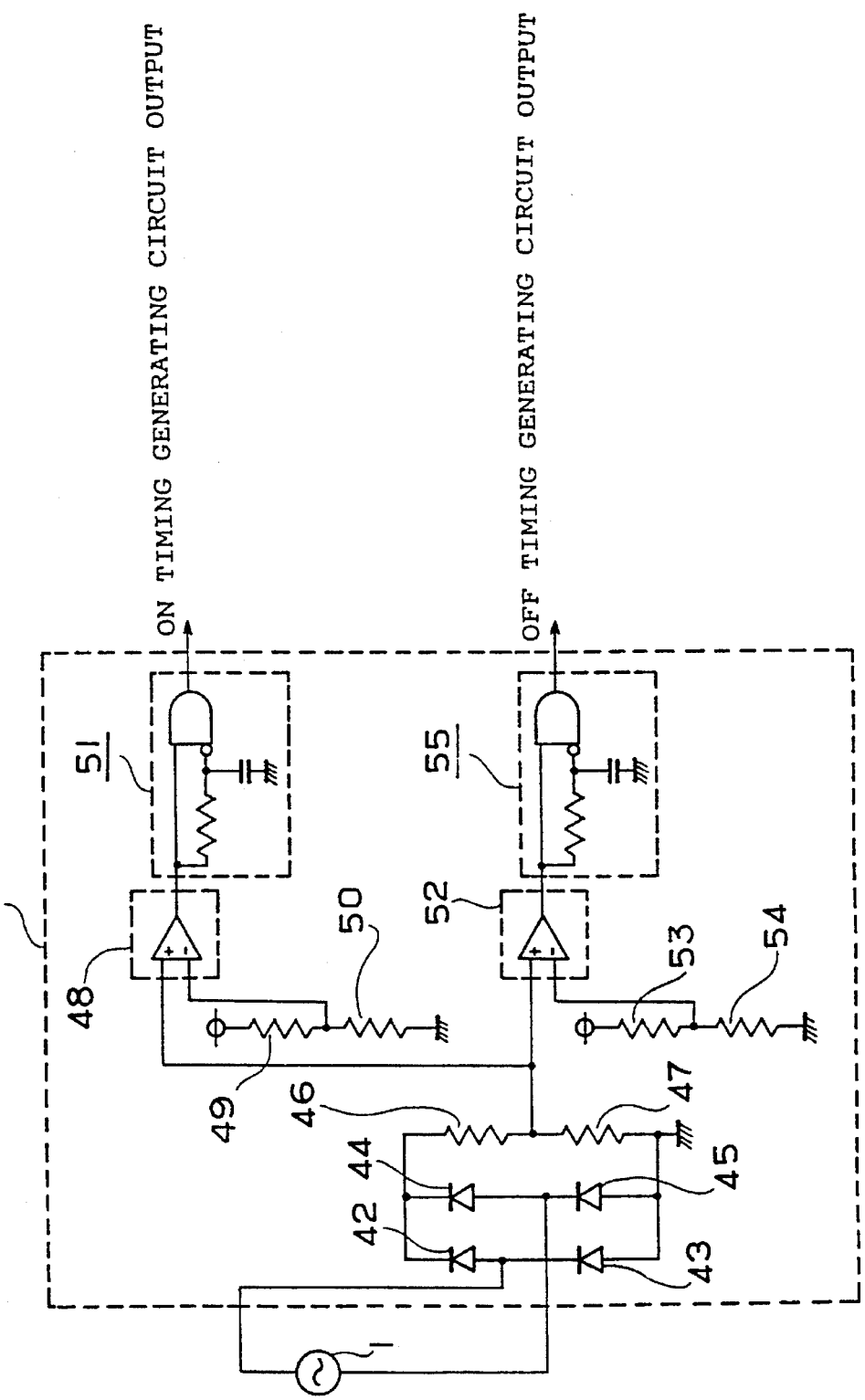
FIG. 12 is a detailed circuit diagram showing the ON timing generating circuit and the OFF timing generating circuit.

According to the circuit embodiment shown in FIG. 11, the signals in synchronization with the source voltage can be obtained by setting output from the ON timing generating circuit 23 and the OFF timing generating circuit 24 on the basis of the zero crossing point of the source voltage of the ac power supply 1. However, it must be noted that the present invention should not be limited to the above means for obtaining the synchronizing signal, and may include another means as shown in a circuit embodiment in FIG. 12. In FIG. 12, reference numerals 42 to 45 are rectifying diodes, 46 and 47 are voltage dividing resistors, 48 and 52 are comparator circuits, 49, 50, 53, and 54 are reference voltage setting resistors for the comparator circuits 48, 52, and 51, 55 are leading edge detecting circuits.

Figure 13:
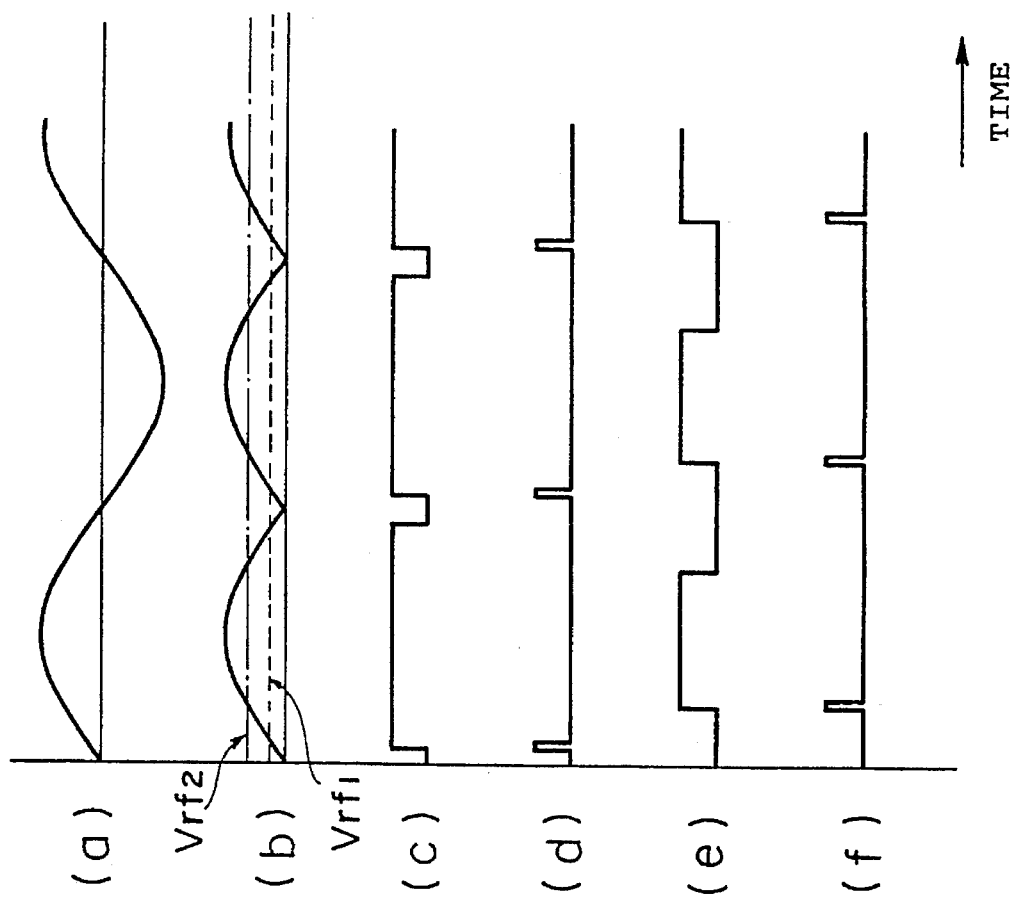
FIG. 13 is an operating waveform diagram showing the operating waveform in each part.

FIG. 13 is a diagram showing the operation of the circuit shown in FIG. 12. In FIG. 13, (a) shows a source voltage waveform of the ac power supply 1, (b) shows a rectified/voltage divided output waveform of the voltage dividing resistors 46 and 47, (c) and (e) show output waveforms from the respective comparator circuits 48 and 52, and (d), (f) show on timing and off timing output waveforms from the respective leading edge detecting circuits 51, 55. As seen from FIG. 13, if the reference voltage of the comparator circuits 51, 55 are respectively set to the ON timing and the OFF timing for the switch 21, output from the leading edge detecting circuits 51, 55 can serve as output from the ON timing generating circuit 23 and the OFF timing generating circuit 24, respectively.

Embodiment 2

Figure 14:
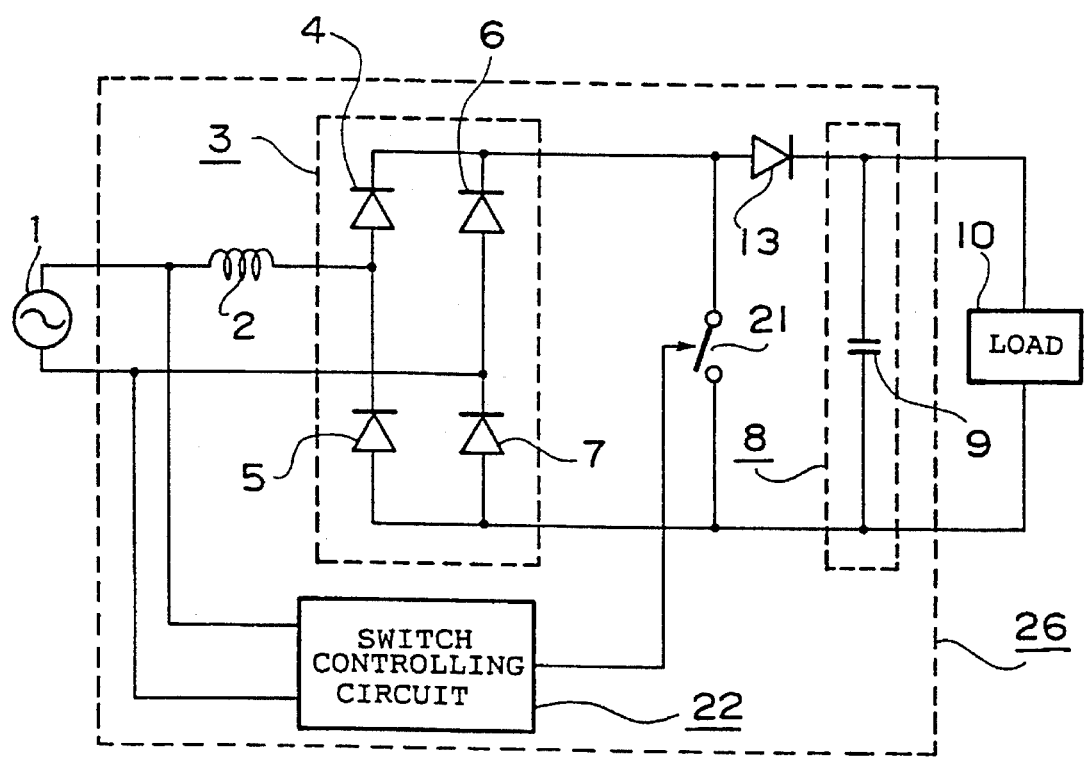
FIG. 14 is a circuit diagram showing another embodiment of the dc power-supply unit according to the first aspect of the present invention.

In the embodiment 1 shown in FIG. 7, both a reactor 2 and a switch 21 are arranged on the dc side of a subsequent stage of a rectifier circuit 3. However, it must be noted that the present invention should not be limited to the arrangement of the reactor 2 and the switch 21, and the reactor 2 may be disposed on the ac side as shown in FIG. 14 (according to the twenty-fourth aspect). In this case, the reactor 2 can be made smaller than would be if the reactor 2 is disposed on the dc side.

Embodiment 3

Figure 15:
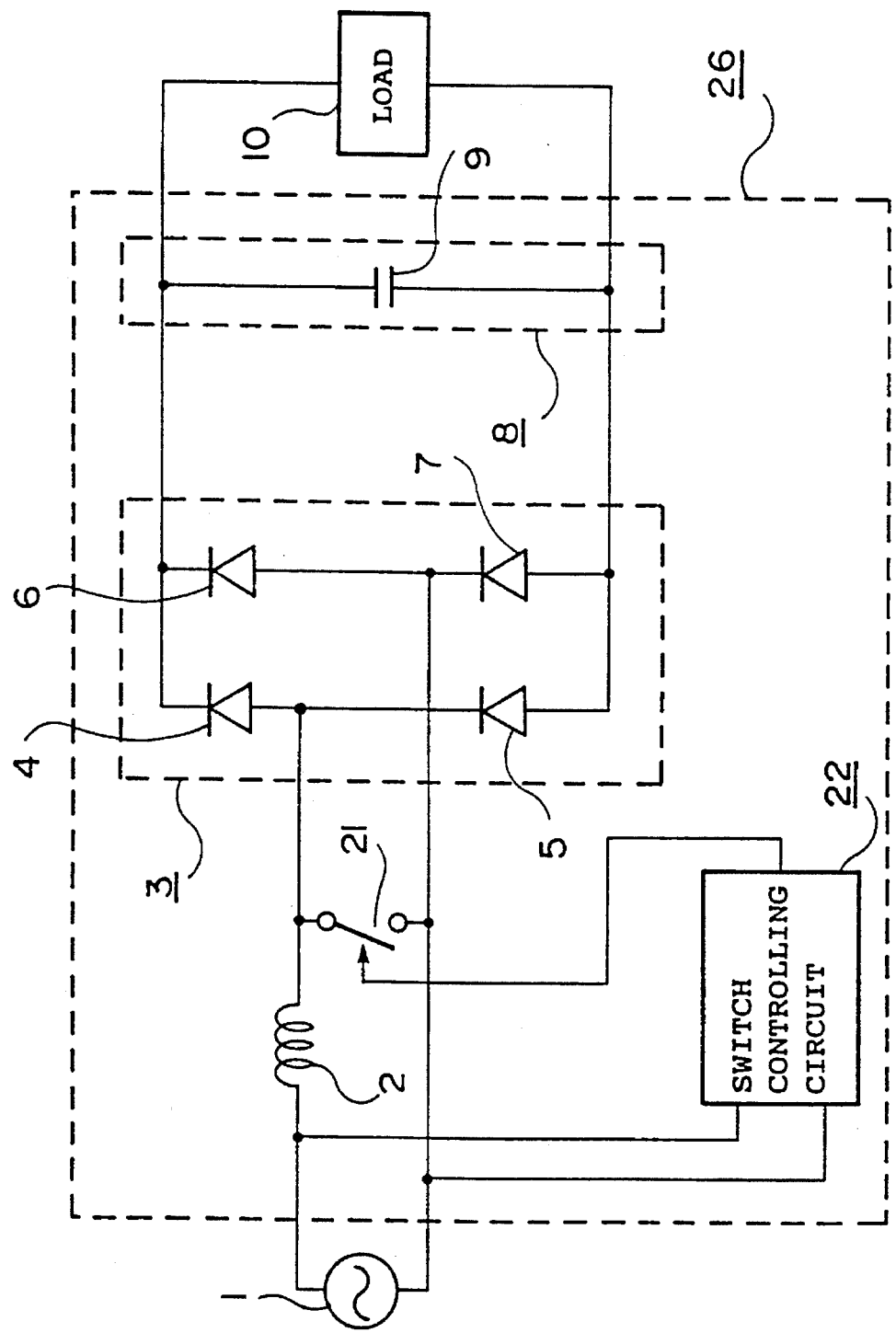
FIG. 15 is a circuit diagram showing another embodiment of the dc power-supply unit according to the first aspect of the present invention.

Alternatively, both a reactor 2 and a switch 21 may be arranged on the ac side as shown in FIG. 15. In case both the reactor 2 and the switch 21 are arranged on the ac side as shown in FIG. 15, it is possible to omit the diode 13 of the capacitor 9 of the smoothing circuit 8 shown in FIG. 7 according to the embodiment 1 since the diode bridges 4 to 7 of the rectifier circuit 3 also serve as the diode 13. In this case, the plurality of reactors 2 may be provided to serve as an inductive element shown in FIGS. 7, 14, and 15.

Embodiment 4

Figure 16:
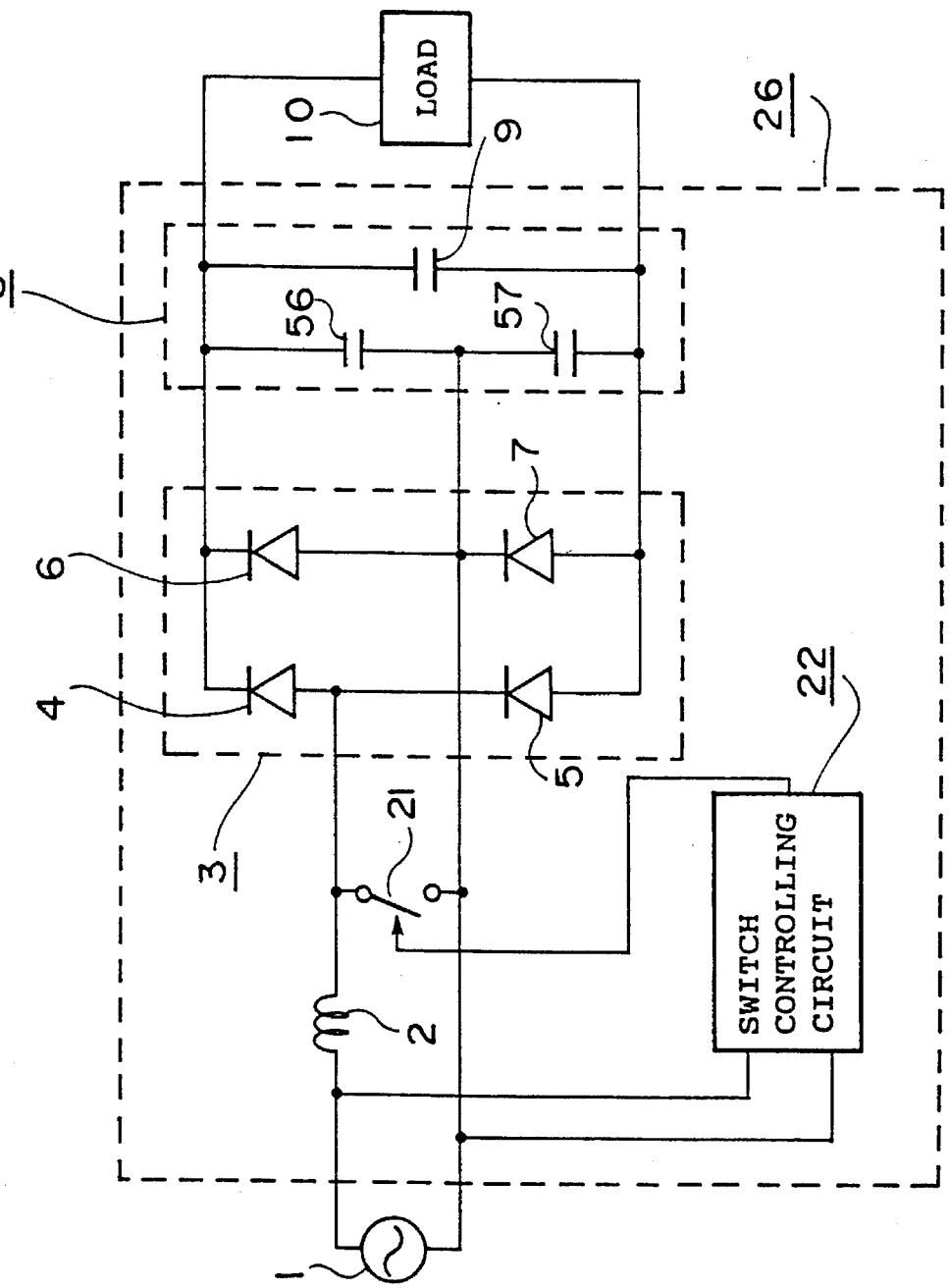
FIG. 16 is a circuit diagram showing another embodiment of the dc power-supply unit according to the first aspect of the present invention.

It is also possible to provide substantially the same operation, and the same effects so as to enhance dc output voltage applied to a load 10 by forming a voltage doubler rectifier circuit as shown in FIG. 16 including two capacitors 56 and 57 in the smoothing circuit 8.

Embodiment 5

Figure 17:
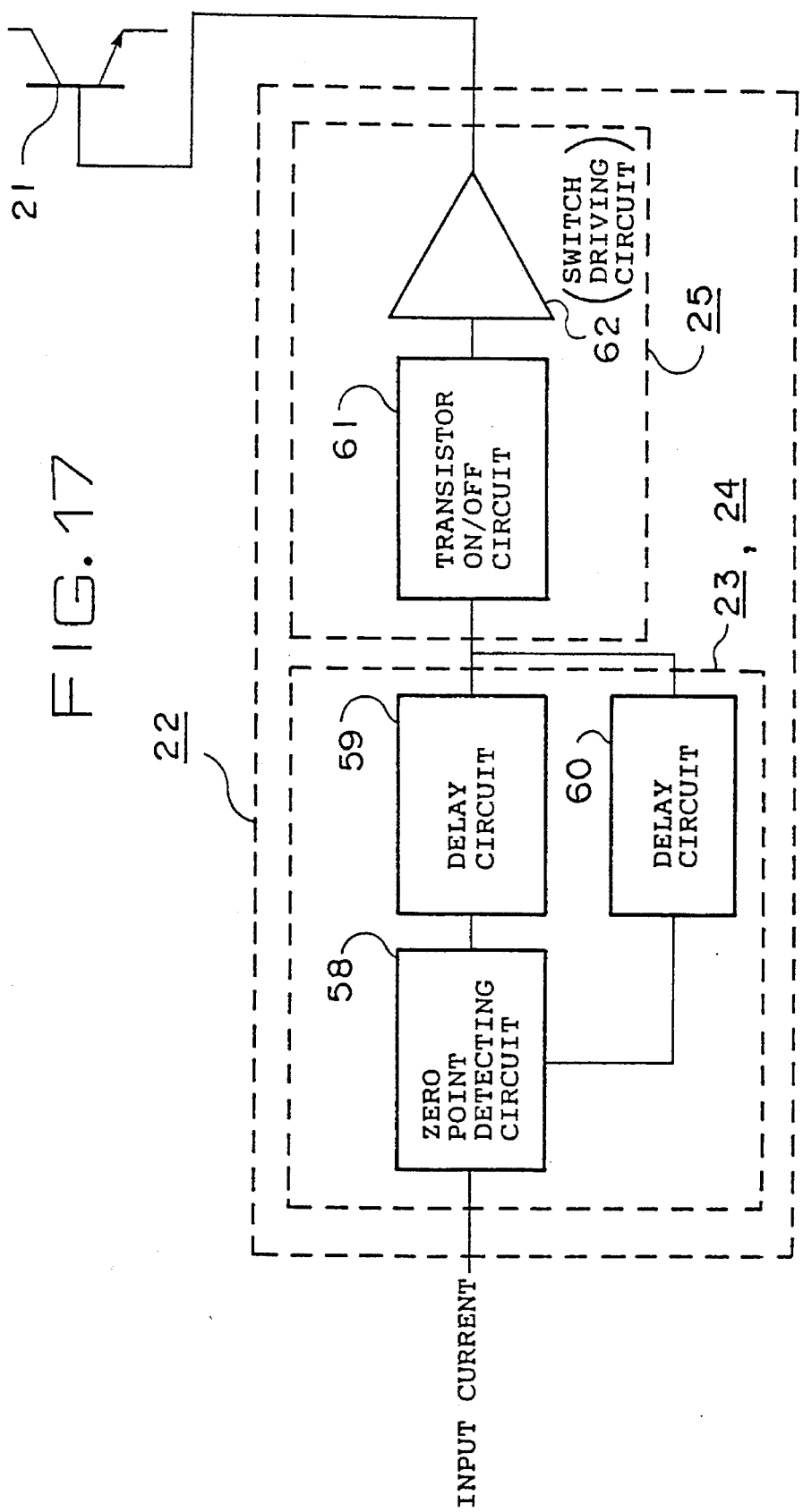
FIG. 17 is a circuit diagram showing another embodiment of the dc power-supply unit according to the first aspect of the present invention.

The switch controlling circuit 22 of FIG. 7 may be constructed as shown in FIG. 17. In FIG. 17, reference numeral 58 means a zero point detecting circuit to detect a zero point of input current, 59 and 60 are delay circuits to respectively output a signal after a first delay time and a second delay time when the zero point is detected by the zero point detecting circuit 58, 61 is a transistor ON/OFF circuit to continuously output an ON signal and an OFF signal for a predetermined period when signals are output from the delay circuits 59, 60, and 62 is a switch driving circuit to drive the switch 21 in response to the output signal from the transistor ON/OFF circuit 61.

Embodiment 6

Figure 18:
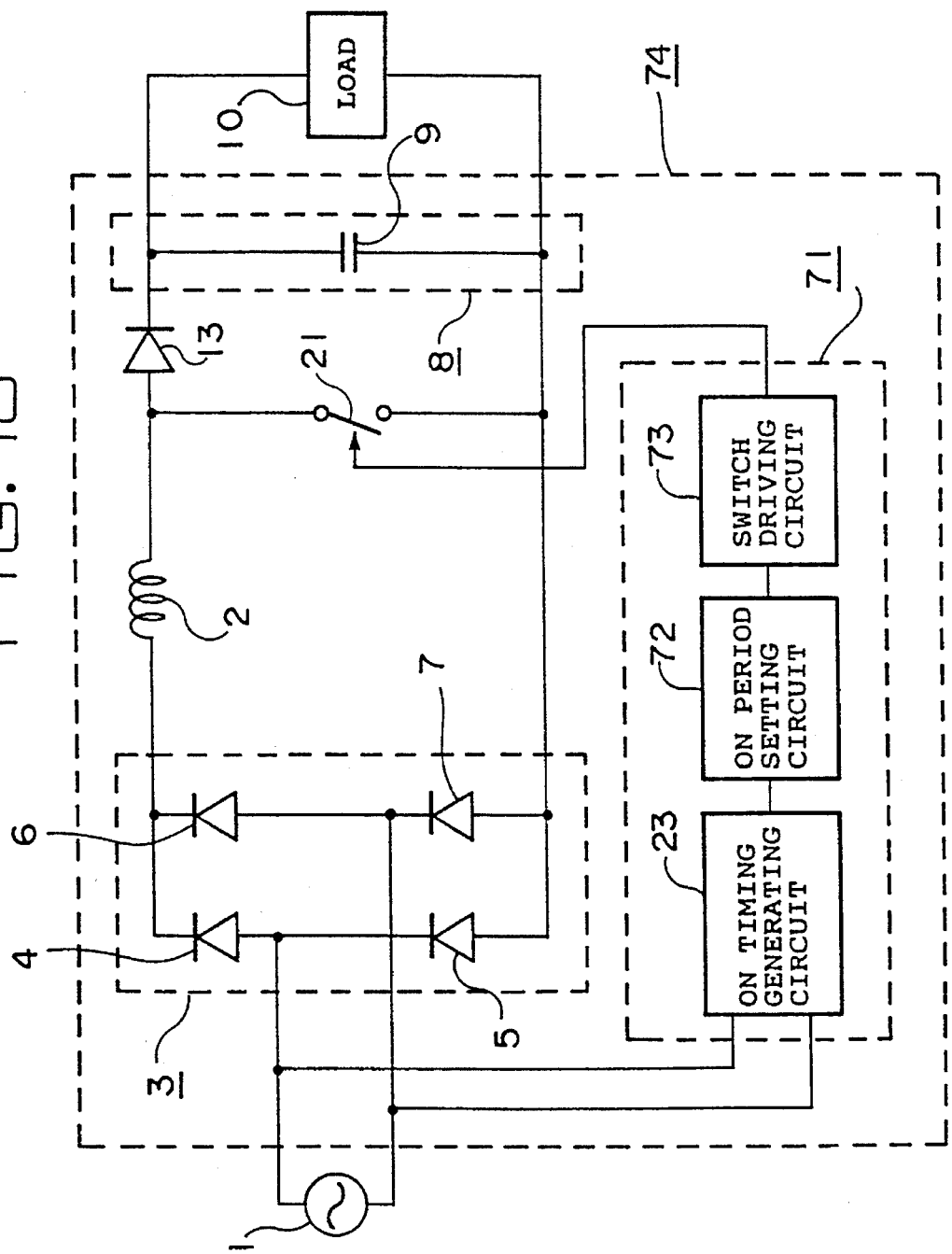
FIG. 18 is a circuit diagram showing one embodiment of the dc power-supply unit according to the second aspect of the present invention.

FIG. 18 is a circuit diagram showing one embodiment according to the second aspect of the present invention. In FIG. 18, reference numeral 72 means an ON period setting circuit to set an ON period of the switch 21 by using the output signal from an ON timing generating circuit 23 as a trigger, 73 means a switch driving circuit to drive a switch 21 according to an output signal from the ON period setting circuit 72, and 71 is a switch controlling circuit (switch controlling means) including the ON timing generating circuit 23, the ON period setting circuit 72, and the switch driving circuit 73, and 74 is a dc power-supply unit.

A description will now be given of the operation. When the ON timing generating circuit 23 outputs the ON signal in synchronization with the source voltage of the ac power supply 1 and according to a time which is delayed by a preset time $T_d$ immediately after the source voltage passes through the zero point, the ON period setting circuit 72 outputs a signal to close the switch 21 only for a preset period which is passed to the switch 21 through the switch driving circuit 73. When the switch 21 is closed, as in the case of the embodiment 1 described before, the ac power supply 1 is short-circuited through the reactor 2 and the diode bridges 4 and 7 (or the diode bridges 5, 6) to conduct current, and the current gradually increases. Subsequently, when the ON period of the switch 21 is terminated to open the switch 21, the short-circuit current which has been flowing in the reactor 2 passes through the diode 13 to become the charging current in the capacitor 9 of the smoothing circuit 8, and starts to decrease. Thereafter, when the source voltage of the ac power supply 1 is in the vicinity of the peak voltage, the diode bridges 4, 7 (or the diode bridges 5, 6) cause the charging current in the capacitor 9 to flow through the reactor 2 and the diode 13.

At this time, a source voltage waveform of the ac power supply 1 and an input current waveform of the dc power-supply unit 74 are identical with those shown in FIG. 8 according to the embodiment 1.

Figure 19:
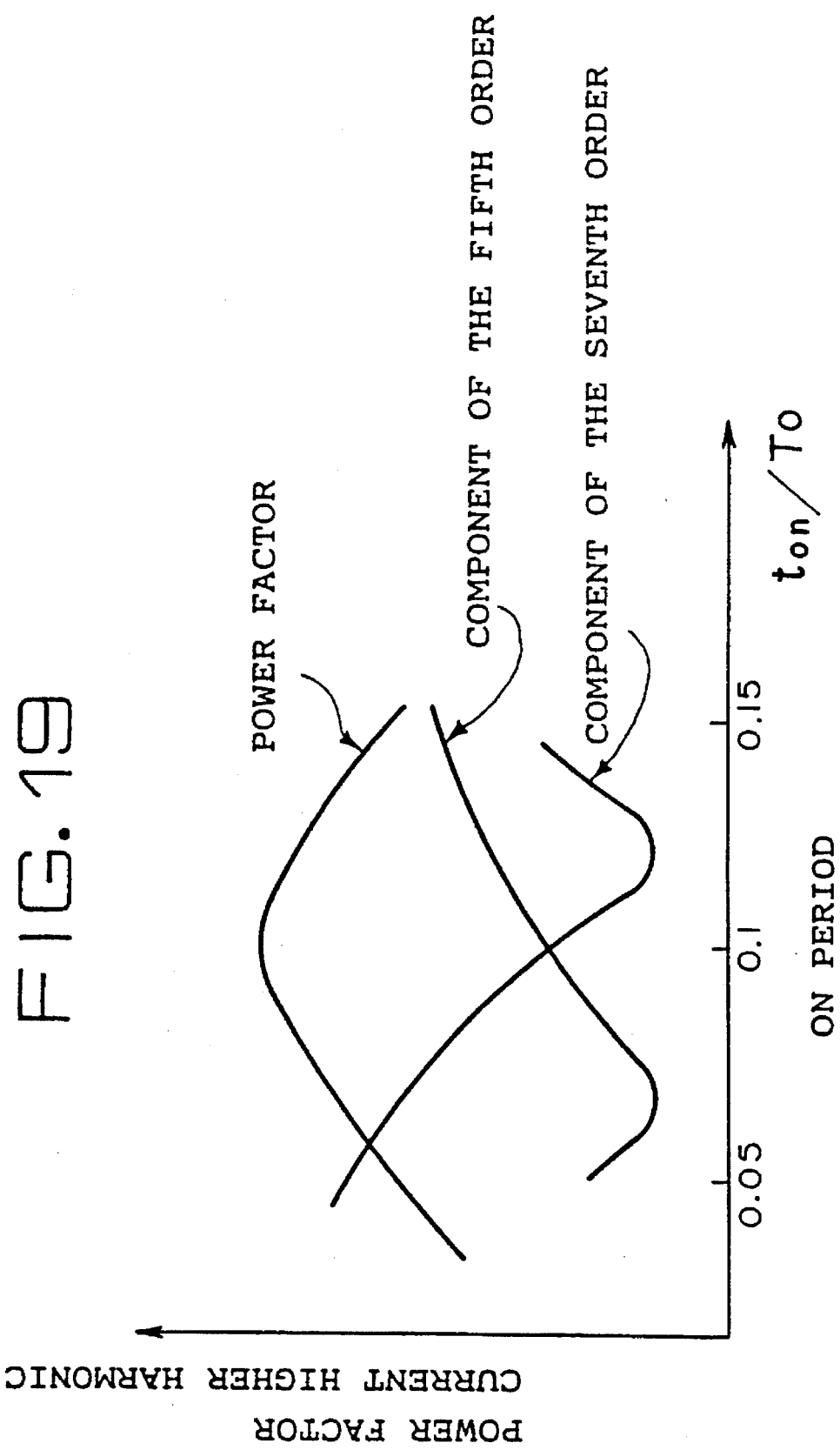
FIG. 19 is a graph diagram showing a relation between the OFF timing and the power factor, and the higher harmonic component.

FIG. 19 is a diagram showing the relationships between a signal output period of the ON period setting circuit 72, and a power factor and a higher harmonic component of the input current of the dc power-supply unit 74 in case the ON signal for the switch 21 is generated from the ON timing generating circuit 23 at a certain time point in synchronization with the source voltage of the ac power supply 1 (for example, after a time $T_d$ from the zero crossing point of the source voltage) under a constant load. In FIG. 19, the transverse axis represents a ratio of an ON signal output period $t_{on}$ to the power supply period $T_o$. As in the case of the embodiment 1 described above, it is possible to provide the overall optimal operating point in view of the power factor and a current higher harmonic characteristic shown in FIGS. 10 and 19. In the present invention, the ON timing generating circuit 23 and the ON period setting circuit 72 are preset to output the optimal timing and the optimal ON period, respectively. Further, as in the embodiment 1, it must be noted that the ON timing and the ON period may be set depending upon, for example, an operating point to maximize the power factor, or another operating point to minimize a specific higher harmonic current of the input current.

Figure 20:
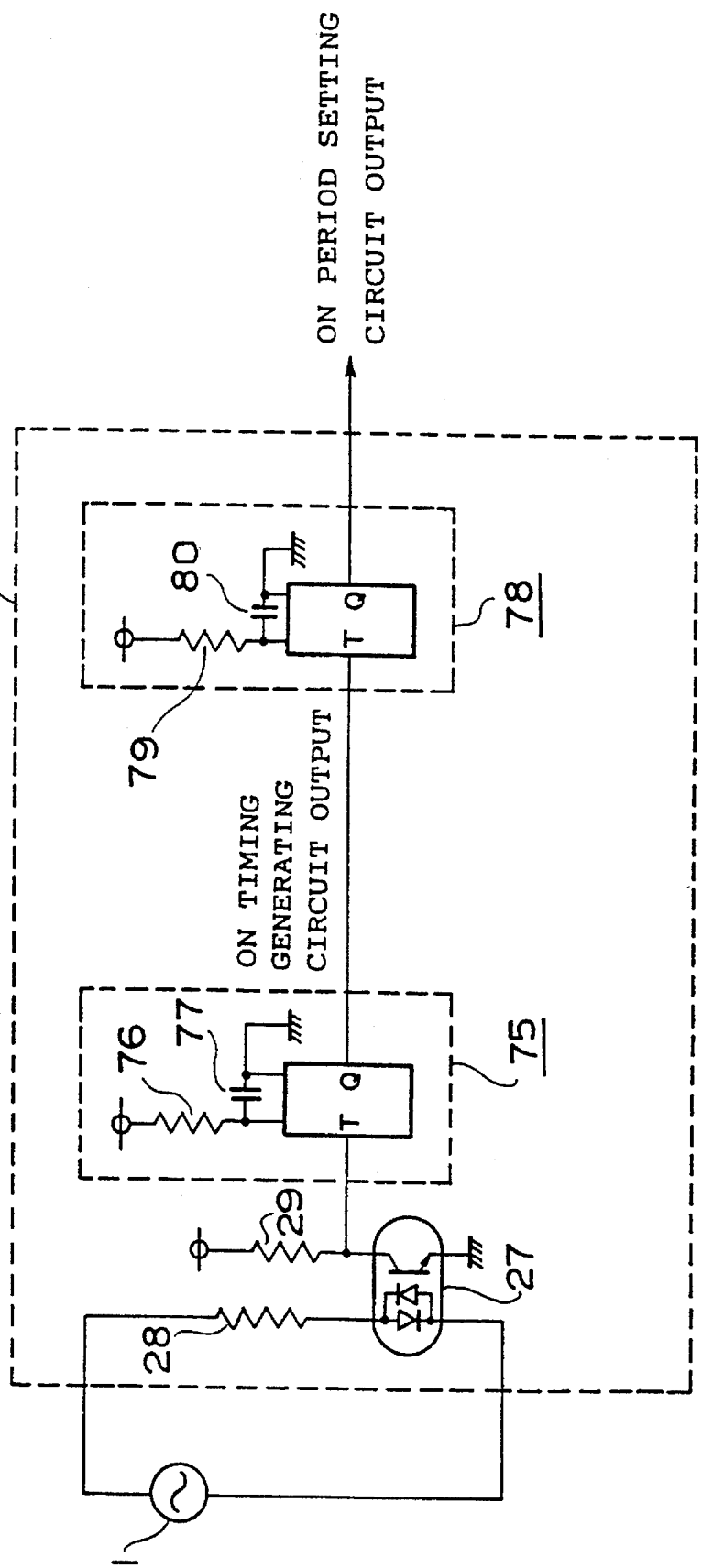
FIG. 20 is a detailed circuit diagram showing the ON timing generating circuit and an ON period setting circuit.

For example, the ON timing generating circuit 23 and the ON period setting circuit 72 may be constructed as shown in FIG. 20 in case the ON signal output timing for the switch 21 is delayed by a delay time $T_d$ from the zero crossing point of the source voltage of the ac power supply 1. In FIG. 20, reference numeral 75 is a one-shot multivibrator circuit using the output from the photocoupler 27 as a trigger input, and 76, 77 are respectively a resistor and a capacitor to set an output pulse width of the one-shot multivibrator circuit 75, that is, the ON timing for the switch 21. Further, reference numeral 78 is a one-shot multivibrator circuit using the output from the ON timing generating circuit 23 as the trigger input, and 79, 80 are respectively a resistor and a capacitor to set an output pulse width of the one-shot multivibrator circuit 78, that is, the ON period of the switch 21.

In addition, as in the embodiment 1, it must be noted that the present invention should not be limited to the means on the basis of the zero crossing point of the source voltage as means for obtaining the signal in synchronization with the source voltage of the ac power supply 1.

Besides, as in the embodiment 1, it must be noted that the present invention should not be limited to the arrangement of the reactor 2 and the switch 21 shown in FIG. 18. The reactor 2 may be disposed on the ac side as shown in FIG. 14, and both of the reactor 2 and the switch 21 may be arranged on the ac side as shown in FIG. 15. Alternatively, a voltage doubler rectifier circuit may be formed as shown in FIG. 16. Further, the plurality of reactors 2 may be provided to serve as an inductive element.

Embodiment 7

Figure 21:
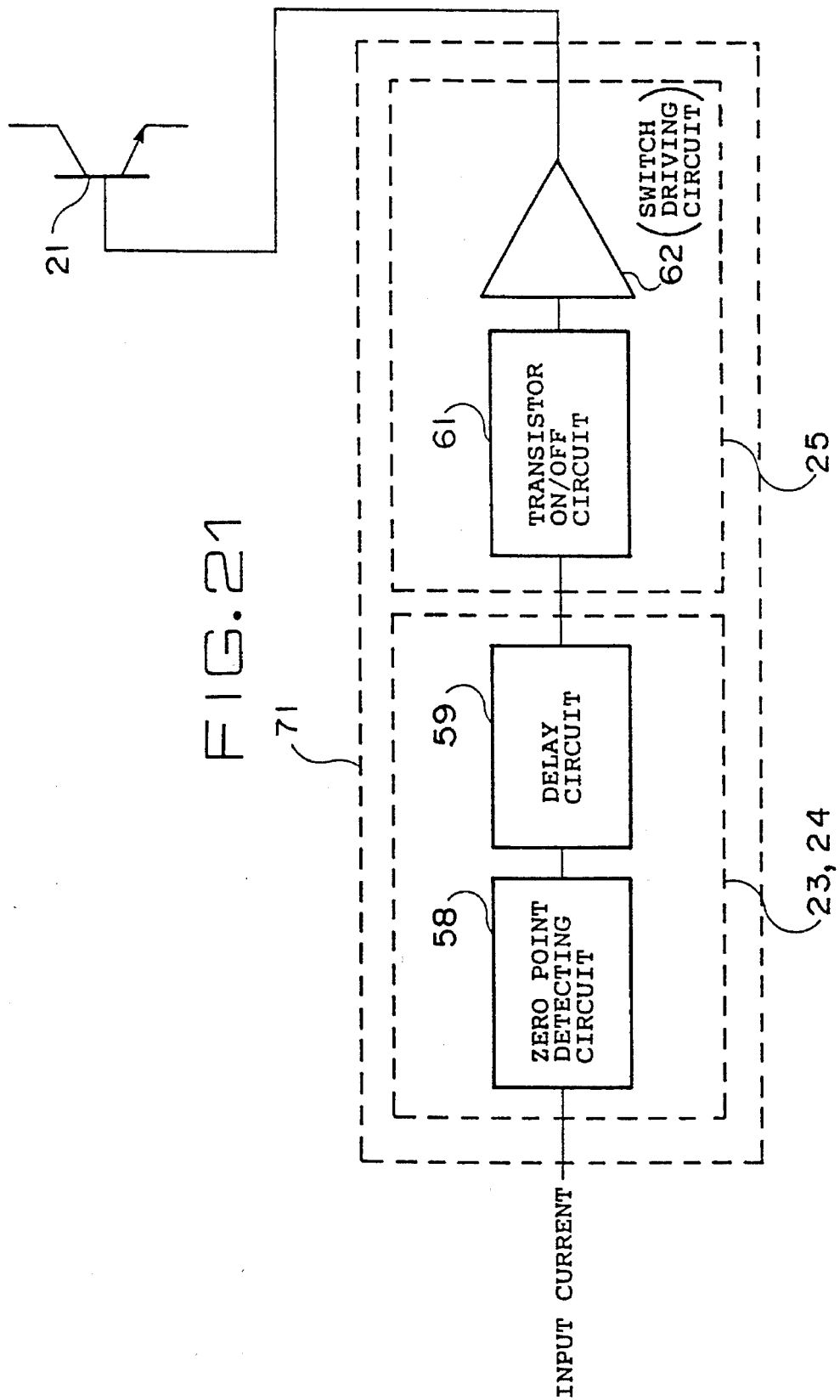
FIG. 21 is a circuit diagram showing another embodiment of the dc power-supply unit according to the second aspect of the present invention.

Alternatively, a switch controlling circuit 71 of FIG. 18 may be constructed as shown in FIG. 21.

Embodiment 8

Figure 22:
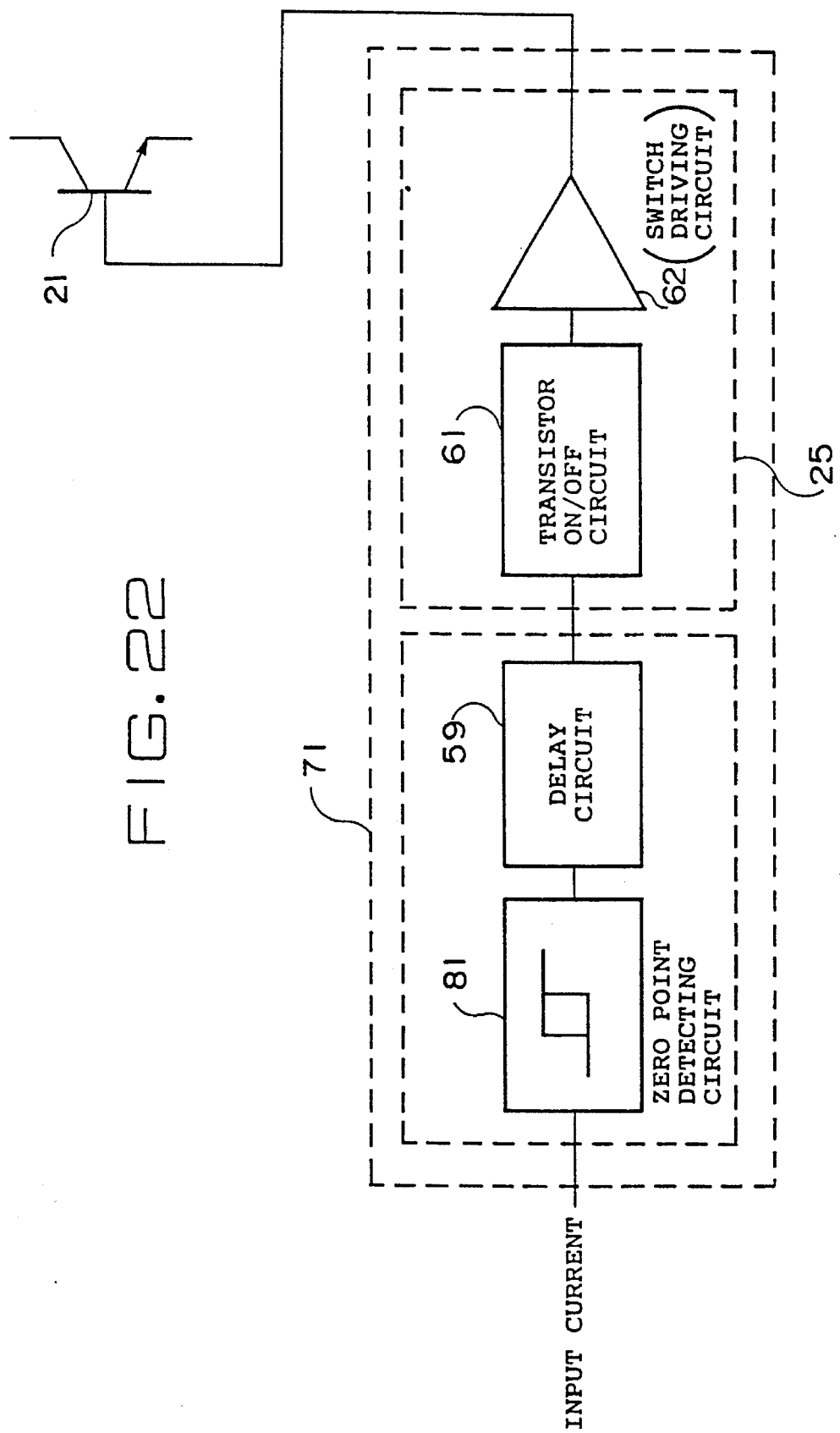
FIG. 22 is a circuit diagram showing another embodiment of the dc power-supply unit according to the second aspect of the present invention.

Though a point to set the input current to zero is detected in the embodiment 7, it is possible to employ another point to set the input current to a value other than zero. An illustrative circuit is shown in FIG. 22. In FIG. 22, reference numeral 81 means a zero point detecting circuit to output a signal A when the input current is equal to or more than b, and is equal to or less than a.

Figure 23:
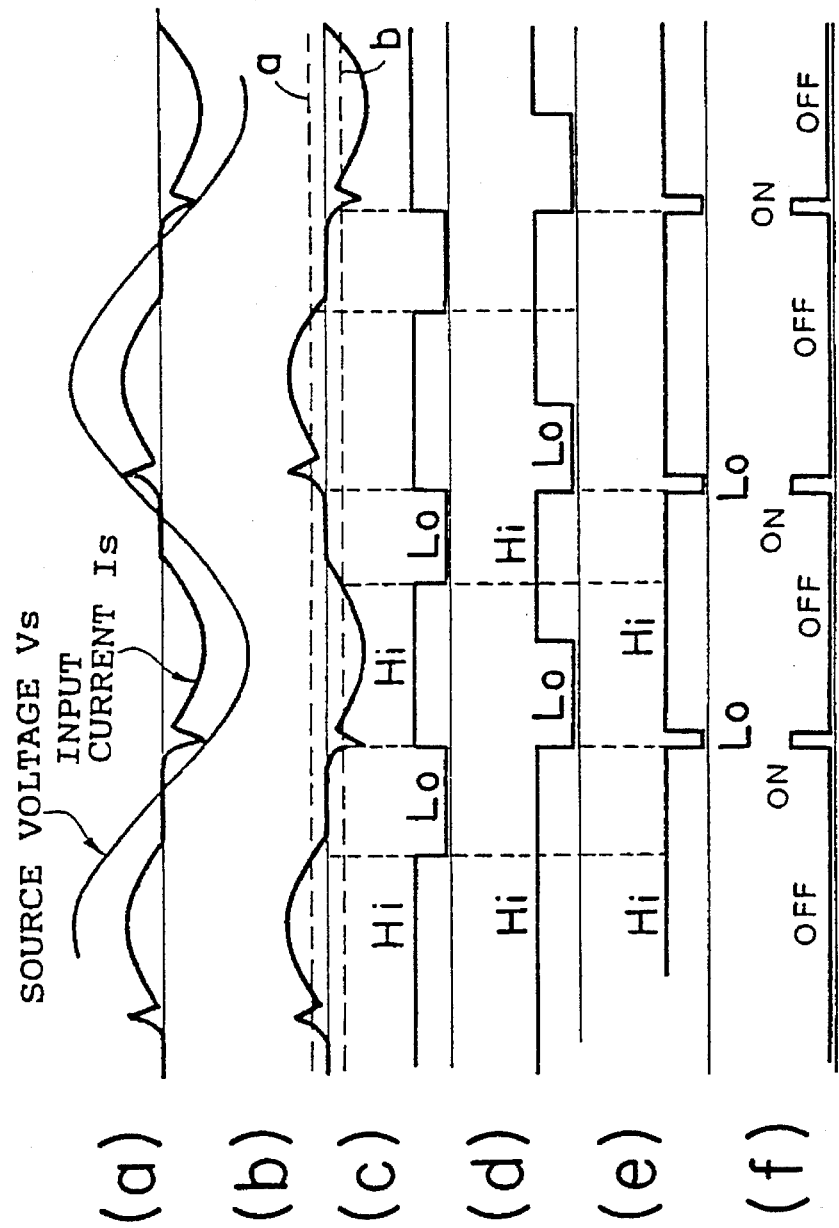
FIG. 23 is an operating waveform diagram showing the operating waveform in each part.

A description will be given of the control with reference to FIG. 23.

FIG. 23(a) shows the source voltage and input current. FIG. 23(b) shows the detected waveform of the input current, and FIG. 23(c) shows the signal A output from the zero point detector 81. FIG. 23(d) shows the signal B output from the delay circuit 59, FIG. 23(e) shows the signal C output form the transistor on/off circuit 61 and FIG. 23(f) shows the transistor on/off signal. The zero point detecting circuit 81 has thresholds a, b with respect to the input current, and outputs "Lo" signal, that is, the signal A when the input current is equal to or more than b and is equal to or less than a. It is possible to provide signals B and C in the same process as that in the embodiment 1. Thereby, it is possible to perform the same operation as that in the embodiment 1, resulting in the same effect.

Embodiment 9

Figure 24:
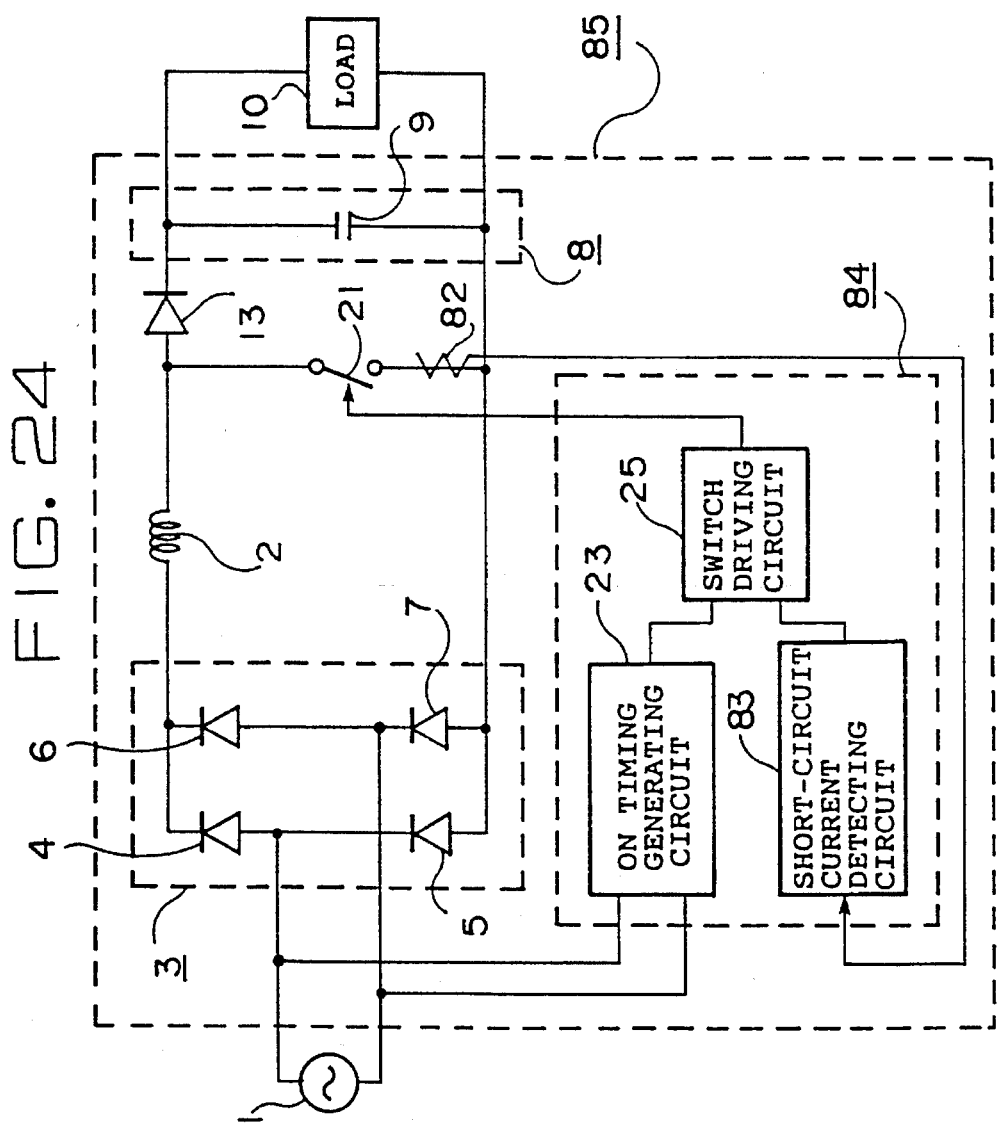
FIG. 24 is a circuit diagram showing one embodiment of the dc power-supply unit according to the third aspect of the present invention.

FIG. 24 is a circuit diagram showing one embodiment according to the third aspect of the present invention. In FIG. 24, reference numeral 82 is a current sensor (short-circuit current detecting means) to detect short-circuit current which flows in the reactor 2 when a switch 21 is closed, 83 is a short-circuit current detecting circuit to output an OFF signal for the switch 21 when an output from the current sensor 82 reaches a preset value, 84 is a switch controlling circuit (switch controlling means) including the ON timing generating circuit 23, the short-circuit current detecting circuit 83, and the switch driving circuit 25, and 85 is a dc power-supply unit.

A description will now be given of the operation. The ON timing generating circuit 23 outputs the ON signal through the switch driving circuit 25 in synchronization with source voltage of an ac power supply 1 and according to timing which is delayed by a preset time $T_d$ immediately after the source voltage passes through the zero point. Subsequently, the switch 21 is closed so that the ac power supply 1 is short-circuited through a reactor 2 and diode bridges 4 and 7 (or diode bridges 5, 6) to conduct current, and the current gradually increases. When the short-circuit current increases and reaches the preset value, the short-circuit current detecting circuit 83 outputs the OFF signal for the switch 21 through the switch driving circuit 25 to open the switch 21. Accordingly, the short-circuit current which has been flowing in the reactor 2 passes through the diode 13 to become the charging current in the capacitor 9 of the smoothing circuit 8, and starts to decrease. Thereafter, when the source voltage of the ac power supply 1 is in the vicinity of the peak voltage, the diode bridges 4, 7 (or the diode bridges 5, 6) cause the charging current in the capacitor 9 to flow through the reactor 2 and the diode 13.

At this time, a source voltage waveform of the ac power supply 1 and an input current waveform of the dc power-supply unit 85 are identical with those shown in FIG. 8 according to the embodiment 1.

Figure 25:
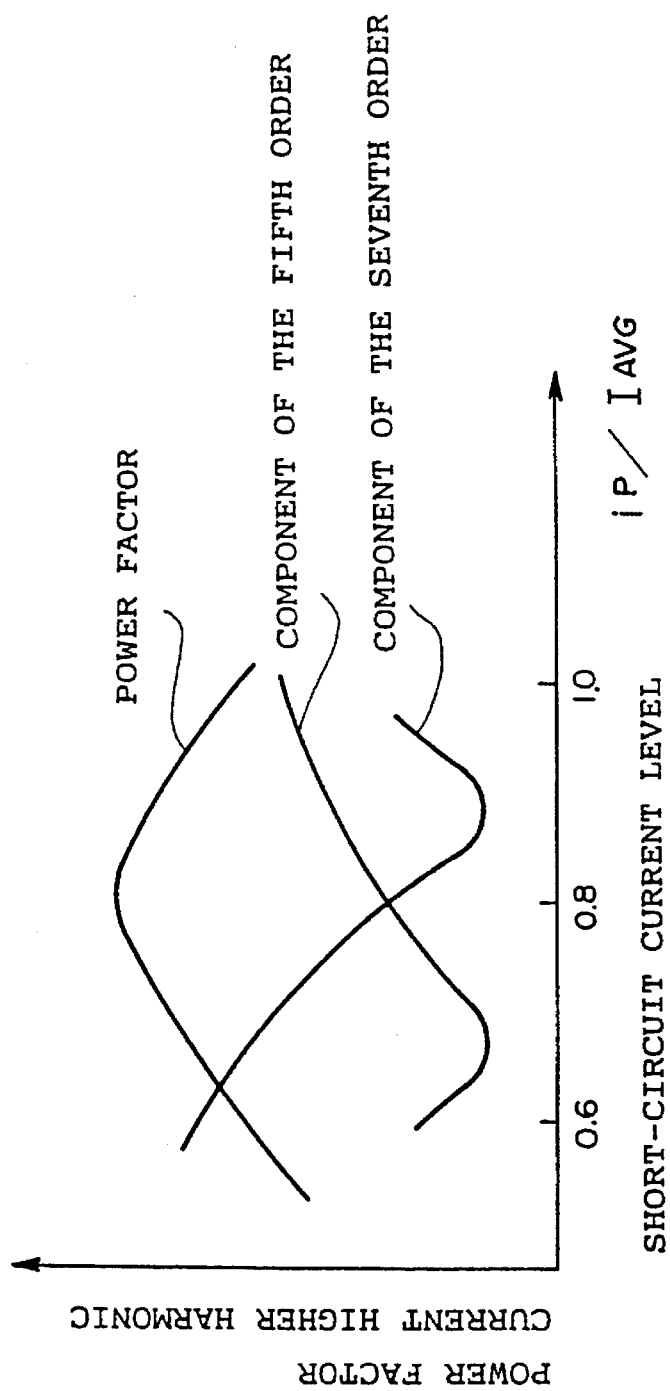
FIG. 25 is a graph diagram showing a relation between a short-circuit current level, and the power factor and the higher harmonic component.

FIG. 25 is a diagram showing the relationships between a short-circuit current level to generate the OFF signal for the switch 21, and a power factor and a higher harmonic component of the input current of the dc power-supply unit 85 in case the ON signal for the switch 21 is generated from the ON timing generating circuit 23 at a certain time point in synchronization with the source voltage of the ac power supply 1 (for example, after a time $T_d$ from the zero crossing point of the source voltage) under a constant load. In FIG. 25, the transverse axis represents a ratio of the short-circuit current level $i_p$ to generate the OFF signal for the switch 21 to average output current $I_{AVG}$ when the maximum load is applied to the dc power-supply unit 85. As in the case of the embodiment 1 described above, it is possible to provide the overall optimal operating point in view of the power factor and a current higher harmonic characteristic shown in FIG. 25. In the present invention, the ON timing generating circuit 23 and the short-circuit current detecting circuit 83 are preset to output the optimal timing and the optimal short-circuit current level, respectively. Further, as in the embodiment 1, it must be noted that the ON timing and the short-circuit current level may be set depending upon, for example, an operating point to maximize the power factor, or another operating point to minimize a specific higher harmonic current of the input current.

Figure 26:
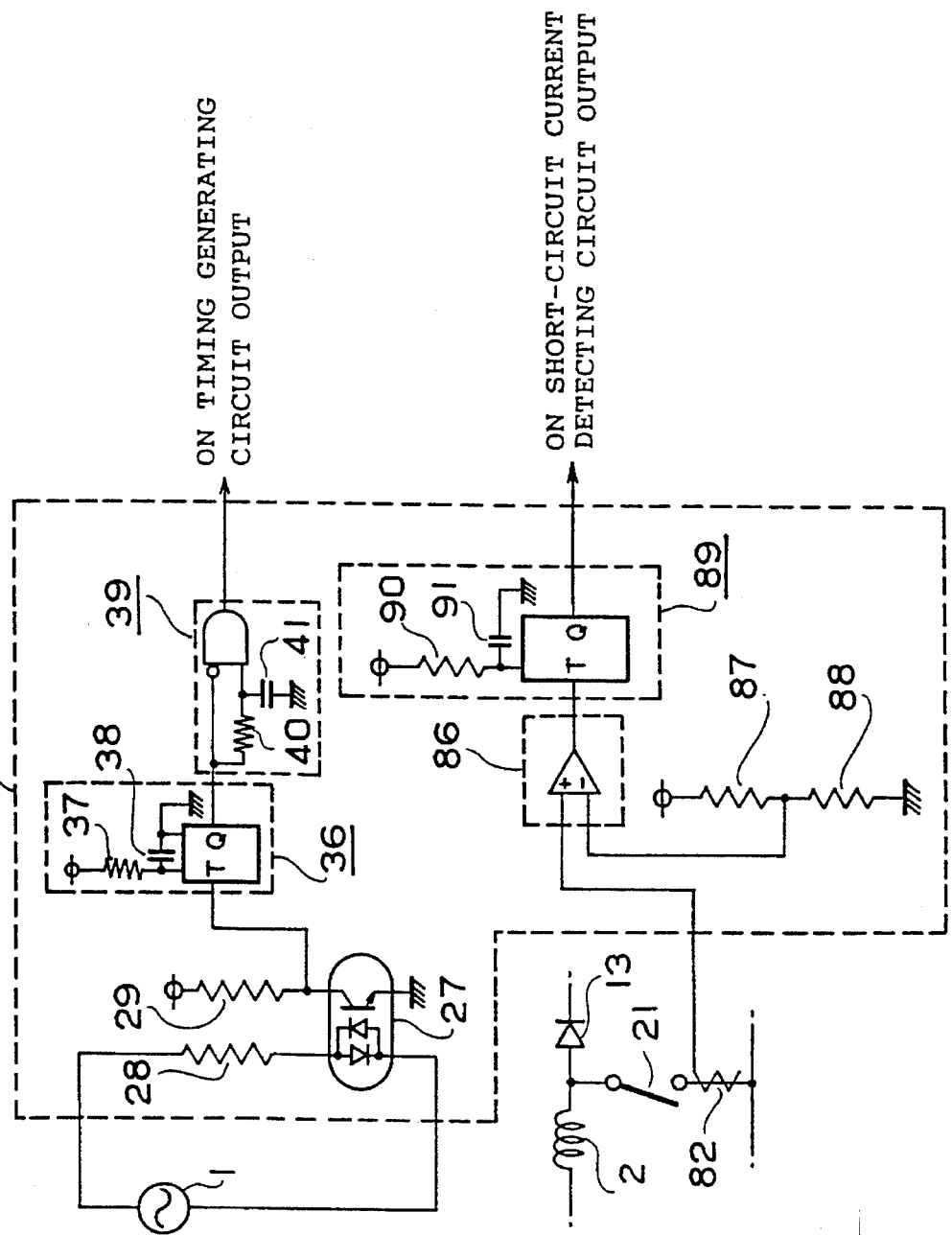
FIG. 26 is a detailed circuit diagram showing the ON timing generating circuit and a short-circuit current detecting circuit.

For example, the ON timing generating circuit 23 and the short-circuit current detecting circuit 83 may be constructed as shown in FIG. 26 in case ON signal output timing for the switch 21 is delayed by a delay time $T_d$ from the zero crossing point of the source voltage of the ac power supply 1. In FIG. 26, reference numeral 86 is a comparator circuit, 87 and 88 are setting resistors to set the short-circuit current level to generate a reference voltage input to the comparator circuit 86, that is, the OFF signal for the switch 21, 89 is a one-shot multivibrator circuit using an output signal from the comparator circuit 86 as a trigger, and 90, 91 are respectively a resistor and a capacitor to set an output pulse width of the one-shot multivibrator circuit 89, that is, a width of a pulse signal serving as OFF timing for the switch 21.

In addition, as in the embodiment 1, it must be noted that the present invention should not be limited to the means on the basis of the zero crossing point of the source voltage as means for obtaining the signal in synchronization with the source voltage of the ac power supply 1.

Besides, as in the embodiment 1, it must be noted that the present invention should not be limited to the arrangement of the reactor 2 and the switch 21 shown in FIG. 24. The reactor 2 may be disposed on the ac side as shown in FIG. 14, and both 0f the reactor 2 and the switch 21 may be arranged on the ac side as shown in FIG. 15. Alternatively, a voltage doubler rectifier circuit may be formed as shown in FIG. 16. Further, the plurality of reactors 2 may be provided to serve as an inductive element.

Embodiment 10

Figure 27:
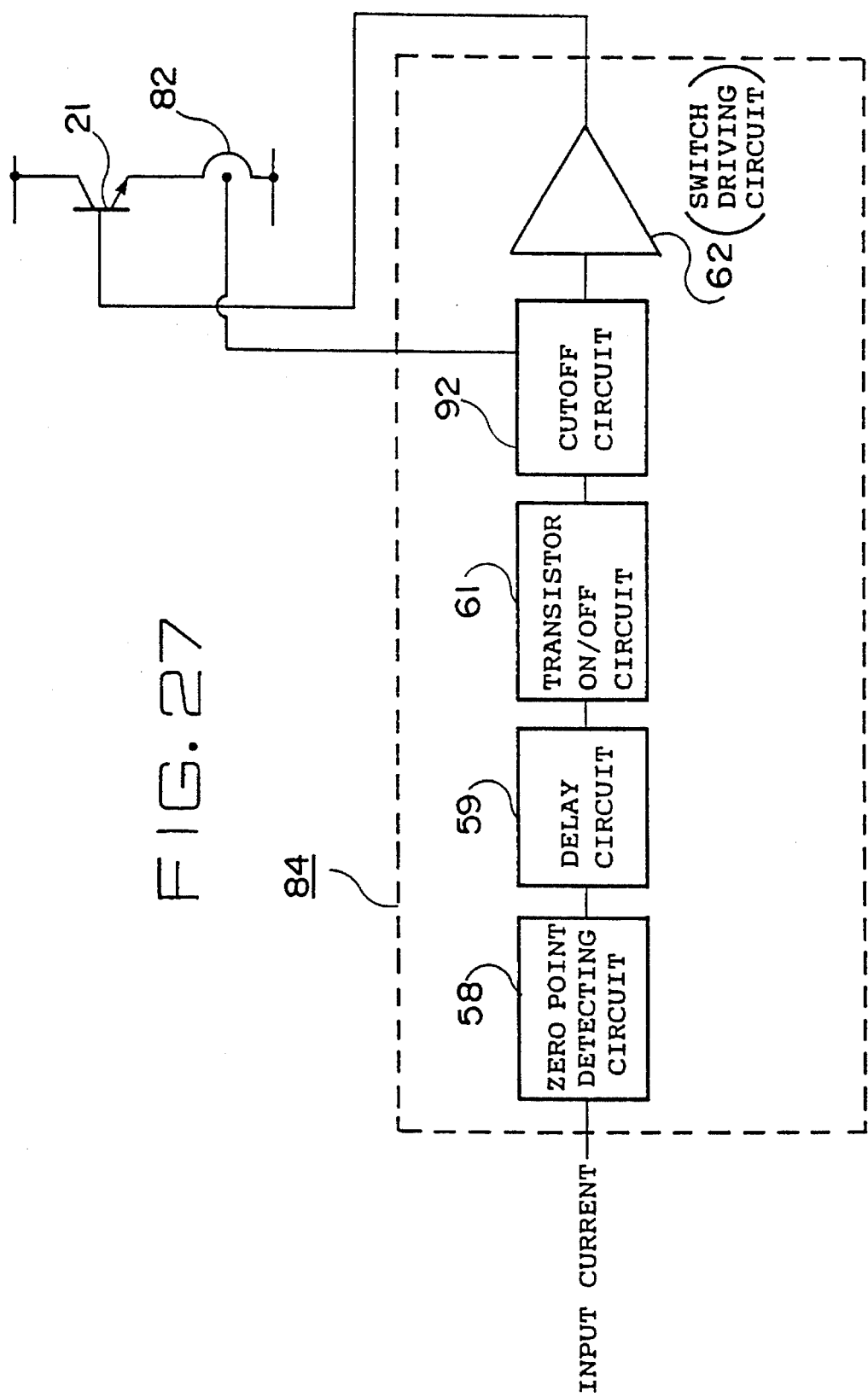
FIG. 27 is a circuit diagram showing another embodiment of the dc power-supply unit according to the third aspect of the present invention.

Alternatively, the switch controlling circuit 84 of FIG. 24 may be constructed as shown in FIG. 27. In FIG. 27, reference numeral 92 is a cutoff circuit to cut off a driving signal for a switch 21.

Figure 28:
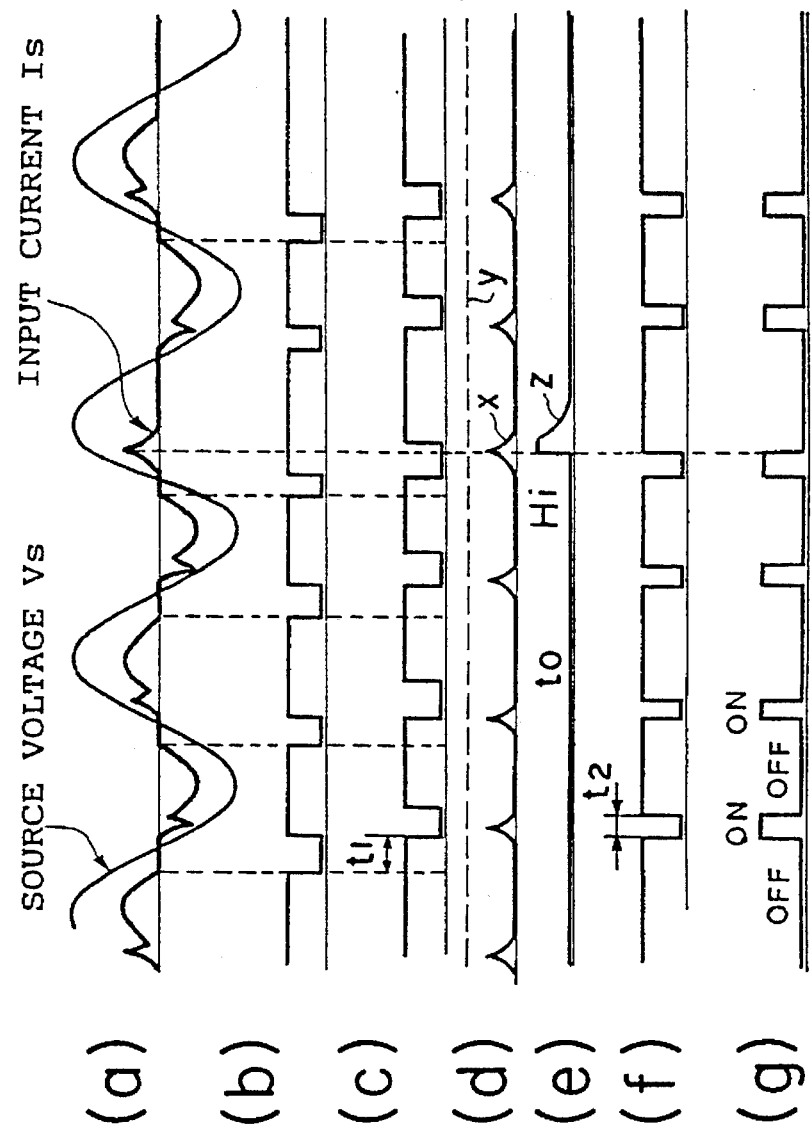
FIG. 28 is an operating waveform diagram showing the operating waveform in each part.

FIG. 28 is an operating waveform diagram showing the operation in FIG. 27.

FIG. 28(a) shows the source voltage and input current, FIG. 28(b) shows the signal A output from the zero point detecting circuit 58, and FIG. 28(c) shows the signal B output from the delay circuit 59. FIG. 28(d) shows the current in the transistor, FIG. 28(e) shows the cutoff signal, FIG. 28(f) shows the signal C output from the transistor on/off circuit 61 and FIG. 28(g) shows the transistor on/off signal.

Embodiment 11

Figure 29:
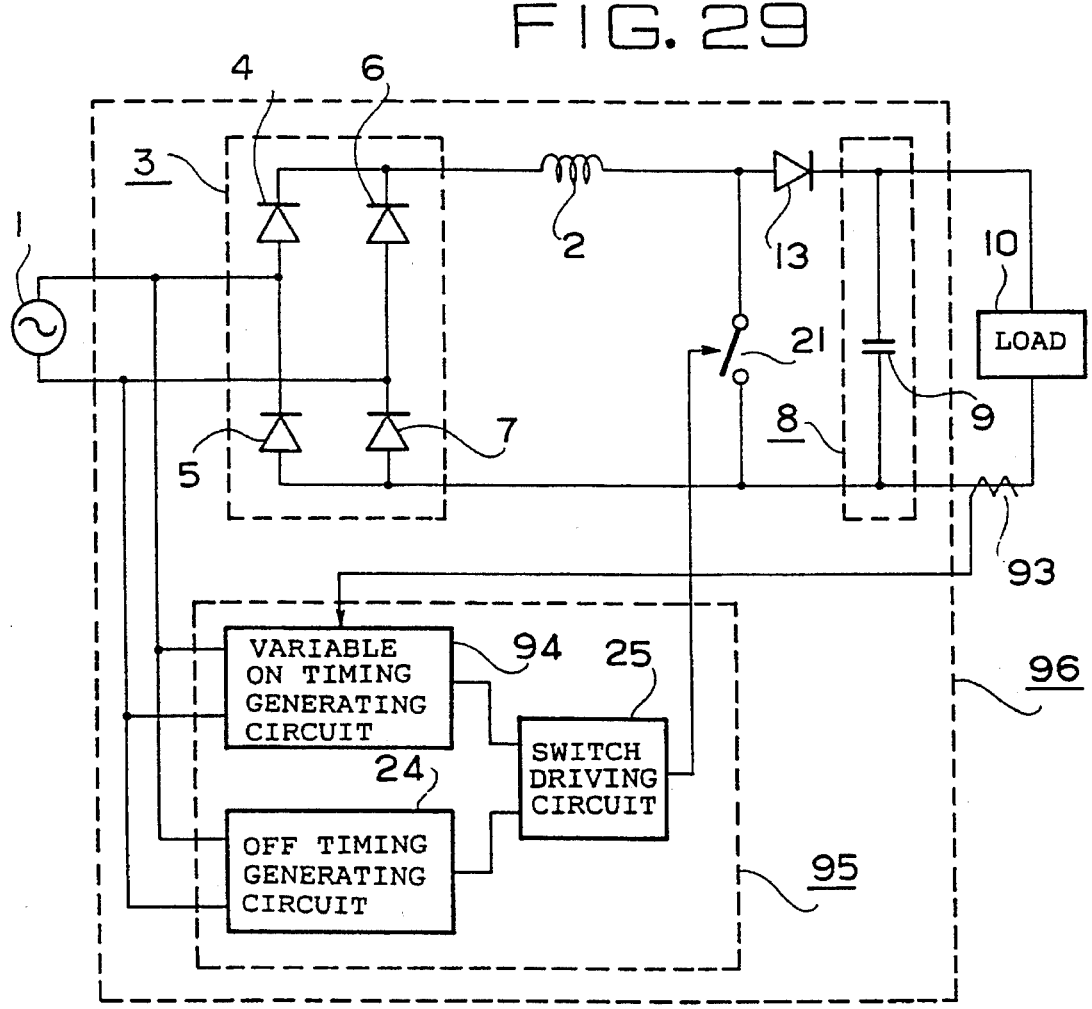
FIG. 29 is a circuit diagram showing one embodiment of the dc power-supply unit according to the fourth aspect of the present invention.

FIG. 29 is a circuit diagram showing one embodiment according to the fourth aspect of the present invention. In FIG. 29, reference numeral 93 is a current sensor (load condition detecting means) to detect load current, 94 is a variable ON timing generating circuit to generate an ON signal for a switch 21 in synchronization with the source voltage, and according to timing in accordance with a load condition detected by the current sensor 93, 95 is a switch controlling circuit (switch controlling means) including the variable ON timing generating circuit 94, an OFF timing generating circuit 24, and a switch driving circuit 25, and 96 is a dc power-supply unit.

A description will now be given of the operation. The variable ON timing generating circuit 94 outputs an ON signal through the switch driving circuit 25 in synchronization with the source voltage of an ac power supply 1, and according to the load condition detected by the current sensor 93. Consequently, the switch 21 is closed so that the ac power supply 1 is short-circuited through a reactor 2 and diode bridges 4 and 7 (or diode bridges 5, 6) to conduct current, and the current gradually increases. Subsequently, the OFF timing generating circuit 24 outputs the OFF signal through the switch driving circuit 25 in synchronization with the source voltage, resulting in opening the switch 21. The short-circuit current which has been flowing in the reactor 2 passes through a diode 13 to become the charging current in a capacitor 9 of a smoothing circuit 8, and starts to decrease. Thereafter, when the source voltage of the ac power supply 1 is in the vicinity of peak voltage, the diode bridges 4, 7 (or the diode bridges 5, 6) cause the charging current in the capacitor 9 to flow through the reactor 2 and the diode 13.

Figure 30:
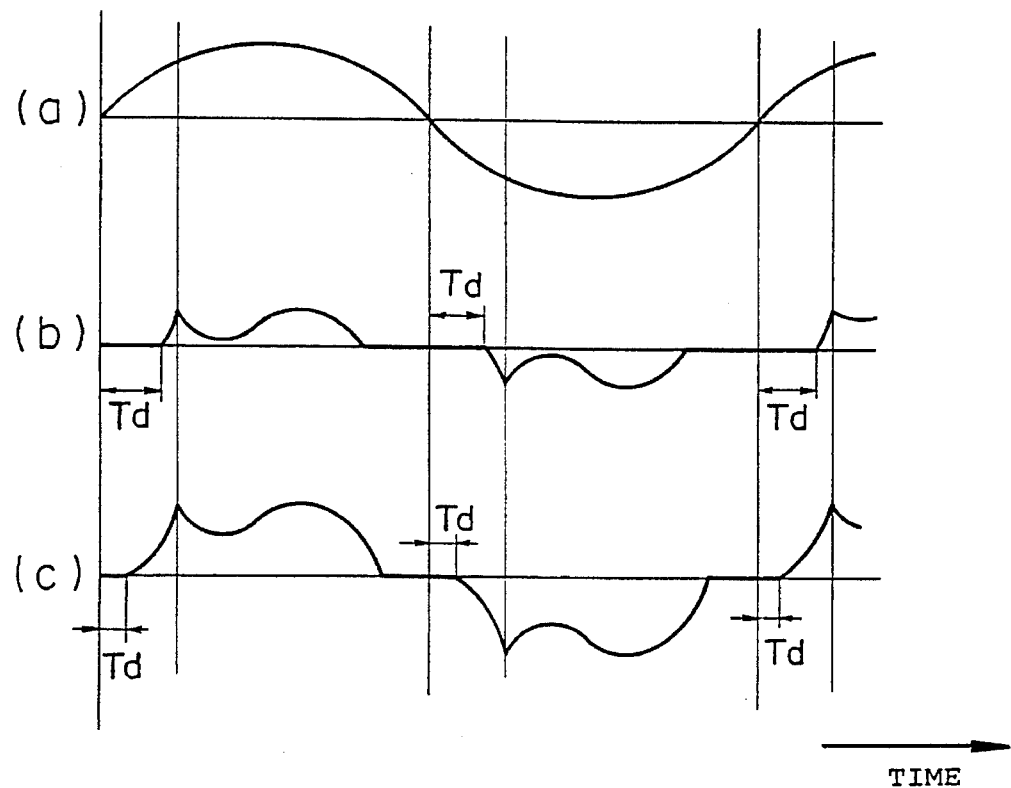
FIG. 30 is an operating waveform diagram showing the operating waveform in each part.

At this time, there are provided a source voltage waveform of the ac power supply 1, shown in FIG. 30(a) and the input current waveforms of the dc power-supply unit 96 under a light load and a heavy load as shown in FIGS. 30(b) and 30(c), respectively. As seen from FIG. 30, the operation is controlled so as to have a later ON signal output .timing of the variable ON timing generating circuit 94 under a light load than the ON signal output timing under a heavy load.

Figure 31:
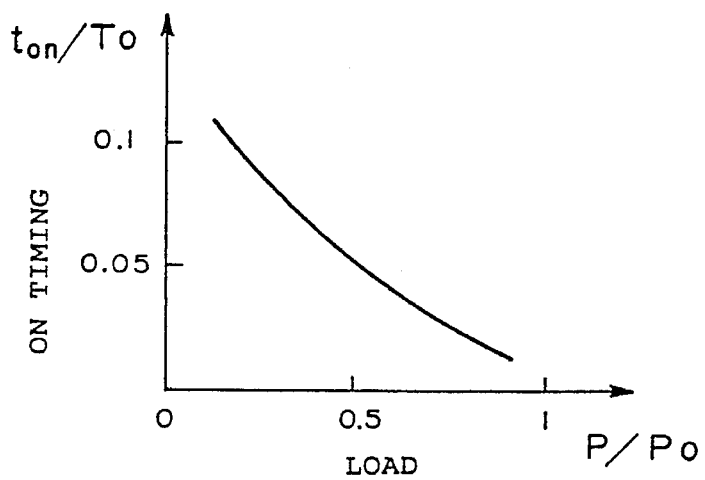
FIG. 31 is a graph diagram showing a relation between the load and ON timing.

FIG. 31 is a diagram showing a relationship between a load, and the ON signal output timing serving as the overall optimal operating point in view of a power factor and a current higher harmonic characteristic in case the OFF signal for the switch 21 is generated from the OFF timing generating circuit 24 at a certain time point in synchronization with the source voltage of the ac power supply 1 (for example, after a time point delayed by one-tenth of power supply period from a zero crossing point of the source voltage). In FIG. 31, the transverse axis represents a load normalized by rated load $P_o$, and the ordinate axis represents the ON signal output timing normalized by the power supply period $T_0$. In the present invention, the output timing of the variable ON timing generating circuit 94 can be controlled according to the load condition based upon the relationship shown in FIG. 31. Further, it must be noted that the output timing of the variable ON timing generating circuit 94 may be controlled according to the purpose. That is, while a particular weight is given to the power factor, the output timing may be controlled according to the load condition. Alternatively, while the particular weight is given to the current higher harmonic characteristic, the output timing may be controlled according to the load condition.

Though the magnitude of the load condition is detected by detecting the load current by the current sensor 93 in the embodiment 11, it must be noted that the present invention should not be limited to this means as load condition detecting means. For example, it is also possible to detect the magnitude of the load condition by using voltage fluctuation in the capacitor 9 of the smoothing circuit 8, or the input current of the dc power-supply unit 96.

In addition, as in the embodiment 1, it is to be understood that the present invention should not be limited to the means on the basis of the zero crossing point of the source voltage as means for obtaining the signal in synchronization with the source voltage of the ac power supply 1.

Besides, as in the embodiment 1, it must be noted that the present invention should not be limited to the arrangement of the reactor 2 and the switch 21 shown in FIG. 29. The reactor 2 may be disposed on the ac side as shown in FIG. 14, and both of the reactor 2 and the switch 21 may be arranged on the ac side as shown in FIG. 15. Alternatively, a voltage doubler rectifier circuit may be formed as shown in FIG. 16. Further, the plurality of reactors 2 may be provided to serve as an inductive element.

Embodiment 12

Figure 32:
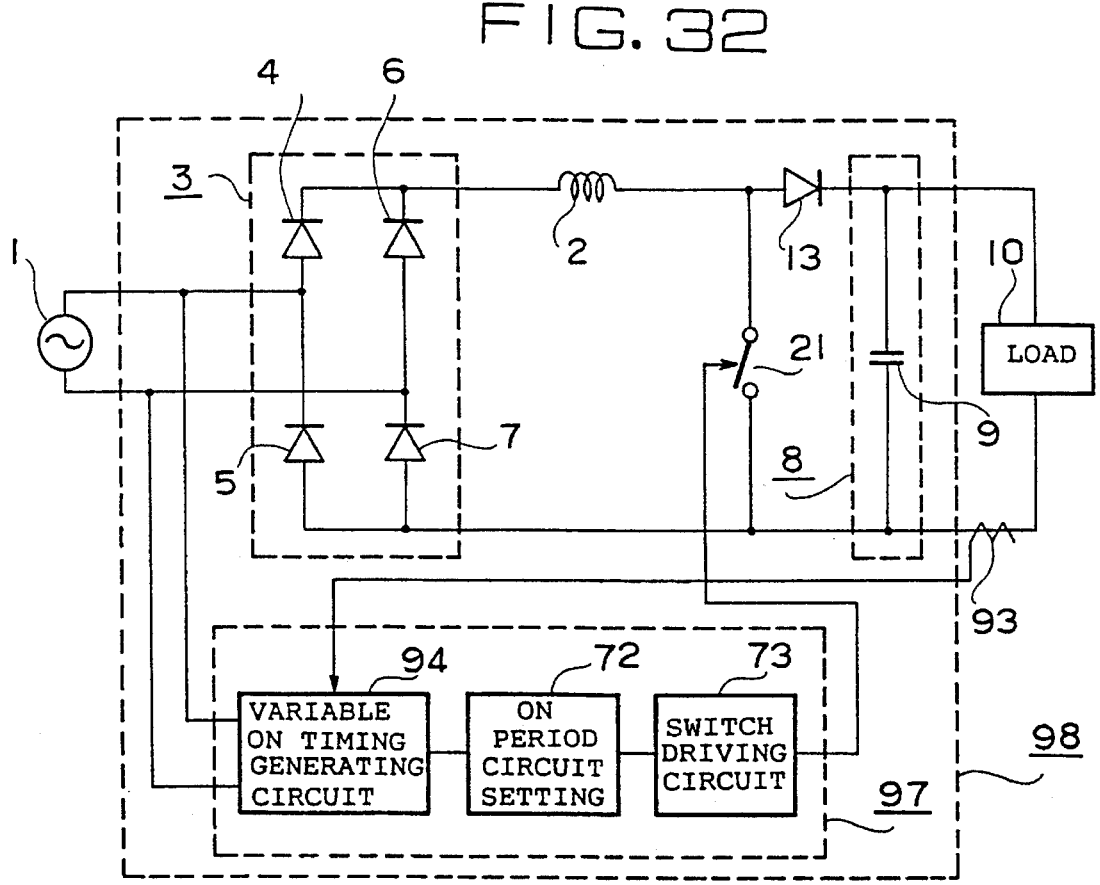
FIG. 32 is a circuit diagram showing one embodiment of the dc power-supply unit according to the fifth aspect of the present invention.

FIG. 32 is a circuit diagram showing one embodiment according to the fifth aspect of the present invention. In FIG. 32, reference numeral 97 means a switch controlling circuit (switch controlling means) including a variable ON timing generating circuit 94, an ON period setting circuit 72, and a switch driving circuit 73, and 98 is a dc power-supply unit.

A description will now be given of the operation. The variable ON timing generating circuit 94 outputs an ON signal in synchronization with the source voltage of the ac power supply 1, and according to a load condition detected by the current sensor 93. Consequently, the ON period setting circuit 72 outputs a signal output to close a switch 21 only for a preset period through the switch driving circuit 73 to the switch 21. When the switch 21 is closed, as in the embodiment 11 described before, the ac power supply 1 is short-circuited through a reactor 2 and diode bridges 4 and 7 (or diode bridges 5, 6) to conduct current, and the current gradually increases. Subsequently, when an ON period of the switch 21 is terminated to open the switch 21, the short-circuit current which has been flowing in the reactor 2 passes through a diode 13 to become the charging current in the capacitor 9 of the smoothing circuit 8, and starts to decrease. Thereafter, when the source voltage of the ac power supply 1 is in the vicinity of peak voltage, the diode bridges 4, 7 (or the diode bridges 5, 6) cause the charging current in the capacitor 9 to flow through the reactor 2 and the diode 13.

Figure 33:
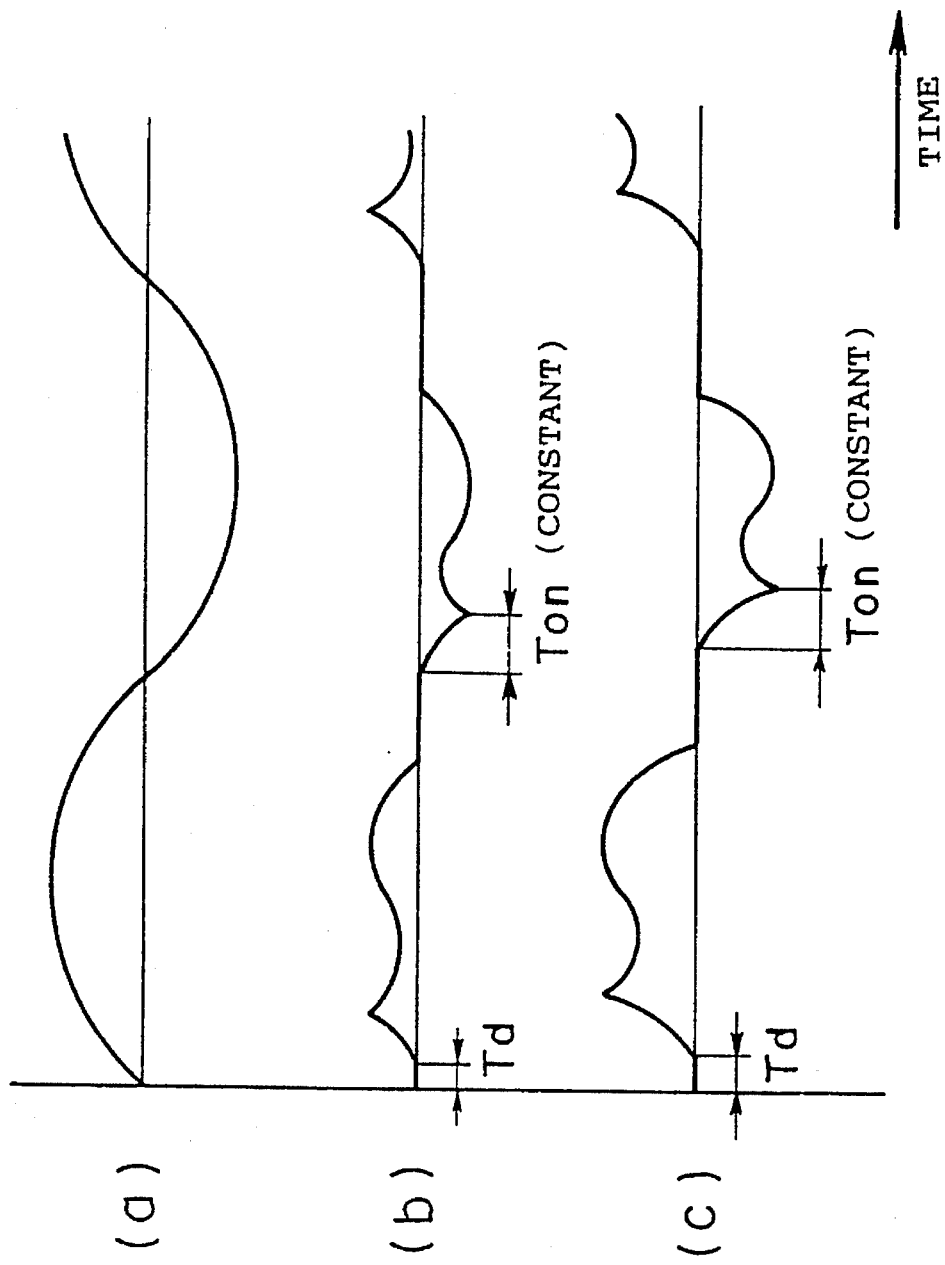
FIG. 33 is an operating waveform diagram showing the operating waveform in each part.

At this time, there are provided a source voltage waveform of the ac power supply 1 as shown in FIG. 33(*a*), and input current waveforms of the dc power-supply unit 98 under a light load and a heavy load as shown in FIGS. 33(*b*) and (*c*) respectively. As seen from FIG. 33, the operation is controlled so as to have an earlier ON signal output timing of the variable ON timing generating circuit 96 under a light load than the ON signal output timing under a heavy load.

Figure 34:
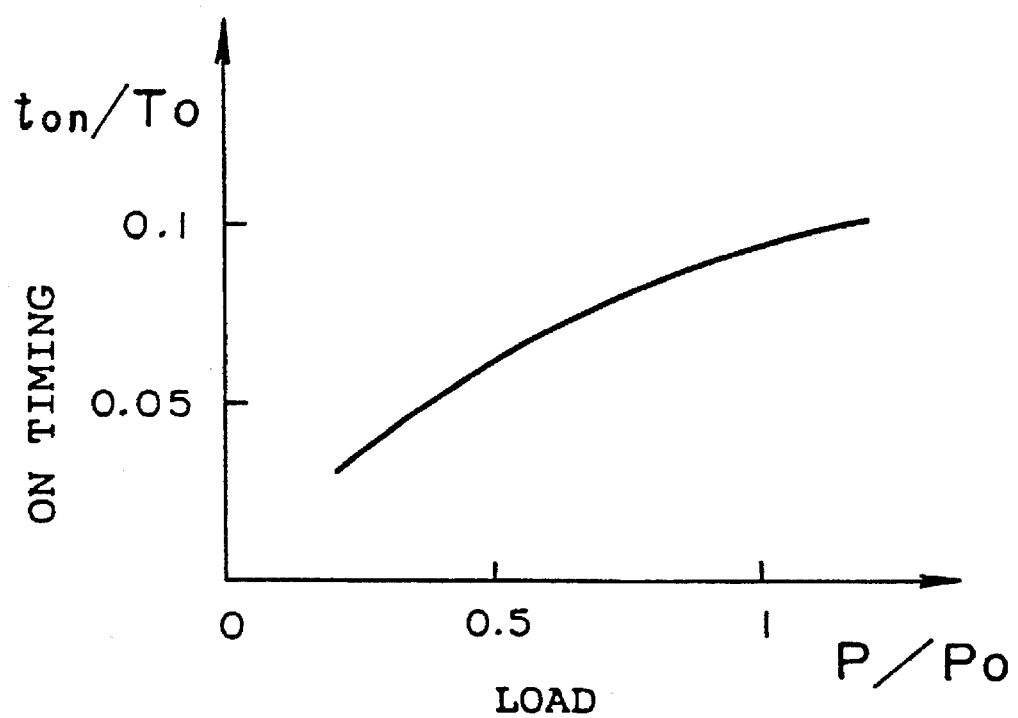
FIG. 34 is a graph diagram showing the relation between the load and the ON timing.

FIG. 34 is a diagram showing a relationship between a load, and the ON signal output timing serving as the overall optimal operating point in view of the power factor and a current higher harmonic characteristic in case an ON signal output period of the ON period setting circuit 72 is set to a certain period (for example, one-twentieth of source voltage period). In FIG. 34, the transverse axis represents a load normalized by rated load $P_o$, and the ordinate axis represents the ON signal output timing normalized by the power supply period $T_0$. In-the present invention, the output timing of the variable ON timing generating circuit 94 can be controlled according to the load condition based upon the relation shown in FIG. 34. Further, as in the embodiment 11, it must be noted that the output timing of the variable ON timing generating circuit 94 may be controlled according to the purpose. That is, while a particular weight is given to the power factor, the output timing may be controlled according to the load condition. Alternatively, while the particular weight is given to the current higher harmonic characteristic, the output timing may be controlled according to the load condition.

As in the embodiment 11, it must be noted that the present invention should not be limited to the load current detecting means as means for detecting the magnitude of the load condition. For example, it is also possible to detect the magnitude of the load condition by using voltage fluctuation in the capacitor 9 of the smoothing circuit 8, or the input current of the dc power-supply unit 98.

In addition, as in the embodiment 1, it is to be understood that the present invention should not be limited to the means on the basis of the zero crossing point of the source voltage as means for obtaining the signal in synchronization with the source voltage of the ac power supply 1.

Besides, as in the embodiment 1, it must be noted that the present invention should not be limited to the arrangement of the reactor 2 and the switch 21 shown in FIG. 32. The reactor 2 may be disposed on the ac side as shown in FIG. 14, and both of the reactor 2 and the switch 21 may be arranged on the ac side as shown in FIG. 15. Alternatively, a voltage doubler rectifier circuit may be formed as shown in FIG. 16. Further, the plurality of reactors 2 may be provided to serve as an inductive element.

Embodiment 13

Figure 35:
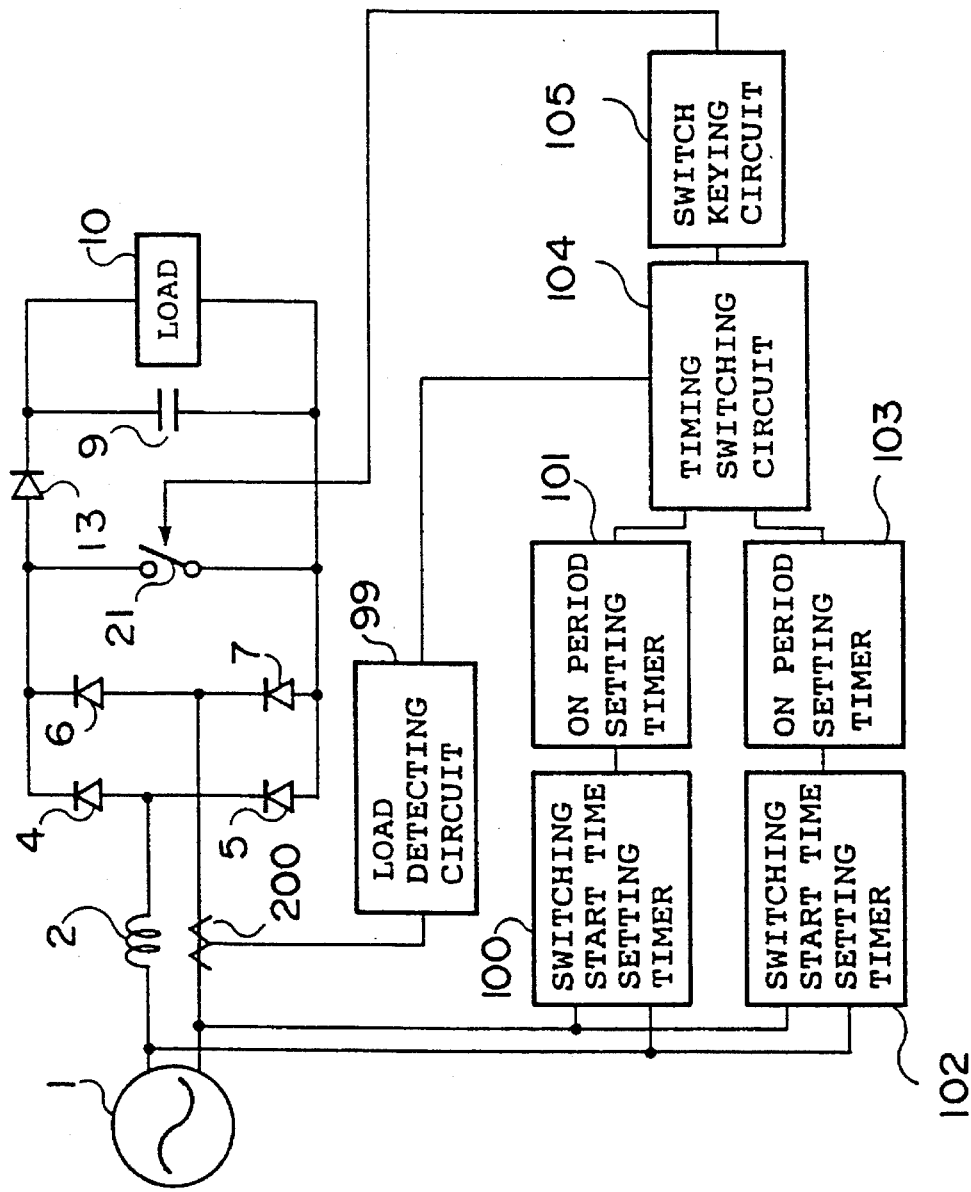
FIG. 35 is a circuit diagram showing another embodiment of the dc power-supply unit according to the fifth aspect of the present invention.

Alternatively, the circuit in the embodiment 12 may be constructed as shown in FIG. 35. In FIG. 35, reference numeral 99 is a load detecting circuit to decide magnitude of the load according to a signal from a current sensor 200, 100 is a switching start time setting timer to set a switching start time under a heavy load in synchronization with source voltage, 101 is an ON period setting timer to set an ON time under the heavy load, 102 is a switching start time setting timer to set the switching start time under a light load in synchronization with the source voltage, 103 is an ON period setting timer to set the ON time under the light load, 104 is a timing switching circuit by which the timing is switched over to either timing for heavy load or timing for light load in response to a signal from the load detecting circuit 99, and 105 is a switch keying circuit to open and close a switch 21 according to the ON/OFF timing output from the timing switching circuit 104.

A description will now be given of the operation. The switching start time setting timers 100 and 102 output the ON signals in synchronization with the source voltage of the ac power supply 1 to actuate the ON period setting timers 101 and 103 so as to output the ON signals to the timing switching circuit 104. The magnitude of the load is decided in the load detecting circuit 99 depending upon the signal from the current sensor 200 to output the result to the timing switching circuit 104. The timing switching circuit 104 is switched over so as to output the signal from the ON period setting timer 101 to the switch keying circuit 105 if the signal from the load detecting circuit 99 is a heavy load signal, and output the signal from the ON period setting timer 103 to the switch keying circuit 105 if it is a light load signal. The switch keying circuit 105 receives the ON signal from the timing switching circuit 104 to close the switch 21.

When the switch 21 is closed, the ac power supply 1 is short-circuited through a reactor 2 and diode bridges 4 and 7 (or diode bridges 5, 6) to conduct current, and the current gradually increases. Subsequently, the ON period setting timers 101 and 103 output the OFF signals to the timing switching circuit 104. The magnitude of the load is decided in the load detecting circuit 99 depending upon the signal from the current sensor 200 to output the result to the timing switching circuit 104. The timing switching circuit 104 is switched over so as to output the signal from the ON period setting timer 101 to the switch keying circuit 105 if the signal from the load detecting circuit 99 is a heavy load signal, and output the signal from the ON period setting timer 103 to the switch keying circuit 105 if it is a light load signal. The switch keying circuit 105 receives the OFF signal from the timing switching circuit 104 to open the switch 21.

When the switch 21 is opened, the short-circuit current which has been flowing in the reactor 2 passes through the diode 13 to become the charging current in the capacitor 9, and starts to decrease. Thereafter, when the source voltage of the ac power supply 1 is in the vicinity of peak voltage, the diode bridges 4, 7 (or the diode bridges 5, 6) cause the charging current in the capacitor 9 to flow through the reactor 2 and the diode 13.

Figure 36:
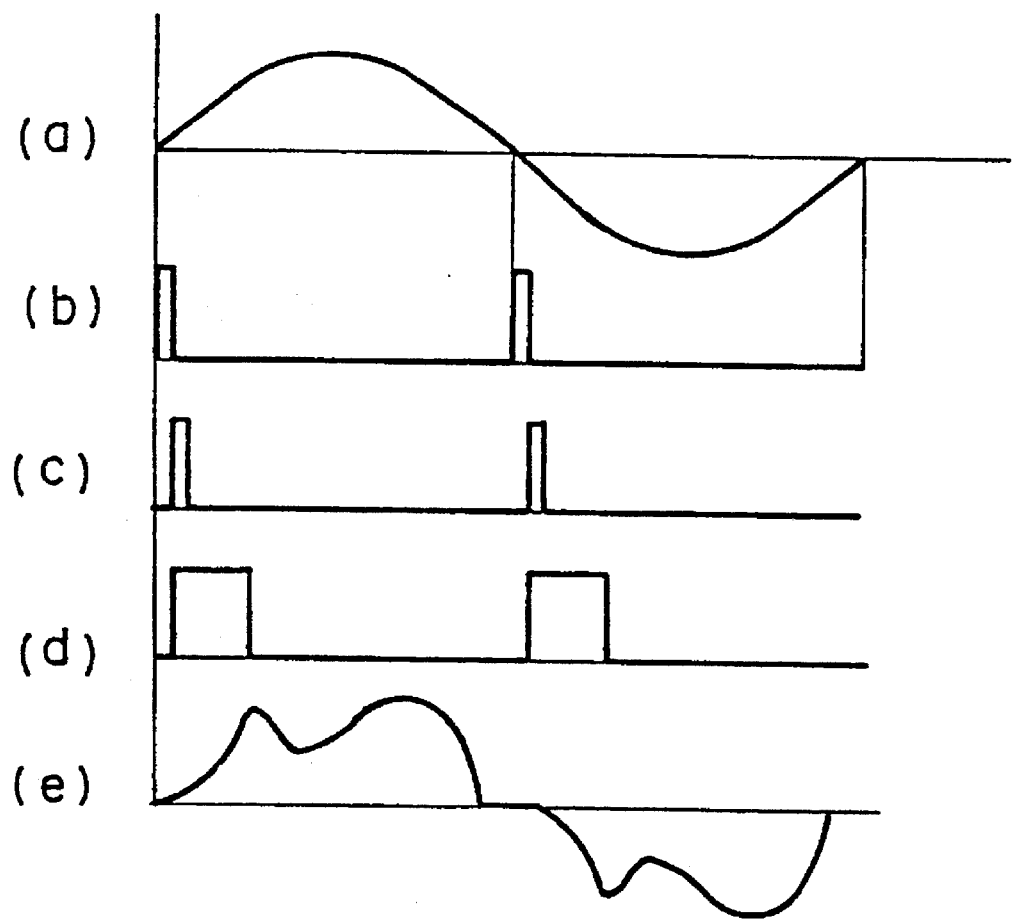
FIG. 36 is an operating waveform diagram showing the operating waveform in each part.

At this time, there are provided timing charts shown in FIG. 36. In FIG. 36, (a) shows a source voltage waveform, (b) shows a zero cross detecting signal, (c) shows a switching start time output signal, (d) shows the ON time, and (e) shows a current waveform.

Embodiment 14

Figure 37:
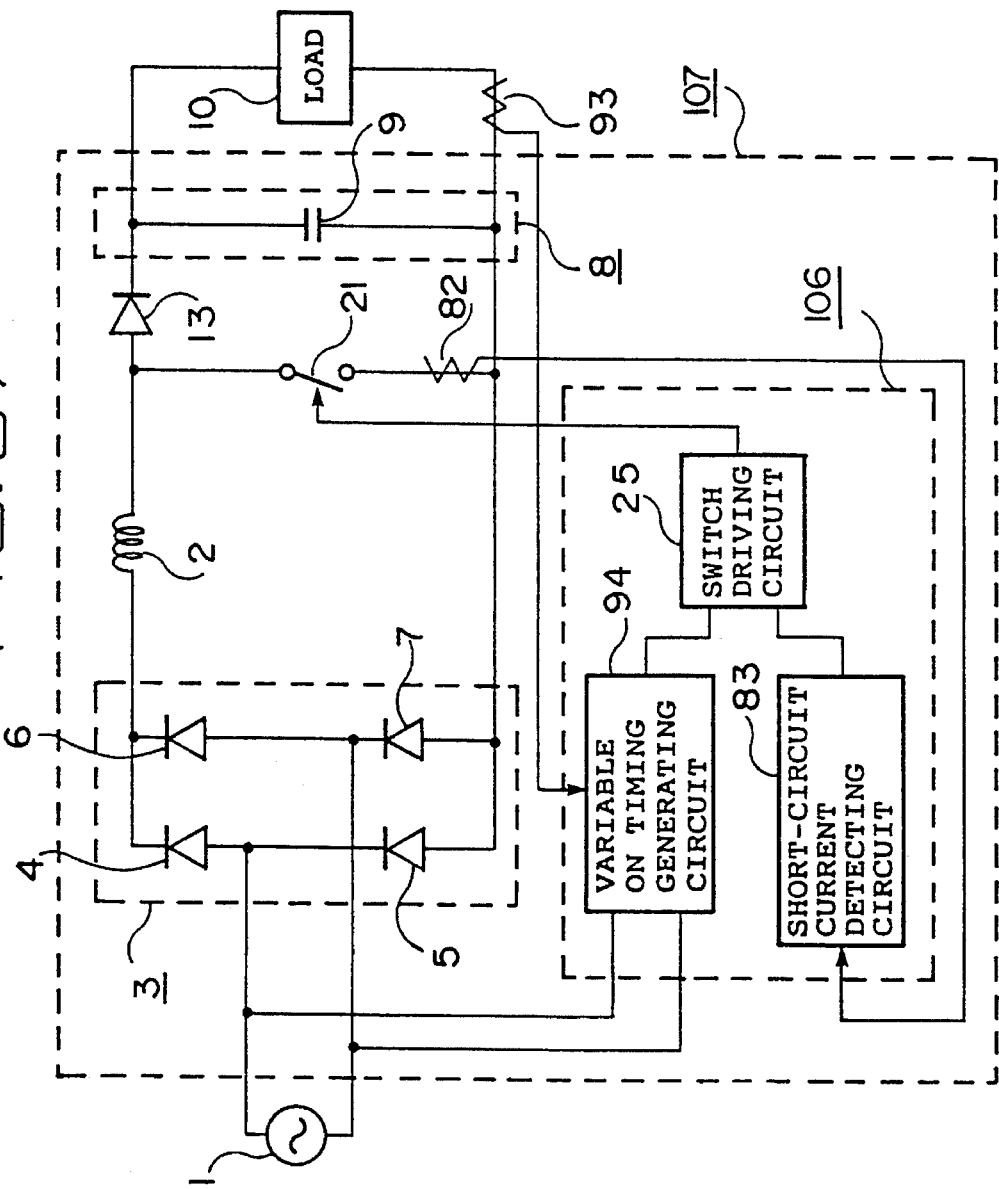
FIG. 37 is a circuit diagram showing one embodiment of the dc power-supply unit according to the sixth aspect of the present invention.

FIG. 37 is a circuit diagram showing one embodiment according to the sixth aspect of the present invention. In FIG. 37, reference numeral 106 is a switch controlling circuit (switch controlling means) including a variable ON timing generating circuit 94, a short-circuit current detecting circuit 83, and a switch driving circuit 25, and 107 is a dc power-supply unit.

A description will now be given of the operation. The variable ON timing generating circuit 94 outputs an ON signal through the switch driving circuit 25 in synchronization with the source voltage of the ac power supply 1, and according to the load condition detected by the current sensor 93. Subsequently, the switch 21 is closed so that the ac power supply 1 is short-circuited through a reactor 2 and diode bridges 4 and 7 (or diode bridges 5, 6) to conduct current, and the current gradually increases. When the short-circuit current increases and reaches a preset value, the short-circuit current detecting circuit 83 outputs an OFF signal for the switch 21 through the switch driving circuit 25 to open the switch 21. Accordingly, the short-circuit current which has been flowing in the reactor 2 passes through a diode 13 to become the charging current in a capacitor 9 of a smoothing circuit 8, and starts to decrease. Thereafter, when the source voltage of the ac power supply 1 is in the vicinity of peak voltage, the diode bridges 4, 7 (or the diode bridges 5, 6) cause the charging current in the capacitor 9 to flow through the reactor 2 and the diode 13.

Figure 38:
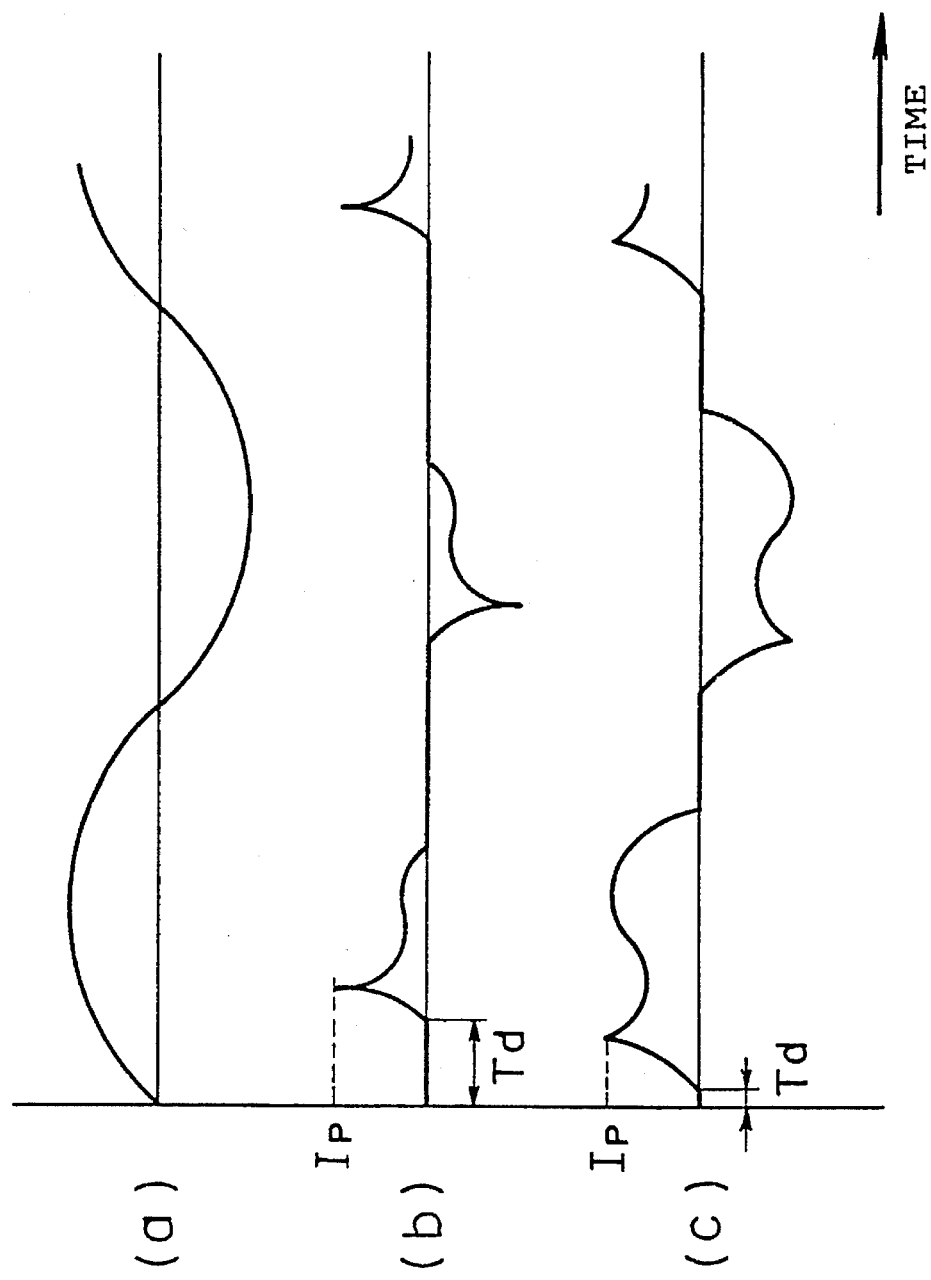
FIG. 38 is an operating waveform diagram showing the operating waveform in each part.

At this time, a source voltage waveform of the ac power supply 1 as shown in FIG. 38(a), and input current waveforms of the dc power-supply unit 107 under a light load and a heavy load as shown in FIGS. 38(b) and 38(c), respectively. As seen from FIG. 38, the operation is controlled so as to have a later ON signal output timing of the variable ON timing generating circuit 94 under a light load than the ON signal output timing under a heavy load.

Figure 39:
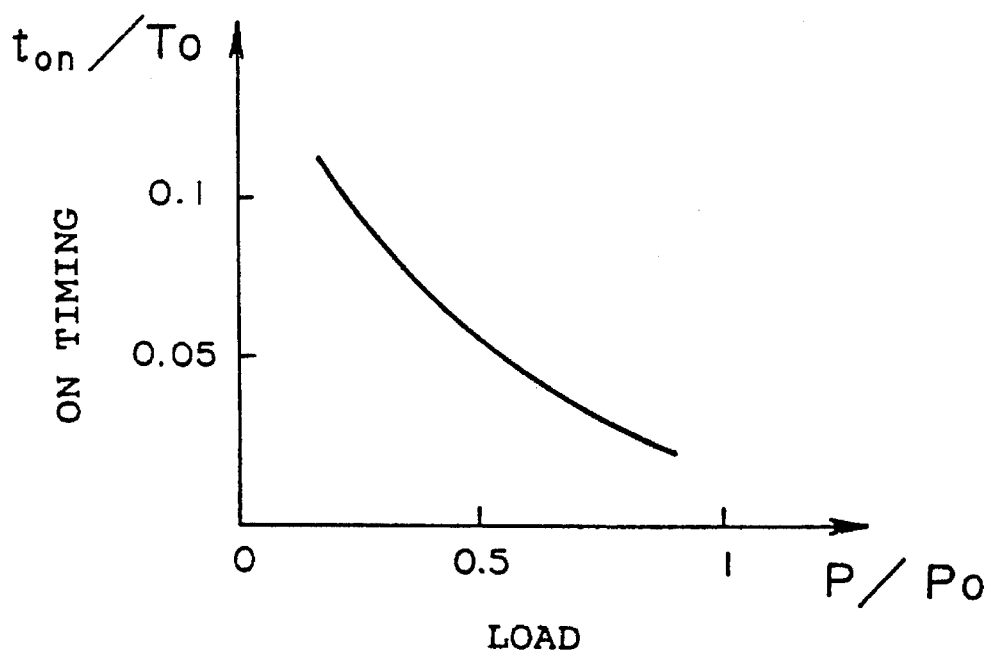
FIG. 39 is a graph diagram showing the relation between the load and the ON timing.

FIG. 39 is a diagram showing a relationship between a load, and the ON signal output timing serving as the overall optimal operating point in view of a power factor and a current higher harmonic characteristic in case a short-circuit level to generate the OFF signal of the switch 21 is set to a predetermined value (for example, four-fifths of average current under the maximum load). In FIG. 39, the transverse axis represents a load normalized by rated load $P_0$, and the ordinate axis represents the ON signal output timing normalized by the power supply period $T_0$. In the present invention, the output timing of the variable ON timing generating circuit 94 can be controlled according to the load condition based upon the relationship shown in FIG. 39. Further, as in the embodiment 11, it must be noted that the output timing of the variable ON timing generating circuit 94 may be controlled according to the purpose. That is, while a particular weight is given to the power factor, the output timing may be controlled according to the load condition. Alternatively, while the particular weight is given to the current higher harmonic characteristic, the output timing may be controlled according to the load condition.

As in the embodiment 11, it must be noted that the present invention should not be limited to the load current detecting means as means for detecting the magnitude of the load condition. For example, it is also possible to detect the magnitude of the load condition by using voltage fluctuation in the capacitor 9 of the smoothing circuit 8, or the input current of the dc power-supply unit 107.

In addition, as in the embodiment 1, it is to be understood that the present invention should not be limited to the means on the basis of the zero crossing point of the source voltage as means for obtaining the signal in synchronization with the source voltage of the ac power supply 1.

Besides, as in the embodiment 1, it must be noted that the present invention should not be limited to the arrangement of the reactor 2 and the switch 21 shown in FIG. 37. The reactor 2 may be disposed on the ac side as shown in FIG. 14, and both of the reactor 2 and the switch 21 may be arranged on the ac side as shown in FIG. 15. Alternatively, a voltage doubler rectifier circuit may be formed as shown in FIG. 16. Further, the plurality of reactors 2 may be provided to serve as an inductive element.

Embodiment 15

Figure 40:
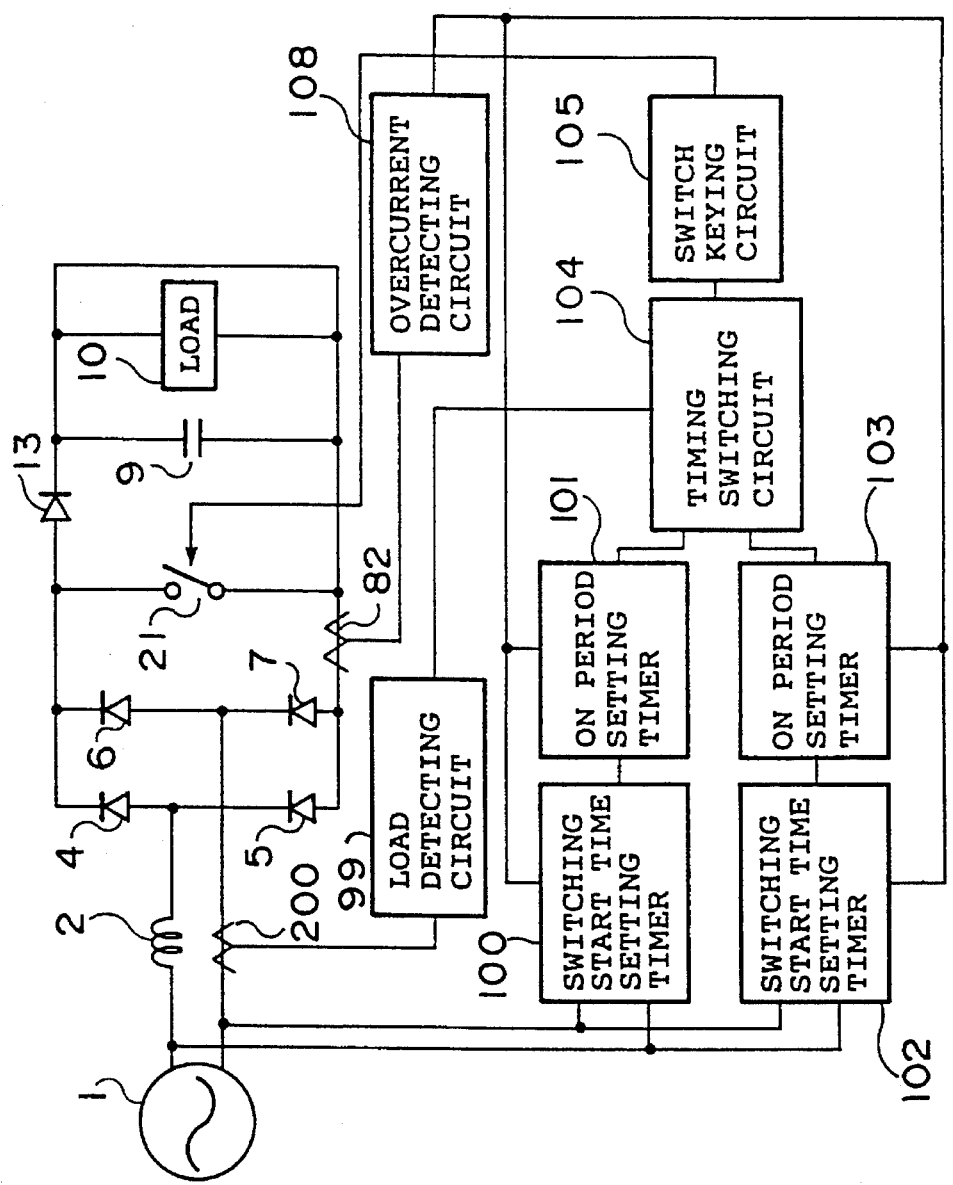
FIG. 40 is a circuit diagram showing another embodiment of the dc power-supply unit according to the sixth aspect of the present invention.

Alternatively, the circuit shown in FIG. 37 according to the embodiment 14 may be constructed as shown in FIG. 40. In FIG. 40, reference numeral 108 is an overcurrent detecting circuit to decide overcurrent depending upon a signal from a current sensor 82.

A description will now be given of the operation. Switching start time setting timers 100 and 102 output ON signals in synchronization with source voltage of an ac power supply 1 to actuate ON period setting timers 101 and 103 so as to output the ON signals to a timing switching circuit 104. The magnitude of the load is decided in a load detecting circuit 99 depending upon a signal from a current sensor 200 to output the result to the timing switching circuit 104. The timing switching circuit 104 is switched over so as to output the signal from the ON period setting timer 101 to a switch keying circuit 105 if the signal from the load detecting circuit 99 is a heavy load signal, and output the signal from the ON period setting timer 103 to the switch keying circuit 105 if it is a light load signal. The switch keying circuit 105 receives the ON signal from the timing switching circuit 104 to close the switch 21.

When the switch 21 is closed, the ac power supply 1 is short-circuited through a reactor 2 and diode bridges 4 and 7 (or diode bridges 5, 6) to conduct current, and the current gradually increases. Subsequently, the ON period setting timers 101 and 103 output an OFF signals to the timing switching circuit 104. The magnitude of the load is detected in the load detecting circuit 99 depending upon the signal from the current sensor 200 to output the result to the timing switching circuit 104. The timing switching circuit 104 is switched over so as to output the signal from the ON period setting timer 101 to the switch keying circuit 105 if the signal from the load detecting circuit 99 is a heavy load signal, and output the signal from the ON period setting timer 103 to the switch keying circuit 105 if it is a light load signal. The switch keying circuit 105 receives the OFF signal from the timing switching circuit 104 to open the switch 21.

When the switch 21 is opened, the short-circuit current which has been flowing in the reactor 2 passes through a diode 13 to become the charging current in a capacitor 9, and starts to decrease. Thereafter, when the source voltage of the ac power supply 1 is in the vicinity of peak voltage, the diode bridges 4, 7 (or the diode bridges 5, 6) cause the charging current in the capacitor 9 to flow through the reactor 2 and the diode 13. In case the overcurrent detecting circuit 108 detects that an signal from the current sensor 82 is the overcurrent in a condition where the switch 21 is closed, the overcurrent detecting circuit 108 outputs a reset signal to the switching start time setting timers 100 and 102, and to the ON period setting timers 101 and 103. Consequently, the ON period is terminated so that the ON period setting timers 101 and 103 output the OFF signals through the timing switching circuit 104 to the switch keying circuit 105, resulting in opening the switch 21.

Figure 41:
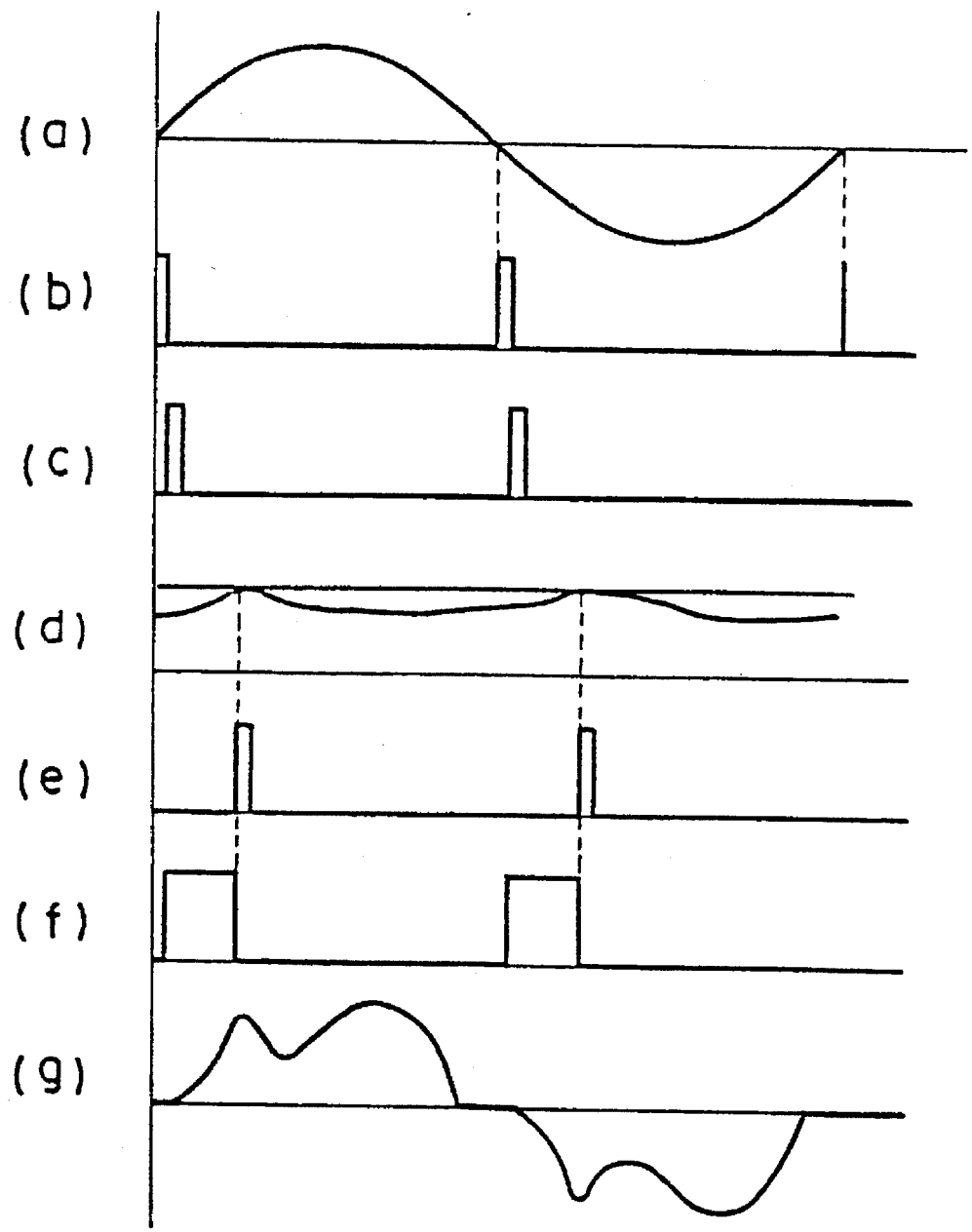
FIG. 41 is an operating waveform diagram showing the operating waveform in each part.

At this time, there are provided timing charts shown in FIG. 41. In FIG. 41, (a) shows a source voltage waveform, (b) shows a zero cross detecting signal, (c) shows a switching start time output signal, (d) shows the overcurrent, (e) shows a switching OFF signal, (f) shows the ON time, and (g) shows a current waveform of the power supply. When a current value exceeds a given value in FIG. 41(d), it is decided that an current is the overcurrent, and therefore the OFF signal shown in FIG. 41(e) is output.

Embodiment 16

Figure 42:
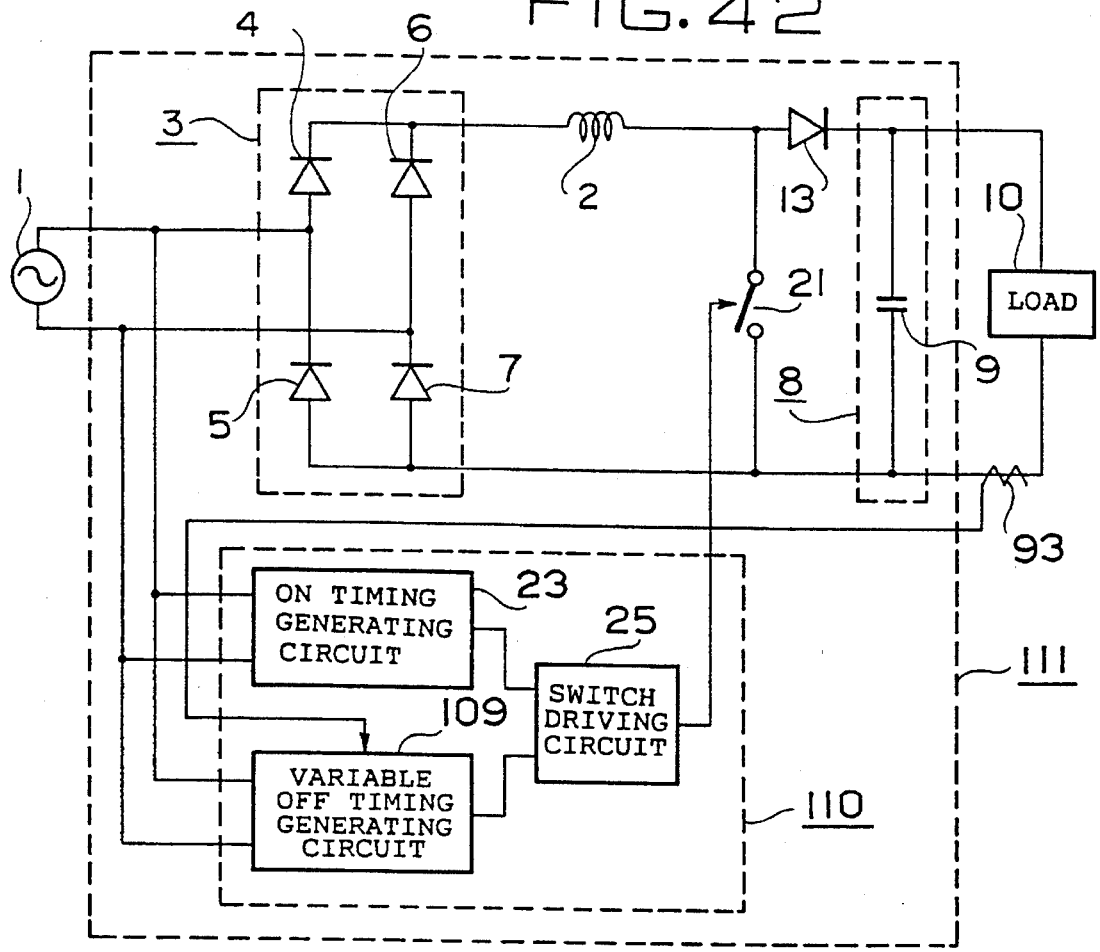
FIG. 42 is a circuit diagram showing one embodiment of the dc power-supply unit according to the seventh aspect of the present invention.

FIG. 42 is a circuit diagram showing one embodiment according to the seventh aspect of the present invention. In FIG. 42, reference numeral 109 is a variable OFF timing generating circuit to generate an OFF signal for a switch 21 according to timing in synchronization with source voltage, and according to a load condition detected by a current sensor 93, 110 is a switch controlling circuit (switch controlling means) including a variable ON timing generating circuit 23, the variable OFF timing generating circuit 109, and a switch driving circuit 25, and 111 is a dc power-supply unit.

A description will now be given of the operation. An ON timing generating circuit 23 outputs an ON signal through a switch driving circuit 25 in synchronization with the source voltage of an ac power supply 1. Accordingly, the switch 21 is closed so that the ac power supply 1 is short-circuited through a reactor 2 and diode bridges 4 and 7 (or diode bridges 5, 6) to conduct current, and the current gradually increases. Subsequently, the variable OFF timing generating circuit 109 outputs the OFF signal through the switch driving circuit 25 in synchronization with the source voltage, and according to a load condition detected by the current sensor 93, resulting in opening the switch 21. When the switch 21 is opened, the short-circuit current which has been flowing in the reactor 2 passes through a diode 13 to become the charging current in a capacitor 9 of a smoothing circuit 8, and starts to decrease. Thereafter, when the source voltage of the ac power supply 1 is in the vicinity of peak voltage, the diode bridges 4, 7 (or the diode bridges 5, 6) cause the charging current in the capacitor 9 to flow through the reactor 2 and the diode 13.

Figure 43:
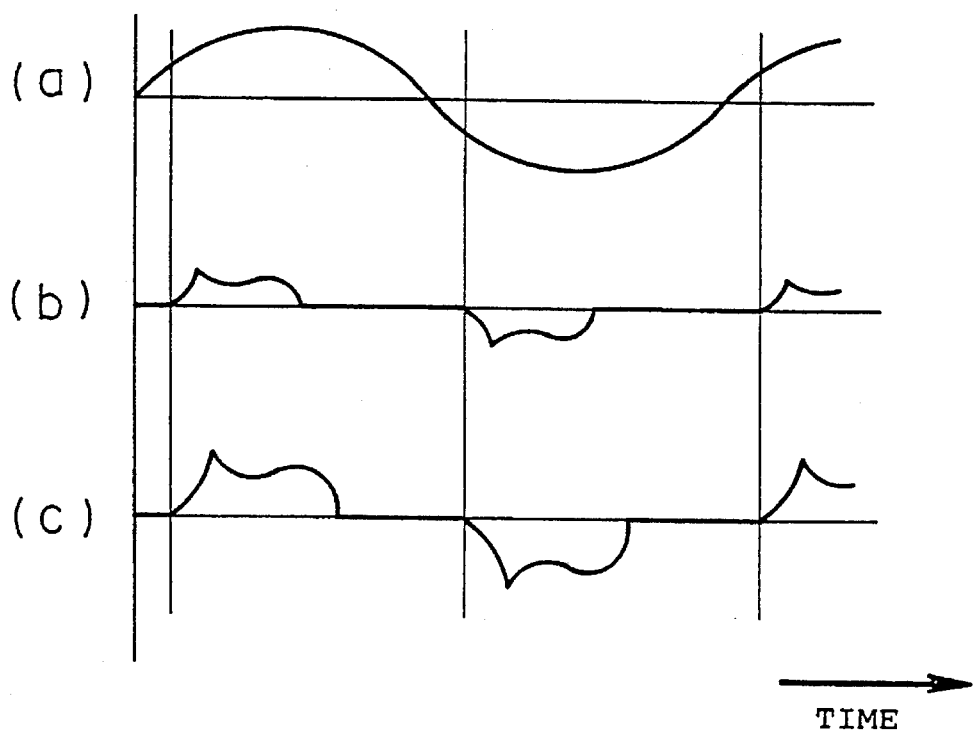
FIG. 43 is an operating waveform diagram showing the operating waveform in each part.

At this time, there are provided a source voltage waveform of the ac power supply 1, and input current waveforms of the dc power-supply unit 111 under a light load and a heavy load as shown in FIGS. 43(b) and 43(c), respectively. As seen from FIG. 43, the operation is controlled so as to have an earlier OFF signal output timing of the variable OFF timing generating circuit 109 under a light load than the OFF signal output timing under a heavy load.

Figure 44:
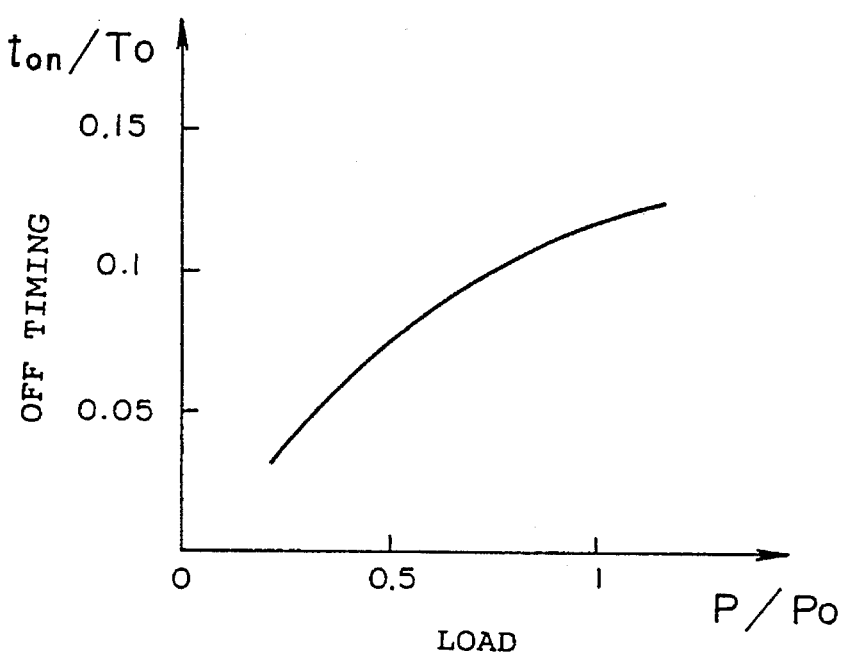
FIG. 44 is a graph diagram showing the relation between the load and the ON timing.

FIG. 44 is a diagram showing a relationship between a load, and the OFF signal output timing serving as the overall optimal operating point in view of a power factor and a current higher harmonic characteristic in case the ON timing generating circuit 23 generates the ON signal for the switch 21 at a certain time point (for example, a time point delayed by one-twentieth of power supply period from a zero crossing point of the source voltage). In FIG. 44, the transverse axis represents a load normalized by rated load $P_0$, and the ordinate axis represents the ON signal output timing normalized by the power supply period $T_0$. In the present invention, the output timing of the variable OFF timing generating circuit 109 can be controlled according to the load condition based upon the relationship shown in FIG. 44. Further, it must be noted that the output timing of the variable OFF timing generating circuit 109 may be controlled according to the purpose. That is, while a particular weight is given to the power factor, the output timing may be controlled according to the load condition. Alternatively, while the particular weight is given to the current higher harmonic characteristic, the output timing may be controlled according to the load condition.

As in the embodiment 11, it must be noted that the present invention should not be limited to the load current detecting means as means for detecting the magnitude of the load condition. For example, it is also possible to detect the magnitude of the load condition by using voltage fluctuation in a capacitor 9 of a smoothing circuit 8, or the input current of the dc power-supply unit 111.

In addition, as in the embodiment 1, it is to be understood that the present invention should not be limited to the means on the basis of the zero crossing point of the source voltage as means for obtaining the signal in synchronization with the source voltage of the ac power supply 1.

Besides, as in the embodiment 1, it must be noted that the present invention should not be limited to the arrangement of the reactor 2 and the switch 21 shown in FIG. 42. The reactor 2 may be disposed on the ac side as shown in FIG. 14, and both of the reactor 2 and the switch 21 may be arranged on the ac side as shown in FIG. 15. Alternatively, a voltage doubler rectifier circuit may be formed as shown in FIG. 16. Further, the plurality of reactors 2 may be provided to serve as an inductive element.

Embodiment 17

Figure 45:
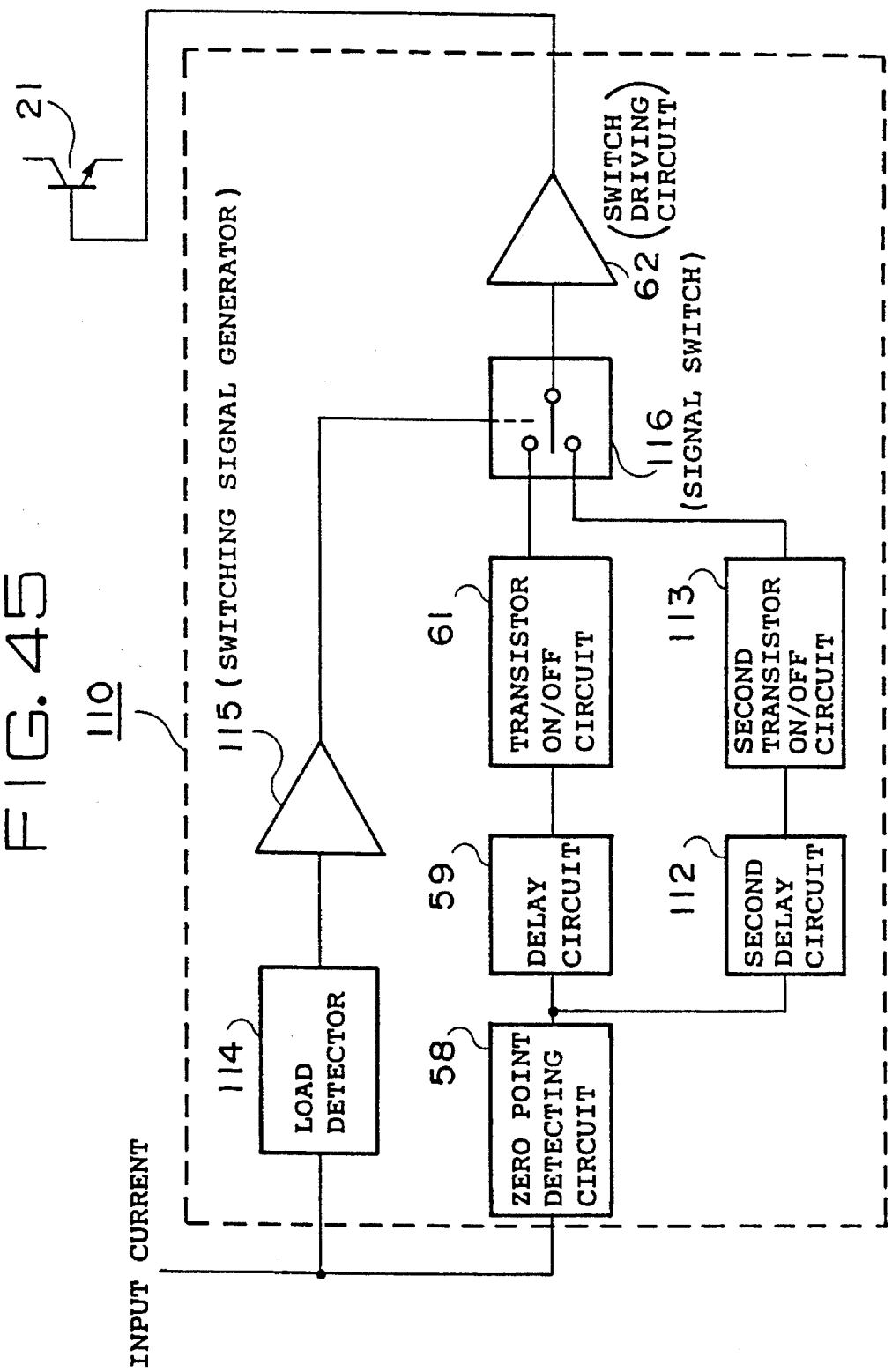
FIG. 45 is a circuit diagram showing another embodiment of the dc power-supply unit according to the seventh aspect of the present invention.

The switch controlling circuit 110 shown in FIG. 42 may be constructed as shown in FIG. 45. In FIG. 45, reference numeral 112 is a second delay circuit, 113 is a second transistor ON/OFF circuit, 114 is a load detector to convert the input current into electric energy consumed by a load, 115 is a switching signal generator to output a switching signal in response to a signal from the load detecting detector 114, and 116 is a signal switch.

Figure 46:
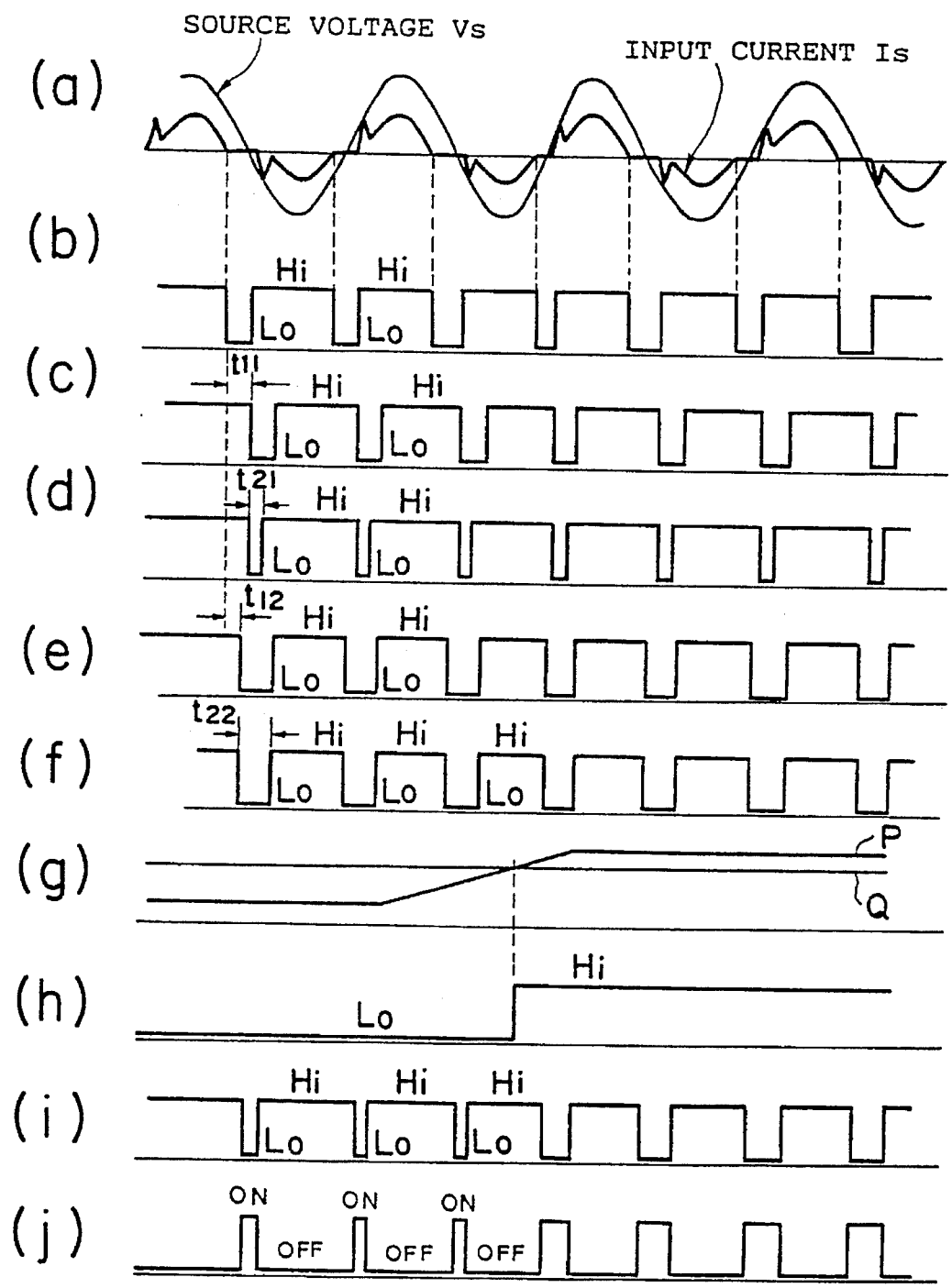
FIG. 46 is an operating waveform diagram showing the operating waveform in each part.

A description will now be given of the operation with reference to FIG. 46. FIG. 46(a) shows the source voltage and an input current and FIG. 46.(b) shows the signal A output from the zero point detecting circuit 58. As shown in FIG. 46(c) the delay circuit 59 provides a signal $B_1$ which is delayed by a time $t_{11}$ from a signal A, and the transistor ON/OFF circuit 61 provides a signal $C_1$ to turn ON a switch 21 for a time interval $t_{21}$ as shown in FIG. 46(d). As shown in FIG. 46(e) the second delay circuit 112 provides a signal B2 which is delayed by a time $t_{12}$ from the signal A, and the second transistor ON/OFF circuit 113 provides a signal $C_2$ to turn ON the switch 21 for a time period $t_{22}$ as shown in FIG. 46(f). On the other hand, as shown in FIG. 46(g) the load detector 114 outputs a signal P indicating the electric energy consumed by the load depending upon the input current. As shown in FIG. 46(h) switching signal generator 115 outputs a signal "Hi" in case the signal P exceeds a predetermined reference value Q. FIG. 46(i) shows the transistor driving signal and FIG. 46(j) shows the transistor on/off signal. The signal switch 116 is switched over to receive the signal $C_1$ from the transistor ON/OFF circuit 61 when an output signal R from the switching signal generator 115 is "Lo," or to receive the signal $C_2$ from the second transistor ON/OFF circuit 113 when the output signal R is "Hi." Thereby, it is possible to provide the optimal power factor, and the optimal higher harmonic even if the load fluctuates.

Further, it is also possible to provide third and fourth delay circuits and transistor ON/OFF circuits so as to perform a switching operation.

Embodiment 18

Figure 47:
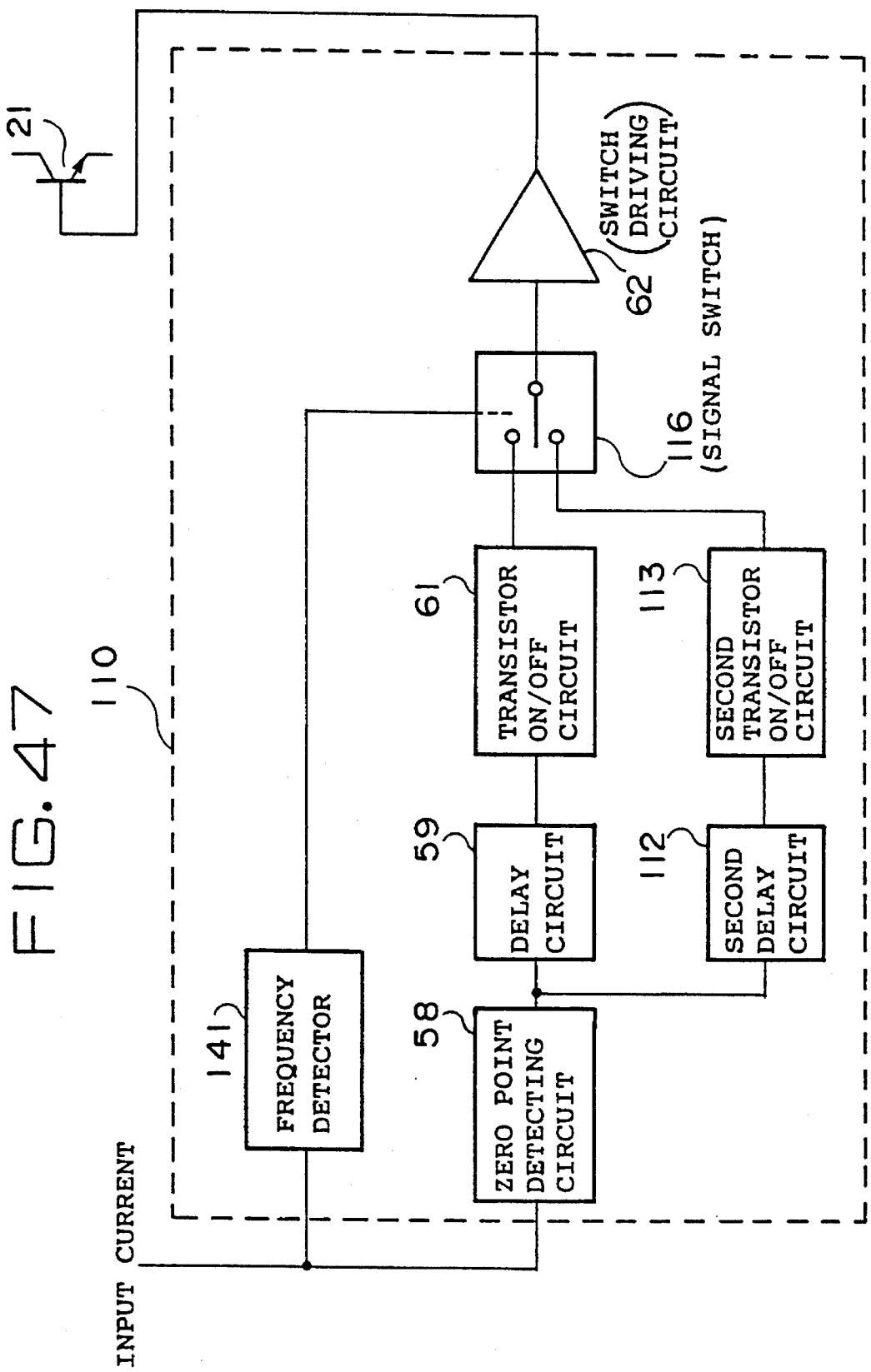
FIG. 47 is a circuit diagram showing another embodiment of the dc power-supply unit according to the seventh aspect of the present invention.

The switch controlling circuit 110 shown in FIG. 42 may be constructed as shown in FIG. 47. In FIG. 47, reference numeral 141 is a frequency detector to detect frequency of a power supply depending upon input current.

Figure 48:
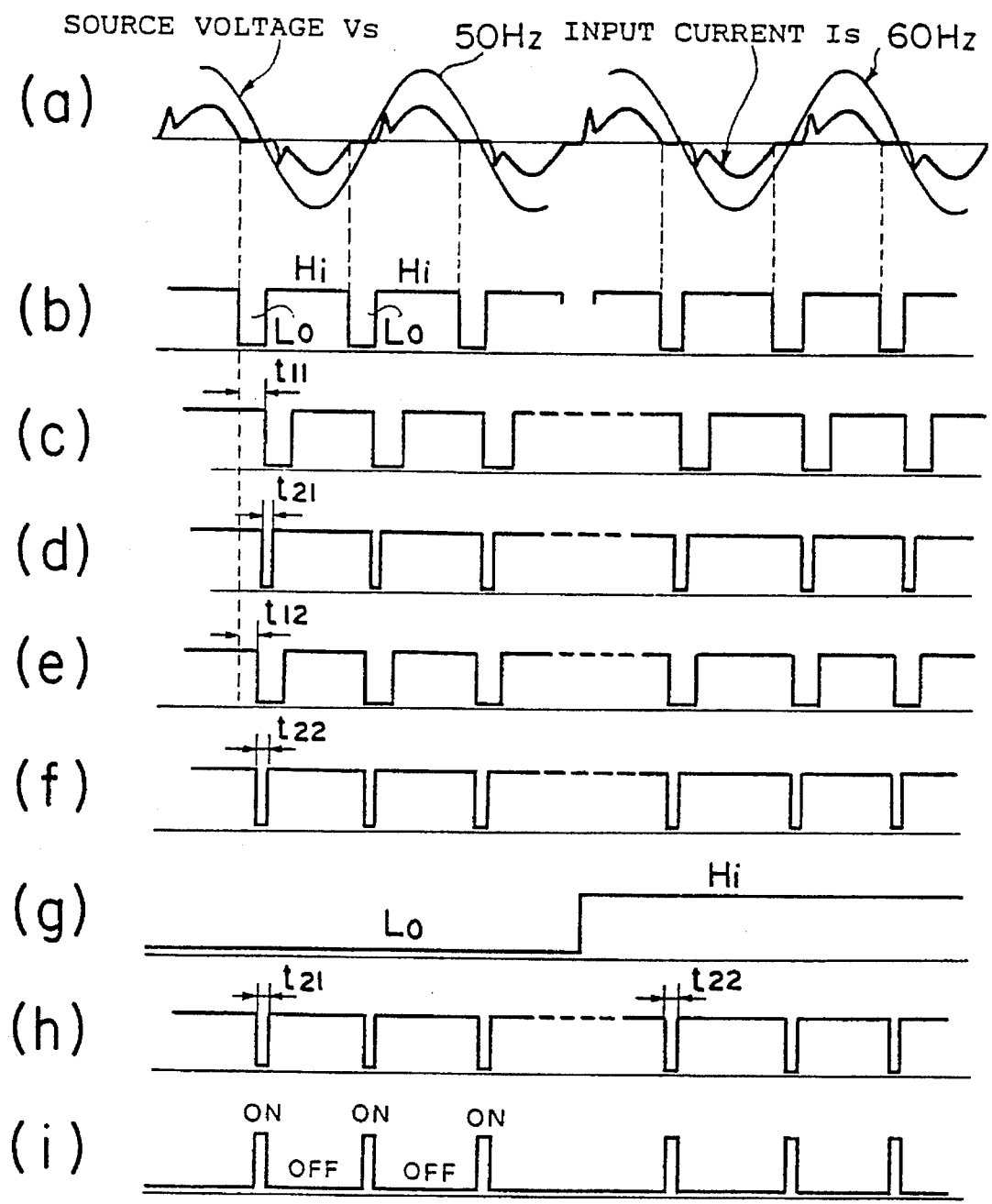
FIG. 48 is an operating waveform diagram showing the operating waveform in each part.

A description will now be given of the operation with reference to FIG. 48. FIG. 48(a) shows the source voltage and input current. In FIGS. 48(b), 48(c), 48(e), 48(d), and 48(f), signals A, $B_1$, $B_2$, $C_1$, and $C_1$, respectively, are provided by detecting a zero point of the input current in the same process as that in the embodiment 17. The frequency detector 141 detects whether power supply frequency is 50 Hz or 60 Hz, and outputs "Lo" if 50 Hz, or outputs "Hi" if 60 Hz and outputs a signal as shown in FIG. 48(g. FIGS. 48(h) and 48(i) show the transistor driving signal and the transistor on/off signal, respectively. The signal switch 116 is switched over to receive the signal $C_1$ from a transistor ON/OFF circuit 61 if 50 Hz, and receive the signal $C_2$ from a second transistor ON/OFF circuit 113 if 60 Hz. Thereby, it is possible to provide the optimal power factor, and the optimal higher harmonic according to the frequency.

Embodiment 19

Figure 49:
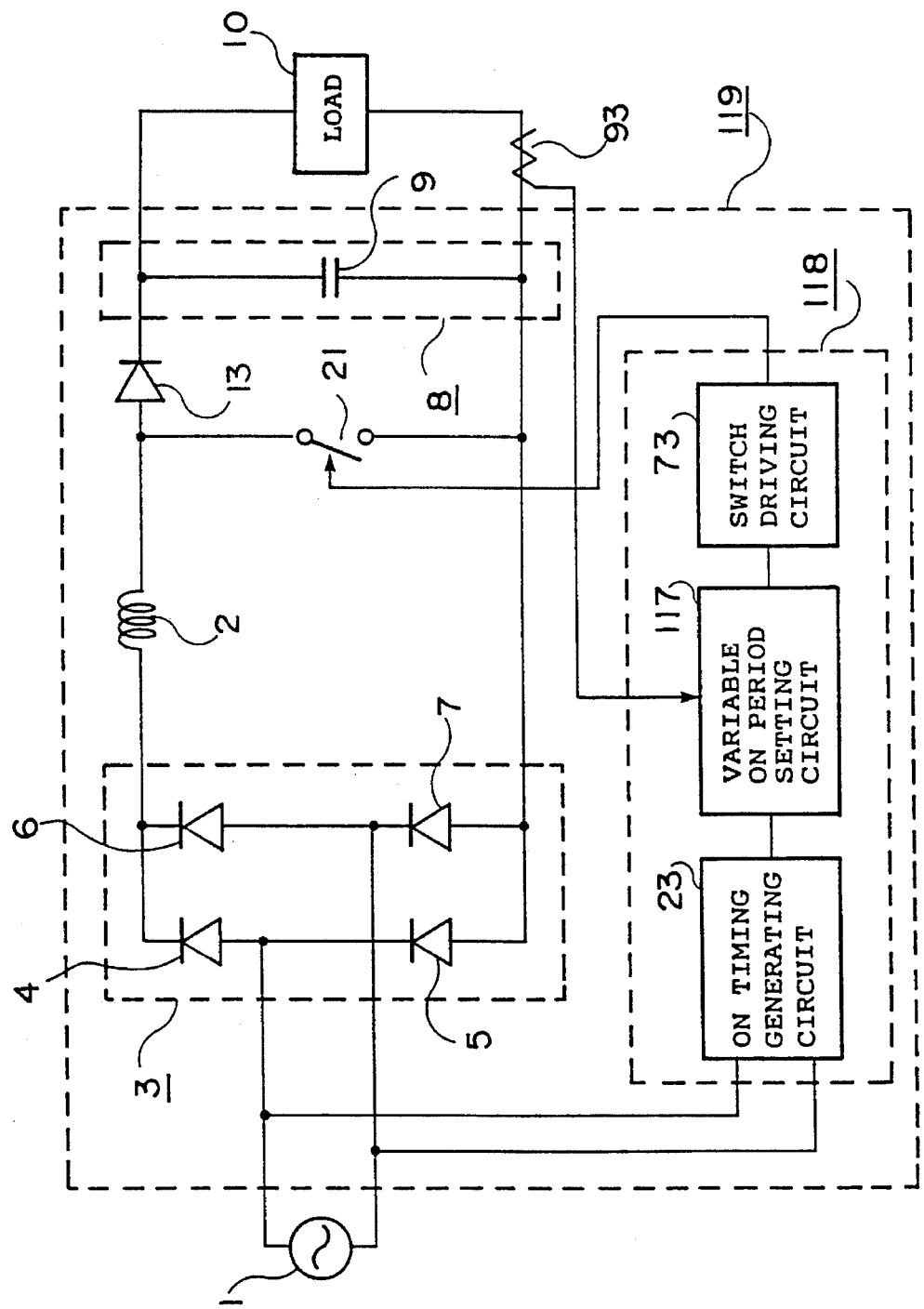
FIG. 49 is a circuit diagram showing one embodiment of the dc power-supply unit according to the eighth aspect of the present invention.

FIG. 49 is a circuit diagram showing one embodiment according to the eighth aspect of the present invention. In FIG. 49, reference numeral 117 is a variable ON period setting circuit to use an output signal from an ON timing generating circuit 23 as a trigger so as to set the ON period of a switch 21 according to a load condition detected by a current sensor 93, 118 is a switch controlling circuit (switch controlling means) including the ON timing generating circuit 23, the variable ON period setting circuit 117, and the switch driving circuit 73, and 119 is a dc power-supply unit.

A description will now be given of the operation. The ON timing generating circuit 23 outputs the ON signal in synchronization with the source voltage of the ac power supply 1. Consequently, the variable ON period setting circuit 117 outputs a signal output to close the switch 21 only for a preset period according to the load condition detected by the current sensor 93 through the switch driving circuit 73 to the switch 21. During the switch 21 is closed, as in the embodiment 1 described before, the ac power supply 1 is short-circuited through a reactor 2 and diode bridges 4 and 7 (or diode bridges 5, 6) to conduct current, and the current gradually increases. Subsequently, when the ON period of the switch 21 is terminated to open the switch 21, the short-circuit current which has been flowing in the reactor 2 passes through a diode 13 to become the charging current in a capacitor 9 of a smoothing circuit 8, and starts to decrease. Thereafter, when the source voltage of the ac power supply 1 is in the vicinity of peak voltage, the diode bridges 4, 7 (or the diode bridges 5, 6) cause the charging current in the capacitor 9 to flow through the reactor 2 and the diode 13.

Figure 50:
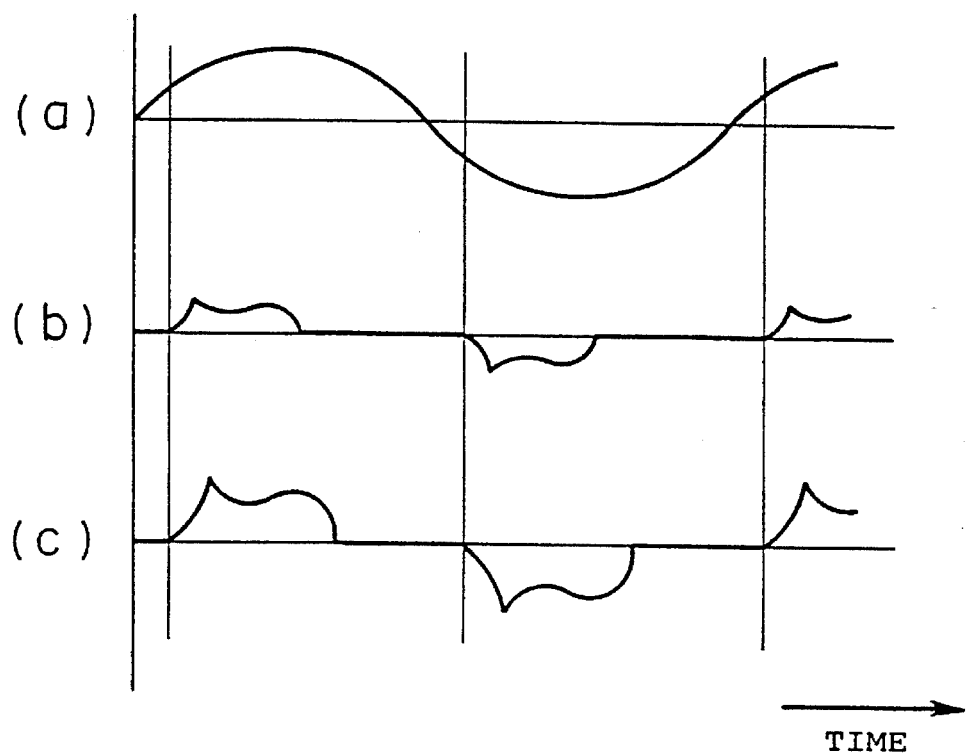
FIG. 50 is an operating waveform diagram showing the operating waveform in each part.

At this time, there are provided a source voltage waveform of the ac power supply 1 as shown in FIG. 50(a), and input current waveforms of the dc power-supply unit 119 under a light load and a heavy load as shown in FIGS. 50(b) and 50(c), respectively. As seen from FIG. 50, the operation is controlled so as to have a shorter ON signal output period of the variable ON period setting circuit 117 under a light load than the ON signal output period under a heavy load.

Figure 51:
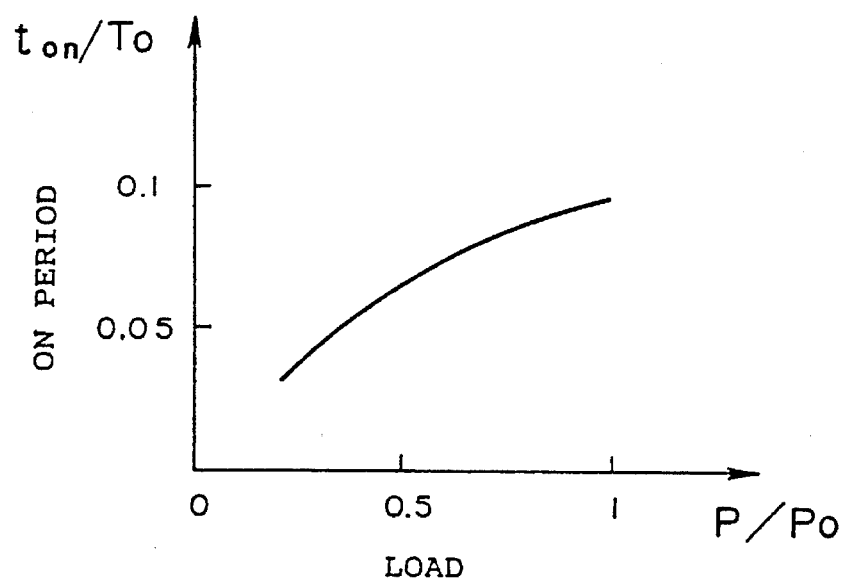
FIG. 51 is a graph diagram showing the relation between the load and the ON timing.

FIG. 51 is a diagram showing a relationship between a load, and the ON signal output timing serving as the overall optimal operating point in view of a power factor and a current higher harmonic characteristic in case the ON timing generating circuit 23 generates the ON signal for the switch 21 at a certain time point (for example, a time point which is delayed by one-twentieth of source voltage period from a zero crossing point of the source voltage). In FIG. 51, the transverse axis represents a load normalized by rated load $P_o$, and the ordinate axis represents the ON period normalized by the power supply period $T_0$. In the present invention, an ON signal output interval of the variable ON period setting circuit 117 can be controlled according to the load condition based upon the relationship shown in FIG. 51. Further, it must be noted that the ON signal output interval of the variable ON period setting circuit 117 may be controlled according to the purpose. That is, while a particular weight is given to the power factor, the ON signal output interval may be controlled according to the load condition. Alternatively, while the particular weight is given to the current higher harmonic, the ON signal output interval may be controlled according to the load condition.

As in the embodiment 11, it must be noted that the present invention should not be limited to the load current detecting means as means for detecting the magnitude of the load condition. For example, it is also possible to detect the magnitude of the load condition by using voltage fluctuation in a capacitor 9 of a smoothing circuit 8, or the input current of the dc power-supply unit 119.

In addition, as in the embodiment 1, it is to be understood that the present invention should not be limited to the means on the basis of the zero crossing point of the source voltage as means for obtaining the signal in synchronization with the source voltage of the ac power supply 1.

Besides, as in the embodiment 1, it must be noted that the present invention should not be limited to the arrangement of the reactor 2 and the switch 21 shown in FIG. 49. The reactor 2 may be disposed on the ac side as shown in FIG. 14, and both of the reactor 2 and the switch 21 may be arranged on the ac side as shown in FIG. 15. Alternatively, a voltage doubler rectifier circuit may be formed as shown in FIG. 16. Further, the plurality of reactors 2 may be provided to serve as an inductive element.

Embodiment 20

Figure 52:
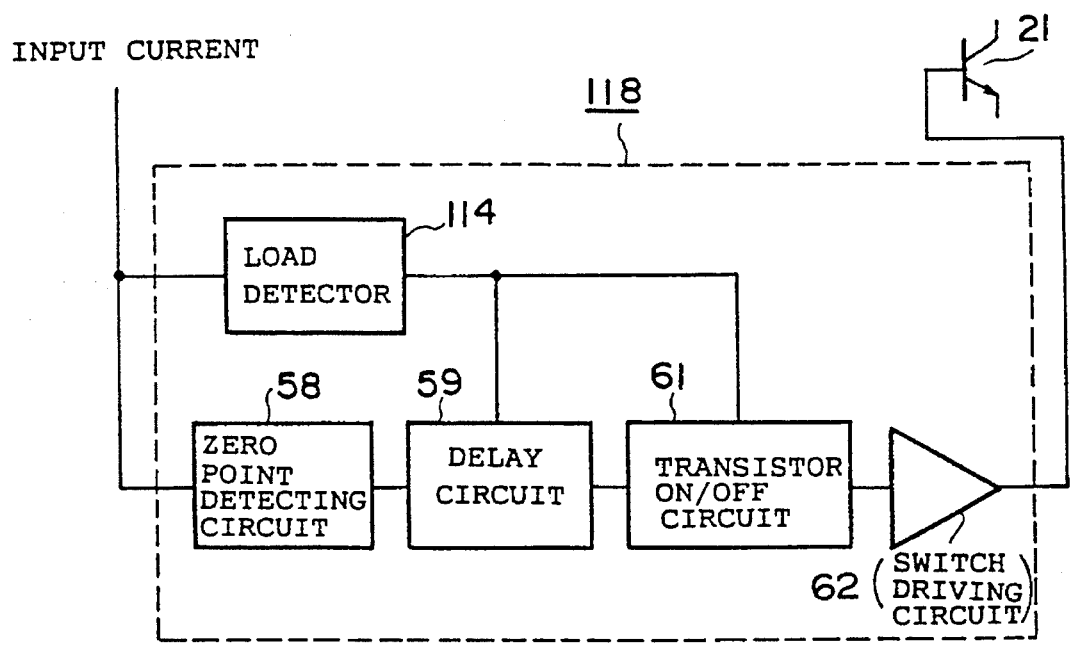
FIG. 52 is a circuit diagram showing another embodiment of the dc power-supply unit according to the eighth aspect of the present invention.

The switch controlling circuit 118 shown in FIG. 49 may be constructed as shown in FIG. 52. A delay circuit 59 to determine $t_1$ and a transistor ON/OFF circuit 61 to determine $t_2$ can linearly vary $t_1$, $t_2$ in response to an analog signal which is externally fed. In the embodiment, $t_1$, $t_2$ are varied by a signal from the load detector 114. The signal P from the load detector 114 increases or decreases according to electric energy consumed in a load 10 so that $t_1$, $t_2$ of a delay circuit 59 and the transistor ON/OFF circuit 61 increase or decrease. That is, when the signal P is varied from P1 to P2 as shown in FIG. 51, $t_1$, $t_2$ are similarly varied from $t_{11}$ to $t_{12}$, and from $t_{21}$ to $t_{22}$. Thereby, there are provided operating waveforms as shown in FIG. 53, and it is possible to provide the optimal power factor, and the optimal higher harmonic according to the electric energy consumed in the load 10.

Figure 53:
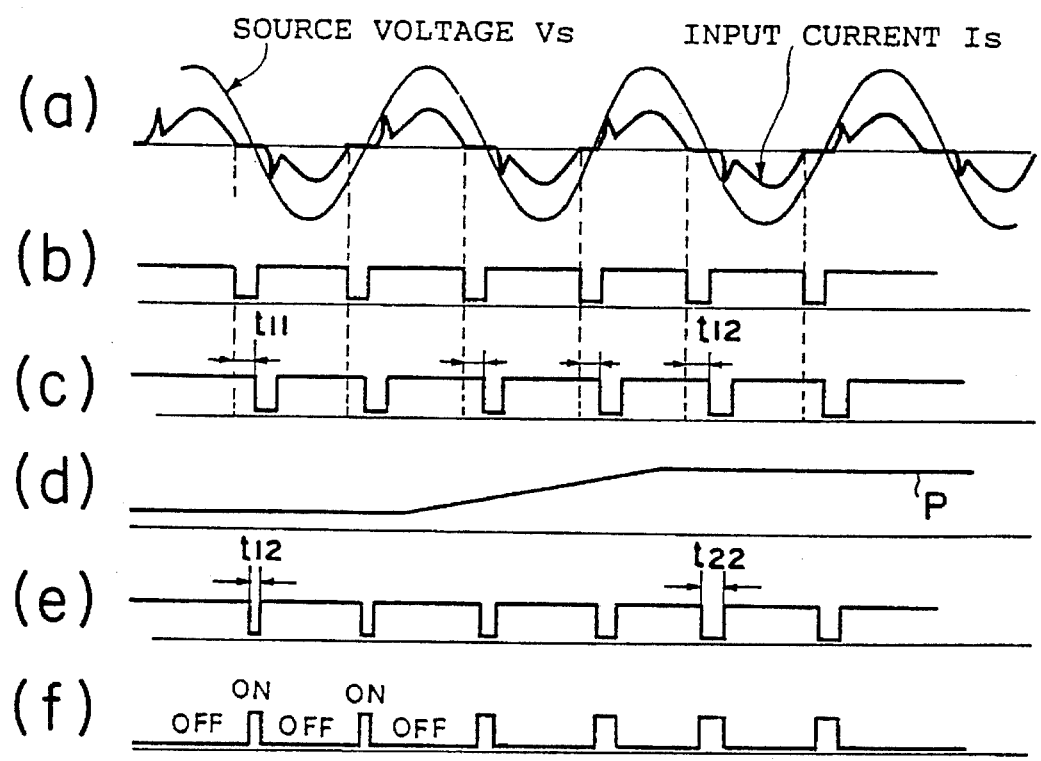
FIG. 53 is an operating waveform diagram showing the operating waveform in each part.

FIG. 53(*a*) shows the source voltage and input current, FIG. 53(*b*) shows the signal A output from the zero point detecting circuit 58 and FIG. 53(*c*) shows the signal B output from the delay circuit 59. FIG. 53(*d*) shows the input signal from the load detector, FIG. 53(*e*) shows the signal C from the transistor on/off circuit 61 and FIG. 53(*f*) shows the transistor on/off signal.

Embodiment 21

Figure 54:
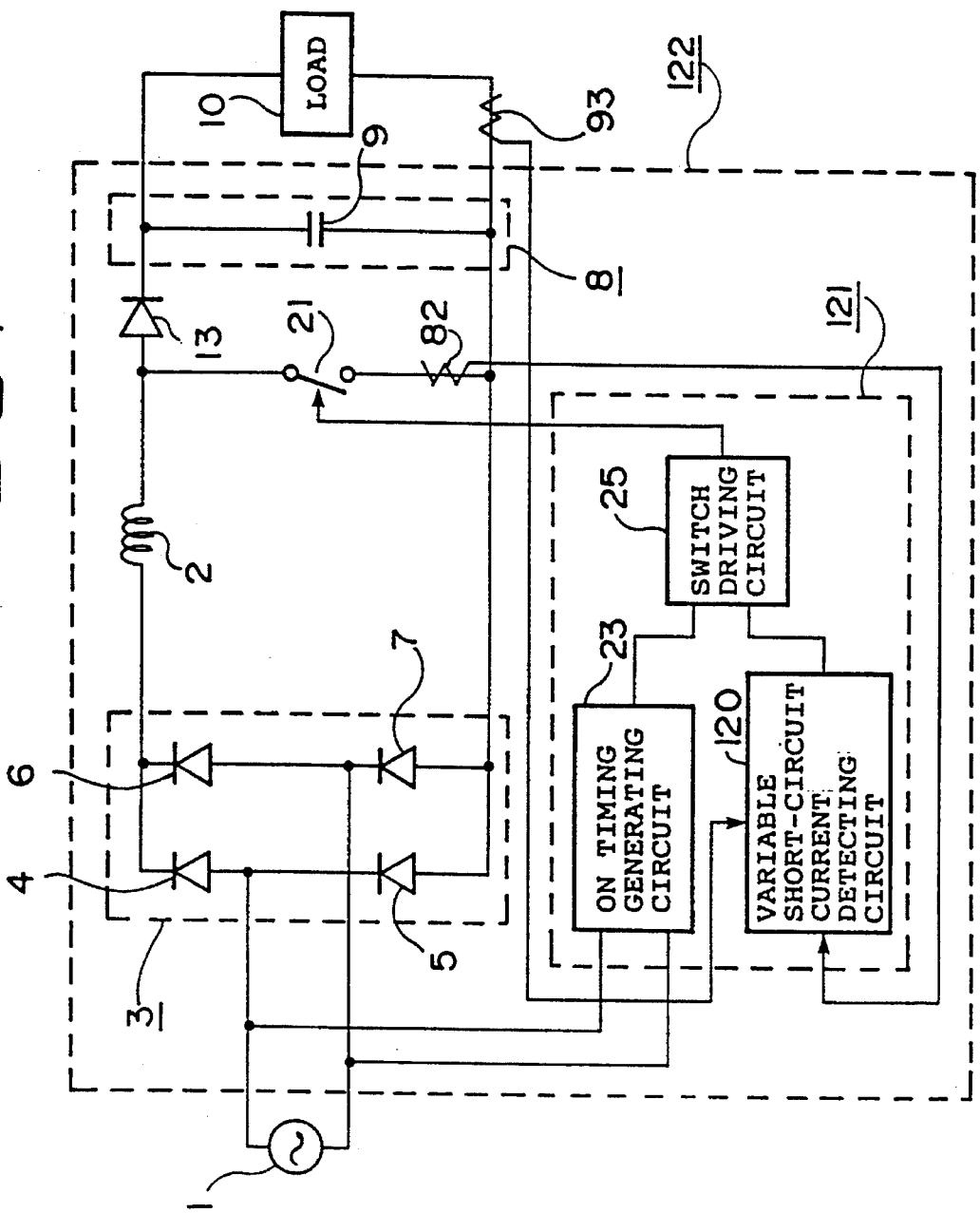
FIG. 54 is a circuit diagram showing one embodiment of the dc power-supply unit according to the ninth aspect of the present invention.

FIG. 54 is a circuit diagram showing one embodiment according to the ninth aspect of the present invention. In FIG. 54, reference numeral 120 is a variable short-circuit current detecting circuit which outputs an OFF signal for the switch 21 when an output from a current sensor 82 reaches a value which is set according to a load condition detected by a current sensor 93, 121 is a switch controlling circuit (switch controlling means) including a ON timing generating circuit 23, the variable short-circuit current detecting circuit 120, and a switch driving circuit 25, and 122 is a dc power-supply unit.

A description will now be given of the operation. The ON timing generating circuit 23 outputs an ON timing signal through the switch driving circuit 25 in synchronization with the source voltage of an ac power supply 1. Consequently, the switch 21 is closed so that the ac power supply 1 is short-circuited through a reactor 2 and diode bridges 4 and 7 (or diode bridges 5, 6) to conduct current, and the current gradually increases. When the short-circuit current increases and reaches the value which is set according to the load condition detected by the current sensor 93, the variable short-circuit current detecting circuit 120 outputs the OFF signal for the switch 21 through the switch driving circuit 25 to open the switch 21. Accordingly, the short-circuit current which has been flowing in the reactor 2 passes through a diode 13 to become the charging current in a capacitor 9 of a smoothing circuit 8, and starts to decrease. Thereafter, when the source voltage of the ac power supply 1 is in the vicinity of peak voltage, the diode bridges 4, 7 (or the diode bridges 5, 6) cause the charging current in the capacitor 9 to flow through the reactor 2 and the diode 13.

Figure 55:
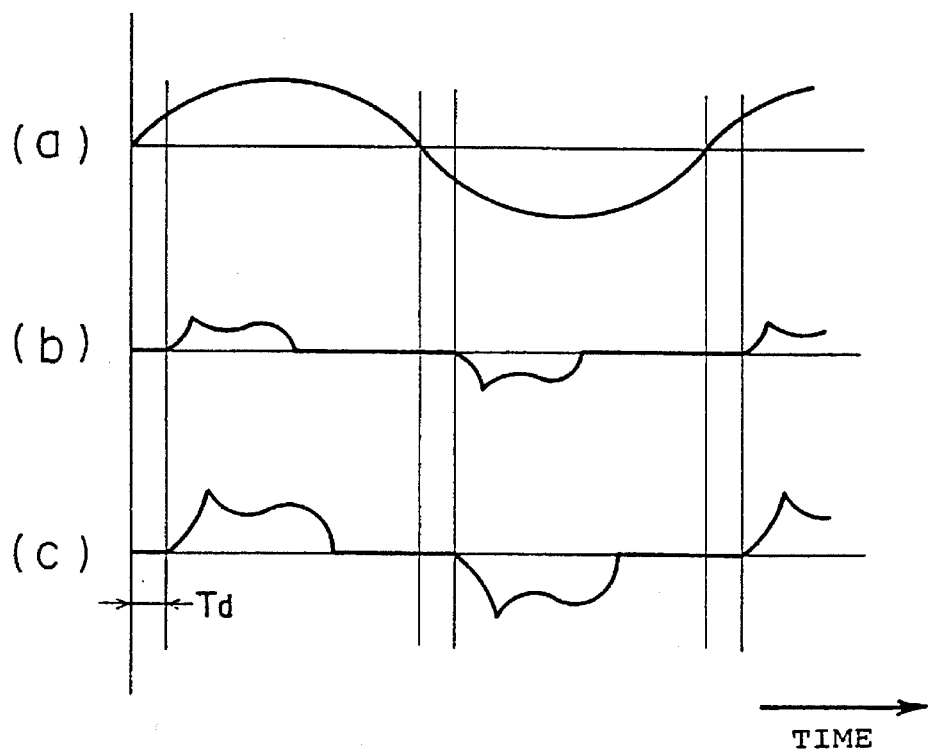
FIG. 55 is an operating waveform diagram showing the operating waveform in each part.

At this time, there are provided a source voltage waveform of the ac power supply 1 as shown in FIG. 55(*a*), and input current waveforms of the dc power-supply unit 122 under a light load and a heavy load as shown in FIGS. 55(*b*) and 55(*c*), respectively. As seen from FIG. 55, the operation is controlled so as to have a lower short-circuit current setting level of the variable short-circuit current detecting circuit 102 under a light load than the short-circuit current setting level under a heavy load.

Figure 56:
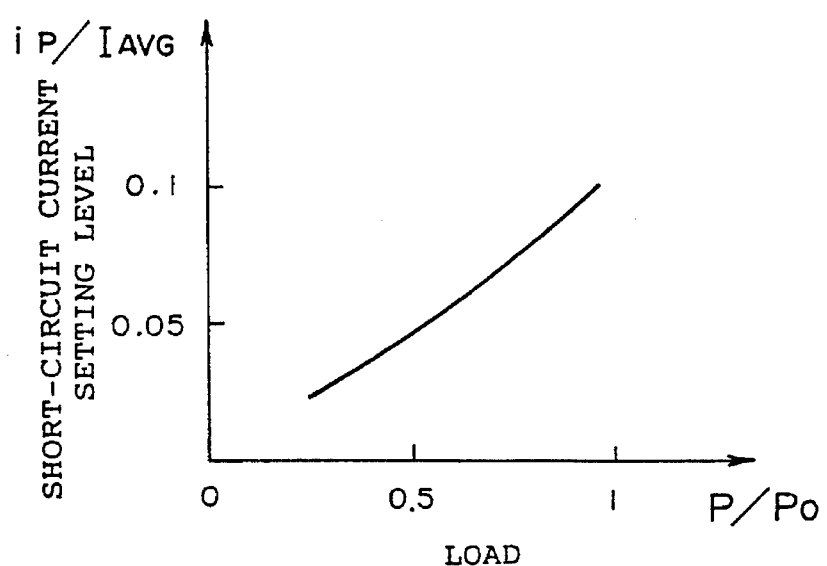
FIG. 56 is a graph diagram showing the relation between the load and the ON timing.

FIG. 56 is a diagram showing a relationship between a load, and a short-circuit current level serving as the overall optimal operating point in view of a power factor and a higher harmonic characteristic in case the ON timing generating circuit 23 generates the ON signal for the switch 21 at a certain time point in synchronization with the source voltage of the ac power supply 1 (for example, a time point which is delayed by one-twentieth of source voltage period from a zero crossing point of the source voltage). In FIG. 56, the transverse axis represents a load normalized by rated load $P_0$, and the ordinate axis represents the short-circuit current setting level normalized by average current $I_{AVG}$ under the maximum load. In the present invention, the short-circuit current setting level of the variable short-circuit current detecting circuit 120 can be controlled according to the load condition based upon the relation shown in FIG. 56. Further, it must be noted that the short-circuit current setting level of the variable short-circuit current detecting circuit 120 may be controlled according to the purpose. That is, while a particular weight is given to the power factor, the short-circuit current setting level may be controlled according to the load condition. Alternatively, while the particular weight is given to the current higher harmonic, the short-circuit current setting level may be controlled according to the load condition.

As in the embodiment 11, it must be noted that the present invention should not be limited to the load current detecting means as means for detecting the magnitude of the load condition. For example, it is also possible to detect the magnitude of the load condition by using voltage fluctuation in a capacitor 9 of a smoothing circuit 8, or the input current of the dc power-supply unit 122.

In addition, as in the embodiment 1, it is to be understood that the present invention should not be limited to the means on the basis of the zero crossing point of the source voltage as means for obtaining the signal in synchronization with the source voltage of the ac power supply 1.

Besides, as in the embodiment 1, it must be noted that the present invention should not be limited to the arrangement of the reactor 2 and the switch 21 shown in FIG. 54. The reactor 2 may be disposed on the ac side as shown in FIG. 14, and both of the reactor 2 and the switch 21 may be arranged on the ac side as shown in FIG. 15. Alternatively, a voltage doubler rectifier circuit may be formed as shown in FIG. 16. Further, the plurality of reactors 2 may be provided to serve as an inductive element.

Embodiment 22

Figure 57:
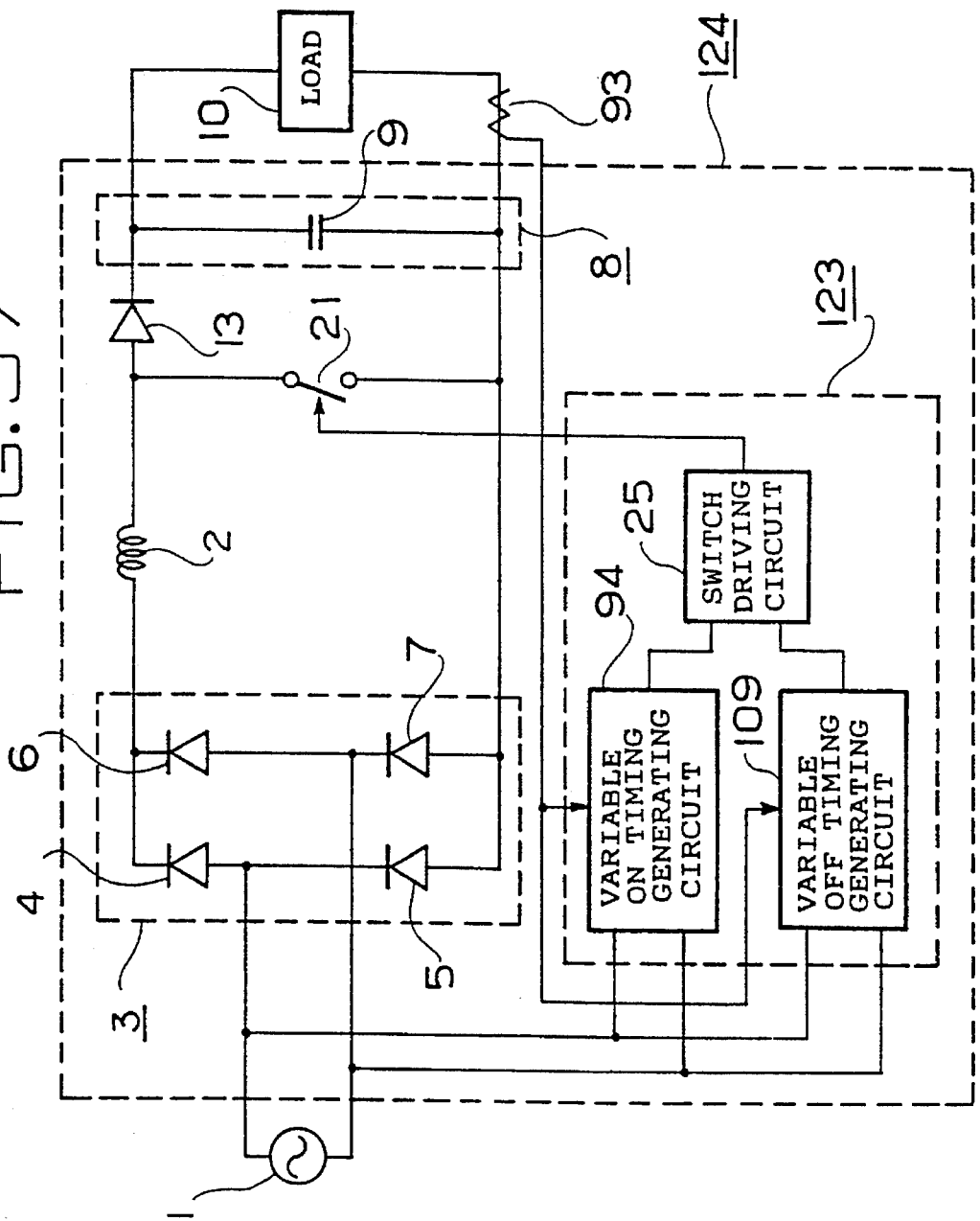
FIG. 57 is a circuit diagram showing one embodiment of the dc power-supply unit according to the tenth aspect of the present invention.

FIG. 57 is a circuit diagram showing one embodiment according to the tenth aspect of the present invention. In FIG. 57, reference numeral 123 is a switch controlling circuit (switch controlling means) including a variable ON timing generating circuit 94, a variable OFF timing generating circuit 109, and a switch driving circuit 25, and 124 means a dc power-supply unit.

A description will now be given of the operation. The variable ON timing generating circuit 94 outputs an ON signal through the switch driving circuit 25 in synchronization with the source voltage of an ac power supply 1, and according to a load condition detected by the current sensor 93. Consequently, the switch 21 is closed so that the ac power supply 1 is short-circuited through a reactor 2 and diode bridges 4 and 7 (or diode bridges 5, 6) to conduct current, and the current gradually increases. Subsequently, the variable OFF timing generating circuit 109 outputs a OFF signal through the switch driving circuit 25 in synchronization with the source voltage and according to the load condition detected by the current sensor 93, resulting in opening the switch 21. The short-circuit current which has been flowing in the reactor 2 passes through a diode 13 to become the charging current in a capacitor 9 of a smoothing circuit 8, and starts to decrease. Thereafter, when the source voltage of the ac power supply 1 is in the vicinity of peak voltage, the diode bridges 4, 7 (or the diode bridges 5, 6)

cause the charging current in the capacitor 9 to flow through the reactor 2 and the diode 13.

At this time, there are provided a source voltage waveform of the ac power supply 1 as shown in FIG. 58(a), and input current waveforms of the dc power-supply unit 124 under a light load and a heavy load as shown in FIGS. 58(b) and 58(c), respectively. In the present invention, each output timing of the variable ON timing generating circuit 94 and the variable OFF timing generating circuit 109 can be controlled according to the load condition so as to provide the overall optimal operating point in view of a power factor and a current higher harmonic characteristic. Further, it must be noted that the output timing of the variable ON timing generating circuit 94 and the variable OFF timing generating circuit 109 may be controlled according to the purpose. That is, while a particular weight is given to the power factor, the output timing may be controlled according to the load condition. Alternatively, while the particular weight is given to the current higher harmonic characteristic, the output timing may be controlled according to the load condition.

As in the embodiment 11, it must be noted that the present invention should not be limited to the load current detecting means as means for detecting the magnitude of the load condition. For example, it is also possible to detect the magnitude of the load condition by using voltage fluctuation in a capacitor 9 of a smoothing circuit 8, or the input current of the dc power-supply unit 124.

In addition, as in the embodiment 1, it is to be understood that the present invention should not be limited to the means on the basis of the zero crossing point of the source voltage as means for obtaining the signal in synchronization with the source voltage of the ac power supply 1.

Besides, as in the embodiment 1, it must be noted that the present invention should not be limited to the arrangement of the reactor 2 and the switch 21 shown in FIG. 57. The reactor 2 may be disposed on the ac side as shown in FIG. 14, and both of the reactor 2 and the switch 21 may be arranged on the ac side as shown in FIG. 15. Alternatively, a voltage doubler rectifier circuit may be formed as shown in FIG. 16. Further, the plurality of reactors 2 may be provided to serve as an inductive element.

Embodiment 23

Figure 59:
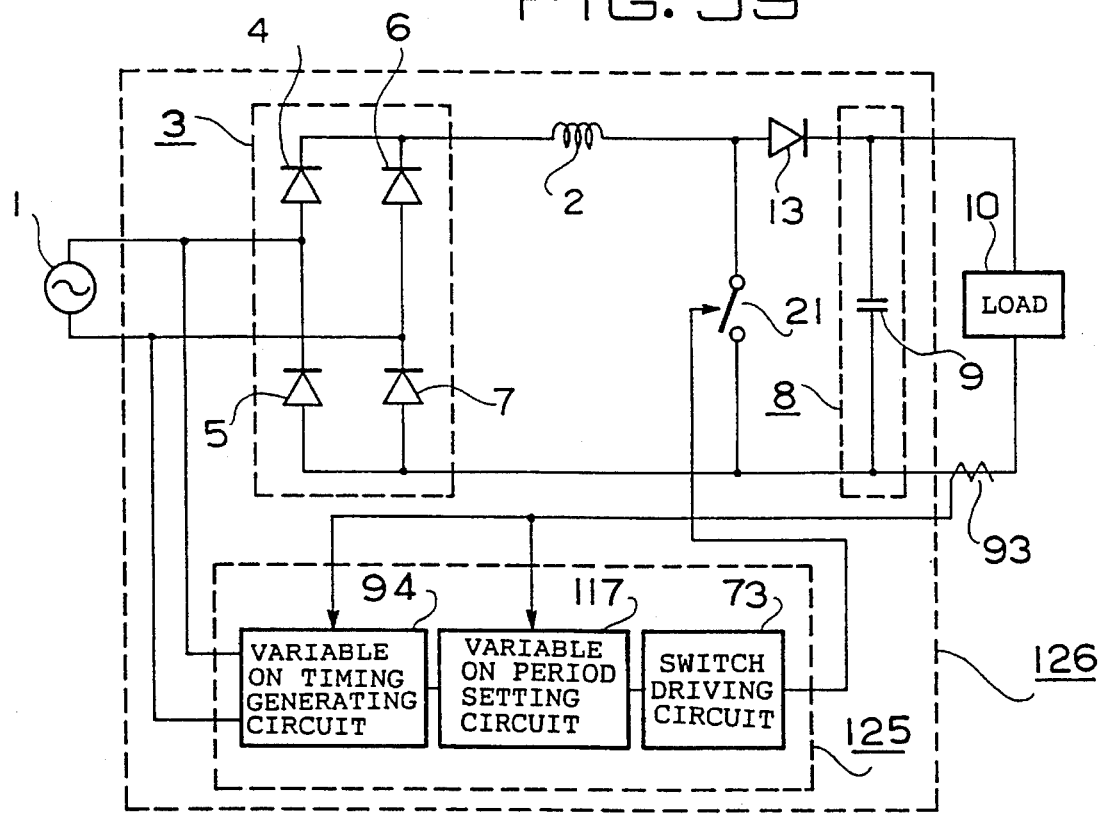
FIG. 59 is a circuit diagram showing one embodiment of the dc power-supply unit according to the eleventh aspect of the present invention.

FIG. 59 is a circuit diagram showing one embodiment according to the eleventh aspect of the present invention. In FIG. 59, reference numeral 125 is a switch controlling circuit (switch controlling means) including a variable ON timing generating circuit 94, a variable ON period setting circuit 117, and a switch driving circuit 73, and 126 means a dc power-supply unit.

A description will now be given of the operation. The variable ON timing generating circuit 94 outputs an ON signal in synchronization with the source voltage of an ac power supply 1, and according to a load condition detected by the current sensor 93. Consequently, the variable ON period setting circuit 117 outputs a signal output to close a switch 21 only for a preset period which is set according to the load condition detected by the current sensor 93 through the switch driving circuit 73 to the switch 21. When the switch 21 is closed, as in the embodiment 1 described before, the ac power supply 1 is short-circuited through a reactor 2 and diode bridges 4 and 7 (or diode bridges 5, 6) to conduct current, and the current gradually increases. Subsequently, when the ON period of the switch 21 is terminated to open the switch 21, the short-circuit current which has been flowing in the reactor 2 passes through the diode 13 to become the charging current in a capacitor 9 of a smoothing circuit 8, and starts to decrease. Thereafter, when the source voltage of the ac power supply 1 is in the vicinity of peak voltage, the diode bridges 4, 7 (or the diode bridges 5, 6) cause the charging current in the capacitor 9 to flow through the reactor 2 and the diode 13.

Figure 58:
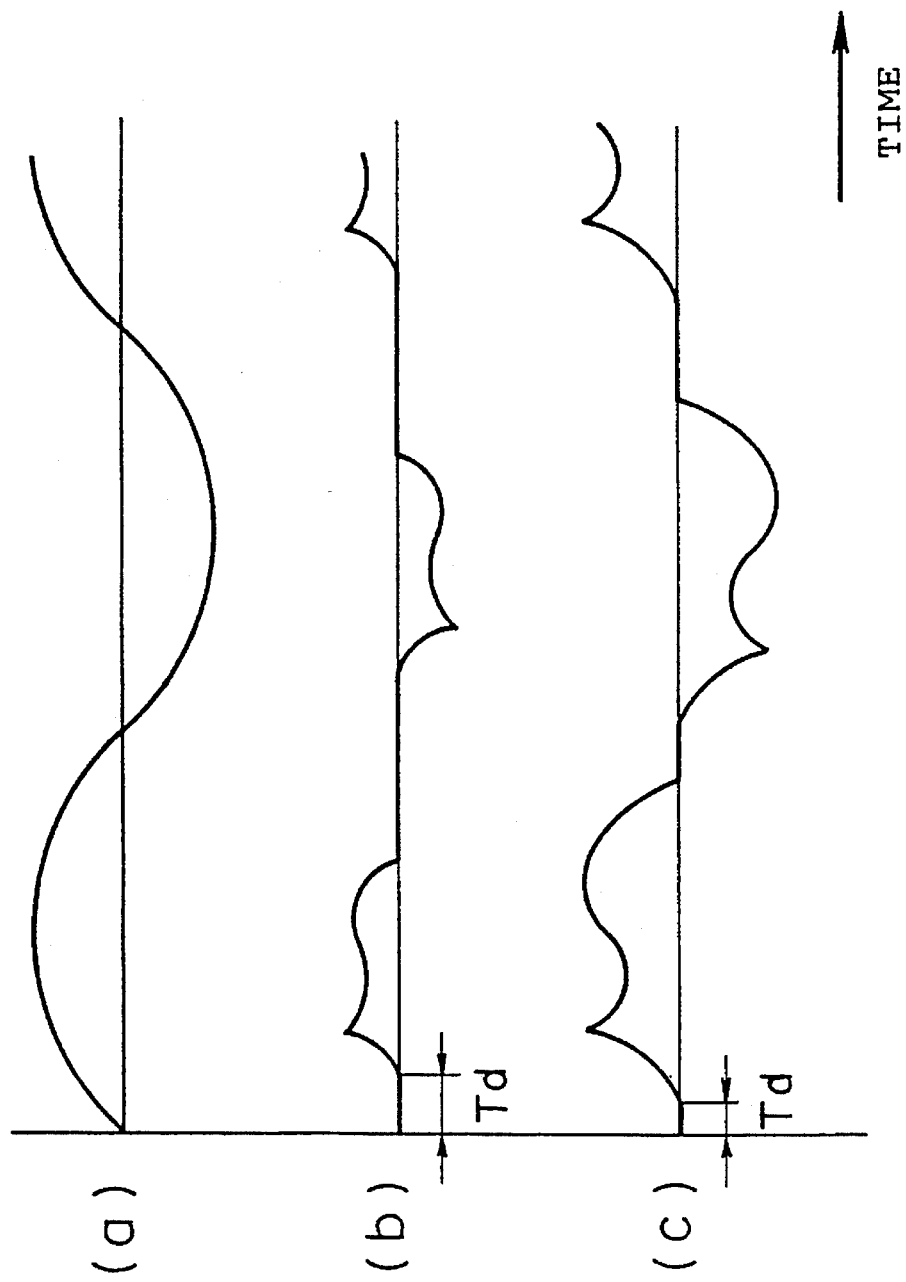
FIG. 58 is an operating waveform diagram showing the operating waveform in each part.

At this time, as in the embodiment 1, there are provided a source voltage waveform of the ac power supply 1, and input current waveforms of the dc power-supply unit 126 under a light load and a heavy load as shown in FIG. 58. In the present invention, each output timing of the variable ON timing generating circuit 94 and the variable ON period setting circuit 117 can be controlled according to the load condition so as to provide the overall optimal operating point in view of a power factor and a current higher harmonic characteristic. Further, it must be noted that the output timing of the variable ON timing generating circuit 94 and the variable ON period setting circuit 117 may be controlled according to the purpose. That is, while a particular weight is given to the power factor, the output timing may be controlled according to the load condition. Alternatively, while the particular weight is given to the current higher harmonic, the output timing may be controlled according to the load condition.

As in the embodiment 11, it must be noted that the present invention should not be limited to the load current detecting means as means for detecting the magnitude of the load condition. For example, it is also possible to detect the magnitude of the load condition by using voltage fluctuation in the capacitor 9 of the smoothing circuit 8, or the input current of the dc power-supply unit 126.

In addition, as in the embodiment 1, it is to be understood that the present invention should not be limited to the means on the basis of the zero crossing point of the source voltage as means for obtaining the signal in synchronization with the source voltage of the ac power supply 1.

Besides, as in the embodiment 1, it must be noted that the present invention should not be limited to the arrangement of the reactor 2 and the switch 21 shown in FIG. 59. The reactor 2 may be disposed on the ac side as shown in FIG. 14, and both of the reactor 2 and the switch 21 may be arranged on the ac side as shown in FIG. 15. Alternatively, a voltage doubler rectifier circuit may be formed as shown in FIG. 16. Further, the plurality of reactors 2 may be provided to serve as an inductive element.

Embodiment 24

Figure 60:
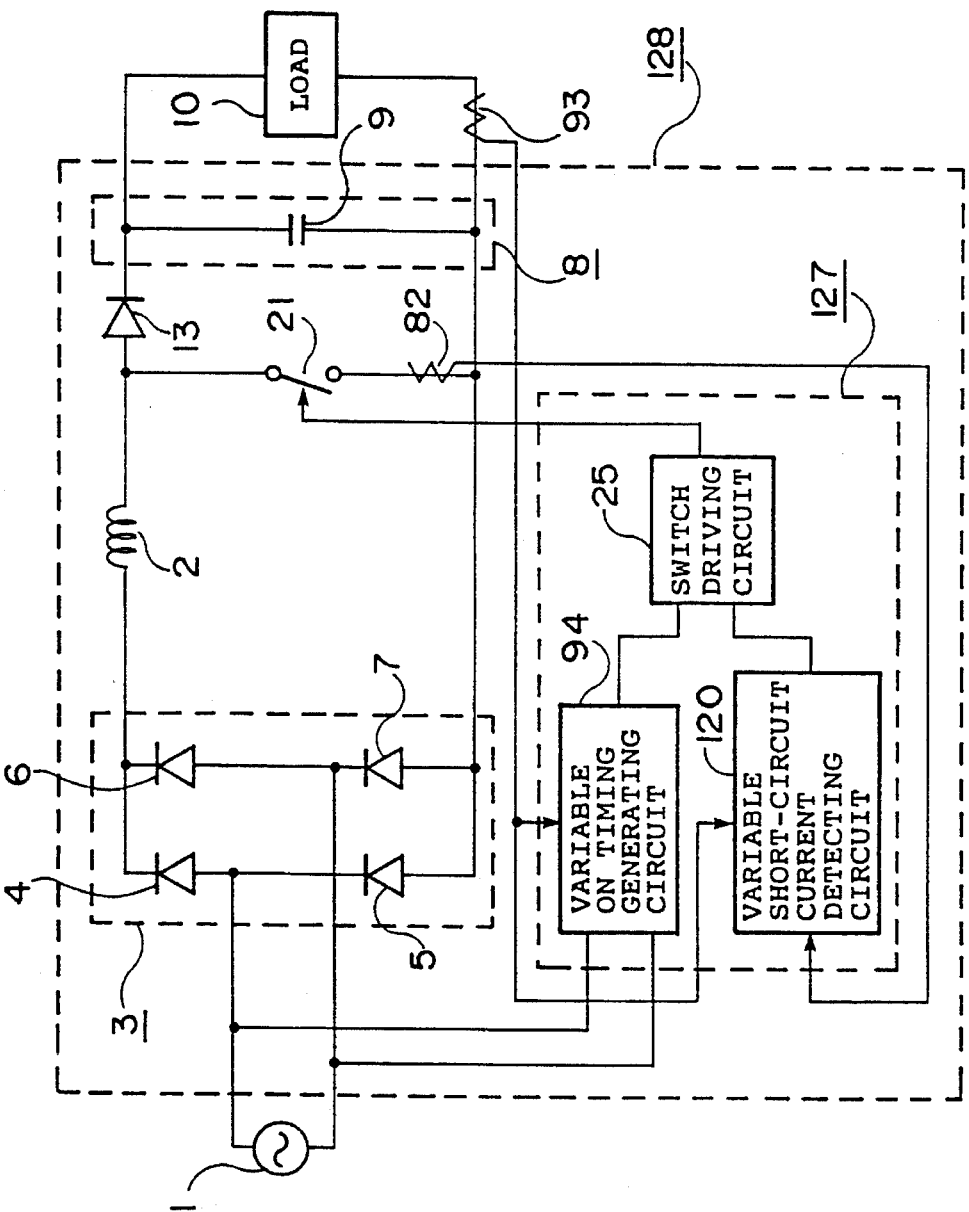
FIG. 60 is a circuit diagram showing one embodiment of the dc power-supply unit according to the twelfth aspect of the present invention.

FIG. 60 is a circuit diagram showing one embodiment according to the twelfth aspect of the present invention. In FIG. 60, reference numeral 127 is a switch controlling circuit (switch controlling means) including a variable ON timing generating circuit 94, a variable short-circuit current detecting circuit 120, and a switch driving circuit 25, and 128 means a dc power-supply unit.

A description will now be given of the operation. The variable ON timing generating circuit 94 outputs a ON signal through the switch driving circuit 25 in synchronization with the source voltage of an ac power supply 1, and according to a load condition detected by a current sensor 93. Consequently, the switch 21 is closed so that the ac power supply 1 is short-circuited through a reactor 2 and the diode bridges 4 and 7 (or the diode bridges 5, 6) to conduct current, and the current gradually increases. When the short-circuit current increases and reaches a value which is set according to the load condition detected by the current sensor 93, the variable short-circuit current detecting circuit 120 outputs a OFF signal for the switch 21 through the switch driving circuit 25 to open the switch 21. Accordingly, the short-circuit current which has been flowing in the reactor 2 passes through a diode 13 to become the charging current in a capacitor 9 of a smoothing circuit 8, and starts to decrease. Thereafter, when the source voltage of the ac power supply 1 is in the vicinity of peak voltage, the diode bridges 4, 7 (or the diode bridges 5, 6) cause the charging current in the capacitor 9 to flow through the reactor 2 and the diode 13.

At this time, as in the embodiment 22, there are provided a source voltage waveform of the ac power supply 1, and input current waveforms of the dc power-supply unit 128 under a light load and a heavy load as shown in FIG. 52. In the present invention, each output timing of the variable ON timing generating circuit 94 and a short-circuit current setting level of the variable short-circuit current detecting circuit 120 can be controlled according to the load condition so as to provide the overall optimal operating point in view of a power factor and a current higher harmonic characteristic. Further, it must be noted that the output timing of the variable ON timing generating circuit 94 and the short-circuit current setting level of the variable short-circuit current detecting circuit 120 may be controlled according to the purpose. That is, while a particular weight is given to the power factor, the output timing and the short-circuit current setting level may be controlled according to the load condition. Alternatively, while the particular weight is given to the current higher harmonic, the output timing and the short-circuit current setting level may be controlled according to the load condition.

As in the embodiment 11, it must be noted that the present invention should not be limited to the load current detecting means as means for detecting the magnitude of the load condition. For example, it is also possible to detect the magnitude of the load condition by using voltage fluctuation in the capacitor 9 of the smoothing circuit 8, or the input current of the dc power-supply unit 128.

In addition, as in the embodiment 1, it is to be understood that the present invention should not be limited to the means on the basis of the zero crossing point of the source voltage as means for obtaining the signal in synchronization with the source voltage of the ac power supply 1.

Besides, as in the embodiment 1, it must be noted that the present invention should not be limited to the arrangement of the reactor 2 and the switch 21 shown in FIG. 60. The reactor 2 may be disposed on the ac side as shown in FIG. 14, and both of the reactor 2 and the switch 21 may be arranged on the ac side as shown in FIG. 15. Alternatively, a voltage doubler rectifier circuit may be formed as shown in FIG. 16. Further, the plurality of reactors 2 may be provided to serve as an inductive element.

Embodiment 25

The above embodiments 1 to 23 have been described with reference to the reactor 2 serving as the inductive element with a given inductance. However, the reactor 2 may be provided so as to have variable inductance.

Figure 61:
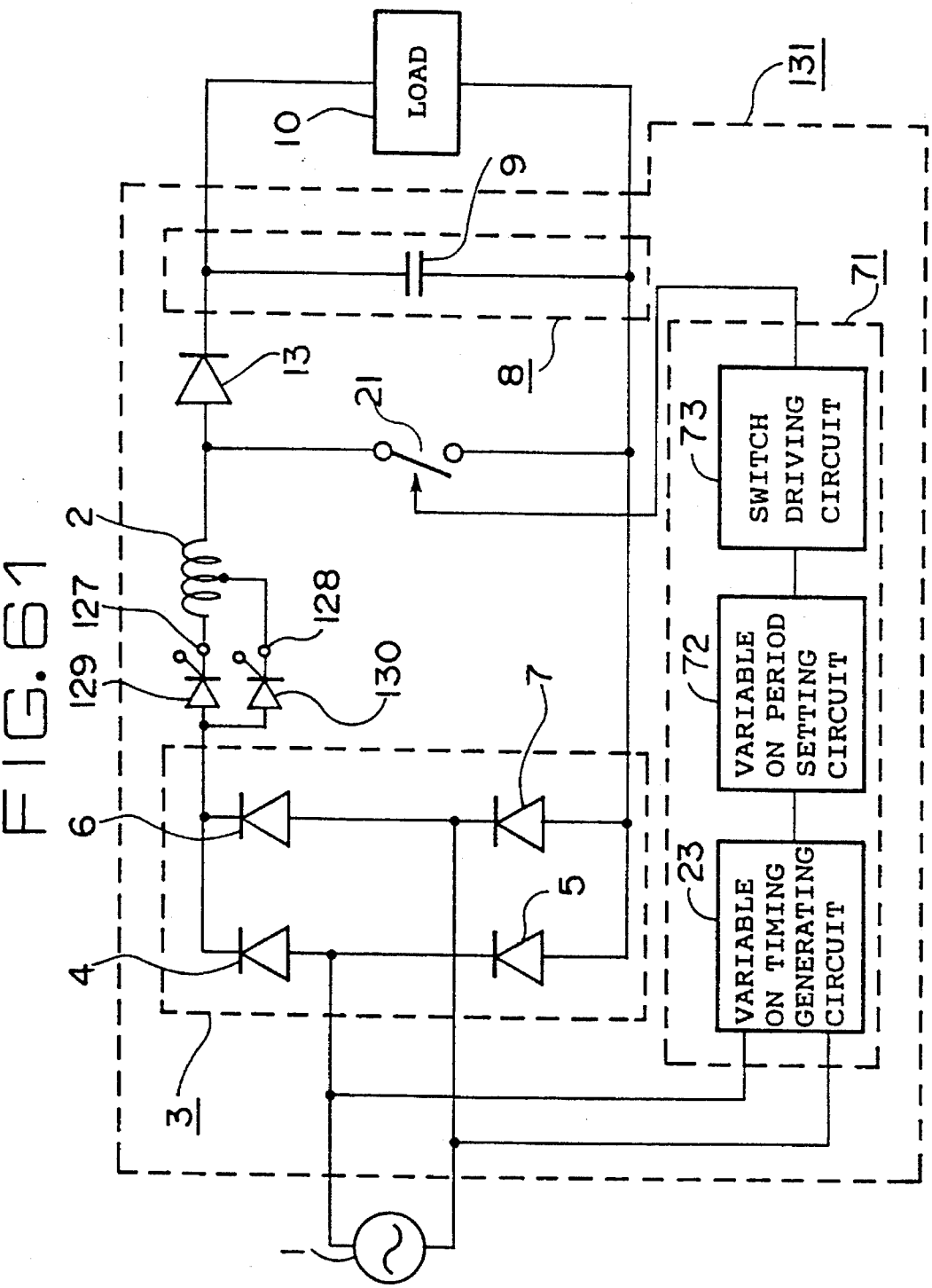
FIG. 61 is a circuit diagram showing another embodiment of the dc power-supply unit according to the twelfth aspect of the present invention.

For example, as shown in FIG. 61, the reactor 2 may be provided with tap terminals 127 and 128 so as to trigger a thyristor 129 such that the reactor 2 can have a greater inductance under a light load, and trigger a thyristor 130 such that the reactor 2 can have a lesser inductance under a heavy load, resulting in the variable inductance.

Figure 62:
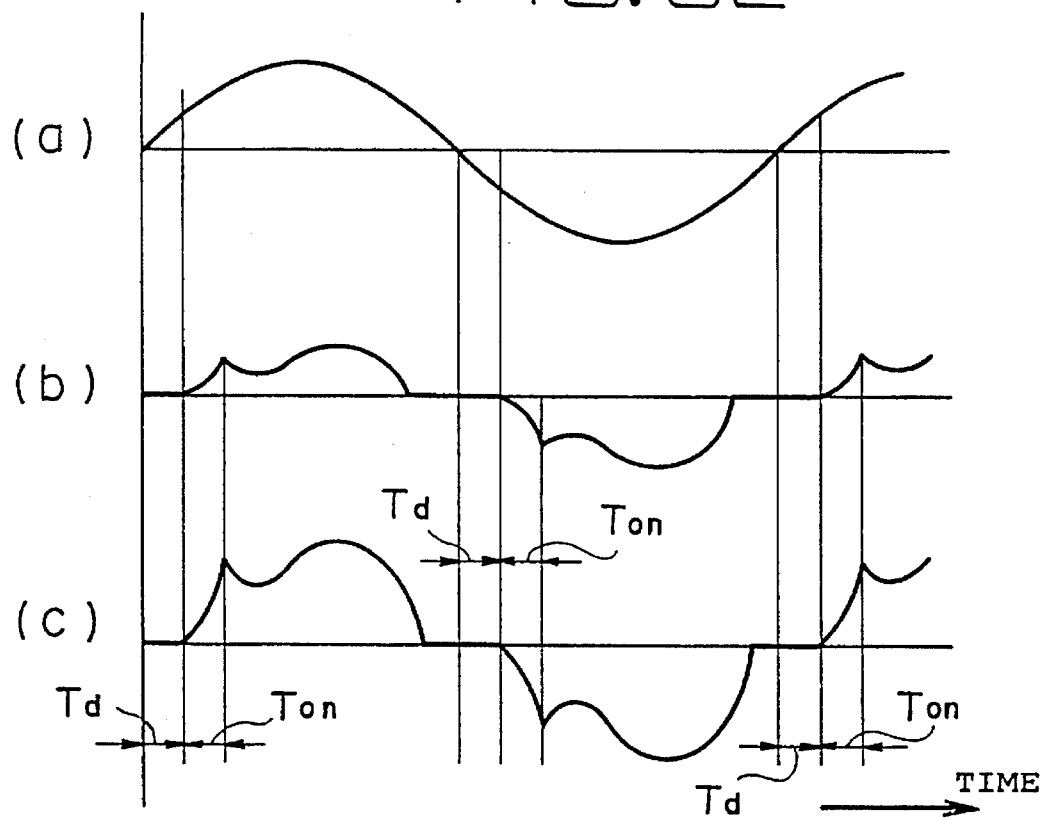
FIG. 62 is an operating waveform diagram showing the operating waveform in each part.

At this time, there are provided a source voltage waveform of the ac power supply 1 as shown in FIG. 62(*a*), and input current waveforms of the dc power-supply unit 131 under the light load and the heavy load as shown in, for example, FIG. 62(*b*) and 62(*c*), respectively. Hence, it is possible to reduce a delay time $T_d$ from a zero crossing point of the source voltage and a conducting time $T_{on}$ of the switch 21, or variation of an OFF timing $t_{off}$ even if the load fluctuates.

Embodiment 26

Figure 63:
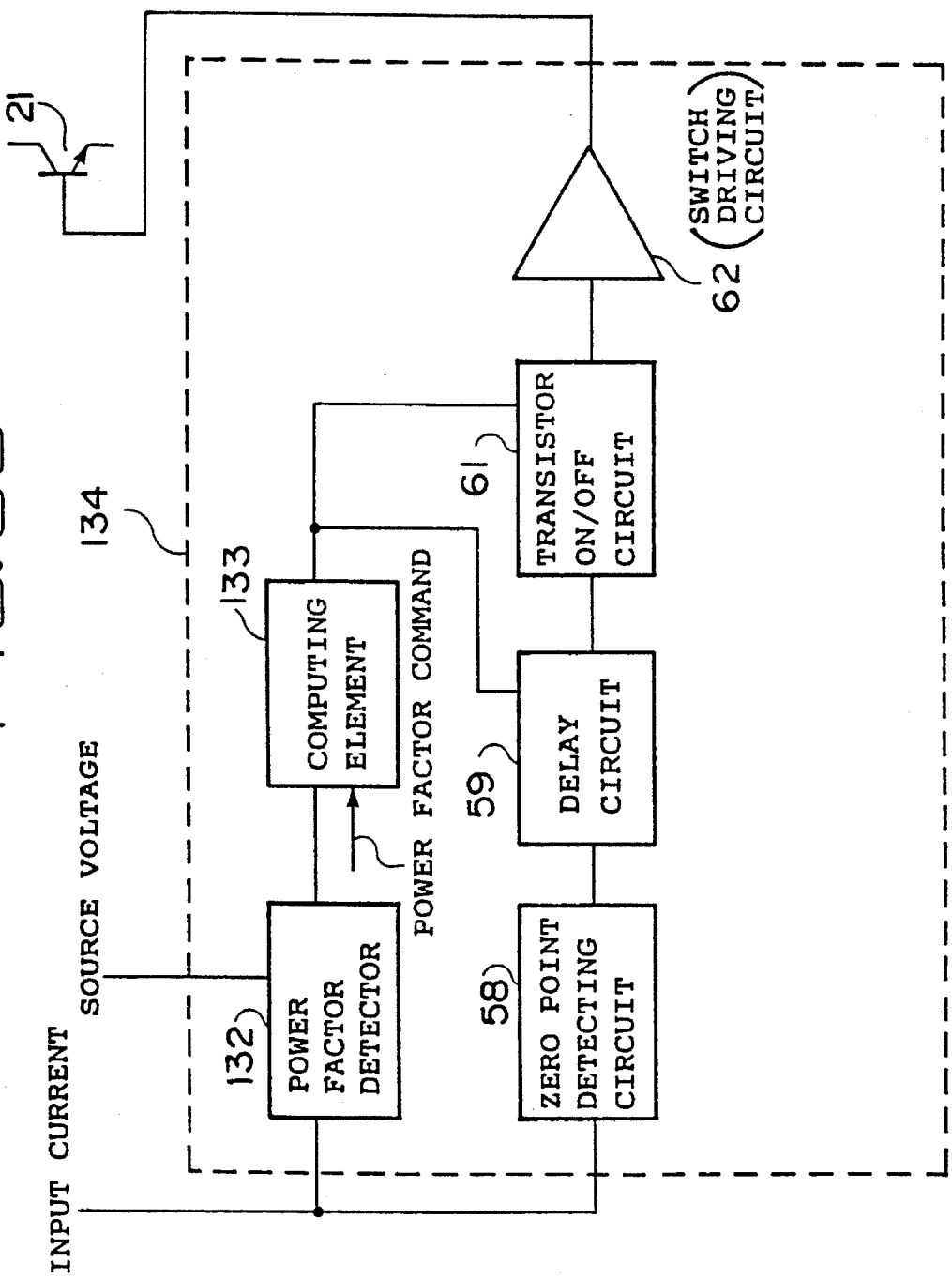
FIG. 63 is a circuit diagram showing one embodiment of the dc power-supply unit according to the thirteenth and the fourteenth aspects of the present invention.

FIG. 63 is a circuit diagram showing one embodiment according to the thirteenth and fourteenth aspects of the present invention. In FIG. 63, reference numeral 132 is a power factor detector (correcting means) to calculate a power factor depending upon input current and source voltage, and 133 means a computing element (correcting means) to correct a delay time set in a delay circuit 59 and an ON signal output time in a transistor ON/OFF circuit 61 by comparing the calculated power factor with a power factor command value which is externally fed.

Figure 64:
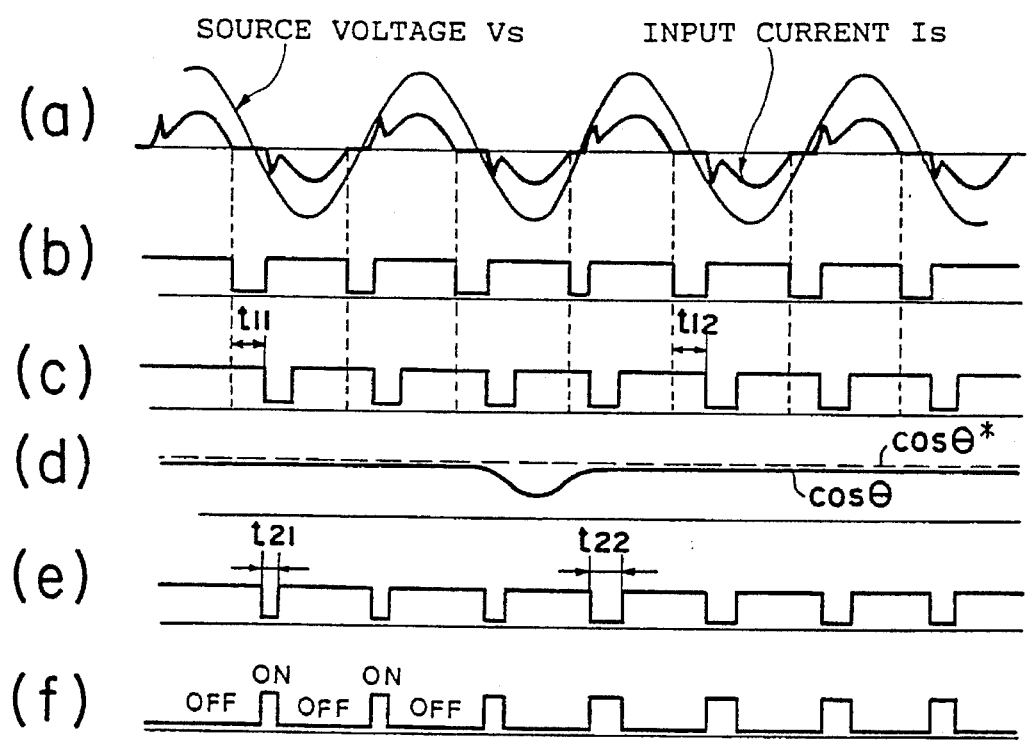
FIG. 64 is an operating waveform diagram showing the operating waveform in each part.

FIG. 64(*a*) shows the source voltage and input current, FIG. 64(*b*) shows the signal output from the zero point detecting circuit 58, and FIG. 64(*c*) shows the signal output from the delay circuit 59. FIG. 64(*d*) shows the signal output from the power factor detector 132 and the power factor command, FIG. 64(*e*) shows the signal from the transistor on/off circuit 61 and FIG. 64(*f*) shows the transistor on/off signal.

In FIG. 64, in case a signal COSθ from the power factor detector 132 becomes greater or less than the command value COSθ*, an output from the computing element 133 is increased or decreased to vary values of $t_1$ and $t_2$ in order to correct the power factor of the source voltage so as to correspond to the command value. Thereby, it is possible to continuously provide the optimal power factor according to the power factor command value.

Embodiment 27

Figure 65:
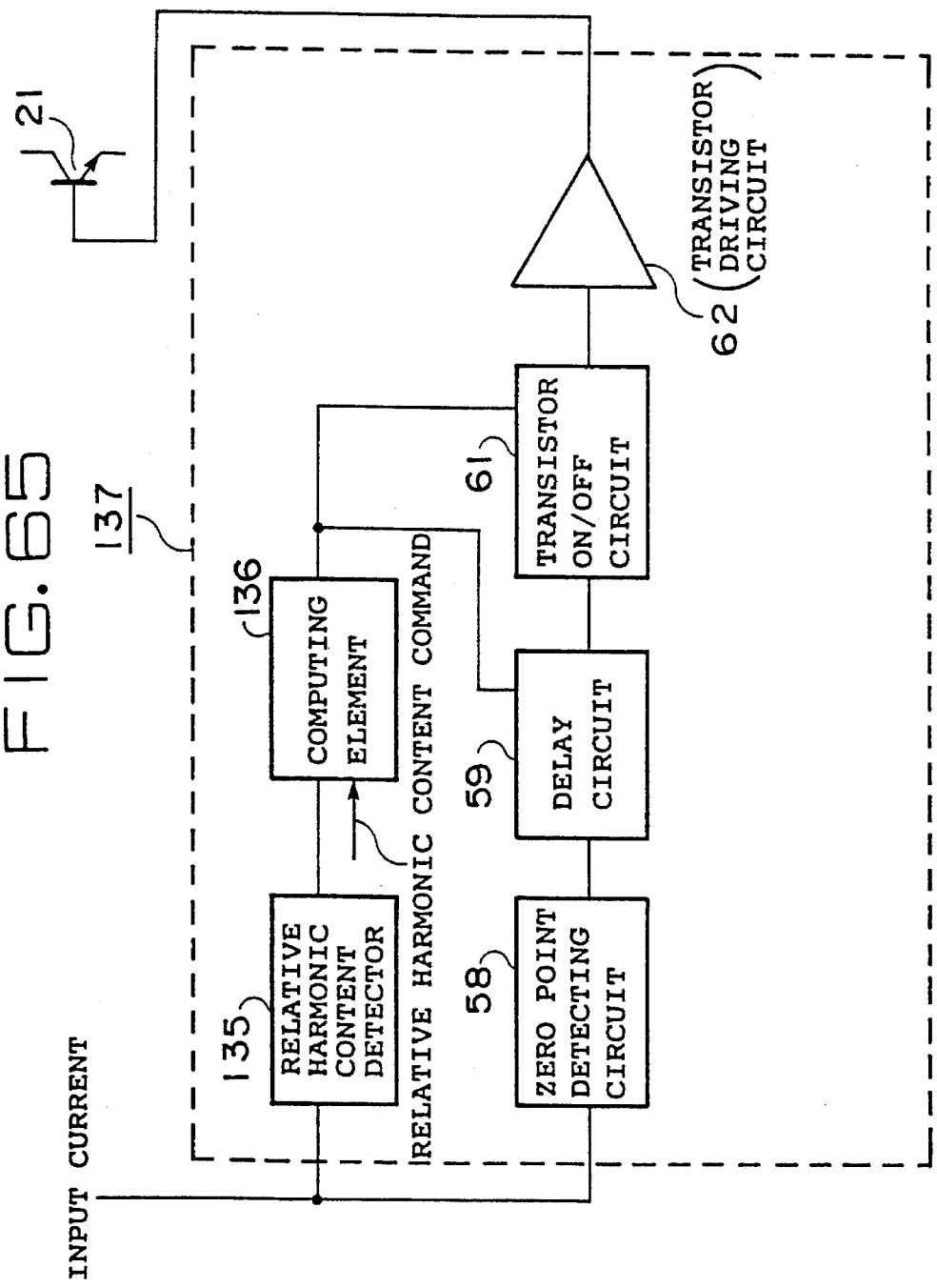
FIG. 65 is a circuit diagram showing one embodiment of the dc power-supply unit according to the fifteenth and the sixteenth aspects of the present invention.

FIG. 65 is a circuit diagram showing one embodiment according to the fifteenth and sixteenth aspects of the present invention. In FIG. 65, reference numeral 135 is a relative harmonic content detector (correcting means) to calculate a relative harmonic content depending upon input current, and 136 means a computing element (correcting means) to correct a delay time set in a delay circuit 59 and an ON signal output time in a transistor ON/OFF circuit 61 by comparing the calculated relative harmonic content with a relative harmonic content command value which is externally fed.

Figure 66:
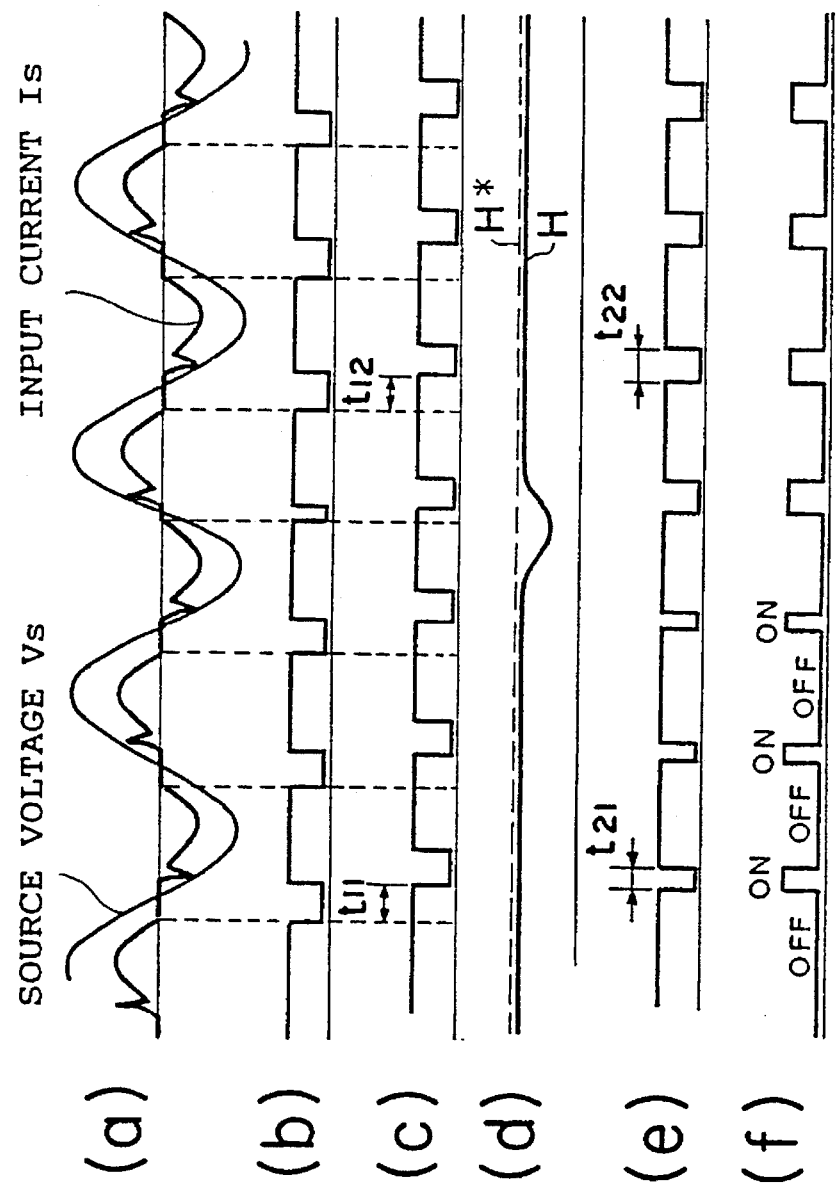
FIG. 66 is an operating waveform diagram showing the operating waveform in each part.

FIG. 66(*a*) shows the source voltage and input circuit, FIG. 66(*b*) shows the signal A from the zero point detecting circuit 58 and FIG. 66(*c*) shows the signal B from the delay circuit 59. FIG. 66(*d*) shows the output from the relative harmonic content detector 135 and the relative harmonic content command, FIG. 66(*e*) shows the signal C from the transistor on/off circuit 61 and FIG. 66(*f*) shows the transistor on/off signal.

In FIG. 66, in case a signal H from the relative harmonic content detector 135 becomes greater or less than the command value H*, an output from the computing element 136 is increased or decreased to vary values of $t_1$ and $t_2$ in order to correct the relative harmonic content of the source voltage so as to correspond to the command value. Thereby, it is possible to continuously provide the optimal relative harmonic content according to the command value of the relative harmonic content.

Embodiment 28

Figure 67:
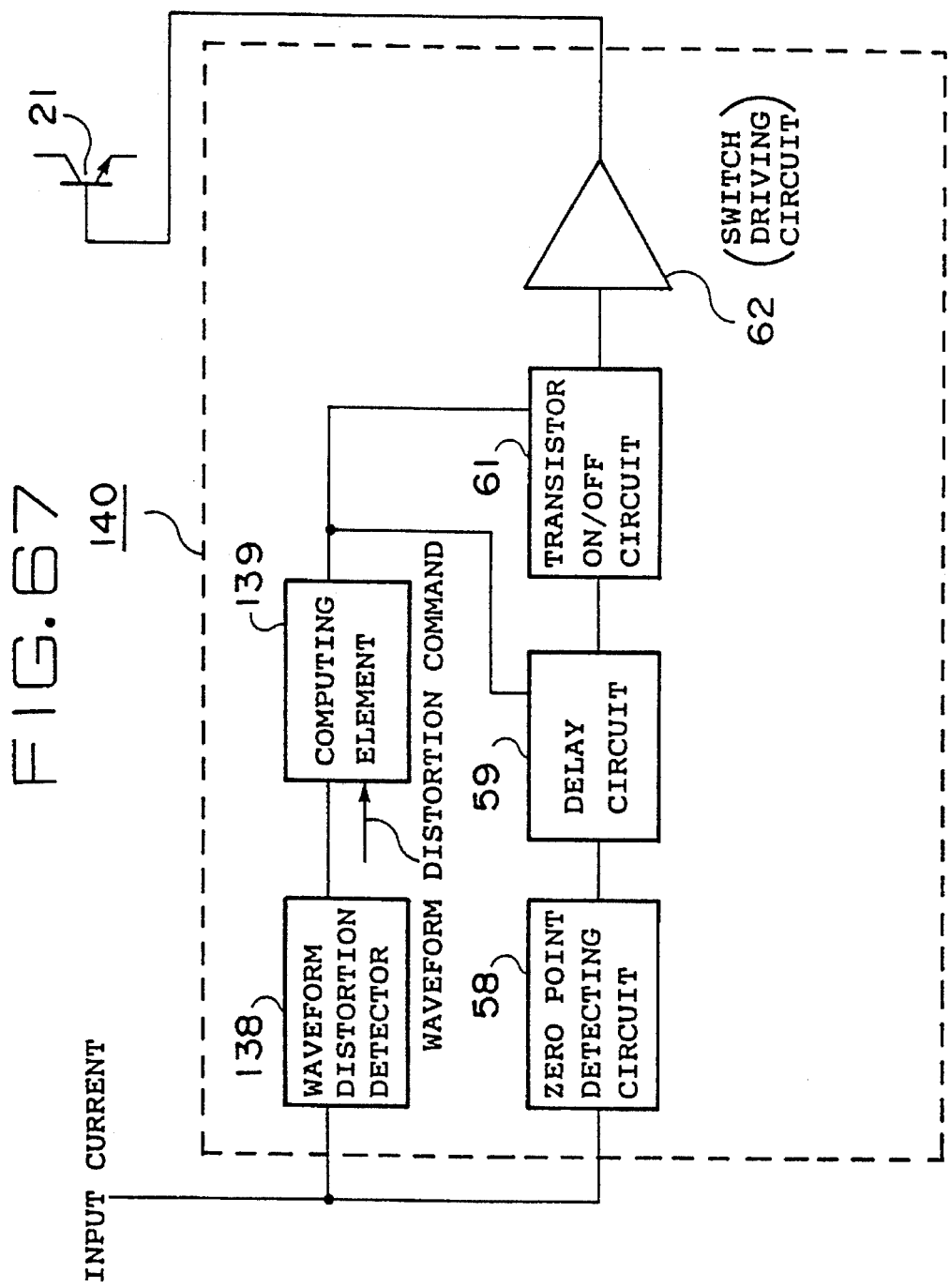
FIG. 67 is a circuit diagram showing one embodiment of the dc power-supply unit according to the seventeenth and the eighteenth aspects of the present invention.

FIG. 67 is a circuit diagram showing one embodiment according to the seventeenth and eighteenth aspects of the present invention. In FIG. 67, reference numeral 138 is a waveform distortion detector (correcting means) to calculate waveform distortion depending upon input current, and 139 is a computing element (correcting means) to correct a delay time set in a delay circuit 59 and an ON signal output time in a transistor ON/OFF circuit 61 by comparing the calculated waveform distortion with a waveform distortion command value which is externally fed.

FIGS. 68(a), 68(b), 68(c), 68(e), and 68(f) represent the source voltage and input current, the signal A from the zero point detecting circuit 58, the signal B from the delay circuit 58, the signal C from the transistor on/off circuit 61, and the transistor on/off signal, respectively. FIG. 68(d) shows the signal from the waveform distortion detector 138 and the waveform distortion command.

Figure 68:
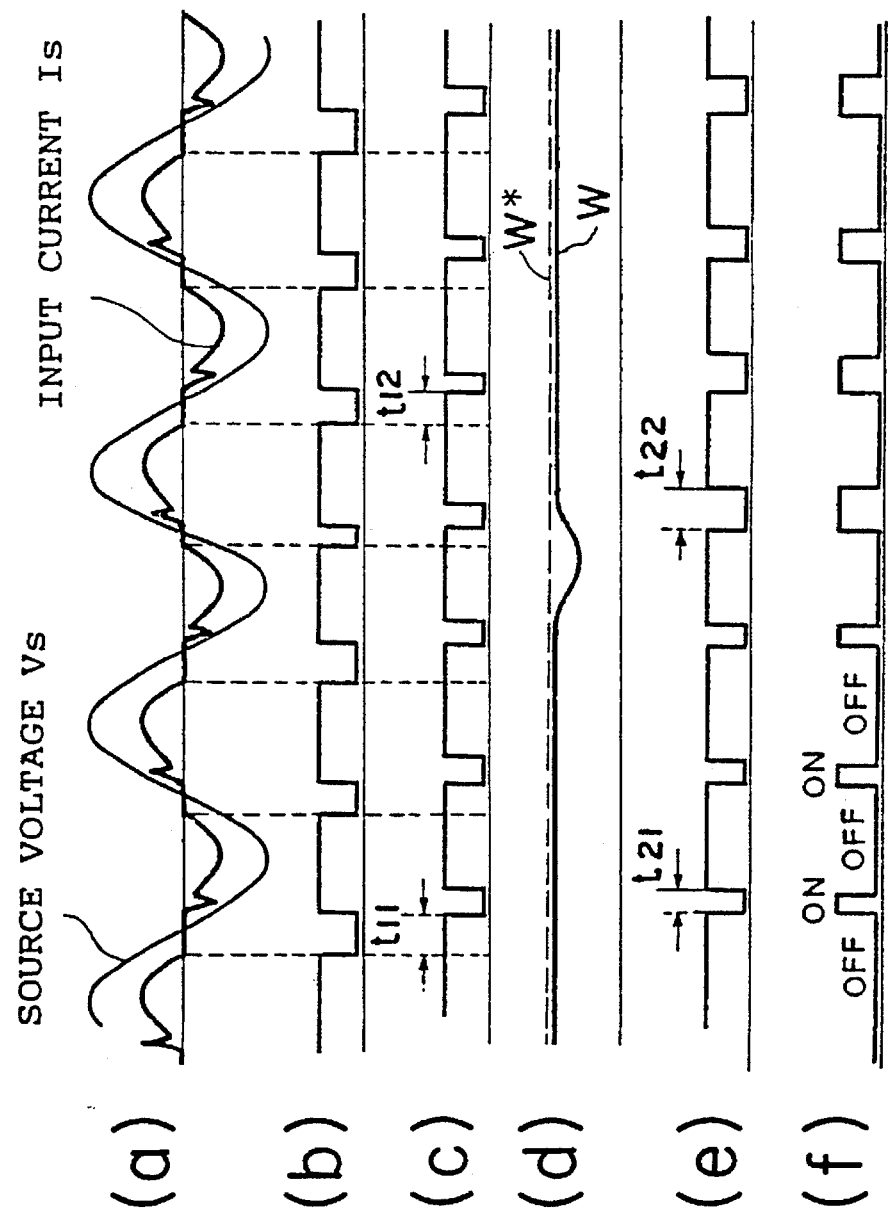
FIG. 68 is an operating waveform diagram showing the operating waveform in each part.

In FIG. 68, in case a signal W from the waveform distortion detector 138 becomes greater or less than the command value W*, an output from the computing element 139 is increased or decreased to vary values of $t_1$ and $t_2$ in order to correct the waveform distortion of the power supply so as to correspond to the command value. Thereby, it is possible to continuously provide the optimal waveform distortion according to the waveform distortion command value.

Embodiment 29

Figure 69:
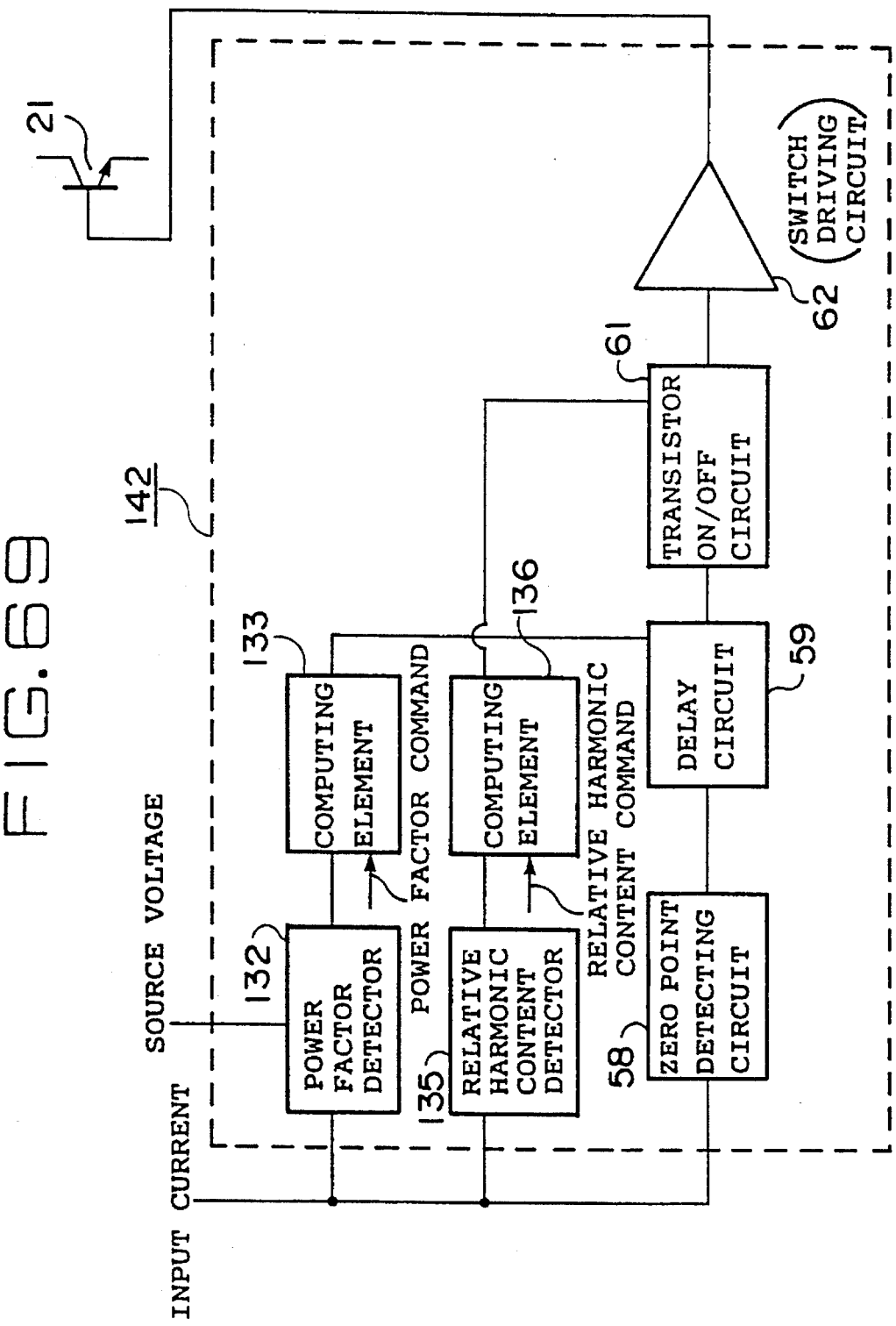
FIG. 69 is a circuit diagram showing one embodiment of the dc power-supply unit according to the nineteenth and the twentieth aspects of the present invention.

FIG. 69 is a circuit diagram showing one embodiment according to the nineteenth and twentieth aspects of the present invention.

Figure 70:
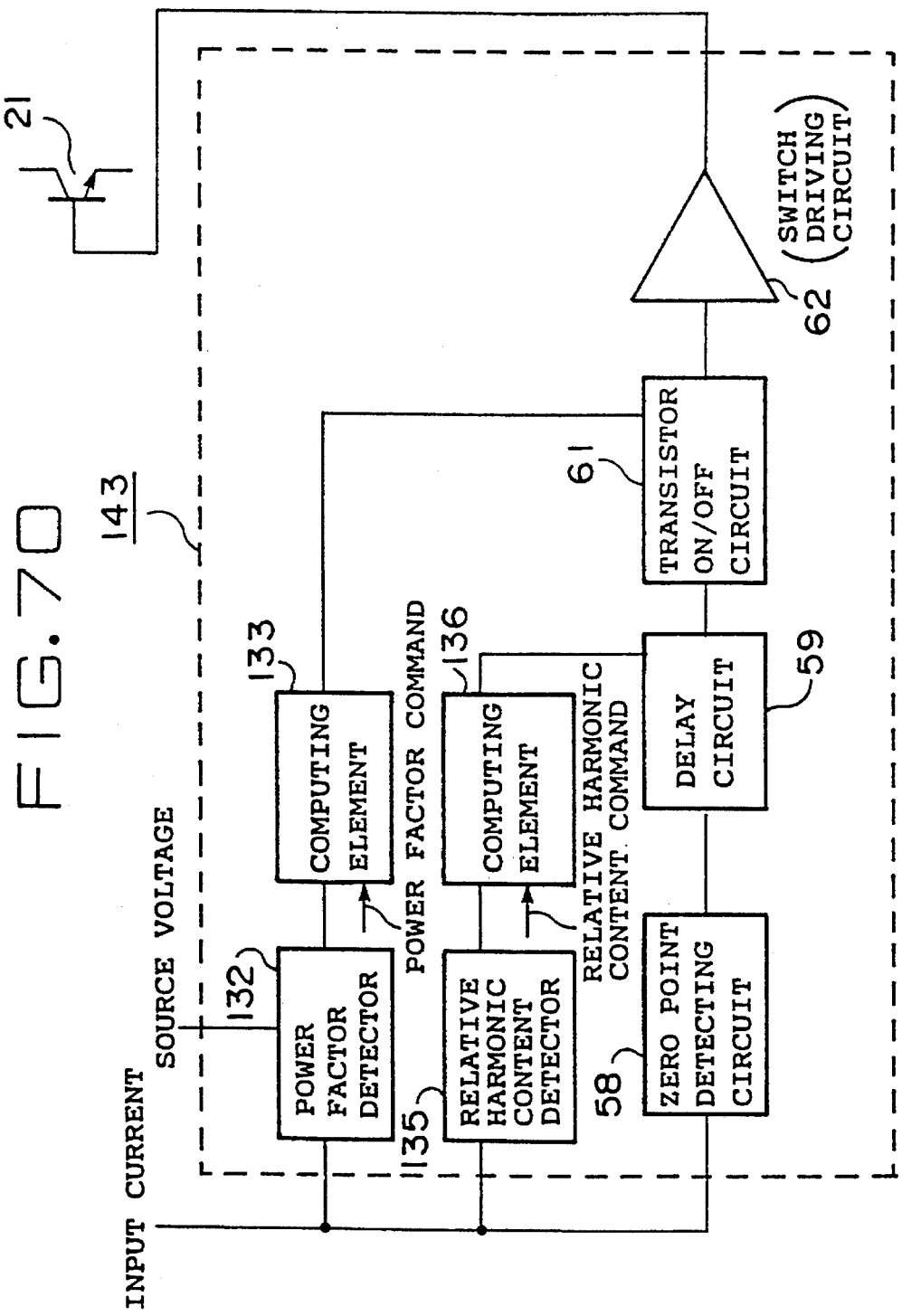
FIG. 70 is a circuit diagram showing another embodiment of the dc power-supply unit according to the nineteenth and the twentieth aspects of the present invention.

As in the embodiment 26, a time $t_1$ is varied to derive the optimal power factor from a power factor detector 132 and a computing element 133. As in the embodiment 27, a time $t_2$ is varied to derive the optimal relative harmonic content from a relative harmonic content detector 135 and a computing element 136. Thereby, it is possible to control so as to provide the optimal power factor and the optimal relative harmonic content. Alternatively, the time $t_2$ may inversely be controlled by the power factor, and the time $t_1$ may be controlled by the relative harmonic content. This alternative embodiment is shown in FIG. 70.

Embodiment 30

Figure 71:
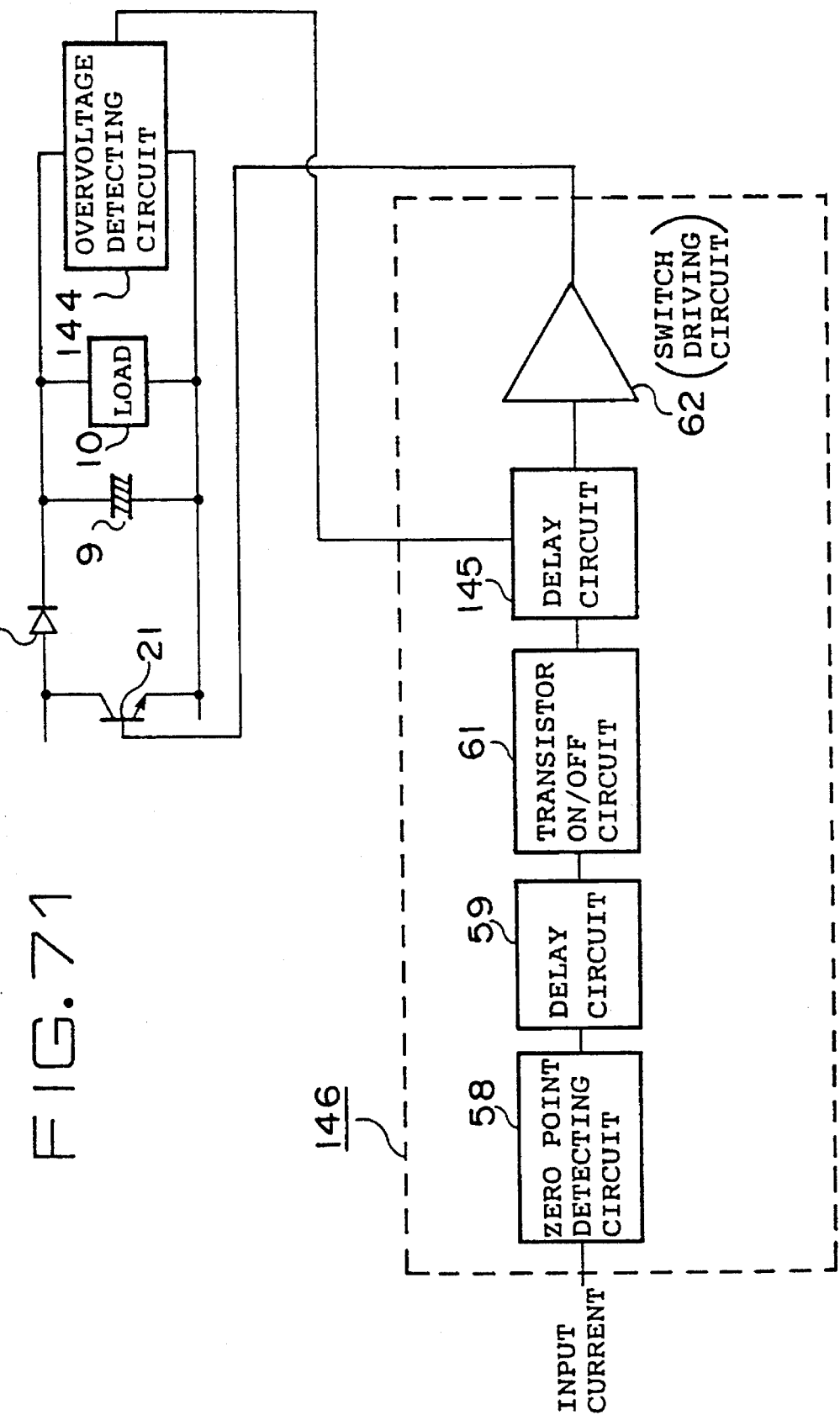
FIG. 71 is a circuit diagram showing one embodiment of the dc power-supply unit according to the twenty-first aspect of the present invention.

FIG. 71 is a circuit diagram showing one embodiment according to the twenty-first aspect of the present invention. In FIG. 71, reference numeral 144 is an overvoltage detector (overvoltage detecting means) to detect overvoltage from dc output voltage, and 145 is a cutoff circuit to cut off a driving signal for a transistor.

Figure 72:
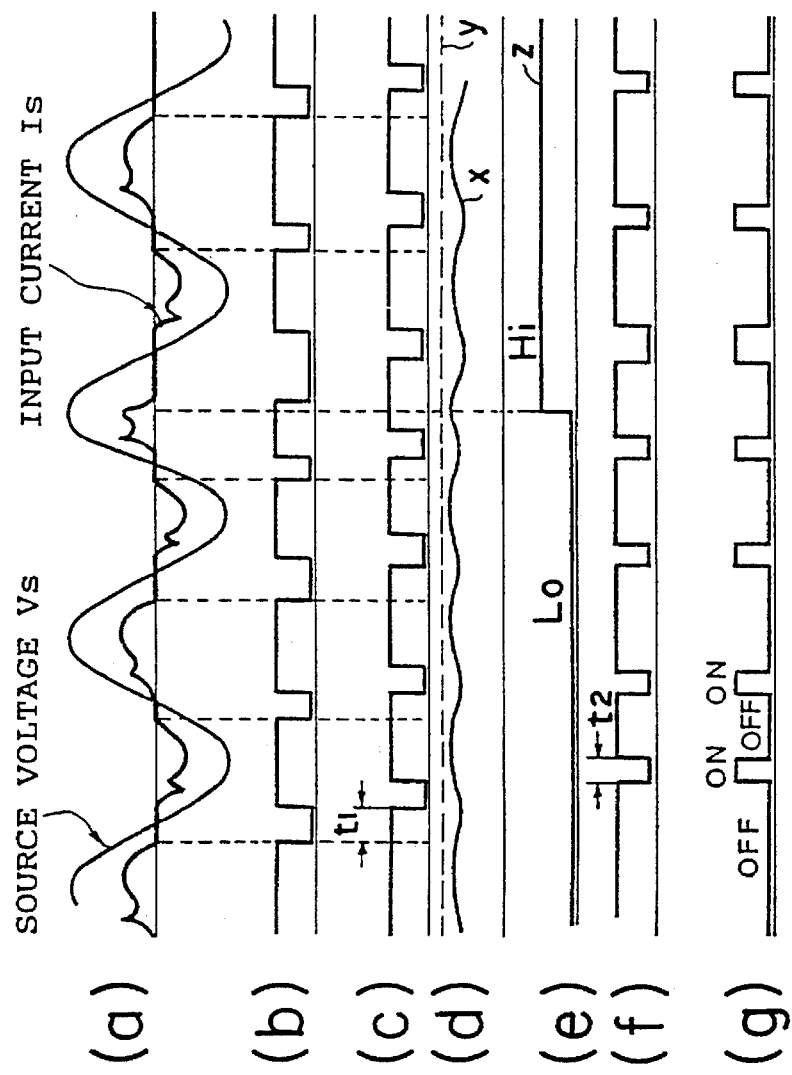
FIG. 72 is an operating waveform diagram showing the operating waveform in each part.

A description will now be given of the operation with reference to FIG. 72. FIG. 72(a) shows the source voltage and input current, FIG. 72(b) shows the signal A from the zero point detecting circuit 58, FIG. 72(c) shows the signal B from the delay circuit 59 and FIG. 72(d) shows the current in the transistor. FIG. 72(e) shows the cutoff signal, FIG. 72(f) shows the signal C from the transistor on/off circuit 61 and FIG. 72(g) shows the transistor on/off signal. As in the above embodiment, a switch 21 is turned ON according to timing delayed by $t_1$ from a time point at which the input current becomes zero. On the other hand, the overvoltage detector 144 detects dc output voltage x. When the dc output voltage x exceeds a threshold y, an output z from the overvoltage detector 144 is switched over from "Lo" to "Hi." The cutoff circuit 145 outputs an output signal C from a transistor ON/OFF circuit 61 when the output z from the overvoltage detector 144 is "Lo." However, when the output z from the overvoltage detector 144 is "Hi," the cutoff circuit 145 outputs a signal to turn OFF a transistor even if the output C from the transistor ON/OFF circuit 61 takes any value. It is thereby possible to avoid destruction of a load 10 due to excessive dc output voltage.

Embodiment 31

Figure 73:
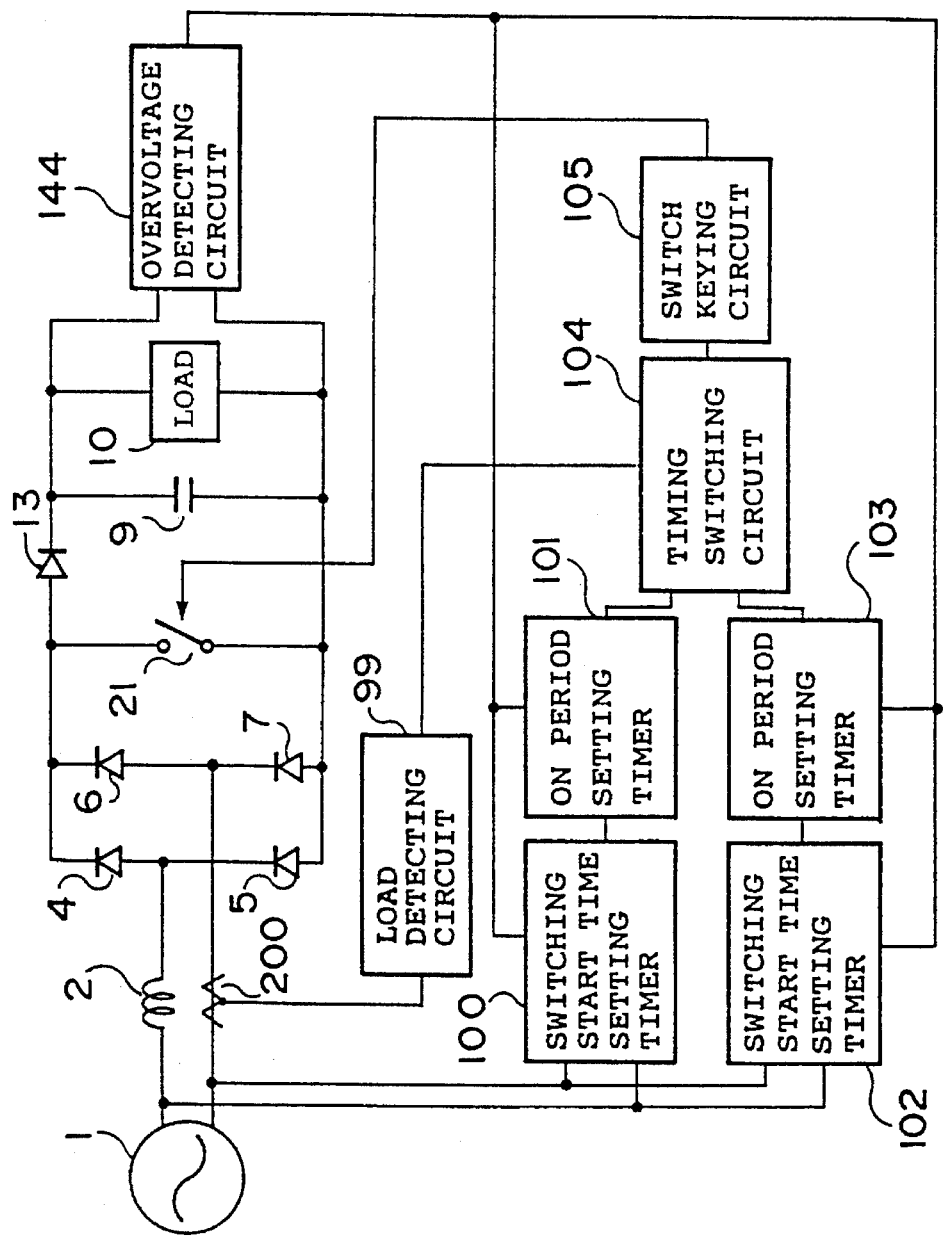
FIG. 73 is a circuit diagram showing another embodiment of the dc power-supply unit according to the twenty-first aspect of the present invention.

FIG. 73 is a circuit diagram showing another embodiment according to the twenty-first aspect of the present invention.

A description will now be given of the operation. Switching start time setting timers 100 and 102 output ON signals in synchronization with source voltage of an ac power supply 1 to actuate ON period setting timers 101 and 103 so as to output the ON signals to a timing switching circuit 104. The magnitude of the load is decided in a load detecting circuit 99 depending upon the signal from a current sensor 200 to output the result to the timing switching circuit 104. The timing switching circuit 104 is switched over so as to output the signal from the ON period setting timer 101 to the switch keying circuit 105 if the signal from the load detecting circuit 99 is a heavy load signal, and output the signal from the ON period setting timer 103 to the switch keying circuit 105 if it is a light load signal. The switch keying circuit 105 receives the ON signal from the timing switching circuit 104 to close the switch 21.

When the switch 21 is closed, the ac power supply 1 is short-circuited through a reactor 2 and diode bridges 4 and 7 (or diode bridges 5, 6) to conduct current, and the current gradually increases. Subsequently, the ON period setting timers 101 and 103 output the OFF signals to the timing switching circuit 104. The magnitude of the load is detected in the load detecting circuit 99 depending upon the signal from the current sensor 200 and the result is output to the timing switching circuit 104. The timing switching circuit 104 is switched over so as to output the signal from the ON period setting timer 101 to the switch keying circuit 105 if the signal from the load detecting circuit 99 is a heavy load signal, and output the signal from the ON period setting timer 103 to the switch keying circuit 105 if it is a light load signal. The switch keying circuit 105 receives the OFF signal from the timing switching circuit 104 to open the switch 21.

When the switch 21 is opened, the short-circuit current which has been flowing in the reactor 2 passes through a diode 13 to become the charging current in a capacitor 9, and starts to decrease. Thereafter, when the source voltage of the ac power supply 1 is in the vicinity of the peak voltage, the diode bridges 4, 7 (or the diode bridges 5, 6) cause the charging current in the capacitor 9 to flow through the reactor 2 and the diode 13. In case the overvoltage detecting circuit 144 detects that the dc voltage across the capacitor 9 is an overvoltage in a condition where the switch 21 is closed, the overvoltage detecting circuit 144 outputs a reset signal to the switching start time setting timers 100 and 102, and to the ON period setting timers 101 and 103. Consequently, the ON period is terminated so that the ON period setting timers 101 and 103 output the OFF signals through the timing switching circuit 104 to the switch keying circuit 105, resulting in opening the switch 21.

Figure 74:
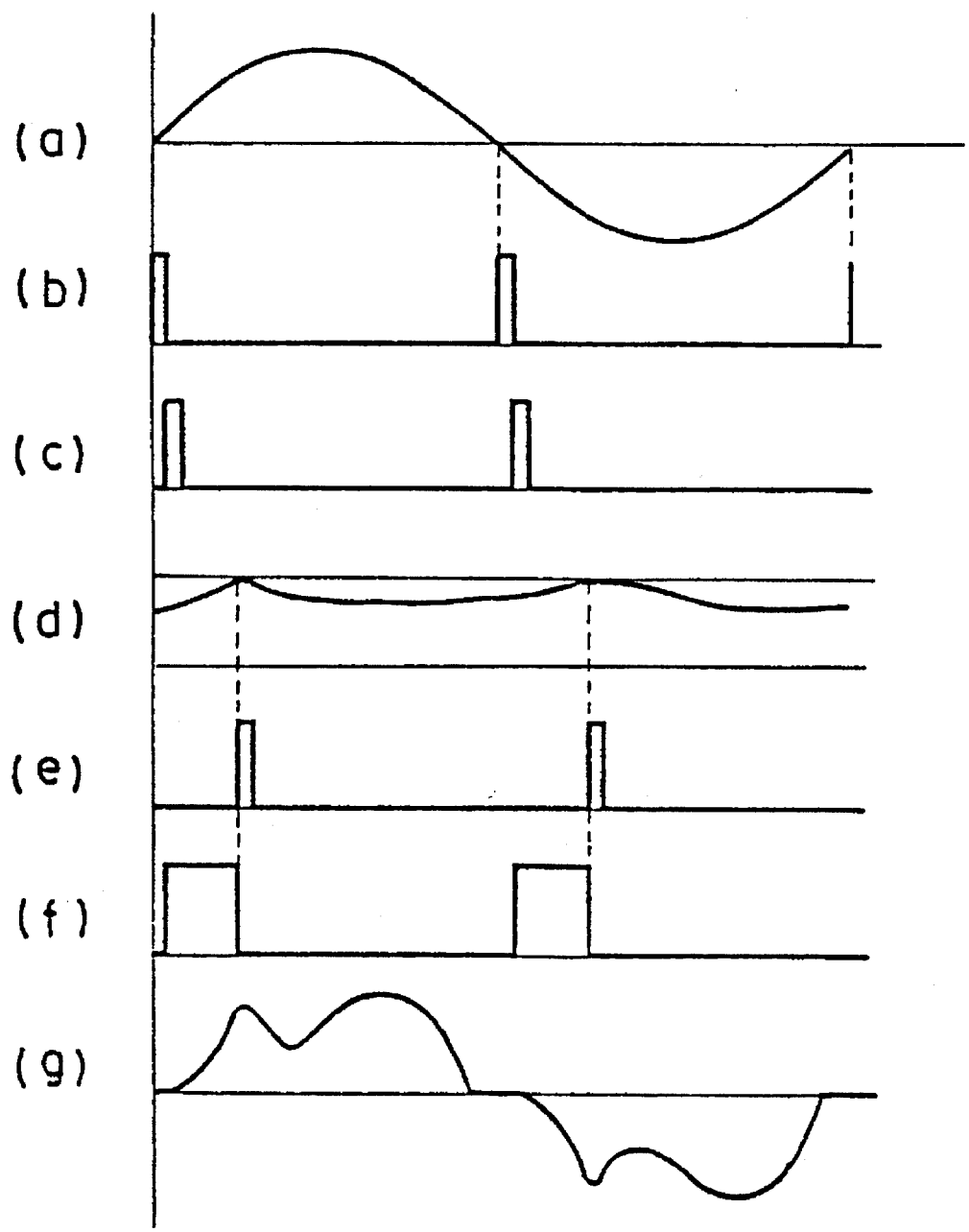
FIG. 74 is an operating waveform diagram showing the operating waveform in each part.

At this time, there are provided timing charts shown in FIG. 74. In FIG. 74, (a) shows a source voltage waveform, (b) shows a zero cross detecting signal, (c) shows a switching start time output signal, (d) shows the overvoltage, (e) shows a switching OFF signal, (f) shows an ON time, and (g) shows a current waveform of a power supply. In FIG. 74(d), in case the dc voltage exceeds a given value, it is decided that the dc voltage is the overvoltage, and the OFF signal shown in FIG. 74(e) is output.

Embodiment 32

Figure 75:
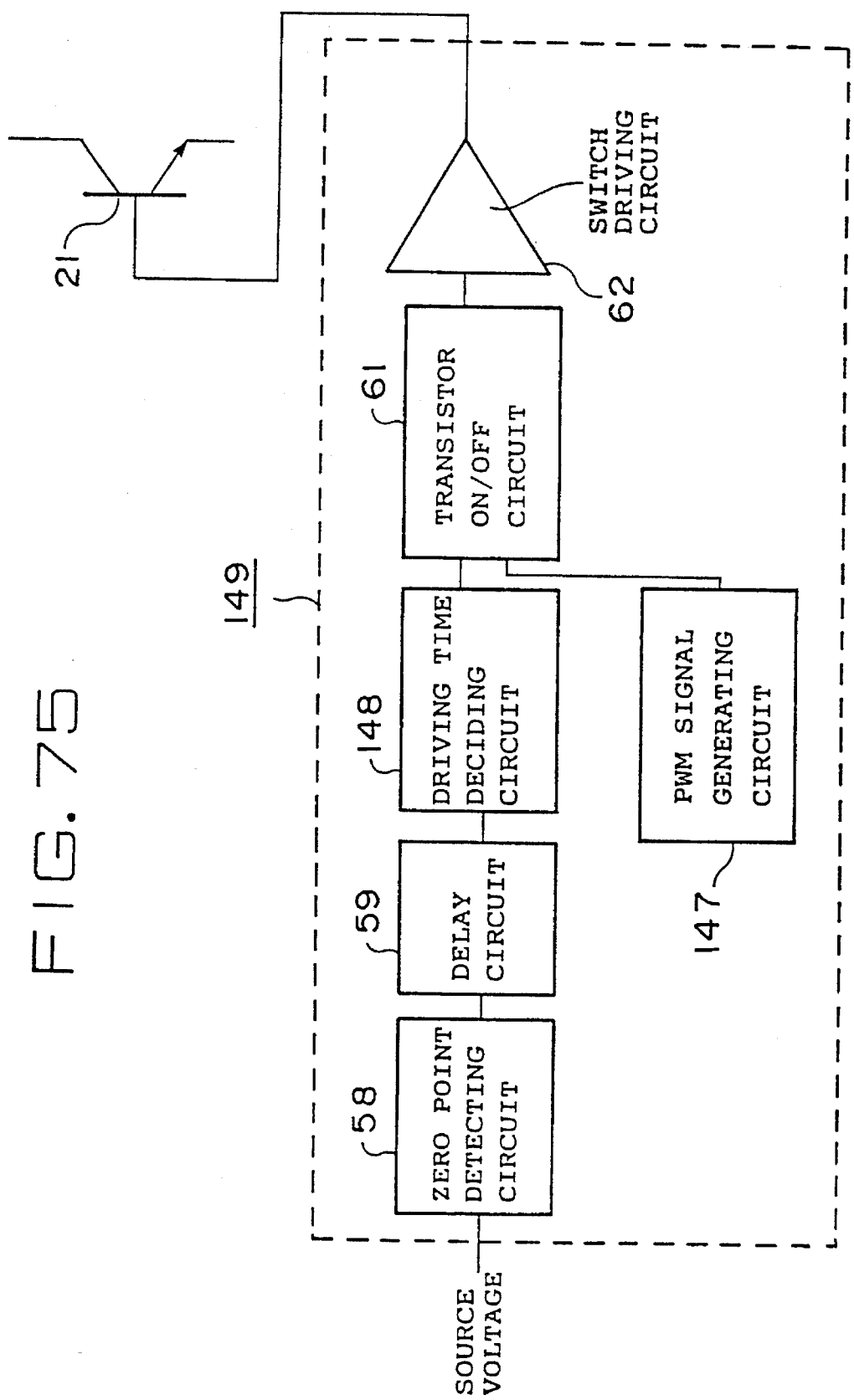
FIG. 75 is a circuit diagram showing one embodiment of the dc power-supply unit according to the twenty-second aspect of the present invention.

FIG. 75 is a circuit diagram showing one embodiment according to the twenty-second aspect of the present invention. In FIG. 75, reference numeral 147 is a PWM signal generating circuit to output a PWM signal having a constant width, 148 is a driving time deciding circuit to output a signal C to set "Lo" only for a time period $t_2$ after a time when a signal B becomes "Lo," and 149 is a switch controlling circuit (switch controlling means).

Figure 76:
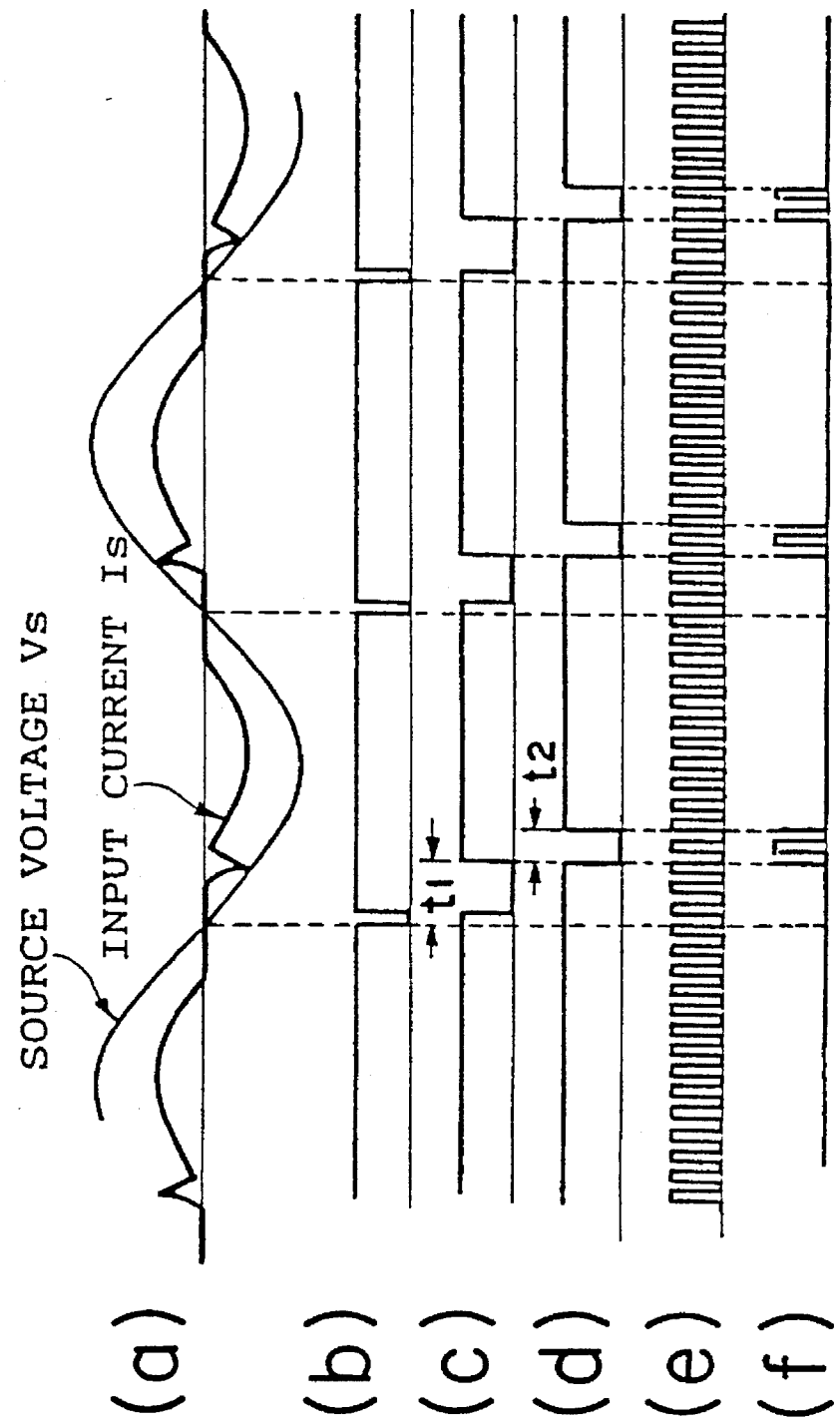
FIG. 76 is an operating waveform diagram showing the operating waveform in each part.

A description will now be given of the operation with reference to FIG. 76. FIG. 76(a) shows the source voltage and input current. In FIG. 76(b), a zero point detected by the zero point detecting circuit 58 is a signal A. As shown in FIG. 76(c), the signal B is delayed by a time $t_1$ from the signal A to become "Lo." As shown in FIG. 76(d), the signal C is kept "Lo" only for the predetermined time $t_2$ after the signal B becomes "Lo." As shown in FIG. 76(e) signal D is a continuously generating PWM signal, and the signal D is output as a control signal E for the switch 21 when the signal C is "Lo" as shown in FIG. 76(f) the driving signal E for the switch 21 turns ON the switch 21 when "Hi," and turns OFF the switch 21 when "Lo."

As set forth above, the reactor 2 serves as a load 10 to increase input current when the switch 21 is ON, and accumulated energy in the reactor 2 is discharged when the switch 21 is OFF, resulting in damped conduction. Thereafter, during the switch 21 is left OFF, current is fed to a capacitor 9 and the load 10 from the ac power supply 1 as in the conventional rectifier circuit 3. Therefore, in case sufficient current can not be fed to the capacitor 9 and the load 10, the input current flows from the ac power supply 1 again. As a result, the ac input current $I_s$ shown in FIG. 76 flows in the circuit shown in FIG. 75, and it is possible to avoid discontinuous input current, improve a power factor, and reduce higher harmonic.

Embodiment 33

Figure 77:
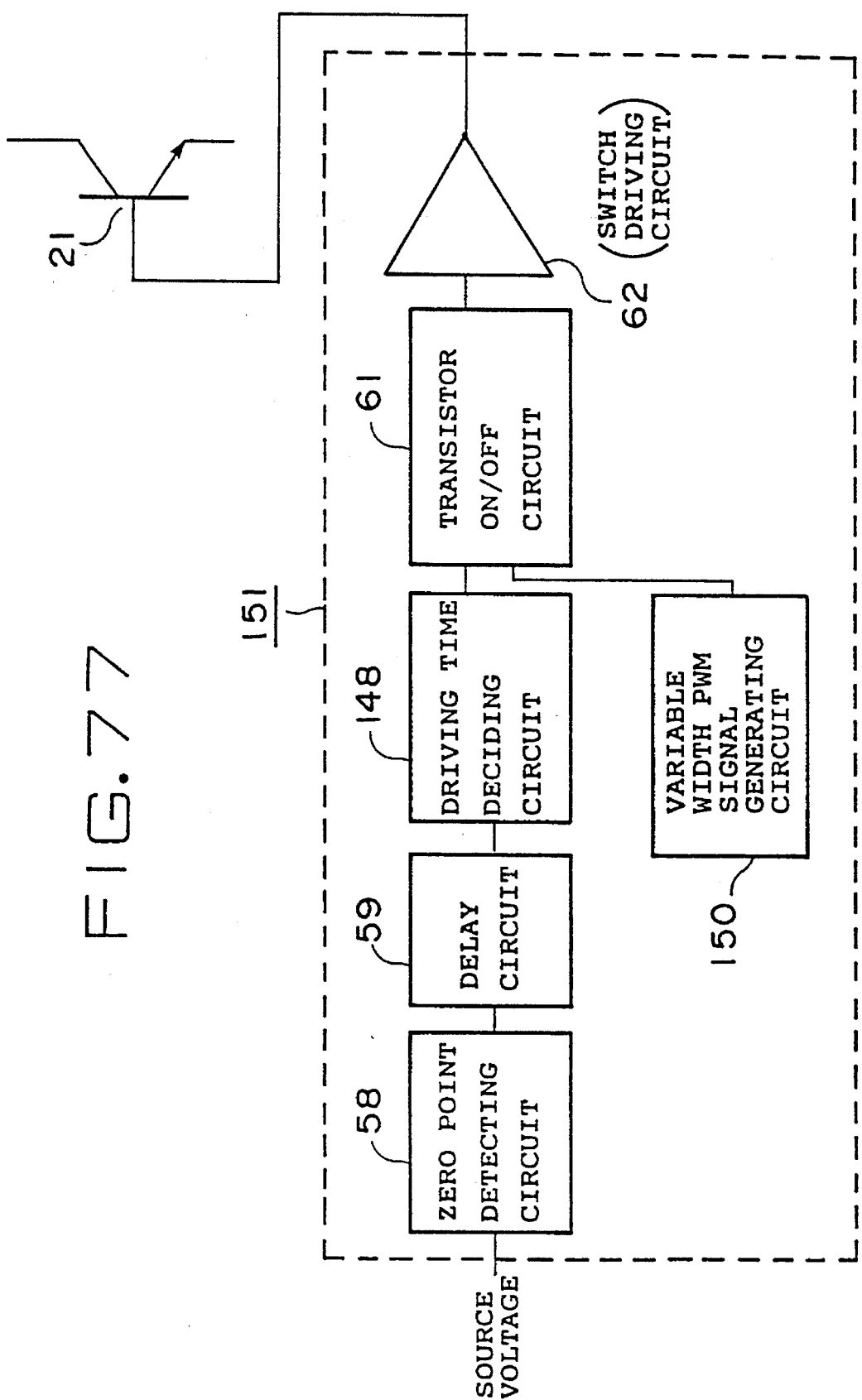
FIG. 77 is a circuit diagram showing another embodiment of the dc power-supply unit according to the twenty-second aspect of the present invention.

FIG. 77 is a circuit diagram showing another embodiment according to the twenty-second aspect of the present invention. In FIG. 77, reference numeral 150 is a variable width PWM signal generating circuit to output PWM signal having a variable width, and 151 is a switch controlling circuit.

Figure 78:
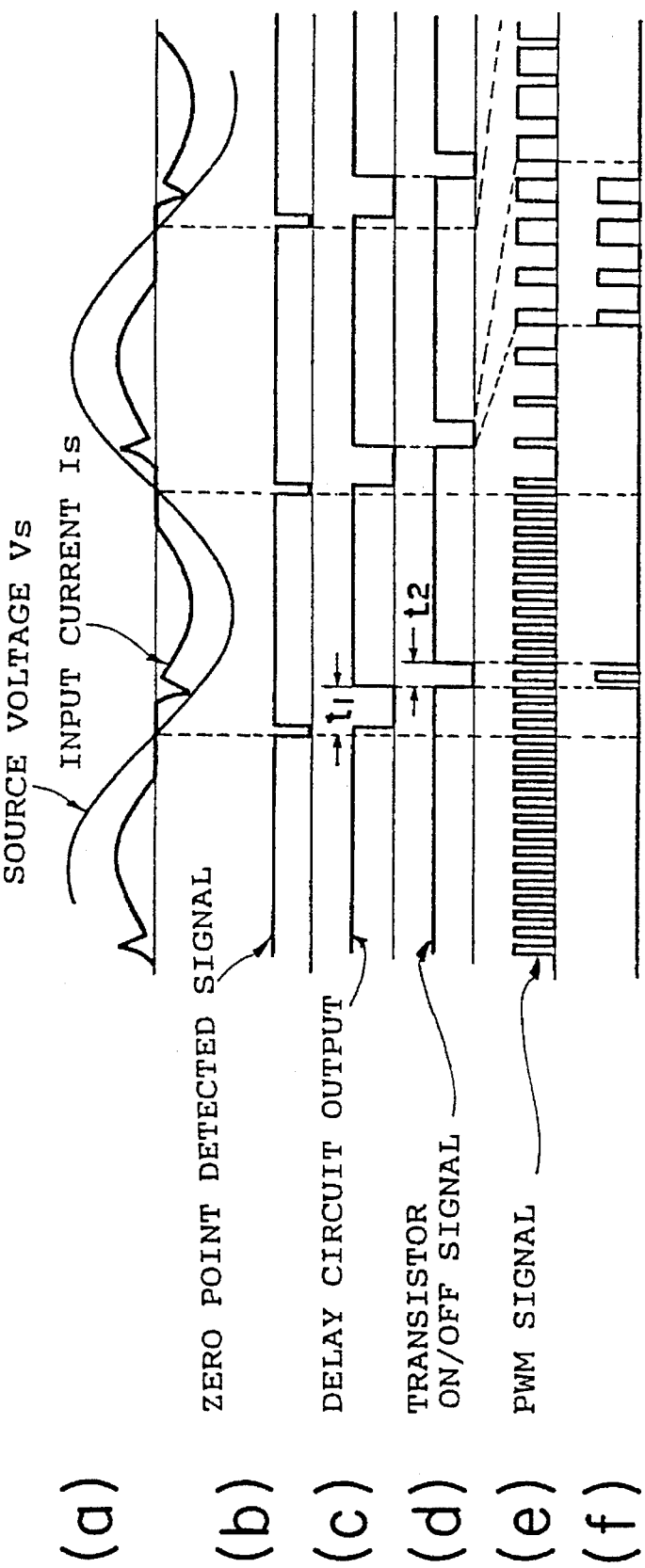
FIG. 78 is an operating waveform diagram showing the operating waveform in each part.

A descriptions will now be given of the operation with reference to FIG. 78. FIG. 78(a) shows the source voltage and input current Is, FIG. 78(b) shows the zero point detecting signal, FIG. 78(c) shows the delay circuit output and FIG. 78(d) shows the transistor on/off signal. In the operation, the variable width PWM signal generating circuit 150 outputs the PWM signal D whose pulse width becomes narrower from a zero point signal with the passage of time in a predetermined way as shown in FIG. 78(e). Therefore, a control signal for the switch 21 is provided to form a switch driving signal E (shown in FIG. 78(f), and it is possible to provide more effective control of the output voltage, and of the higher harmonic or the power factor than that in the embodiment 32.

Embodiment 34

Figure 79:
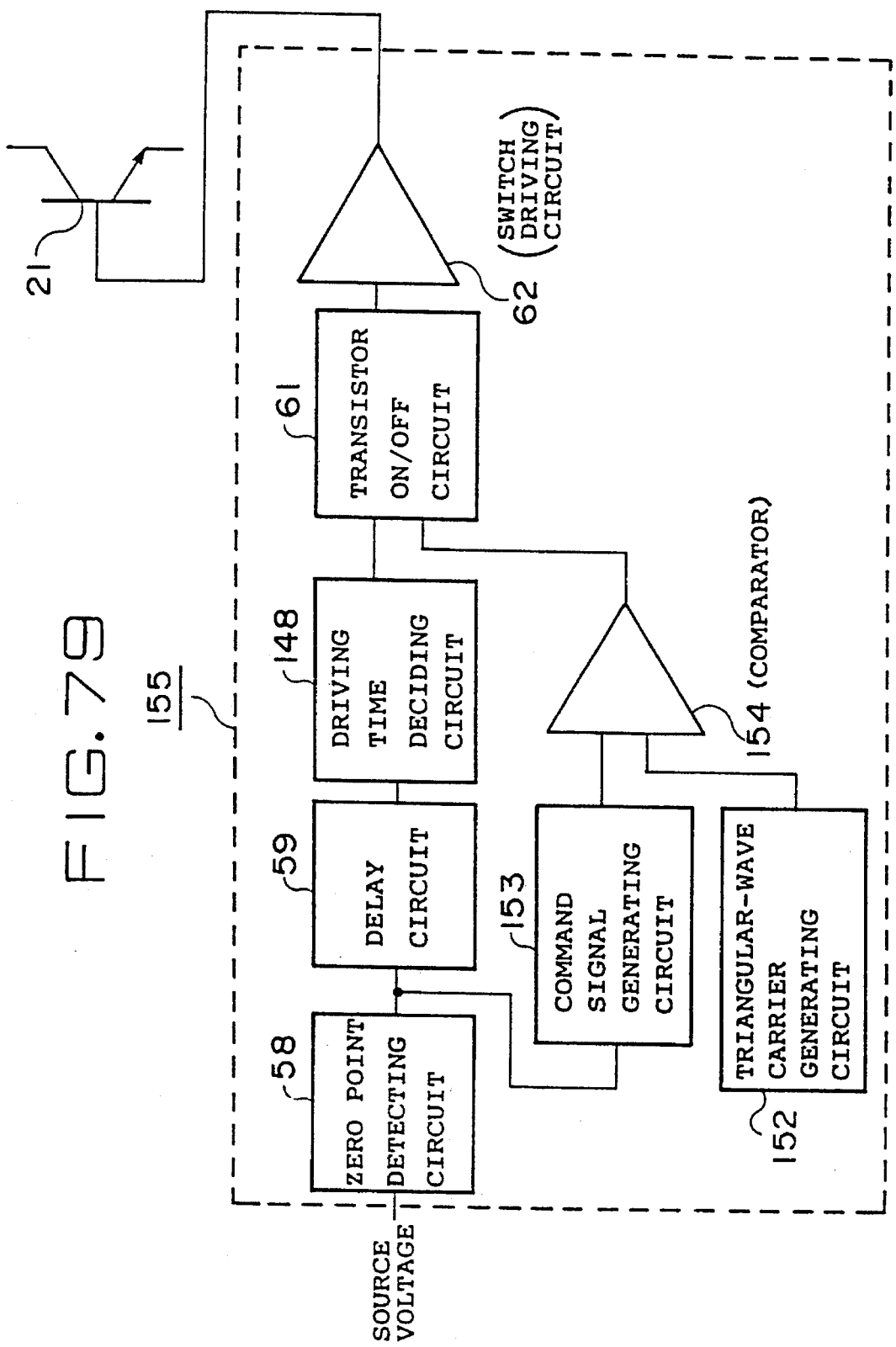
FIG. 79 is a circuit diagram showing another embodiment of the dc power-supply unit according to the twenty-second aspect of the present invention.

FIG. 79 is a circuit diagram showing another embodiment according to the twenty-second aspect of the present invention. In FIG. 79, reference numeral 152 is a triangular carrier generating circuit to generate a triangular carrier, 153 is a command signal generating circuit to provide a command value in synchronization with the source voltage, 154 is a comparator, and 155 is a switch controlling circuit.

Figure 80:
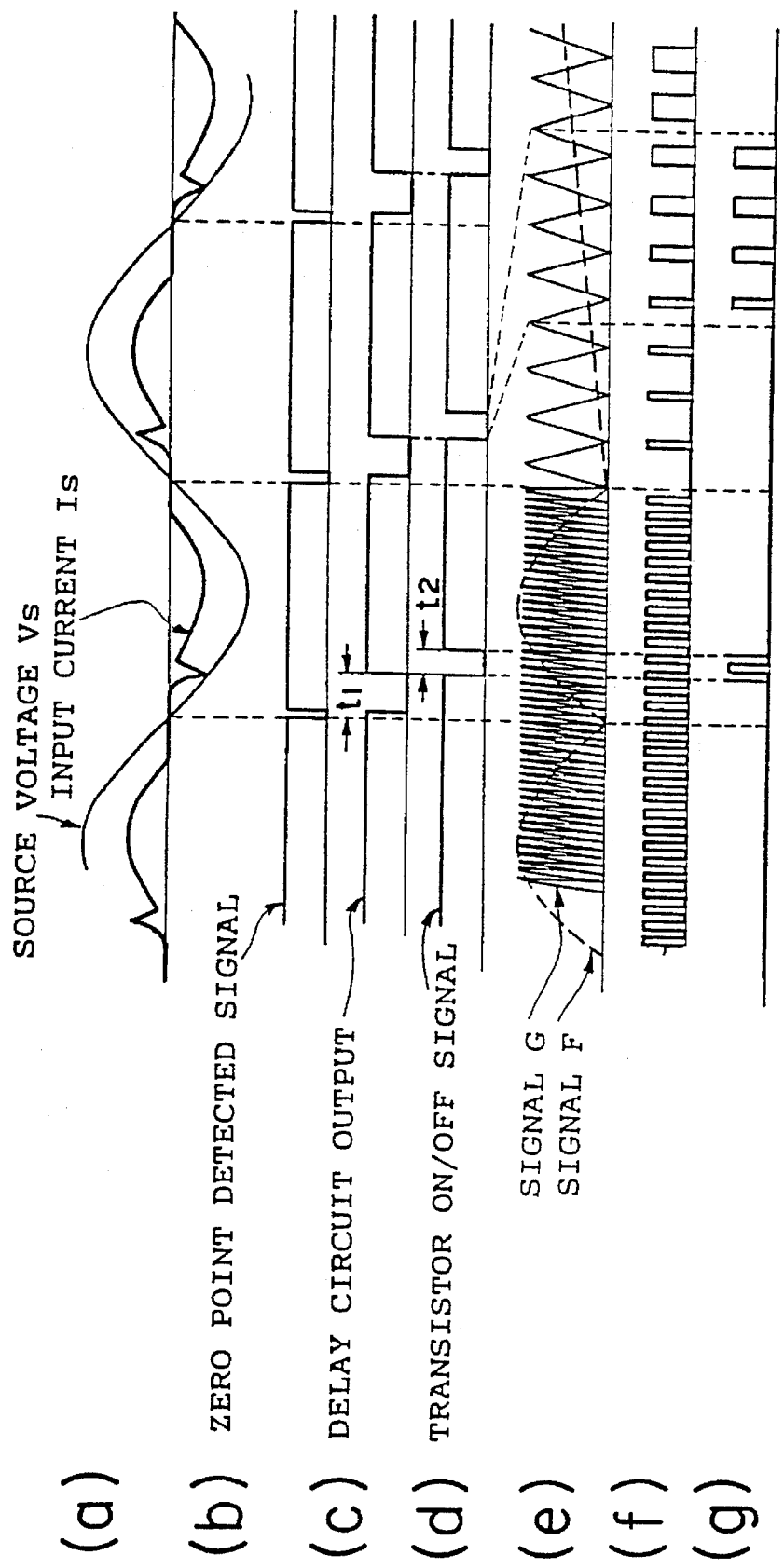
FIG. 80 is an operating waveform diagram showing the operating waveform in each part.

A description will now be given of the operation with reference to FIG. 80 FIGS. 80(a), 80(b), 80(c) and 80(d) show the source voltage Vs and input current Is, the zero point detected signal A, the delay circuit output signal B, and the transistor on/off signal C, respectively. In FIG. 80, the command signal generating circuit 153 outputs a signal having sine-wave shown by F in synchronization with the source voltage in FIG. 80(e). A signal G of FIG. 80(e) is an output from the triangular carrier generating circuit 152, and is decided in the comparator 154. That is, the comparator 154 compares the signal F with the signal G to provide the PWM signal such as a signal D shown in FIG. 80(f). A later process is the same as that in the embodiment 33, wherein FIG. 80(g) shows the switch driving signal E. It is thereby possible to provide the same effect as that in the embodiment 33. Though the output from the command signal generating circuit 153 is provided in a sine-wave form in the embodiment, it must be noted that the present invention should not be limited to the sine-wave, and may be a triangular-wave or saw-tooth wave form.

Embodiment 35

Figure 81:
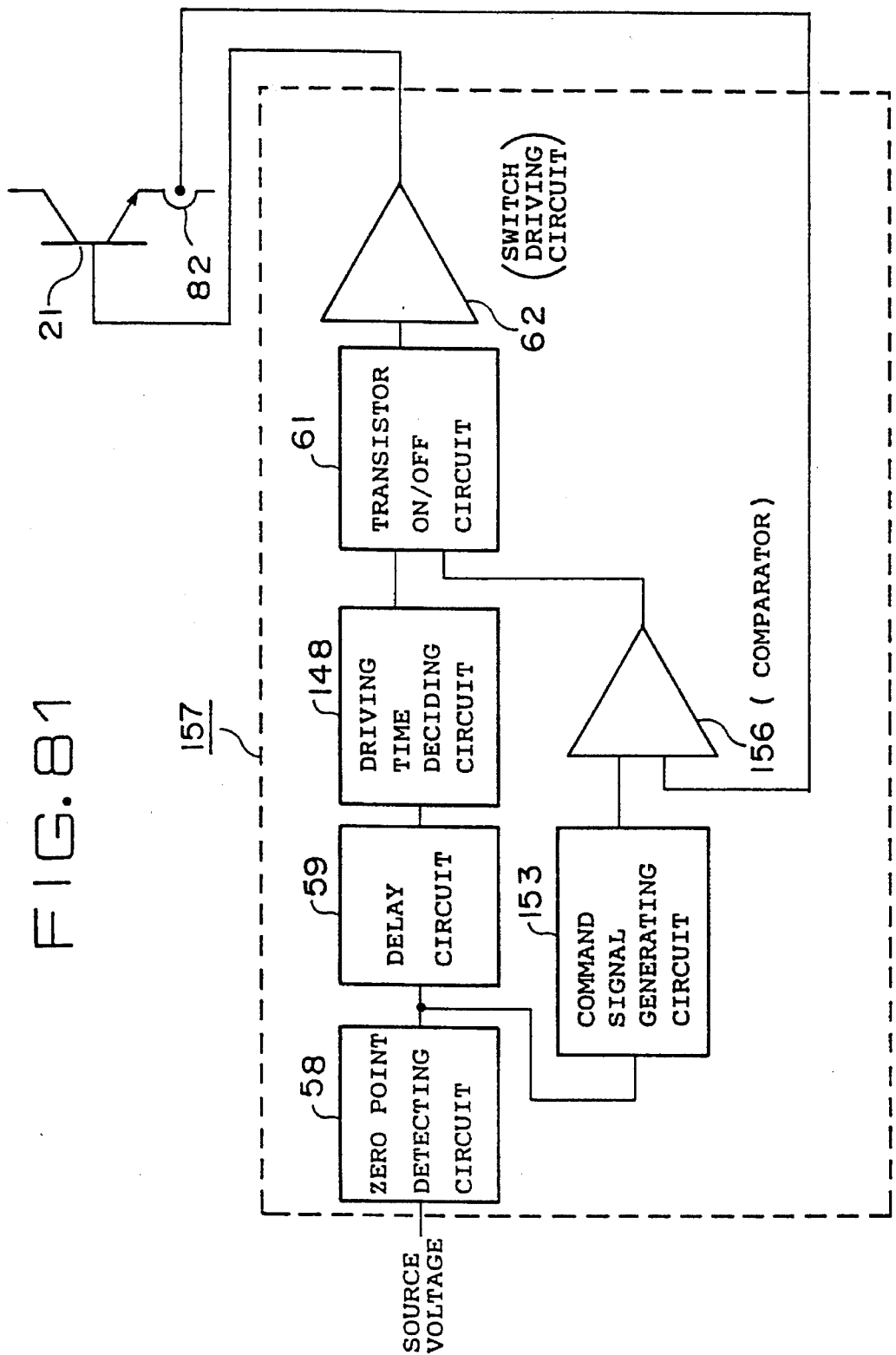
FIG. 81 is a circuit diagram showing another embodiment of the dc power-supply unit according to the twenty-second aspect of the present invention.

FIG. 81 is a circuit diagram showing another embodiment according to the twenty-second aspect of the present invention. In FIG. 81, reference numeral 156 is a hysteresis comparator, and 157 means a switch controlling circuit.

Figure 82:
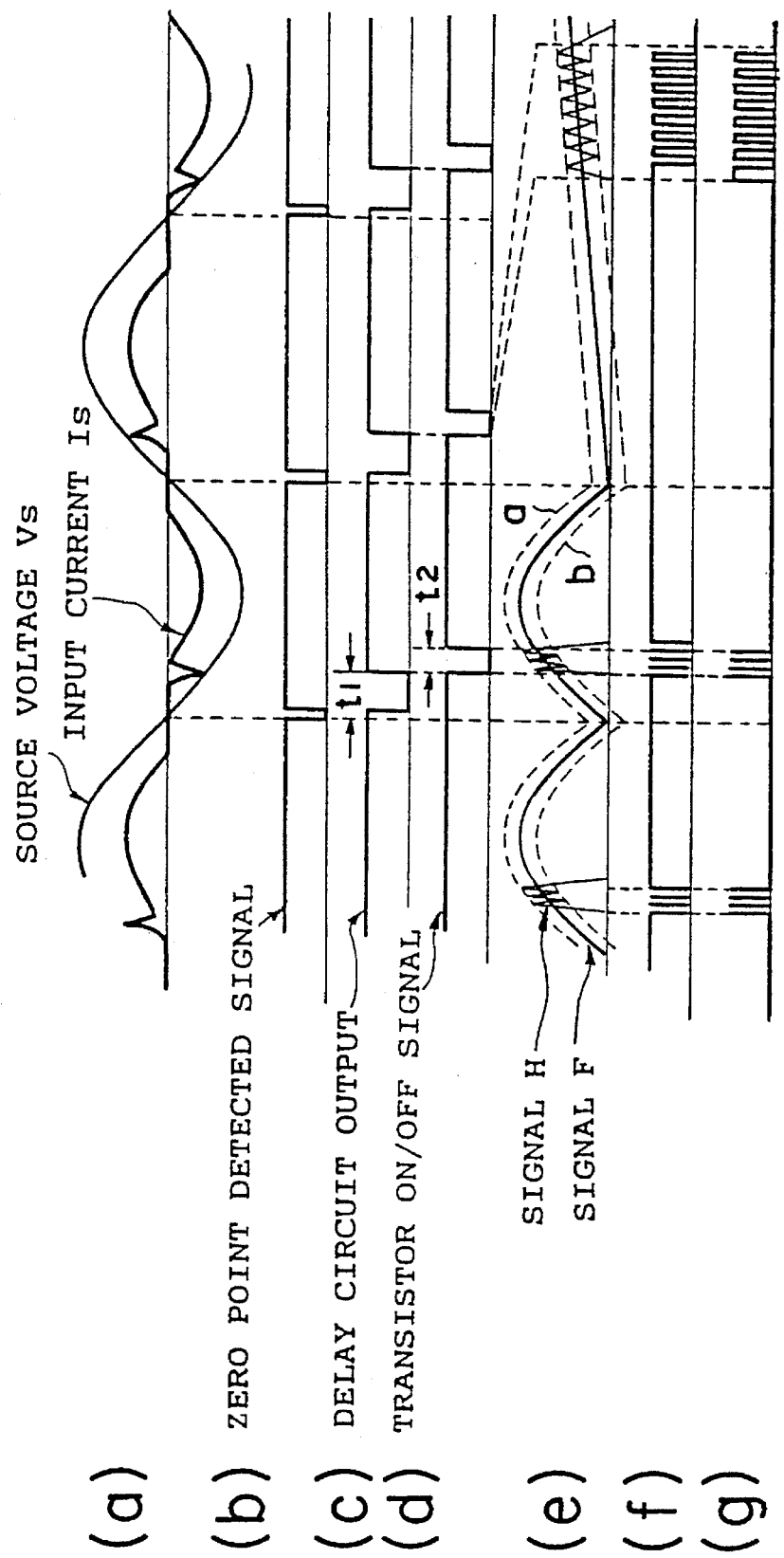
FIG. 82 is an operating waveform diagram showing the operating waveform in each part.

A description will now be given of the operation. FIGS. 82(a), 82(b), 82(c) and 82(d) show the source voltage Vs and input current Is, the zero point detected signal A, the delay circuit output signal B, and the transistor on/off signal Cs respectively. A command signal generating circuit 153 generates an output signal F (FIG. 82(e)) in the same process as that in the embodiment 34. A signal H (FIG. 82(e)) is a detected current signal which is detected by a current sensor 82, and is decided in a comparator 154. The comparator 154 is provided with a hysteresis operation to decide by using an upper limit a and a lower limit b on the basis of the signal F as shown in FIG. 82(e). That is, the comparator 154 outputs a signal I of "Lo" when the detected current signal H exceeds the upper limit a, and outputs the signal I of "Hi" when the detected current signal H exceeds the lower limit b (FIG. 82(f)). The same operation as that in the embodiment 34 is performed using the signal to yield the switch driving signal E shown in (FIG. 82(g)) I as the PWM signal. It is thereby possible to perform the same operation as that in the embodiment 34, resulting in the same effect.

Embodiment 36

Figure 83:
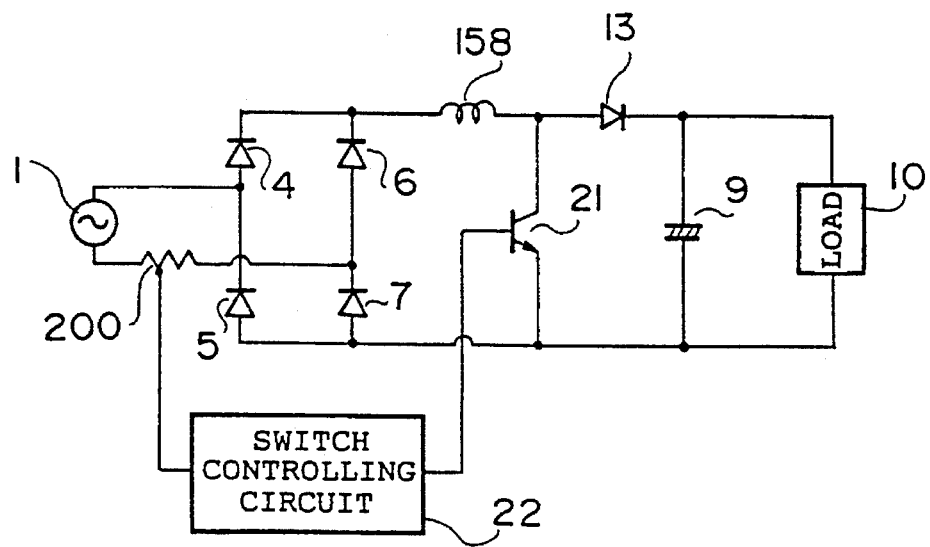
FIG. 83 is a circuit diagram showing another embodiment of the dc power-supply unit according to the first aspect of the present invention.

Though the above embodiments have been described with reference to the dc power-supply unit employing the reactor 2 as an inductive element, the inductive element may be a dc reactor 158 as shown in FIG. 83.

A description will now be given of the operation. When a switch 21 is in a conducting (ON) state, a current path is established to pass through an ac power supply 1, the diode bridge 4, the dc reactor 158, the switch 21, and a diode bridge 7, and return to the ac power supply 1. When the switch is in a cutoff (OFF) state, the current path is established to pass through the ac power supply 1, the diode bridge 4, the dc reactor 158, a diode 13, a capacitor 9, and the diode bridge 7, and return to the ac power supply 1. This conducting mode corresponds to a case where polarity of voltage of the ac power supply 1 on the upper side in FIG. 83 is positive. The switching operation of the transistor 12 is repeated for each positive or negative half-wave of the voltage of the ac power-supply 1. The operation of the switch 21 is controlled as in the embodiments. Thereby, it is possible to provide the same effect as that in the embodiments.

Embodiment 37

Figure 84:
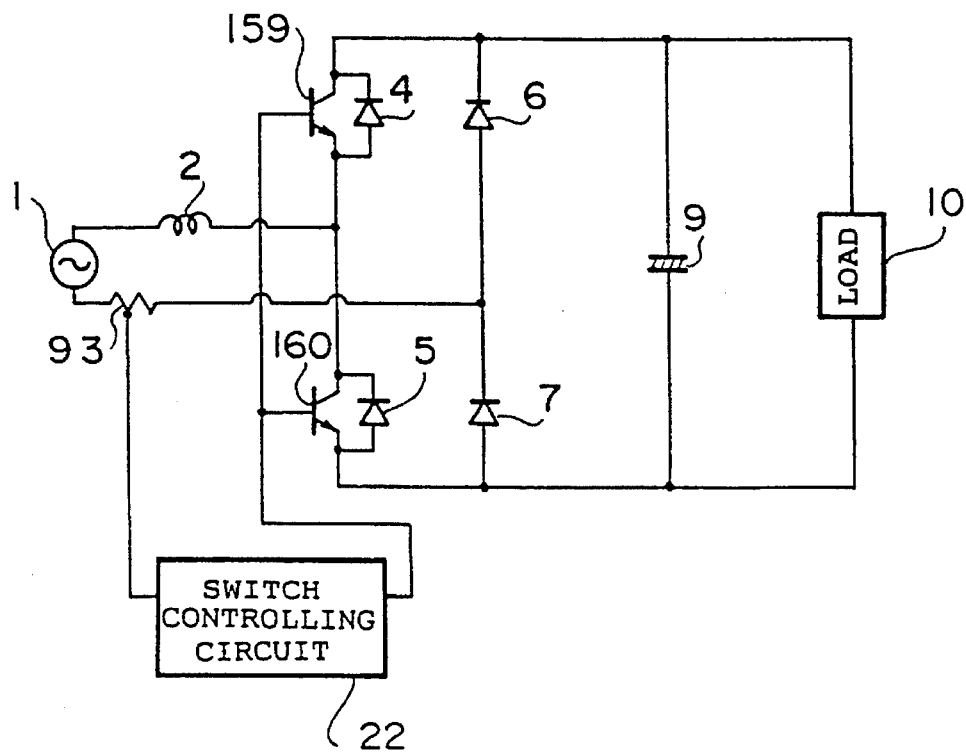
FIG. 84 is a circuit diagram showing one embodiment of the dc power-supply unit according to the twenty-third aspect of the present invention.

FIG. 84 is a circuit diagram showing one embodiment according to the twenty-third aspect of the present invention. In FIG. 84, reference numerals 159, 160 are transistors (switching means) to short-circuit diode bridges 4, 6 forming a rectifier circuit.

A description will now be given of the operation. When the transistor 160 conducts (ON) and the transistor 159 is cutoff (OFF) in case the polarity of the voltage of an ac power supply 1 is positive on the side of a reactor 2, a current path is established to pass through the ac power supply 1, a reactor 2, a transistor 160, and a diode bridge 7, and return to the ac power supply 1. When the transistor 159 is ON and the transistor 160 is OFF, the current path is established to pass through the ac power supply 1, the reactor 2, the transistor 159, a capacitor 9, and a diode bridge 6, and return to the ac power supply 1. When the transistor 159 is ON and the transistor 160 is OFF in case the polarity of the voltage of the ac power supply 1 is negative on the side of the reactor 2, a current path is established to pass through the ac power supply 1, the diode bridge 6, the transistor 160, and the reactor 2, and return to the ac power supply 1. When the transistor 160 is ON and the transistor 159 is OFF, a current path is established to pass through the ac power supply 1, the diode bridge 6, the capacitor 9, the transistor 160, and the reactor 2, and return to the ac power supply 1. The switching operation of the transistors 159 and 160 is repeated for each positive or negative half-wave of the voltage of the ac power-supply 1.

Embodiment 38

Figure 85:
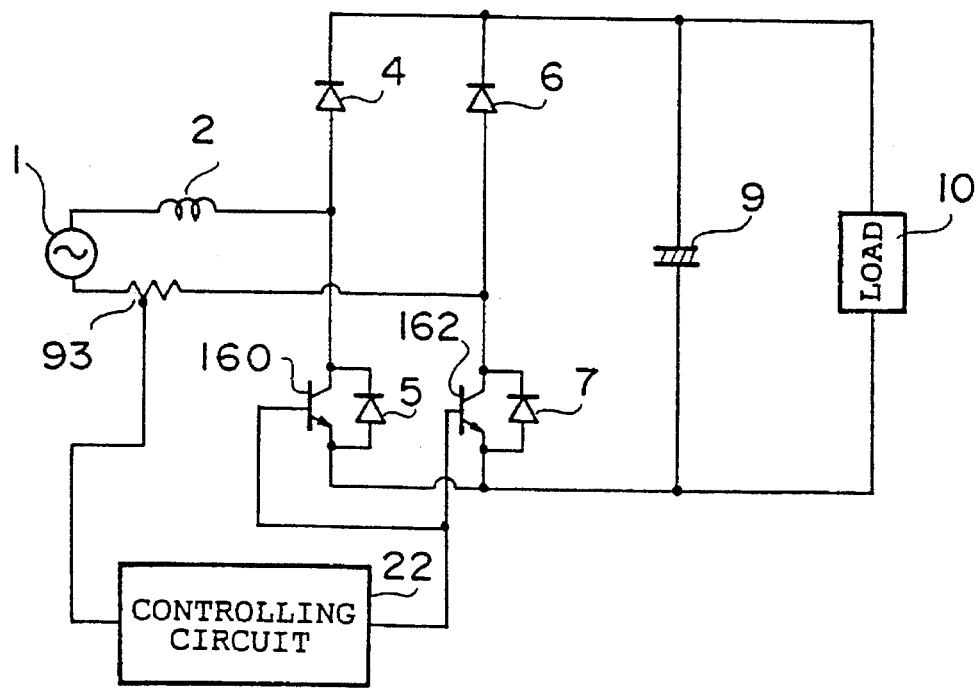
FIG. 85 is a circuit diagram showing another embodiment of the dc power-supply unit according to the twenty-third aspect of the present invention.

FIG. 85 is a circuit diagram showing another embodiment according to the twenty-third aspect of the present invention. In FIG. 85, reference numerals 160, 162 are transistors (switching means) to short-circuit a diode bridge 7 forming a rectifier circuit 3.

A description will now be given of the operation. When the transistor 160 conducts (ON) and the transistor 162 is cutoff (OFF) in case the polarity of the voltage of an ac power supply 1 is positive on the side of a reactor 2, a current path is established to pass through the ac power supply 1, a reactor 2, a transistor 160, and a diode bridge 7, and return to the ac power supply 1. When the transistors 160, 162 are OFF, the current path is established to pass through the ac power supply 1, the reactor 2, a diode bridge 4, a capacitor 9, and the diode bridge 7, and return to the ac power supply 1. When the transistor 162 is ON and the transistor 160 is OFF in case the polarity of the voltage of the ac power supply 1 is negative on the side of the reactor 2, a current path is established to pass through the ac power supply 1, the transistor 162, a diode bridge 5, and the reactor 2, and return to the ac power supply 1. When the transistors 160 and 162 are OFF, the current path is established to pass through the ac power supply 1, the diode bridge 6, the capacitor 9, the diode bridge 5, and the reactor 2, and return to the ac power supply 1. The switching operation of the transistors 160 and 162 is repeated for each positive or negative half-wave of the voltage of the ac power-supply 1.

Embodiment 39

Figure 86:
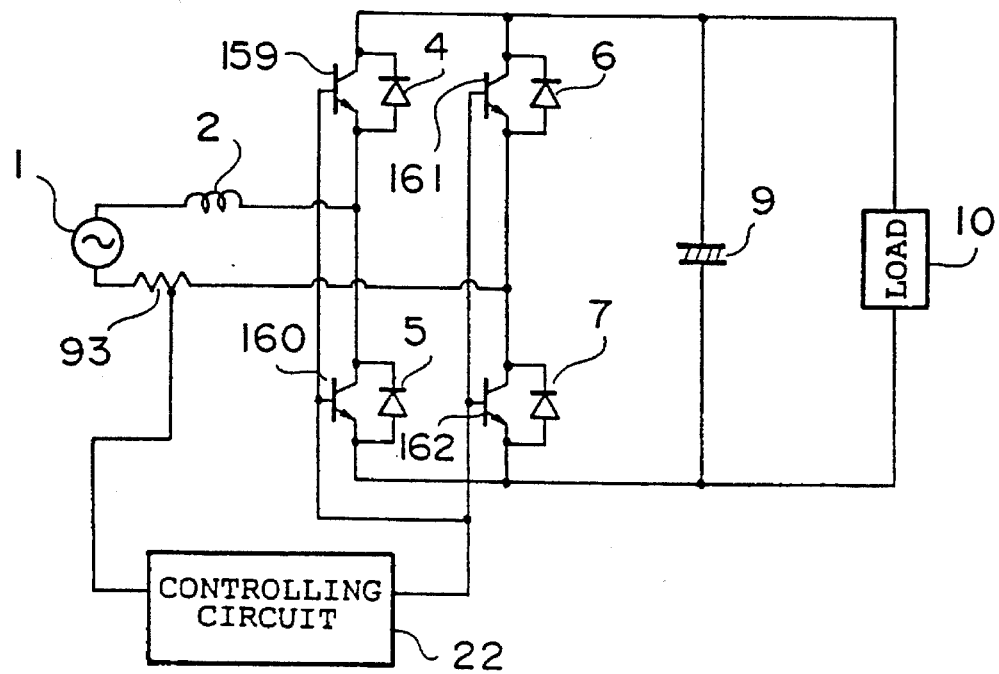
FIG. 86 is a circuit diagram showing another embodiment of the dc power-supply unit according to the twenty-third aspect of the present invention.

FIG. 86 is a circuit diagram showing another embodiment according to the twenty-third aspect of the present invention. In FIG. 86, reference numerals 159–162 are transistors (switching means) to short-circuit a diode bridge 6 forming a rectifier circuit 3.

A description will now be given of the operation. When the transistors 160, 161 conduct (ON) and the transistors 159, 162 are cutoff (OFF) in case the polarity of the voltage of an ac power supply 1 is positive on the side of a reactor 2, two current paths are established to pass through the ac power supply 1, a reactor 2, the transistor 160, and a diode bridge 7, and return to the ac power supply 1, and to pass through the ac power supply 1, the reactor 2, a diode bridge 4, and the transistor 161, and return to the ac power supply 1. When the transistors 159 to 160 are OFF, the current path is established to pass through the ac power supply 1, the reactor 2, the diode bridge 4, a capacitor 9, and the diode bridge 7, and return to the ac power supply 1. When the transistors 159 and 162 are ON and the transistors 160 and 161 are OFF in case the polarity of the voltage of the ac power supply 1 is negative on the side of the reactor 2, two current paths are established to pass through the ac. power supply 1, the transistor 162, the diode bridge 5, and the reactor 2, and return to the ac power supply 1, and to pass through the ac power supply 1, the diode bridge 6, the transistor 159, and the reactor 2, and return to the ac power supply 1. When the transistors 159 to 162 are OFF, the current path is established to pass through the ac power supply 1, the diode bridge 6, the capacitor 9, the diode bridge 5, and the reactor 2, and return to the ac power supply 1. The switching operation of the transistors 159 to 162 is repeated for each positive or negative half-wave of the voltage of the ac power-supply 1.

Embodiment 40

Figure 87:
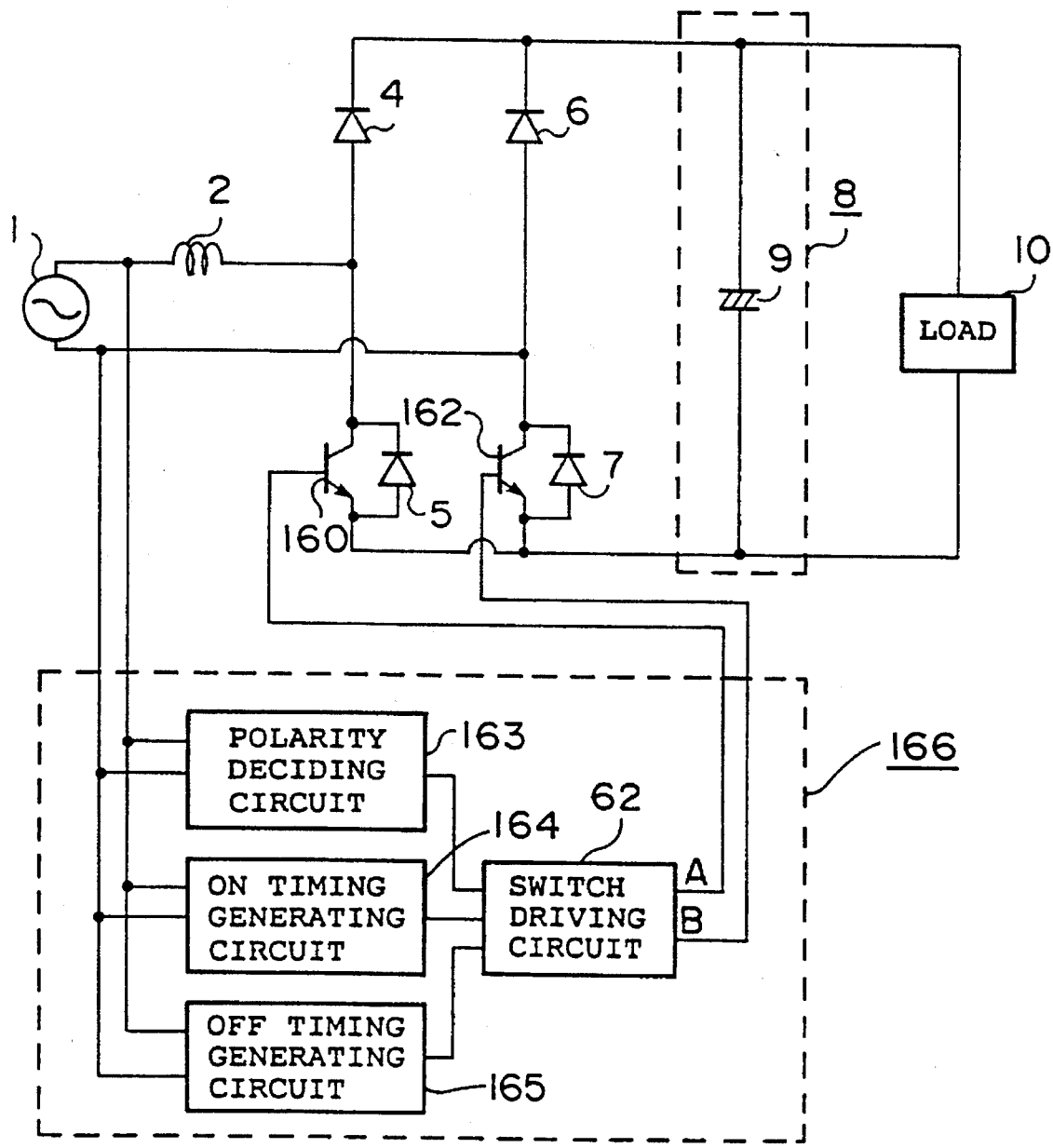
FIG. 87 is a circuit diagram showing another embodiment of the dc power-supply unit according to the twenty-third aspect of the present invention.

FIG. 87 is a circuit diagram showing another embodiment according to the twenty-third aspect of the present invention. In FIG. 87, reference numeral 163 is a polarity deciding circuit to detect the polarity of the voltage of an ac power supply 1, 164 is an ON timing generating circuit to output first ON timing signal to close transistors 160 and 162 in synchronization with the source voltage and according to timing which is delayed by a preset time $T_d$ immediately after the source voltage passes through a zero point, 165 is an OFF timing generating circuit to generate a second timing signal to open the transistors 160 and 162 in synchronization with the source voltage, and 166 is a switch controlling circuit including the polarity deciding circuit 163, the ON timing generating circuit 164, the OFF timing generating circuit 165, and a switch driving circuit 62.

A description will now be given of the operation. The polarity deciding circuit 163 is operated to detect the polarity of the voltage of the ac power supply 1 so as to drive the transistor 160 if the polarity of the voltage is positive, or drive the transistor 162 if the polarity of the voltage is negative. The ON timing generating circuit 164 outputs an ON signal through the switch driving circuit 62 in synchronization with the source voltage and according to timing which is delayed by the preset time $T_d$ immediately after the source voltage passes through a zero point. Accordingly, the transistor 160 or 162 is closed so that the ac power supply 1 is short-circuited through a reactor 2 and a diode bridge 7 (or a diode bridges 5) to conduct current, and the current gradually increases. Subsequently, the OFF timing generating circuit 165 outputs an OFF signal through the switch driving circuit 62 in synchronization with the source voltage open the transistor 160 or 162. Consequently, short-circuit current which has been flowing in a reactor 2 becomes the charging current in a capacitor 9 of a smoothing circuit 8, and starts to decrease. Thereafter, when the source voltage of the ac power supply 1 is in the vicinity of peak voltage, the diode bridges 4, 7 (or the diode bridges 5, 6) cause the charging current in the capacitor 9 to flow through the reactor 2.

Figure 88:
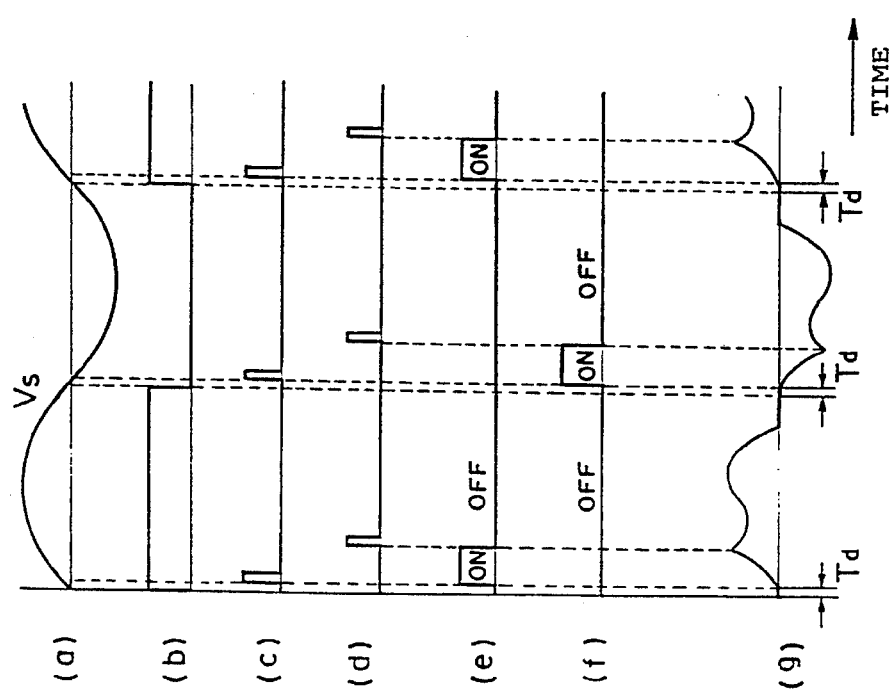
FIG. 88 is an operating waveform diagram showing the operating waveform in each part.

Each operating waveform in each part at this time is shown in FIG. 88. In FIG. 88, (a) shows a source voltage waveform of the ac power supply 1, (b) shows a polarity deciding signal of the voltage of the ac power supply 1, (c) shows the output signal from the ON timing generating circuit 164, (d) shows the output signal from the OFF timing generating circuit 165, (e) shows an output A signal from the switch driving circuit 62 (in case the polarity of the voltage is positive), (f) shows an output B signal from the switch driving circuit 62 (in case the polarity of the voltage is negative), and (g) shows the input current for the dc power-supply unit of the present invention.

Figure 89:
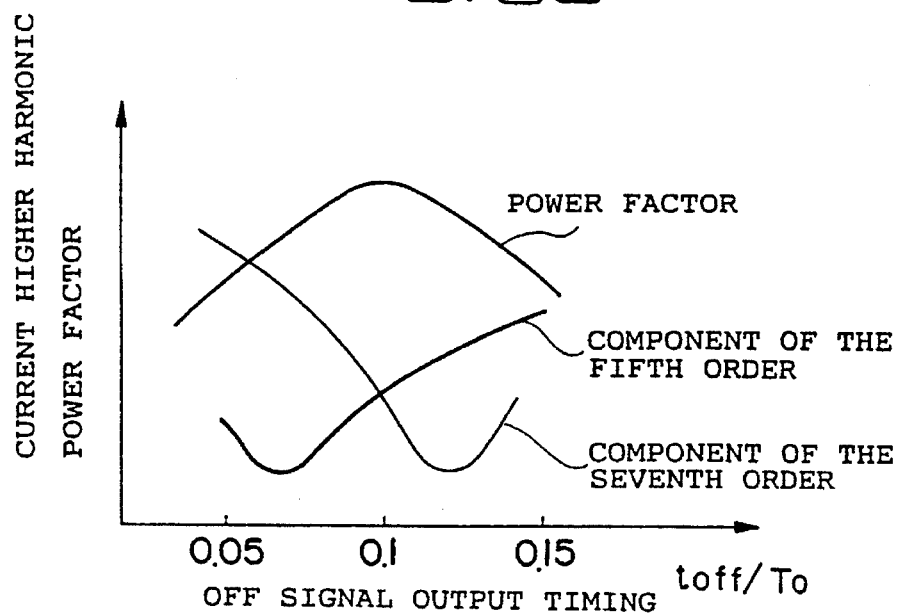
FIG. 89 is a graph diagram showing a relation between OFF signal output timing, and a power factor and a higher harmonic component.

FIG. 89 is a diagram showing a relationship between an OFF signal output timing of the OFF timing generating circuit 165, and a power factor and a higher harmonic component of the input current of the dc power-supply unit in case the ON timing generating circuit 164 outputs the ON signal for the transistors 160 and 162 at a certain time point in synchronization with the source voltage of the ac power supply 1 (for example, after the time $T_d$ from a zero crossing point of the source voltage) under a constant load. In FIG. 89, the transverse axis represents a ratio of the OFF signal output timing $t_{off}$ to a power supply period $T_0$ on the basis of the zero crossing point of the source voltage. In this case, as seen from the drawing, it is possible to provide the overall optimal operating point in view of a power factor and a current higher harmonic characteristic by setting the OFF signal output timing to a value of approximately 0.1. Thus, if the ON signal output timing is determined, it is possible to set the optimal value as the OFF signal output timing depending upon the overall decision of characteristics. In the present invention, the ON timing generating circuit 164 and the OFF timing generating circuit 165 are preset to output the optimal timing in synchronization with the source voltage of the ac power supply 1, respectively.

It must be understood that the OFF signal output timing may be determined in the vicinity of the maximum power factor point with respect to the set ON signal output timing in case a particular weight is given to the power factor. Further, it must be noted that the OFF signal output timing may be determined so as to minimize the higher harmonic component of any desired specific order with respect to the set ON signal output timing in case the higher harmonic component of a specific order in the input current should be particularly reduced.

Figure 90:
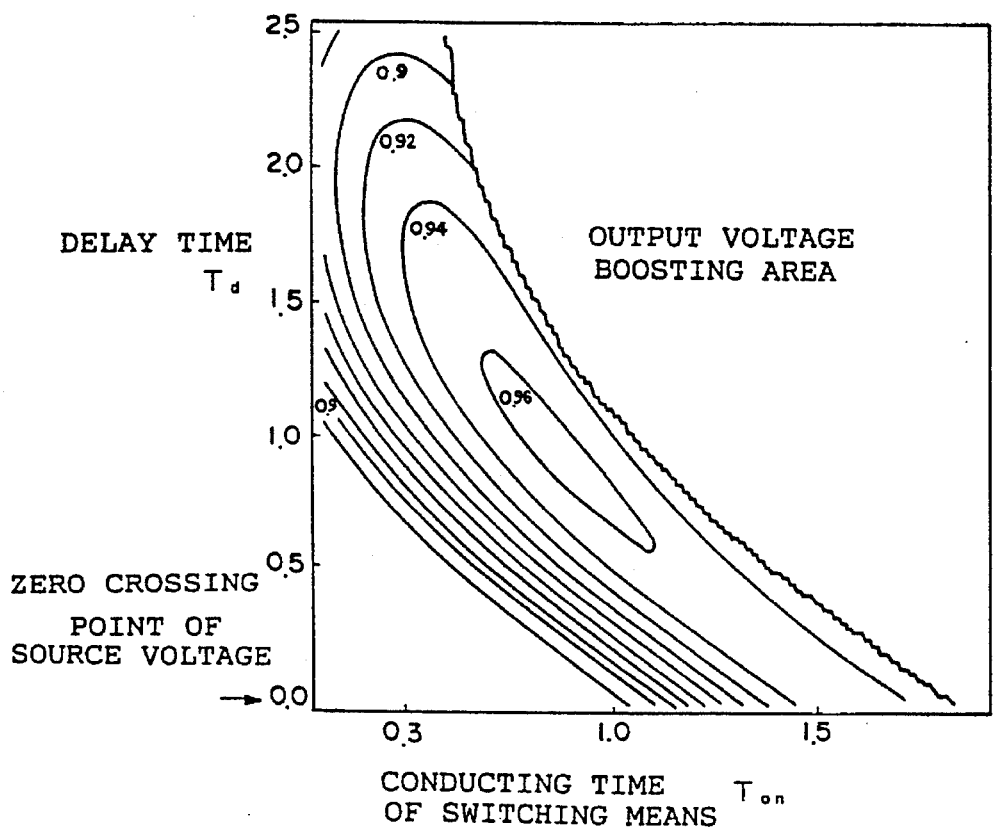
FIG. 90 is a contour map of the power factor with respect to the delay time and the conducting time.

In case the particular weight is given to the power factor, the ON signal for the transistors 160 and 162 output from the ON timing generating circuit 164 may be set depending upon a power factor characteristic shown in FIG. 90 under a constant load. In FIG. 90, the ordinate axis represents the delay time $T_d$ from the zero crossing point of the source voltage, and the transverse axis represents a conducting time (ON time) $T_{on}$ of the transistors 160 and 162, that is, a time obtained by subtracting the delay time $T_d$ from the OFF signal output timing $t_{off}$ on the basis of the zero crossing point of the source voltage. FIG. 90 is a contour map showing 0.8% or more power factor. As seen from the illustration, it is possible to increase a power factor improvement effect when the delay time $T_d$ is in a range from 0.6 to about 1.3 [msec] greater than when the delay time is fixed to the zero crossing point of the source voltage (i.e., $T_d=0$ [msec]) as in the conventional dc power-supply unit having an enhanced power factor. Therefore, the ON signal output timing may be set in the range.

Figure 91:
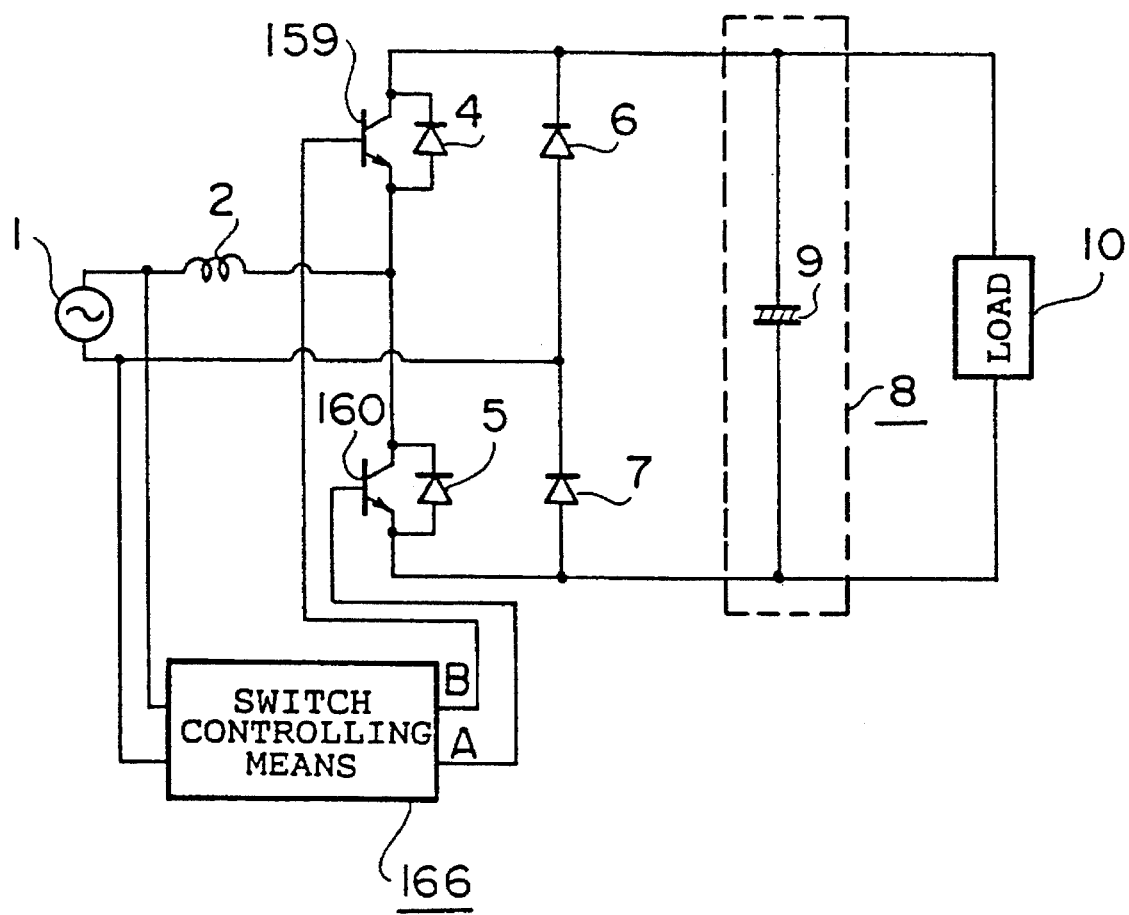
FIG. 91 is a circuit diagram showing another embodiment of the dc power-supply unit according to the twenty-third aspect of the present invention.
Figure 92:
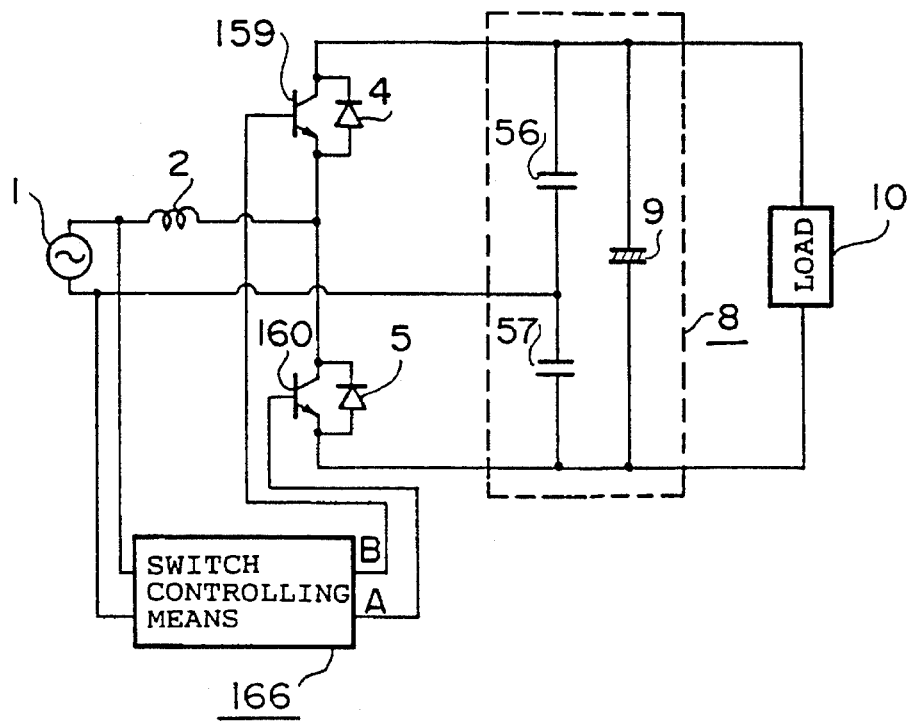
FIG. 92 is a circuit diagram showing another embodiment of the dc power-supply unit according to the twenty-third aspect of the present invention.
Figure 93:
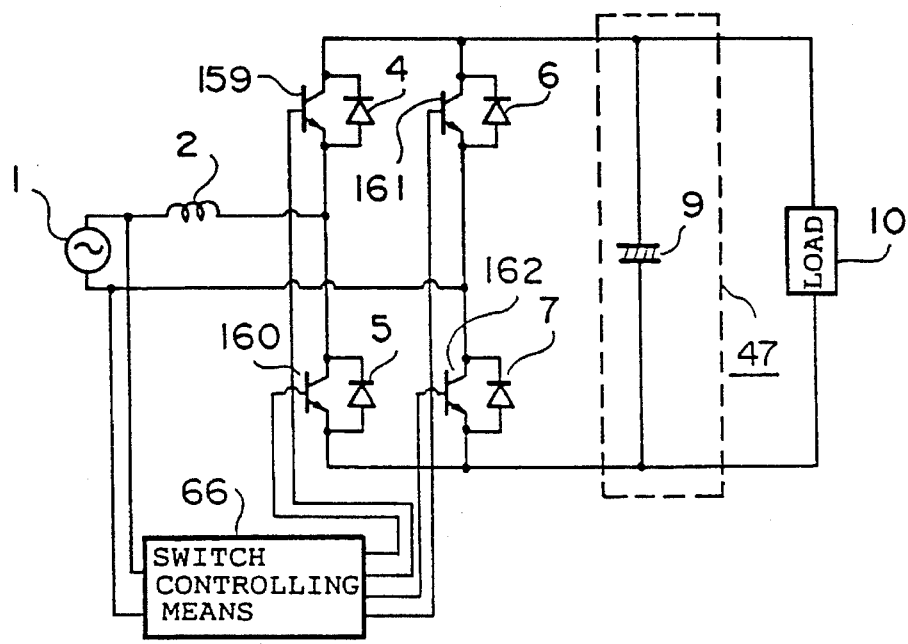
FIG. 93 is a circuit diagram showing another embodiment of the dc power-supply unit according to the twenty-third aspect of the present invention.

The embodiment 40 has been described with reference to the transistors which are respectively connected in parallel with the diode bridges 5 and 7 of the rectifying means. However, it is to be understood that the positions of the transistors should not be limited, and the transistors 159, 160 may be respectively connected in parallel with the diode bridges 4, 5 of a rectifier circuit 3 as shown in FIG. 91. Further, as shown in FIG. 92, capacitors 56, 57 may be provided to form a voltage doubler rectifier circuit. In addition, as shown in FIG. 93, the transistors 159 to 162 may be connected in parallel with the diode bridges 4 to 7 of the rectifier circuit 3 as shown in FIG. 93 to form a full-bridge configuration.

Embodiment 41

Figure 94:
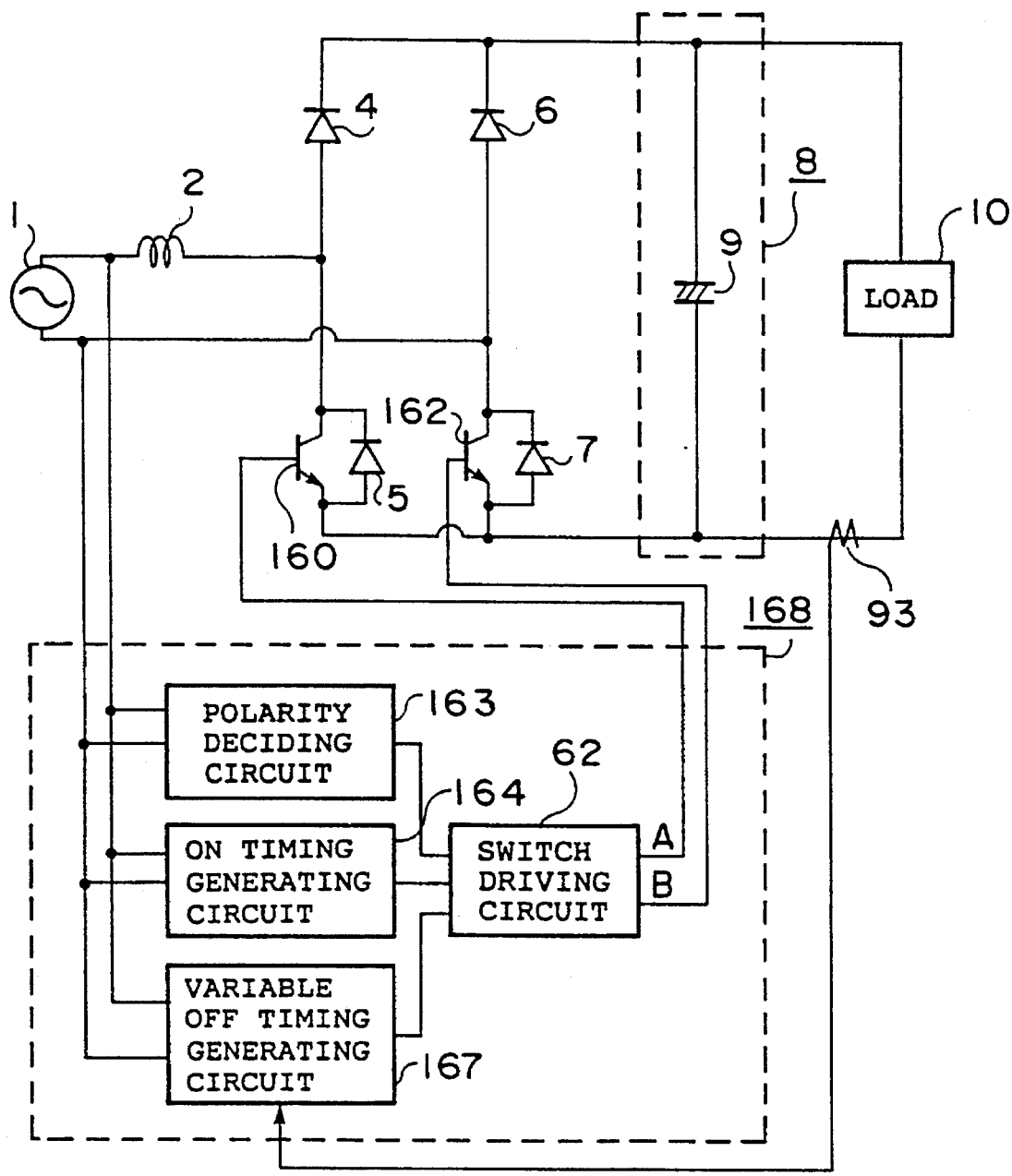
FIG. 94 is a circuit diagram showing another embodiment of the dc power-supply unit according to the twenty-third aspect of the present invention.

FIG. 94 is a circuit diagram showing another embodiment according to the twenty-third aspect of the present invention. In FIG. 94, reference numeral 167 is a variable OFF timing generating circuit to generate an OFF signal for transistors 160 and 162 in synchronization with the source voltage and depending upon a load condition detected by a current sensor 93, and 168 is a switch controlling circuit (switch controlling means) including a polarity deciding circuit 163, an ON timing generating circuit 164, the variable OFF timing generating circuit 167, and a switch driving circuit 62.

A description will now be given of the operation. As in the embodiment 40 described before, the polarity deciding circuit 163 detects the polarity of the voltage of an ac power supply 1, and drives the transistors 160 when the polarity of the voltage is positive or drives the transistor 162 when the polarity of the voltage is negative. The ON timing generating circuit 64 outputs the ON signal through the switch driving circuit 62 in synchronization with the source voltage of the ac power supply 1 and according to timing which is delayed by a preset time $T_d$ immediately after the source voltage passes through a zero point. The transistor 160 or 162 is closed so that the ac power supply 1 is short-circuited through the reactor 2 and a diode bridge 7 (or a diode bridge 5) to conduct current, and the current gradually increases.

Subsequently, the variable OFF timing generating circuit 167 outputs an OFF signal through the switch driving circuit 62 in synchronization with the source voltage of the ac power supply 1 and depending upon a load condition detected by the current sensor 93, resulting in opening the transistor 160 or 162. Accordingly, the short-circuit current which has been flowing in the reactor 2 passes through the diode 13 to reach a the charging current in a capacitor 9 of a smoothing circuit 8, and starts to decrease. Thereafter, when the source voltage of the ac power supply 1 is in the vicinity of peak voltage, the diode bridges 4, 7 (or the diode bridges 5, 6) cause the charging current in the capacitor 9 to flow through the reactor 2.

Figure 95:
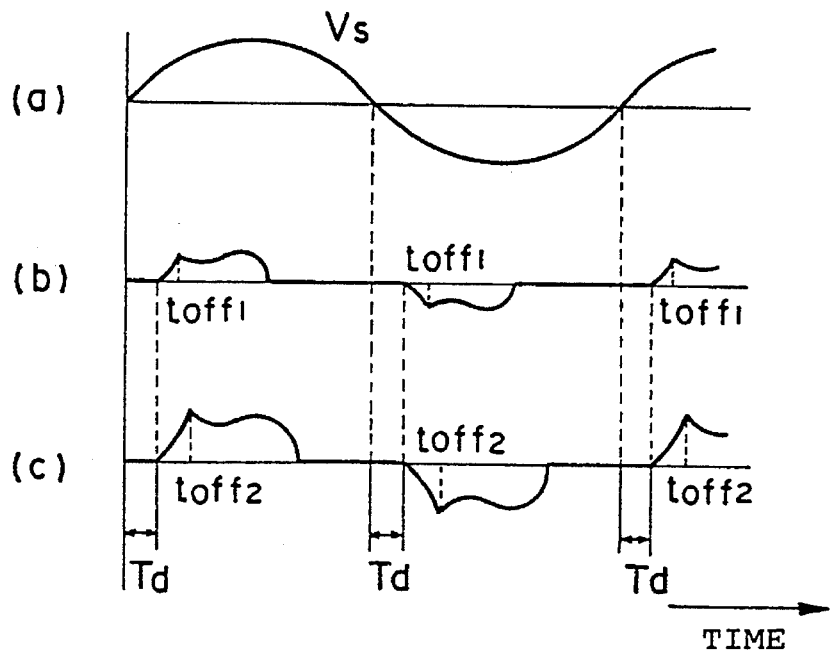
FIG. 95 is an operating waveform diagram showing the operating waveform in each part.

At this time, there are provided a source voltage waveform of the ac power supply 1 as shown in FIG. 95(a), and input current waveforms of the dc power-supplied unit in the embodiment under a light load and a heavy load as shown in FIGS. 95(b) and 95(c), respectively. As seen from FIG. 95, the operation is controlled so as to have an earlier OFF signal output timing of the variable OFF timing generating circuit 167 under a light load than the OFF signal output timing under a heavy load.

Figure 96:
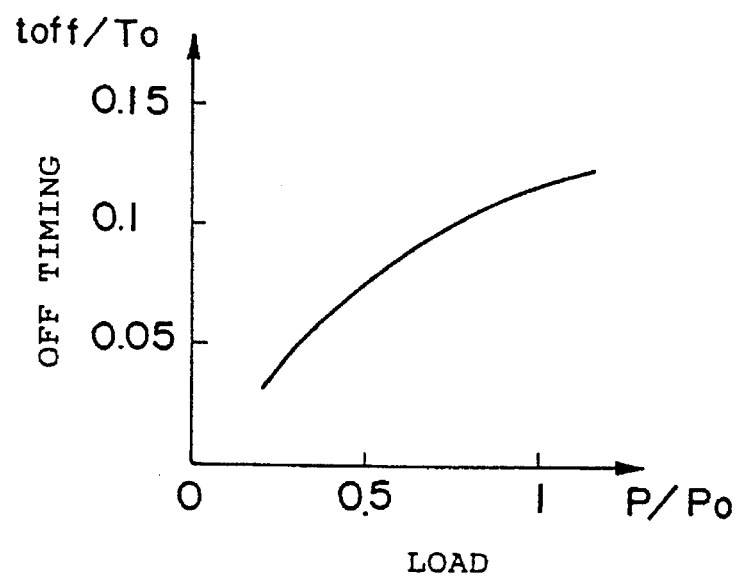
FIG. 96 is a graph diagram showing the relation between the load and the ON timing.

FIG. 96 is a diagram showing a relationship between a load, and the OFF signal output timing serving as the overall optimal operating point in view of a power factor and a current higher harmonic characteristic in case the ON timing generating circuit 164 generates the ON signal for the transistors 160 and 162 at a certain time point in synchronization with the source voltage of the ac power supply 1 (for example, a time point which is delayed by one-twentieth of source voltage period from the zero crossing point of the source voltage). In FIG. 96, the transverse axis represents a load normalized by rated load $P_0$, and the ordinate axis represents the OFF signal output timing normalized by the power supply period $T_0$. In the present invention, the output timing of the variable OFF timing generating circuit 167 can be controlled according to the load condition based upon the relationship shown in FIG. 96. Further, it must be noted that the output timing of the variable OFF timing generating circuit 167 may be controlled according to the purpose. That is, while a particular weight is given to the power factor, the output timing may be controlled according to the load condition. Alternatively, while the particular weight is given to the current higher harmonic characteristic, the output timing may be controlled according to the load condition.

In addition, it is to be understood that the present invention should not be limited to the load current detecting means as means for detecting the magnitude of the load condition. For example, it is also possible to detect the magnitude of the load condition by using voltage fluctuation in the capacitor 9 of the smoothing circuit 8, or the input current of the dc power-supply unit.

Besides, as in the embodiment 40, it must be noted that an arrangement of the transistors should not be limited.

Embodiment 42

Figure 97:
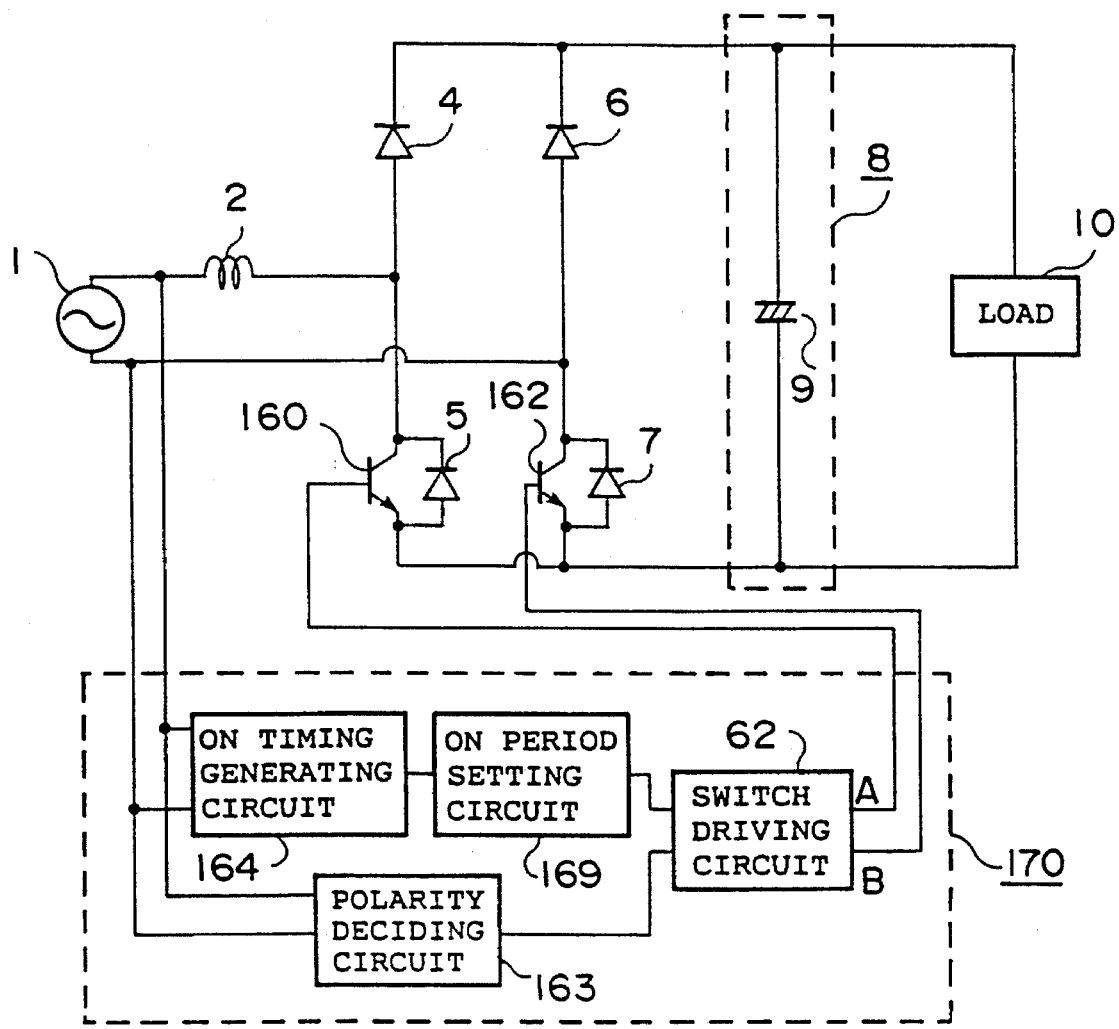
FIG. 97 is a circuit diagram showing another embodiment of the dc power-supply unit according to the twenty-third aspect of the present invention.

FIG. 97 is a circuit diagram showing another embodiment according to the twenty-third aspect of the present invention. In FIG. 97, reference numeral 169 is an ON period setting circuit to use an output signal from an ON timing generating circuit 164 as a trigger so as to set an ON period for transistors 160 and 162, and 170 is a switch controlling circuit including a polarity deciding circuit 163, the ON timing generating circuit 164, and the ON period setting circuit 169.

A description will now be given of the operation. As in the embodiment 40 described before, the polarity deciding circuit 163 detects the polarity of the voltage of the ac power supply 1, and drives the transistors 160 when the polarity of the voltage is positive or drives the transistor 162 when the polarity of the voltage is negative. The ON timing generating circuit 164 outputs the ON signal in synchronization with the source voltage of the ac power supply 1 and according to timing which is delayed by a preset time $T_d$ immediately after the source voltage passes through a zero point. The ON period setting circuit 169 outputs a signal output to close the transistors 160 and 162 only for a preset period through the switch driving circuit 62 to the transistors 160 and 162. During the transistor 160 or 162 is closed, as in the embodiment 40 described before, the ac power supply 1 is short-circuited through a reactor 2 and a diode bridge 7 (or a diode bridge 5) to conduct current, and the current gradually increases. Subsequently, when the ON period of the transistor 160 or 162 is terminated to open the transistors 160 and 162, the short-circuit current which has been flowing in the reactor 2 becomes the charging current in a capacitor 9 of a smoothing circuit 8, and starts to decrease. Thereafter, when the source voltage of the ac power supply 1 is in the vicinity of the peak voltage, the diode bridges 4, 7 (or the diode bridges 5, 6) cause the charging current in the capacitor 9 to flow through the reactor 2.

At this time, there are provided a source voltage waveform of the ac power supply 1, and input current waveforms of the dc power-supply unit as in the embodiment 40 shown in FIG. 88.

Figure 98:
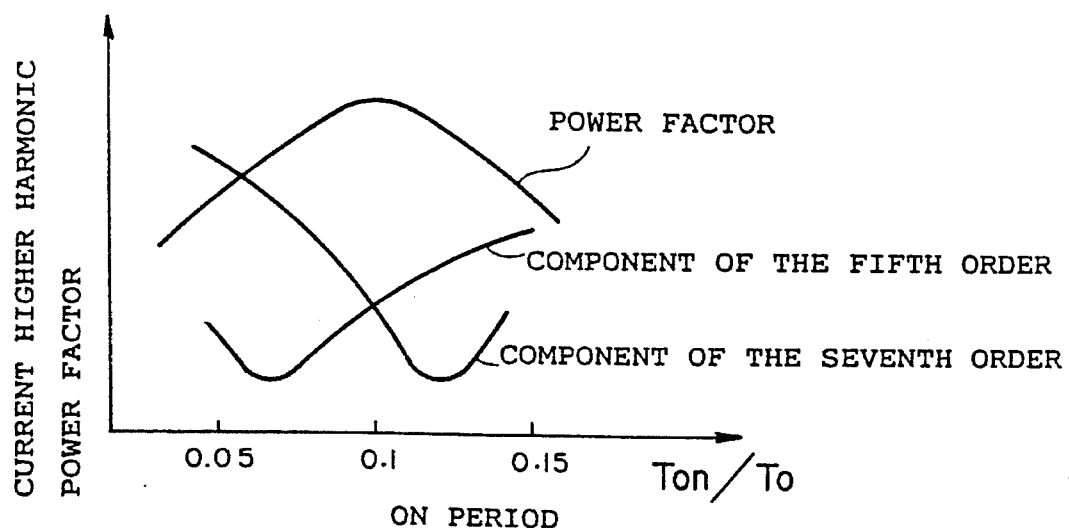
FIG. 98 is a graph diagram showing a relation between an ON period, and the power factor and the higher harmonic component.

FIG. 98 is a diagram showing the relationships between a signal output period of the ON period setting circuit 169, and a power factor and a higher harmonic component of input current of the dc power-supply unit in case the ON timing generating circuit 164 outputs an ON signal for the transistors 160 and 162 at a certain time point in synchronization with the source voltage of the ac power supply 1 (for example, after a time $T_d$ from a zero crossing point of the source voltage) under a constant load. In FIG. 98, the transverse axis represents a ratio of an ON signal output period $t_{on}$ to a power supply period $T_0$. As in the case of the embodiment 40 described above, it is possible to provide the overall optimal operating point in view of a power factor and a current higher harmonic characteristic shown in FIG. 98. In the embodiment, the ON timing generating circuit 164 and the ON period setting circuit 169 are preset to output the optimal timing and the optimal ON period, respectively. Further, as in the embodiment 40, it must be noted that the ON timing and the ON period may be set depending upon, for example, an operating point to maximize the power factor, or another operating point to minimize a specific higher harmonic current of the input current.

In addition, as in the embodiment 40, it is to be understood that an arrangement of the transistors should not be limited.

Embodiment 43

Figure 99:
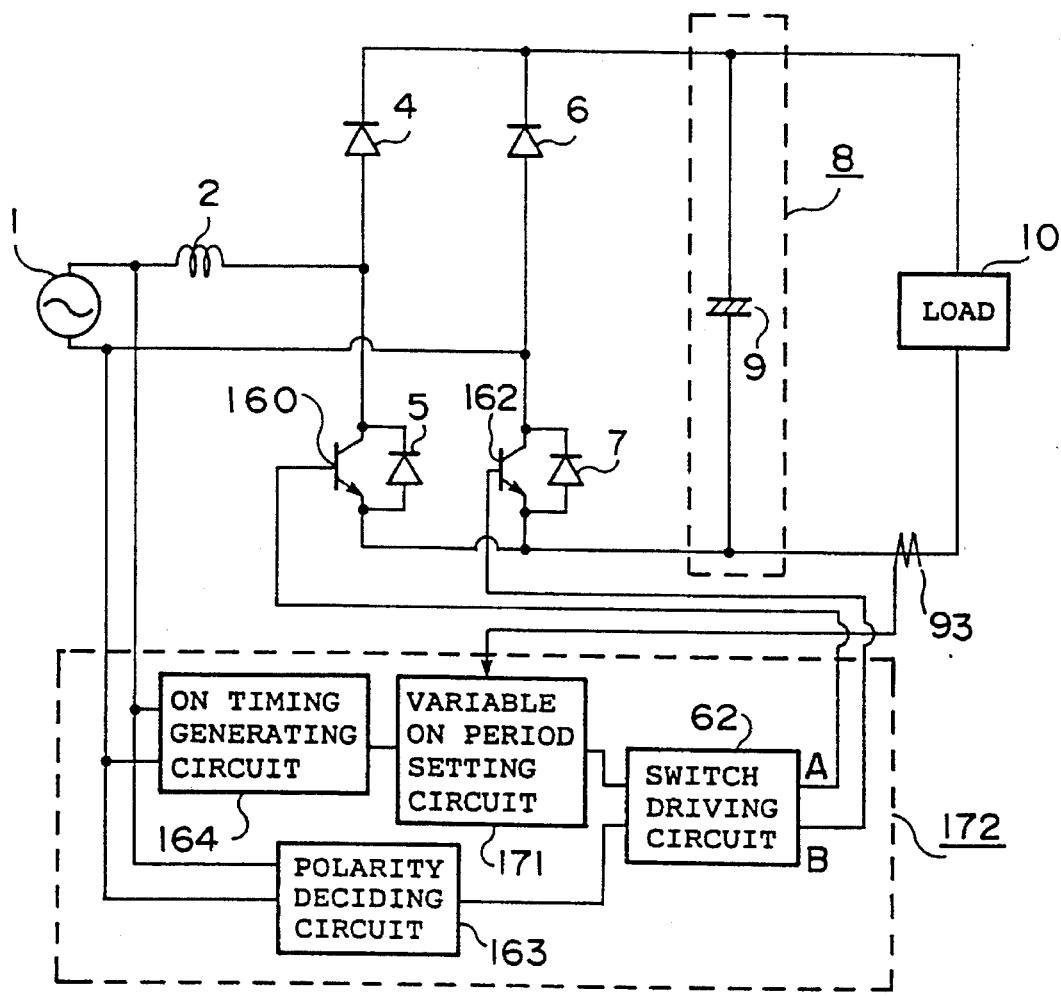
FIG. 99 is a circuit diagram showing another embodiment of the dc power-supply unit according to the twenty-third aspect of the present invention.

FIG. 99 is a circuit diagram showing another embodiment according to the twenty-third aspect of the present invention. In FIG. 99, reference numeral 171 is a variable ON period setting circuit to use an output signal from an ON timing generating circuit 164 as a trigger, and set an ON period for transistors 160 and 162 according to a load condition detected by a current sensor 93, and 172 is a switch controlling circuit including a polarity deciding circuit 163, the ON timing generating circuit 164, the variable ON period setting circuit 171, and a switch driving circuit 62.

A description will now be given of the operation. As in the embodiment 40 described before, the polarity deciding circuit 163 detects the polarity of the voltage of the ac power supply 1, and drives the transistors 160 when the polarity of the voltage is positive or drives the transistor 162 when the polarity of the voltage is negative. The ON timing generating circuit 164 outputs an ON timing signal in synchronization with the source voltage of the ac power supply 1 and according to timing which is delayed by a preset time $T_d$ immediately after the source voltage passes through a zero point. Consequently, the variable ON period setting circuit 171 outputs a signal to close the transistors 160 and 162 only for a period set according to the load condition detected by the current sensor 93 through the switch driving circuit 62. When the transistor 160 or 162 is closed, as in the embodiment 40 described before, the ac power supply 1 is short-circuited through a reactor 2 and a diode bridge 7 (or a diode bridge 5) to conduct current, and the current gradually increases. Subsequently, when the ON period of the transistors 160 and 162 is terminated to open the transistor 160 or 162, the short-circuit current which has been flowing in the reactor 2 becomes the charging current in a capacitor 9 of a smoothing circuit 8, and starts to decrease. Thereafter, when the source voltage of the ac power supply 1 is in the vicinity of peak voltage, the diode bridges 4, 7 (or the diode bridges 5, 6) cause the charging current in the capacitor 9 to flow through the reactor 2.

Figure 100:
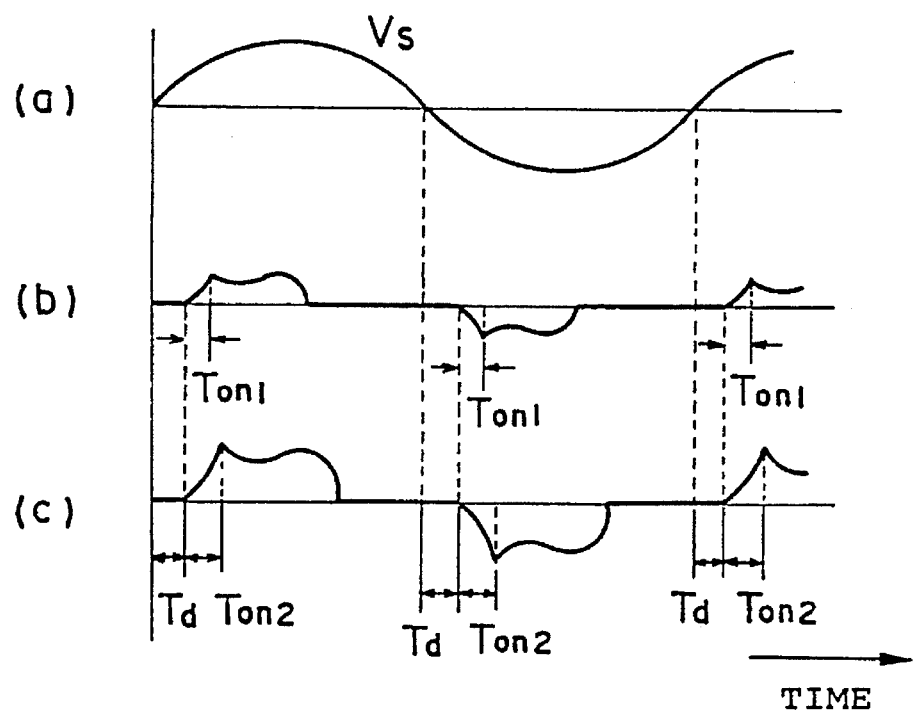
FIG. 100 is an operating waveform diagram showing the operating waveform in each part.

At this time, there are provided a source voltage waveform of the ac power supply 1 shown in FIG. 100(a), and input current waveforms of the dc power-supply unit under a light load and a heavy load as shown in FIG. 100(b) and 100(c), respectively. As seen from FIG. 100, the operation is controlled so as to have a shorter ON signal output period of the variable ON period setting circuit 171 under a light load than the ON signal output period under a heavy load.

Figure 101:
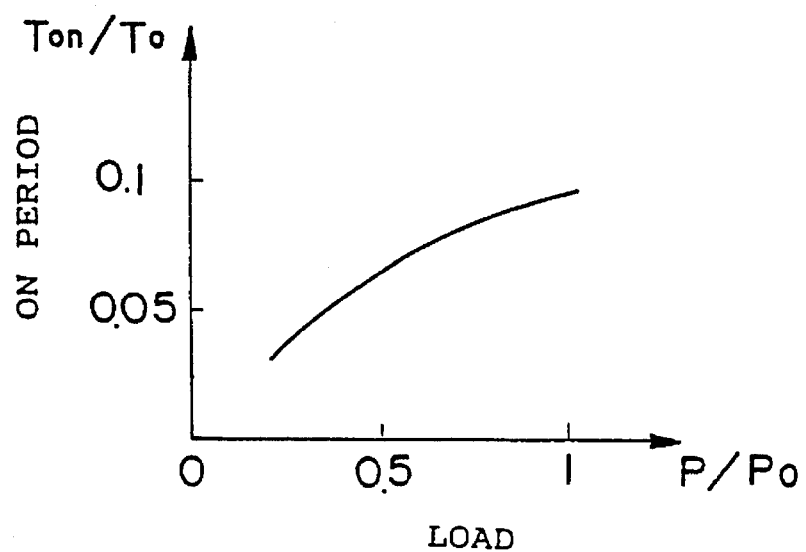
FIG. 101 is a graph diagram showing the relation between the load and the ON timing.

FIG. 101 is a diagram showing a relationship between a load, and the ON period serving as the overall optimal operating point in view of a power factor and a current higher harmonic characteristic in case the ON timing generating circuit 164 generates the ON signal for the transistor 160 or 162 at a certain time point in synchronization with the source voltage of the ac power supply 1 (for example, a time point which is delayed by one-twentieth of source voltage period from the zero crossing point of the source voltage). In FIG. 101, the transverse axis represents a load normalized by rated load $P_0$, and the ordinate axis represents the ON period $T_{ON}$ normalized by a power supply period $T_0$. In the embodiment, an ON signal output interval of the variable ON period setting circuit 171 can be controlled according to the load condition based upon the relationship shown in FIG. 101. Further, it must be noted that the ON signal output interval of the variable ON period setting circuit 171 may be controlled according to the purpose. That is, while a particular weight is given to the power factor, the ON signal output interval may be controlled according to the load condition. Alternatively, while the particular weight is given to the current higher harmonic characteristic, the ON signal output interval may be controlled according to the load condition.

In addition, as in the embodiment 41, it is to be understood that the present invention should not be limited to the load current detecting means as means for detecting the magnitude of the load condition. For example, it is also possible to detect the magnitude of the load condition by using voltage fluctuation in the capacitor 9 of the smoothing circuit 8, or the input current of the dc power-supply unit.

Besides, as in the embodiment 40, it must be noted that an arrangement of the transistors should not be limited.

Embodiment 44

Figure 102:
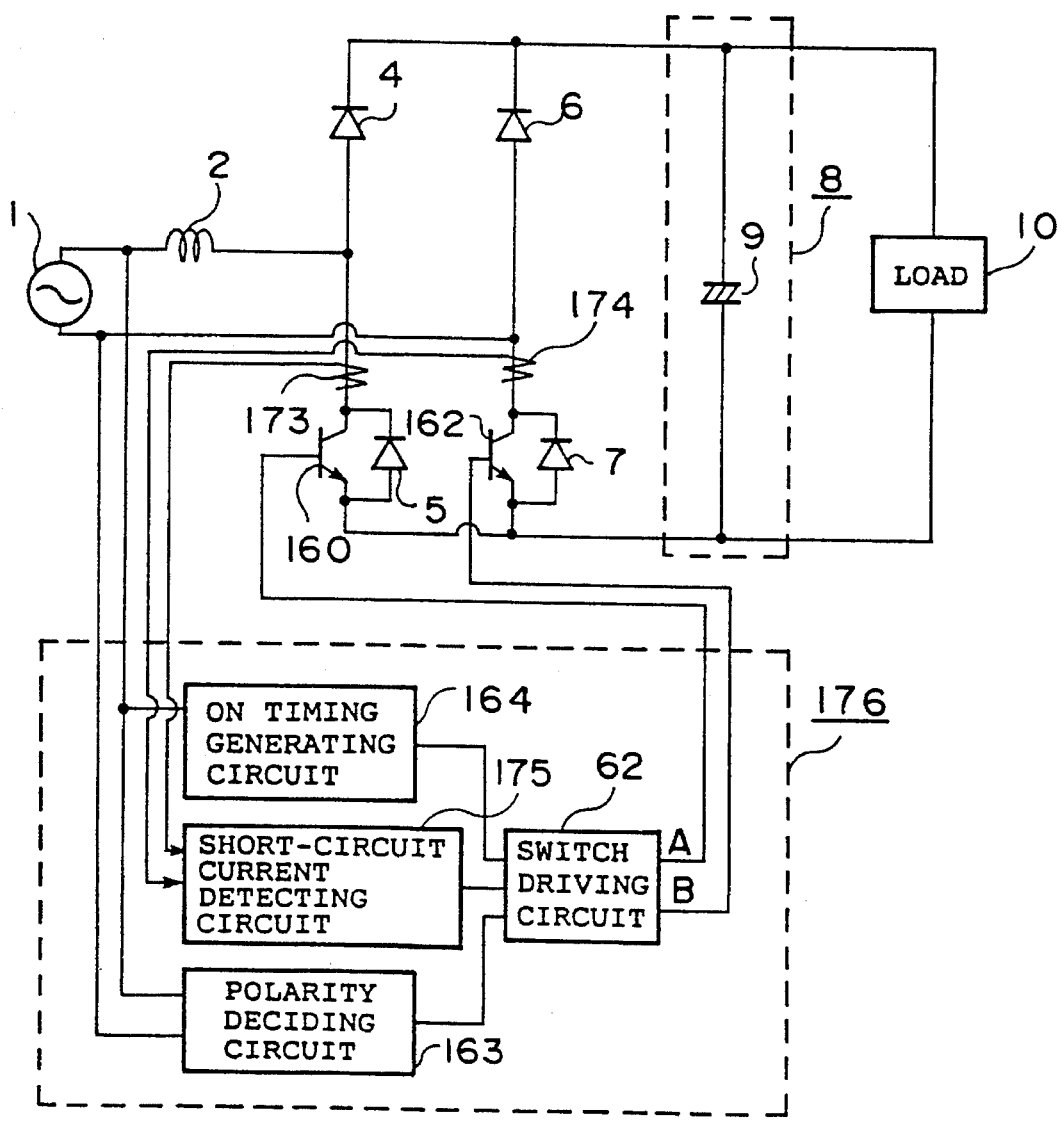
FIG. 102 is a circuit diagram showing another embodiment of the dc power-supply unit according to the twenty-third aspect of the present invention.

FIG. 102 is a circuit diagram showing another embodiment according to the twenty-third aspect of the present invention. In FIG. 102, reference numeral 173 is a current sensor to detect short-circuit current which flows in a reactor 2 when a transistor 160 is closed, 174 is a current sensor to detect short-circuit current which flows in the reactor 2 when a transistor 162 is closed, 175 is a short-circuit detecting circuit to output an OFF signal for the transistor 160 or 162 when an output from the current sensors 173 and 174 reaches a preset value, and 176 is a switch controlling circuit including a polarity deciding circuit 163, an ON timing generating circuit 164, a short-circuit current detecting circuit 175, and a switch driving circuit 62.

A description will now be given of the operation. As in the embodiment 40 described before, the polarity deciding circuit 163 detects the polarity of the voltage of an ac power supply 1, and drives the transistors 160 when the polarity of the voltage is positive or drives the transistor 162 when the polarity of the voltage is negative. The ON timing generating circuit 164 outputs an ON timing signal in synchronization with the source voltage of the ac power supply 1 and according to timing which is delayed by a preset-time $T_d$ immediately after the source voltage passes through a zero point. The ON timing signal is output through the switch driving circuit 62 to close the transistors 160 and 162. When the transistor 160 or 162 is closed, as in the embodiment 40 described before, the ac power supply 1 is short-circuited through a reactor 2 and a diode bridge 7 (or a diode bridge 5) to conduct current, and the current gradually increases. When the short-circuit current increases and reaches the preset value, the short-circuit detecting circuit 175 outputs the OFF signal for the transistor 160 or 162 through the switch driving circuit 62 to open the transistors 160 and 162. Subsequently, the short-circuit current which has been flowing in the reactor 2 becomes the charging current in a capacitor 9 of a smoothing circuit 8, and starts to decrease. Thereafter, when the source voltage of the ac power supply 1 is in the vicinity of peak voltage, the diode bridges 4, 7 (or the diode bridges 5, 6) cause the charging current in the capacitor 9 to flow through the reactor 2.

At this time, there are provided a source voltage waveform of the ac power supply 1, and input current waveforms of the dc power-supply unit under a light load and a heavy load as in the embodiment 40 shown in FIG. 88.

Figure 103:
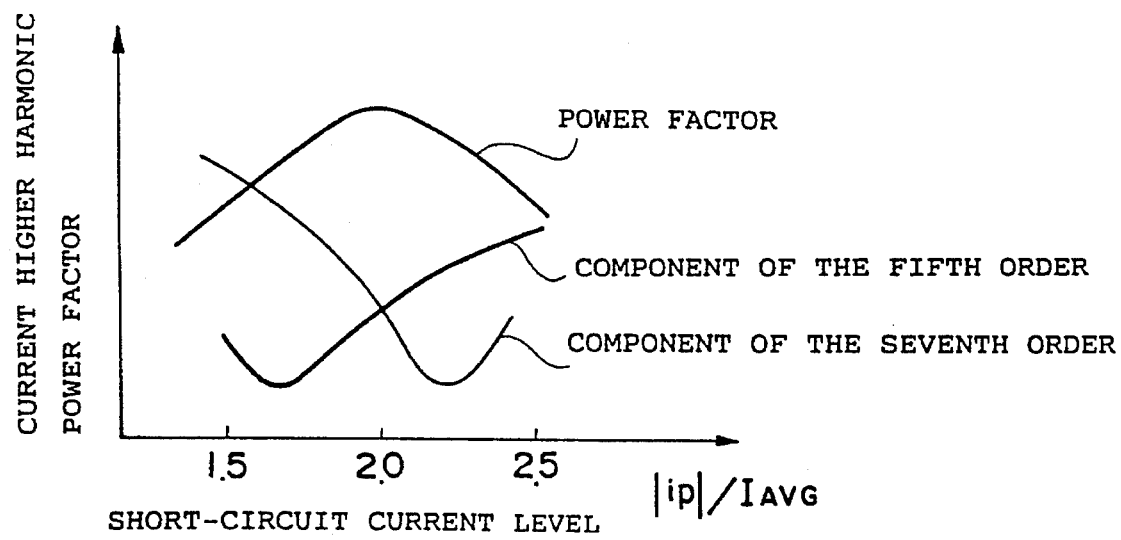
FIG. 103 is a graph diagram showing a relation between the short-circuit current level, and the power factor and the higher harmonic component.

FIG. 103 is a diagram showing a relationship between a short-circuit current level to generate the OFF signal for the transistor 160 or 162, and a power factor and a higher harmonic component of input current of the dc power-supply unit in case the ON timing generating circuit 164 outputs an ON signal for the transistors 160 and 162 at a certain time point in synchronization with the source voltage of the ac power supply 1 (for example, after a time $T_d$ from a zero crossing point of the source voltage) under a constant load. In FIG. 103, the transverse axis represents a rate of the short-circuit current level $i_p$ to generate the OFF signal for the transistor 160 or 162 to average output current $I_{AVG}$ of the dc power-supply unit under the maximum load. Thus, it is possible to provide the overall optimal operating point in view of a power factor and a current higher harmonic characteristic shown in FIG. 103. In the invention, the ON timing generating circuit 164 and the short-circuit current detecting circuit 175 are preset to output the optimal timing and the optimal short-circuit current level, respectively. Further, it must be noted that the ON timing and the short-circuit current level may be set depending upon, for example, an operating point to maximize the power factor, or another operating point to minimize a specific higher harmonic current of the input current.

In addition, as in the embodiment 40, it is to be understood that an arrangement of the transistors should not be limited.

Embodiment 45

Figure 104:
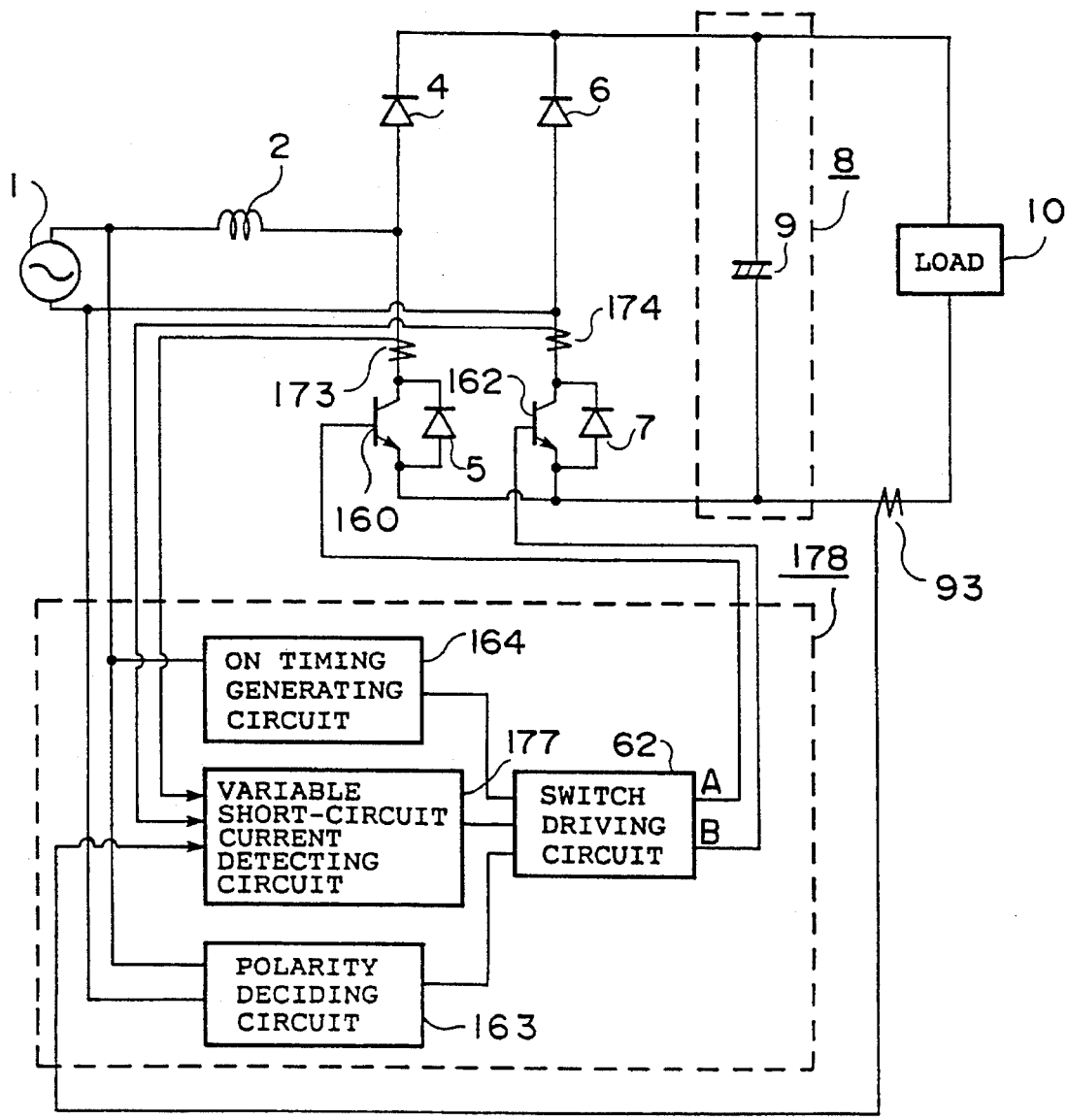
FIG. 104 is a circuit diagram showing another embodiment of the dc power-supply unit according to the twenty-third aspect of the present invention.

FIG. 104 is a circuit diagram showing another embodiment according to the twenty-third aspect of the present invention. In FIG. 104, reference numeral 177 is a variable short-circuit current detecting circuit to output an OFF signal for transistors 160 and 162 when an output from current sensor 173 or 174 reaches a value which is set according to a load condition detected by a current sensor 93, and 178 is a switch controlling circuit including a polarity deciding circuit 163, an ON timing generating circuit 164, the variable short-circuit current detecting circuit 177, and a switch driving circuit 62.

A description will now be given of the operation. As in the embodiment 40 described before, the polarity deciding circuit 163 detects the polarity of the voltage of the ac power supply 1, and drives the transistors 160 when the polarity of the voltage is positive or drives the transistor 162 when the polarity of the voltage is negative. The ON timing generating circuit 164 outputs an ON signal in synchronization with the source voltage of the ac power supply 1 and according to timing which is delayed by a preset time $T_d$ immediately after the source voltage passes through a zero point. The ON signal is output through the switch driving circuit 62 to close the transistors 160 and 162. When the transistor 160 or 162 is closed, as in the embodiment 40 described before, the ac power supply 1 is short-circuited through a reactor 2 and a diode bridge 7 (or a diode bridge 5) to conduct current, and the current gradually increases. When the short-circuit current increases so that a detected value of the current sensor 173 or 174 reaches a value which is set according to the load condition detected by the current sensor 93, the variable short-circuit detecting circuit 177 outputs the OFF signal for the transistor 160 or 162 through the switch driving circuit 62 to open the transistors 160 and 162. Subsequently, the short-circuit current which has been flowing in the reactor 2 becomes the charging current in a capacitor 9 of a smoothing circuit 8, and starts to decrease. Thereafter, when the source voltage of the ac power supply 1 is in the vicinity of peak voltage, diode bridges 4, 7 (or diode bridges 5, 6) cause the charging current in the capacitor 9 to flow through the reactor 2.

Figure 105:
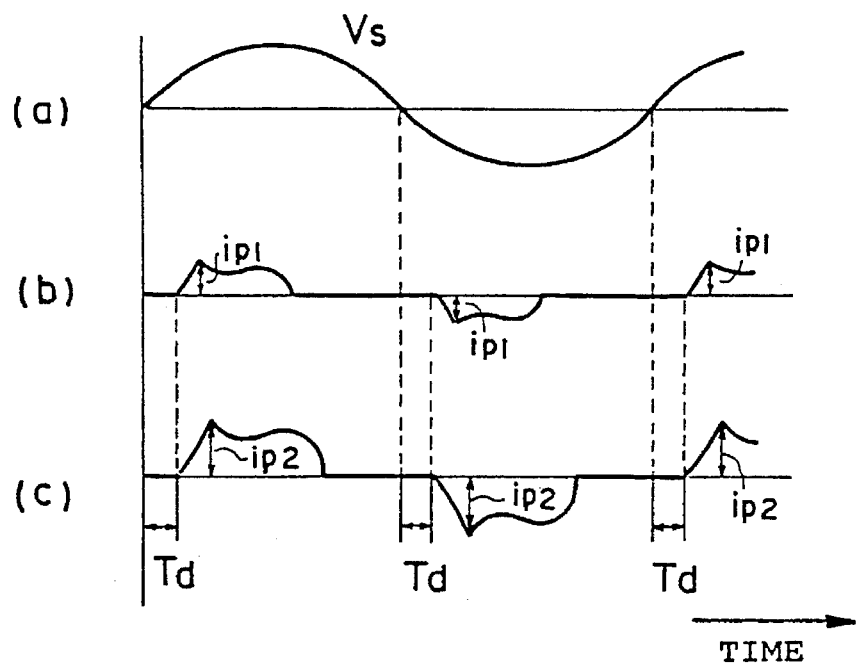
FIG. 105 is an operating waveform diagram showing the operating waveform in each part.

At this time, there are provided a source voltage waveform of the ac power supply 1 (FIG. 105(a), and input current waveforms of the dc power-supply unit under a light load and a heavy load as shown in FIG. 105(b) and 105(c), respectively. As seen from FIG. 105, the operation is controlled so as to have a lower short-circuit current setting level of the variable short-circuit current detecting circuit 177 under a light load than the short-circuit current setting level under a heavy load.

Figure 106:
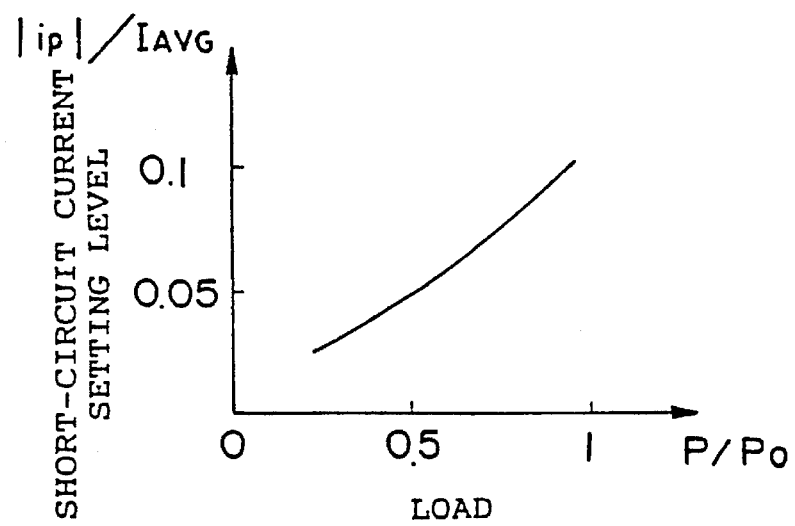
FIG. 106 is a graph diagram showing a relation between the load and the short-circuit current level.

FIG. 106 is a diagram showing a relationship between a load, and the short-circuit current setting level serving as the overall optimal operating point in view of a power factor and a current higher harmonic characteristic in case the ON timing generating circuit 164 generates the ON signal for the transistor 160 or 162 at a certain time point in synchronization with the source voltage of the ac power supply 1 (for example, a time point which is delayed by one-twentieth of source voltage period from a zero crossing point of the source voltage). In FIG. 106, the transverse axis represents a load normalized by rated load $P_0$, and the ordinate axis represents the short-circuit setting level normalized by average current $I_{AVG}$ under the maximum load. In the invention, the short-circuit current setting level of the variable short-circuit current setting circuit 177 can be controlled according to the load condition based upon the relation shown in FIG. 106. Further, it must be noted that the short-circuit current setting level of the variable short-circuit current setting circuit 177 may be controlled according to the purpose. That is, while a particular weight is given to the power factor, the short-circuit current setting level may be controlled according to the load condition. Alternatively, while the particular weight is given to the current higher harmonic characteristic, the short-circuit current setting level may be controlled according to the load condition.

In addition, as in the embodiment 41, it is to be understood that the present invention should not be limited to the load current detecting means as means for detecting the magnitude of the load condition. For example, it is also possible to detect the magnitude of the load condition by using voltage fluctuation in the capacitor 9 of the smoothing circuit 8, or the input current of the dc power-supply unit. Besides, as in the embodiment 40, it must be noted that an arrangement of the transistors should not be limited.

Embodiment 46

Figure 107:
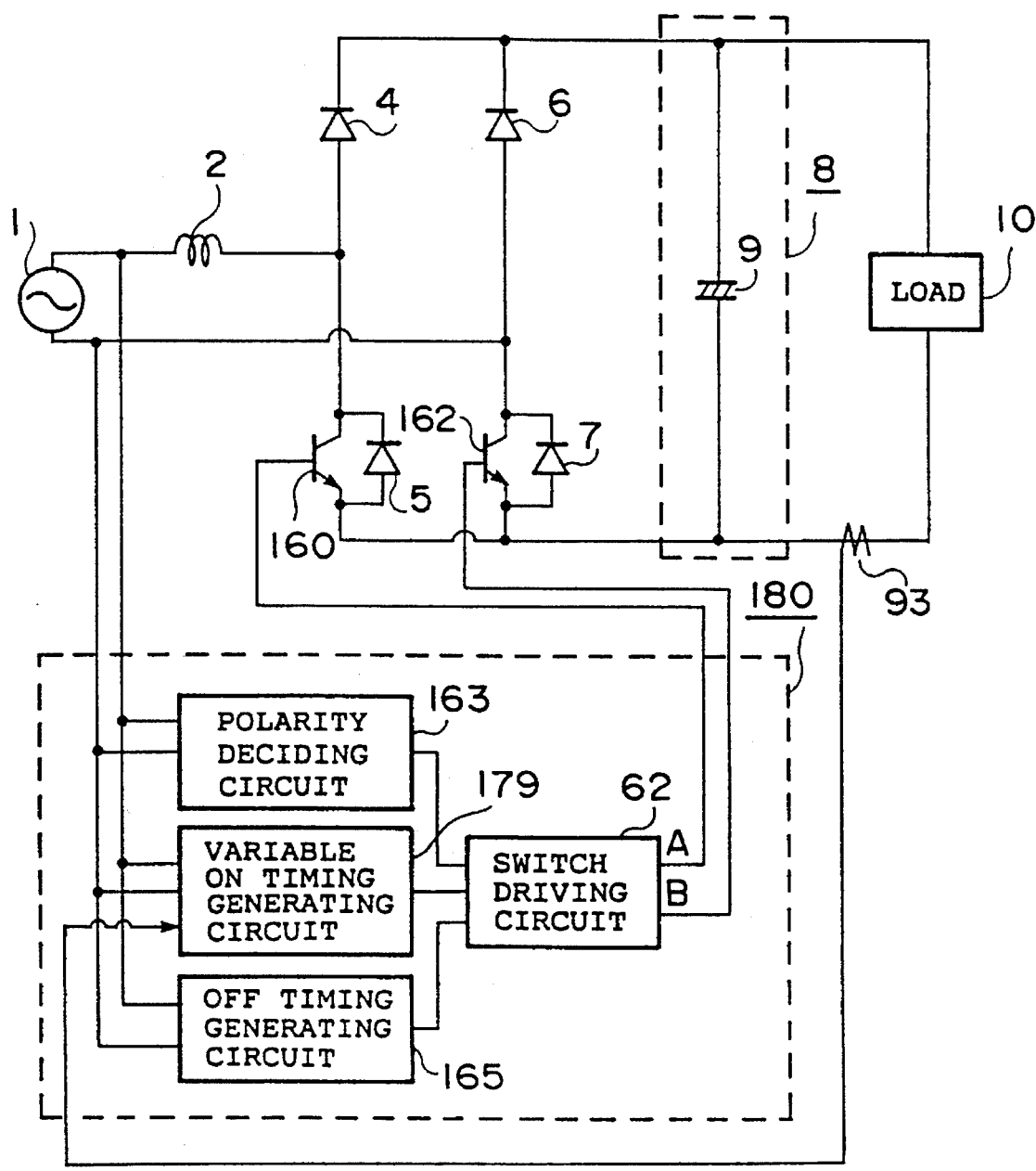
FIG. 107 is a circuit diagram showing another embodiment of the dc power-supply unit according to the twenty-third aspect of the present invention.

FIG. 107 is a circuit diagram showing another embodiment according to the twenty-third aspect of the present invention. In FIG. 107, reference numeral 179 is a variable ON timing generating circuit to generate an ON signal for transistors 160 and 162 in synchronization with the source voltage and according to timing in accordance with a load condition detected by a current sensor 93, and 180 is a switch controlling circuit including a polarity deciding circuit 163, the variable ON timing generating circuit 179, an OFF timing generating circuit 165, and a switch driving circuit 62.

A description will now be given of the operation. As in the embodiment 40 described before, the polarity deciding circuit 163 detects the polarity of the voltage of an ac power supply 1, and drives the transistors 160 when the polarity of the voltage is positive or drives the transistor 162 when the polarity of the voltage is negative. The variable ON timing generating circuit 179 outputs an ON signal through the switch driving circuit 62 in synchronization with the source voltage of the ac power supply 1 and according to the load condition detected by the current sensor 93. Accordingly, the transistor 160 or 162 is closed so that the ac power supply 1 is short-circuited through a reactor 2 and a diode bridge 7 (or a diode bridge 5) to conduct current, and the current gradually increases. Subsequently, the OFF timing generating circuit 165 outputs the OFF signal through the switch driving circuit 62 in synchronization with the source voltage, resulting in opening the transistors 160 and 162. Thus, the short-circuit current which has been flowing in the reactor 2 becomes the charging current in a capacitor 9 of a smoothing circuit 8, and starts to decrease. Thereafter, when the source voltage of the ac power supply 1 is in the vicinity of the peak voltage, the diode bridges 4, 7 (or the diode bridges 5, 6) cause the charging current in the capacitor 9 to flow through the reactor 2.

Figure 108:
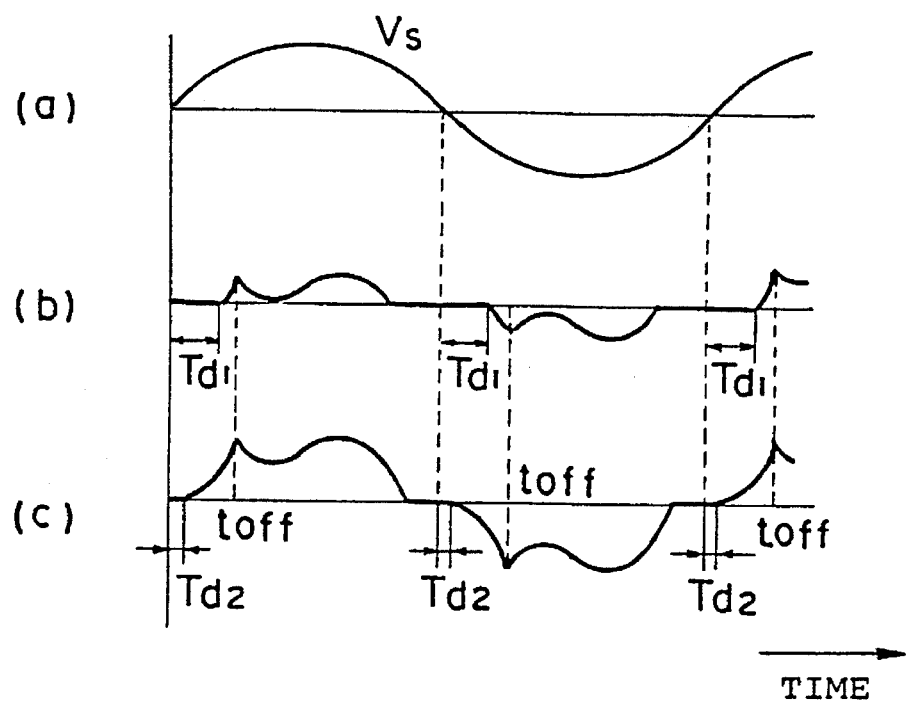
FIG. 108 is an operating waveform diagram showing the operating waveform in each part.

At this time, there are provided a source voltage waveform of the ac power supply 1 (FIG. 108(a)), and input current waveforms of the dc power-supply unit under a light load and a heavy load as shown in FIG. 108(b) and 108(c), respectively. As seen from FIG. 108, the operation is controlled so as to have a later ON signal output timing of the variable ON timing generating circuit 179 under a light load than the ON signal output timing the under a heavy load.

Figure 109:
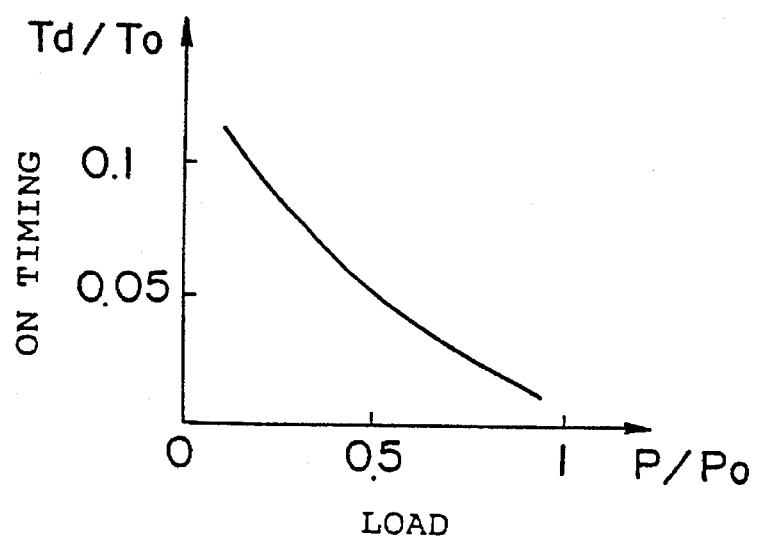
FIG. 109 is a graph diagram showing the relation between the load and the ON timing.

FIG. 109 is a diagram showing a relationship between a load, and the short-circuit current setting level serving as the overall optimal operating point in view of a power factor and a current higher harmonic characteristic in case the OFF timing generating circuit 165 generates an OFF signal for the transistor 160 or 162 at a certain time point in synchronization with the source voltage of the ac power supply 1 (for example, a time point which is delayed by one-tenth of source voltage period from a zero crossing point of the source voltage). In FIG. 109, the transverse axis represents a load normalized by rated load $P_0$, and the ordinate axis represents ON signal output timing normalized by a power supply period $T_0$. In the embodiment, output timing of the variable ON timing generating circuit 179 can be controlled according to the load condition based upon the relationship shown in FIG. 109. Further, it must be noted that the output timing of the variable ON timing generating circuit 179 may be controlled according to the purpose. That is, while a particular weight is given to the power factor, the output timing may be controlled according to the load condition. Alternatively, while the particular weight is given to the current higher harmonic characteristic, the output timing may be controlled according to the load condition.

In addition, as in the embodiment 41, it is to be understood that the present invention should not be limited to the load current detecting means as means for detecting the magnitude of the load condition. For example, it is also possible to detect the magnitude of the load condition by using voltage fluctuation in the capacitor 9 of the smoothing circuit 8, or the input current of the dc power-supply unit. Besides, as in the embodiment 40, it must be noted that an arrangement of the transistors should not be limited.

Embodiment 47

Figure 110:
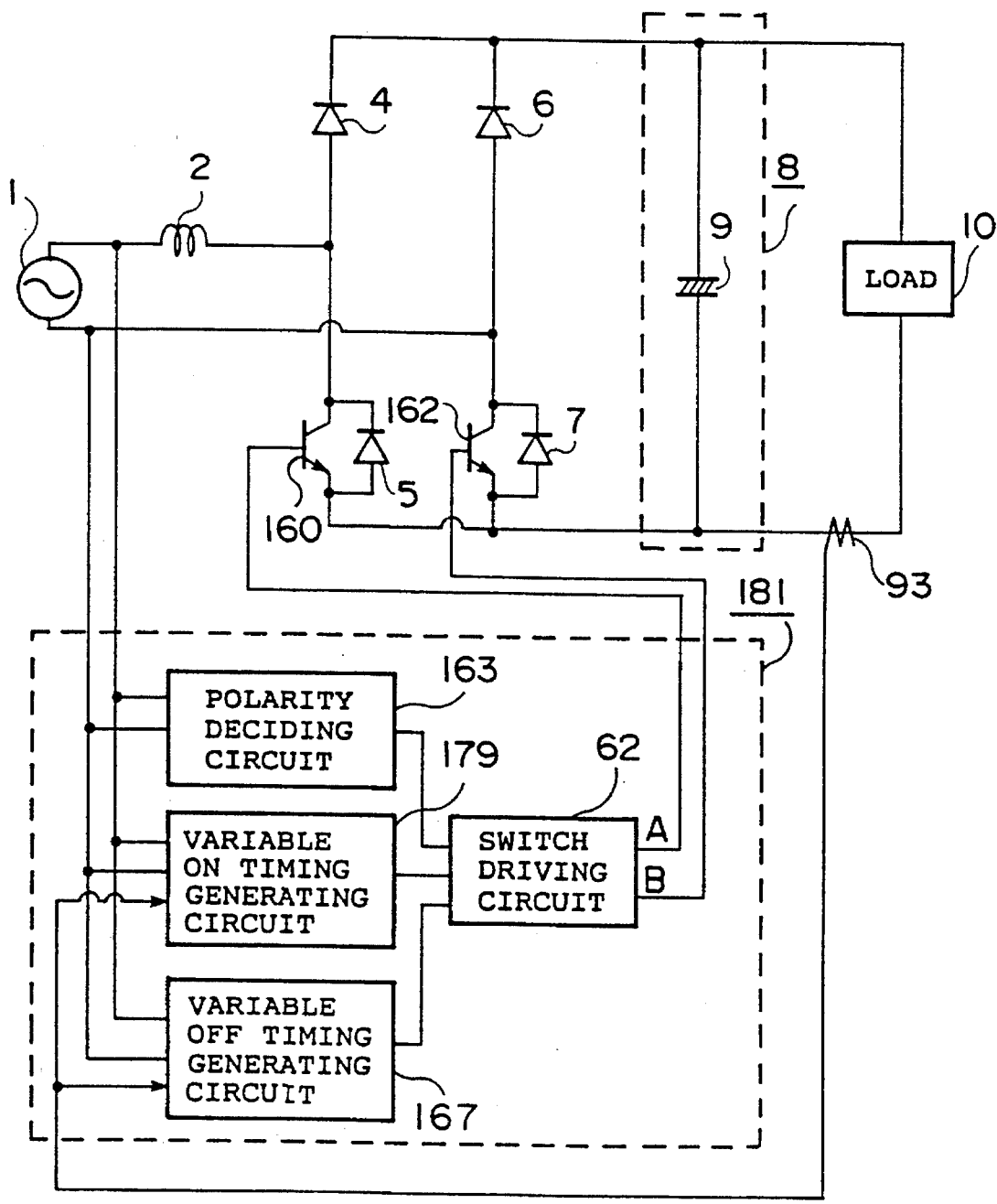
FIG. 110 is a circuit diagram showing another embodiment of the dc power-supply unit according to the twenty-third aspect of the present invention.

FIG. 110 is a circuit diagram showing another embodiment according to the twenty-third aspect of the present invention. In FIG. 110, reference numeral 181 is a switch controlling circuit including a polarity deciding circuit 163, a variable ON timing generating circuit 179, a variable OFF timing generating circuit 167, and a switch driving circuit 62.

A description will now be given of the operation. As in the embodiment 40 described before, the polarity deciding circuit 163 detects the polarity of the voltage of the ac power supply 1, and drives a transistor 160 when the polarity of the voltage is positive or drives a transistor 162 when the polarity of the voltage is negative. The variable ON timing generating circuit 179 outputs an ON signal through the switch driving circuit 62 in synchronization with the source voltage of the ac power supply 1 and according to the load condition detected by a current sensor 93. Accordingly, the transistor 160 or 162 is closed so that the ac power supply 1 is short-circuited through a reactor 2 and a diode bridge 7 (or a diode bridge 5) to conduct current, and the current gradually increases. Subsequently, the variable OFF timing generating circuit 167 outputs the OFF signal through the switch driving circuit 62 in synchronization with the source voltage and according to the load condition detected by a current sensor 93, resulting in opening the transistors 160 and 162. Thus, the short-circuit current which has been flowing in the reactor 2 becomes the charging current in a capacitor 9 of a smoothing circuit 8, and starts to decrease. Thereafter, when the source voltage of the ac power supply 1 is in the vicinity of peak voltage, the diode bridges 4, 7 (or the diode bridges 5, 6) cause the charging current in the capacitor 9 to flow through the reactor 2.

At this time, there are provided a source voltage waveform of the ac power supply 1 (FIG. 111(a)), and input current waveforms of the dc power-supply unit under a light load and a heavy load as shown in FIG. 111(b) and 111(c), respectively. In the embodiment, each output timing of the variable ON timing generating circuit 179 and the variable OFF timing generating circuit 167 can be controlled according to the load condition so as to serve as the overall optimal operating point in view of a power factor and a current higher harmonic characteristic. Further, it must be noted that the output timing of the variable ON timing generating circuit 179 and the variable OFF timing generating circuit 167 may be controlled according to the purpose. That is, while a particular weight is given to the power factor, the output timing may be controlled according to the load condition. Alternatively, while the particular weight is given to the current higher harmonic characteristic, the output timing may be controlled according to the load condition.

In addition, as in the embodiment 41, it is to be understood that the present invention should not be limited to the load current detecting means as means for detecting the magnitude of the load condition. For example, it is also possible to detect the magnitude of the load condition by using voltage fluctuation in the capacitor 9 of the smoothing circuit 8, or the input current of the dc power-supply unit. Besides, as in the embodiment 40, it must be noted that an arrangement of the transistors should not be limited.

Embodiment 48

Figure 112:
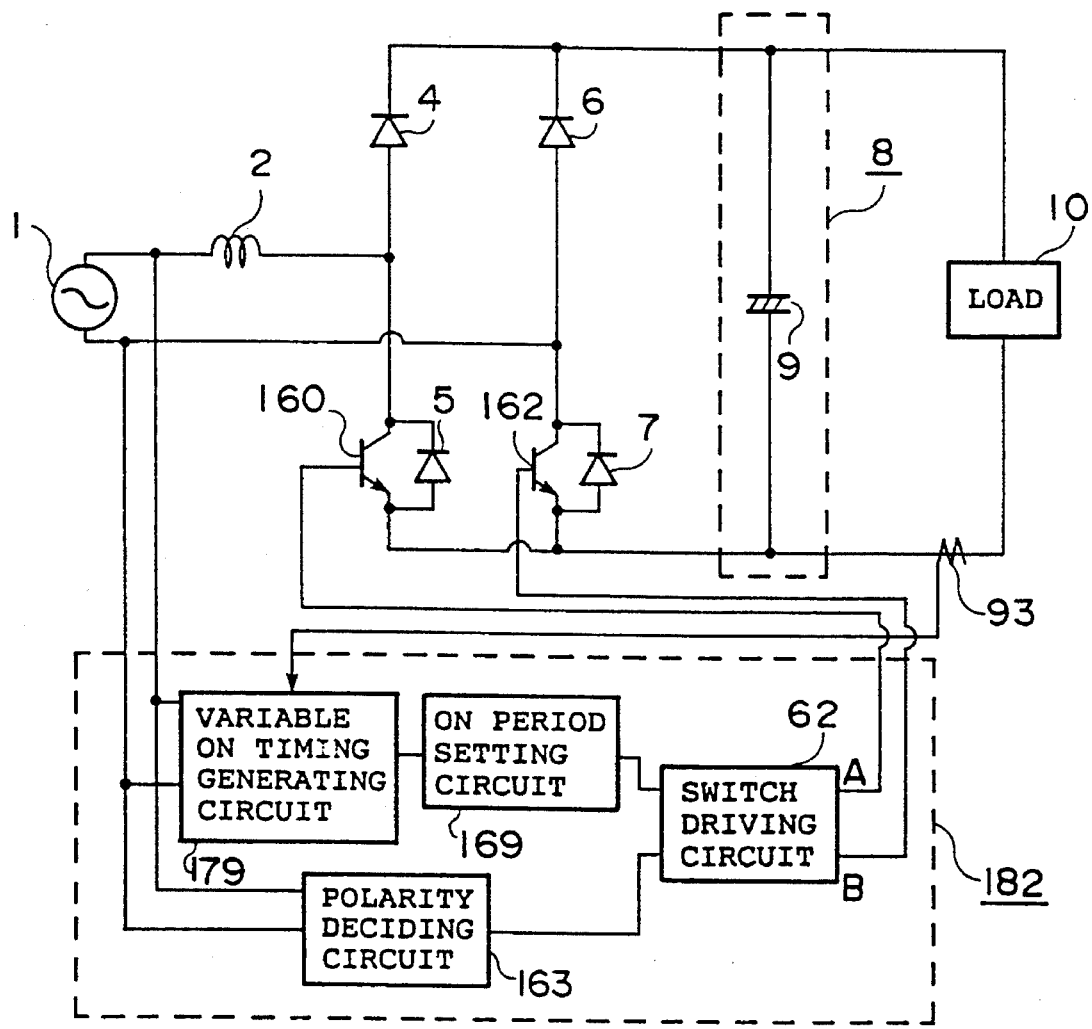
FIG. 112 is a circuit diagram showing another embodiment of the dc power-supply unit according to the twenty-third aspect of the present invention.

FIG. 112 is a circuit diagram showing another embodiment according to the twenty-third aspect of the present invention. In FIG. 112, reference numeral 182 is a switch controlling circuit including a polarity deciding circuit 163, a variable ON timing generating circuit 179, an ON period setting circuit 169, and a switch driving circuit 62.

A description will now be given of the operation. As in the embodiment 40 described before, the polarity deciding circuit 163 detects the polarity of the voltage of an ac power supply 1, and drives a transistor 160 when the polarity of the voltage is positive or drives a transistor 162 when the polarity of the voltage is negative. The variable ON timing generating circuit 179 outputs an ON signal through the switch driving circuit 62 in synchronization with the source voltage of the ac power supply 1 and according to the load condition detected by the current sensor 93. Accordingly, the transistor 160 or 162 is closed so that short-circuit current starts to flow from the ac power supply 1 through a reactor 2 and a diode bridge 7 (or a diode bridge 5) only for a period which is preset by the ON period setting circuit 169, and the short-circuit current gradually increases. Subsequently, when the ON period is terminated, the transistors 160 and 162 are opened so that the short-circuit current which has been flowing in the reactor 2 becomes the charging current in a capacitor 9 of a smoothing circuit 8, and starts to decrease. Thereafter, when the source voltage of the ac power supply 1 is in the vicinity of peak voltage, the diode bridges 4, 7 (or the diode bridges 5, 6) cause the charging current in the capacitor 9 to flow through the reactor 2.

Figure 113:
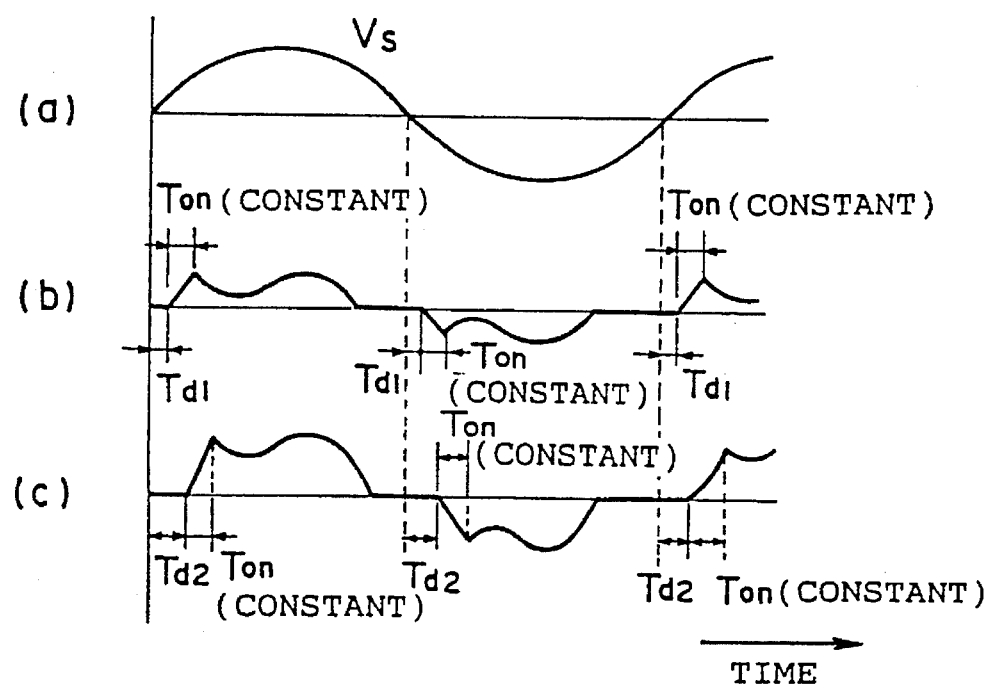
FIG. 113 is an operating waveform diagram showing the operating waveform in each part.

At this time, there are provided a source voltage waveform of the ac power supply 1 (FIG. 113(a), and input current waveforms of the dc power-supply unit under a light load and a heavy load as shown in FIG. 113(b) and 113(c) respectively. As seen from FIG. 113, the operation is controlled so as to have an earlier ON signal output timing of the variable ON timing generating circuit 179 under a light load than the ON signal output timing under a heavy load.

Figure 114:
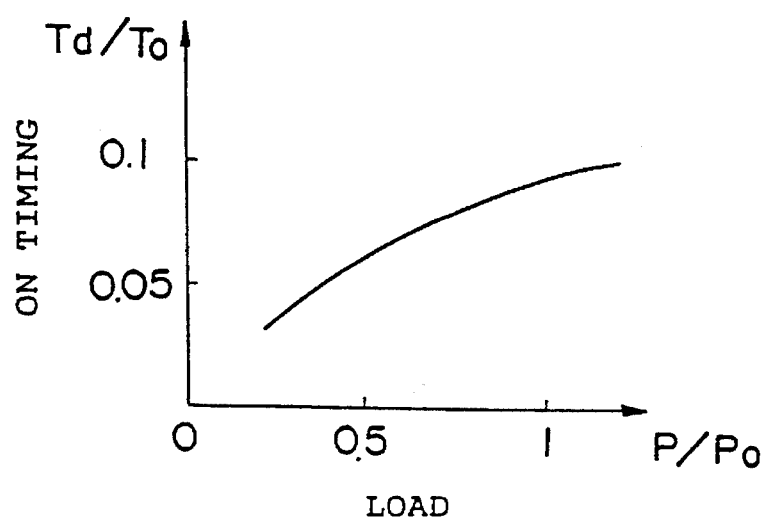
FIG. 114 is a graph diagram showing the relation between the load and the ON timing.

FIG. 114 is a diagram showing a relationship between a load, and the ON signal output timing serving as the overall optimal operating point in view of a power factor and a current higher harmonic characteristic, that is, a delay time $T_d$ from a zero crossing point of the source voltage in case an ON signal output period of the ON period setting circuit 169 is set to a certain period (for example, one-twentieth of source voltage period). In FIG. 114, the transverse axis represents a load normalized by rated load $P_0$, and the ordinate axis represents an ON signal output timing normalized by a power supply period $T_0$. In the embodiment, output timing of the variable ON timing generating circuit 179 can be controlled according to the load condition based upon the relationship shown in FIG. 114. Further, it must be noted that the output timing of the variable ON timing generating circuit 179 may be controlled according to the purpose. That is, while a particular weight is given to the power factor, the output timing may be controlled according to the load condition. Alternatively, while the particular weight is given to the current higher harmonic characteristic, the output timing may be controlled according to the load condition.

In addition, as in the embodiment 41, it is to be understood that the present invention should not be limited to the load current detecting means as means for detecting the magnitude of the load condition. For example, it is also possible to detect the magnitude of the load condition by using voltage fluctuation in the capacitor 9 of the smoothing circuit 8, or the input current of the dc power-supply unit. Besides, as in the embodiment 40, it must be noted that an arrangement of the transistors should not be limited.

Embodiment 49

Figure 115:
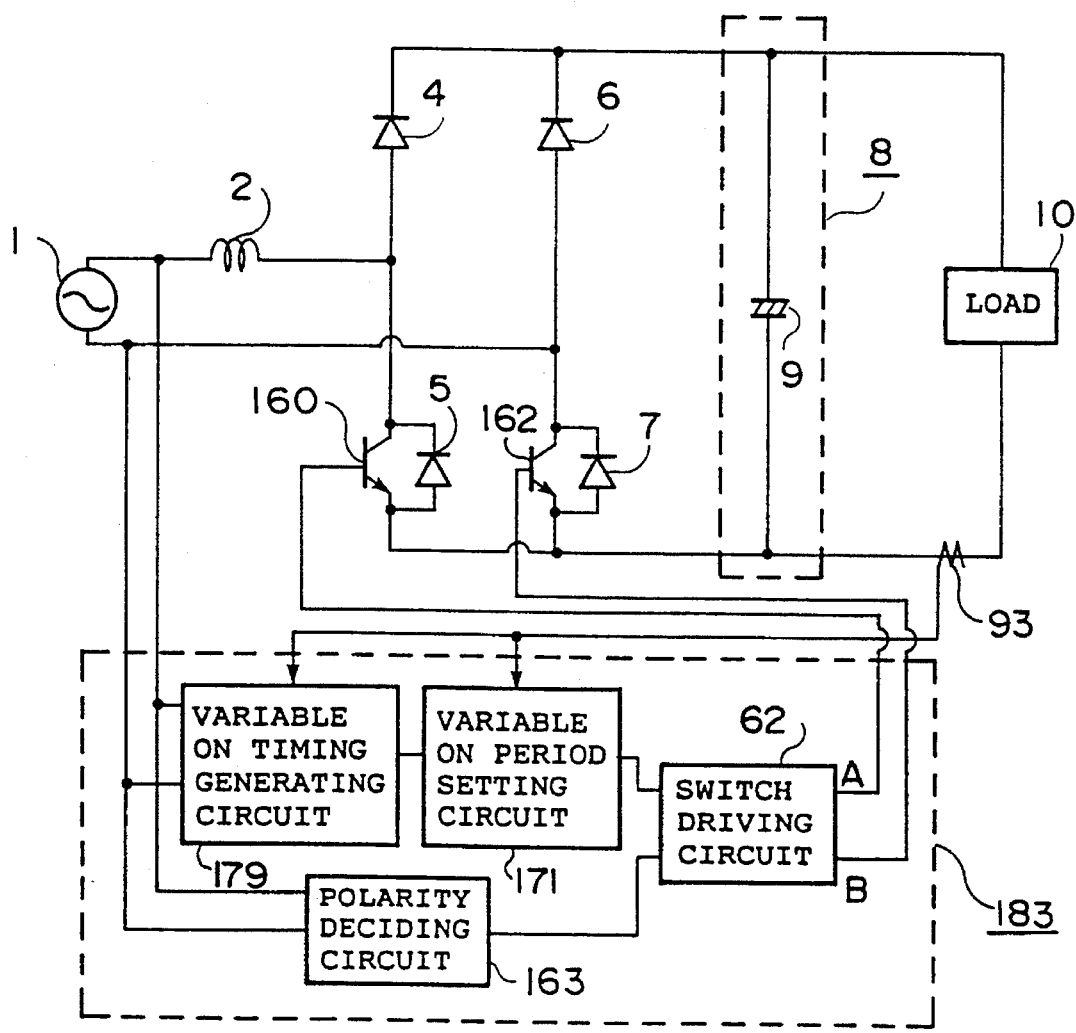
FIG. 115 is a circuit diagram showing another embodiment of the dc power-supply unit according to the twenty-third aspect of the present invention.

FIG. 115 is a circuit diagram showing another embodiment according to the twenty-third aspect of the present invention. In FIG. 115, reference numeral 183 is a switch controlling circuit including a polarity deciding circuit 163, a variable ON timing generating circuit 179, an ON period setting circuit 171, and a switch driving circuit 62.

A description will now be given of the operation. As in the embodiment 40 described before, the polarity deciding circuit 163 detects the polarity of the voltage of an ac power supply 1, and drives a transistor 160 when the polarity of the voltage is positive or drives a transistor 162 when the polarity of the voltage is negative. The variable ON timing generating circuit 179 outputs an ON signal through the switch driving circuit 62 in synchronization with the source voltage of the ac power supply 1 and according to the load condition detected by the current sensor 93. Accordingly, the transistor 160 or 162 is closed so that short-circuit current starts to flow from the ac power supply 1 through a reactor 2 and a diode bridge 7 (or a diode bridge 5) only for a period which is output by the variable ON period setting circuit 171 according to a load condition detected by a current sensor 93, and the short-circuit current gradually increases. Subsequently, when the ON period is terminated, the transistors 160 and 162 are opened so that the short-circuit current which has been flowing in the reactor 2 becomes the charging current in a capacitor 9 of a smoothing circuit 8, and starts to decrease. Thereafter, when the source voltage of the ac power supply 1 is in the vicinity of peak voltage, the diode bridges 4, 7 (or the diode bridges 5, 6) cause the charging current in the capacitor 9 to flow through the reactor 2.

Figure 111:
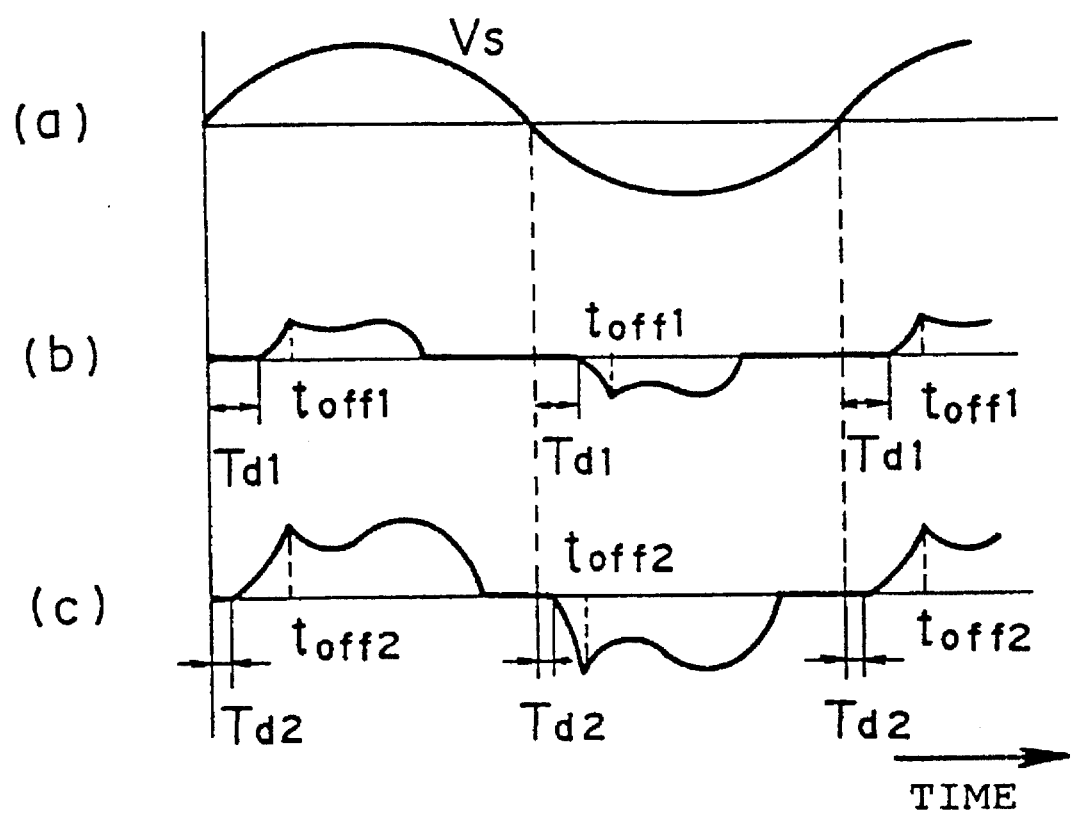
FIG. 111 is an operating waveform diagram showing the operating waveform in each part.

At this time, there are provided a source voltage waveform of the ac power supply 1, and input current waveforms of the dc power-supply unit under a light load and a heavy load as in the embodiment 47 shown in FIG. 111. In the invention, each output timing of the variable ON timing generating circuit 179 and the variable ON period setting circuit 171 can be controlled according to the load condition so as to provide the overall optimal operating point in view of a power factor and a current higher harmonic characteristic. Further, it must be noted that the output timing of the variable ON timing generating circuit 179 and the variable ON period setting circuit 171 may be controlled according to the purpose. That is, while a particular weight is given to the power factor, the output timing may be controlled according to the load condition. Alternatively, while the particular weight is given to the current higher harmonic characteristic, the output timing may be controlled according to the load condition.

In addition, as in the embodiment 41, it is to be understood that the present invention should not be limited to the load current detecting means as means for detecting the magnitude of the load condition. For example, it is also possible to detect the magnitude of the load condition by using voltage fluctuation in a capacitor 9 of a smoothing circuit 8, or the input current of the dc power-supply unit. Besides, as in the embodiment 40, it must be noted that an arrangement of the transistors should not be limited.

Embodiment 50

Figure 116:
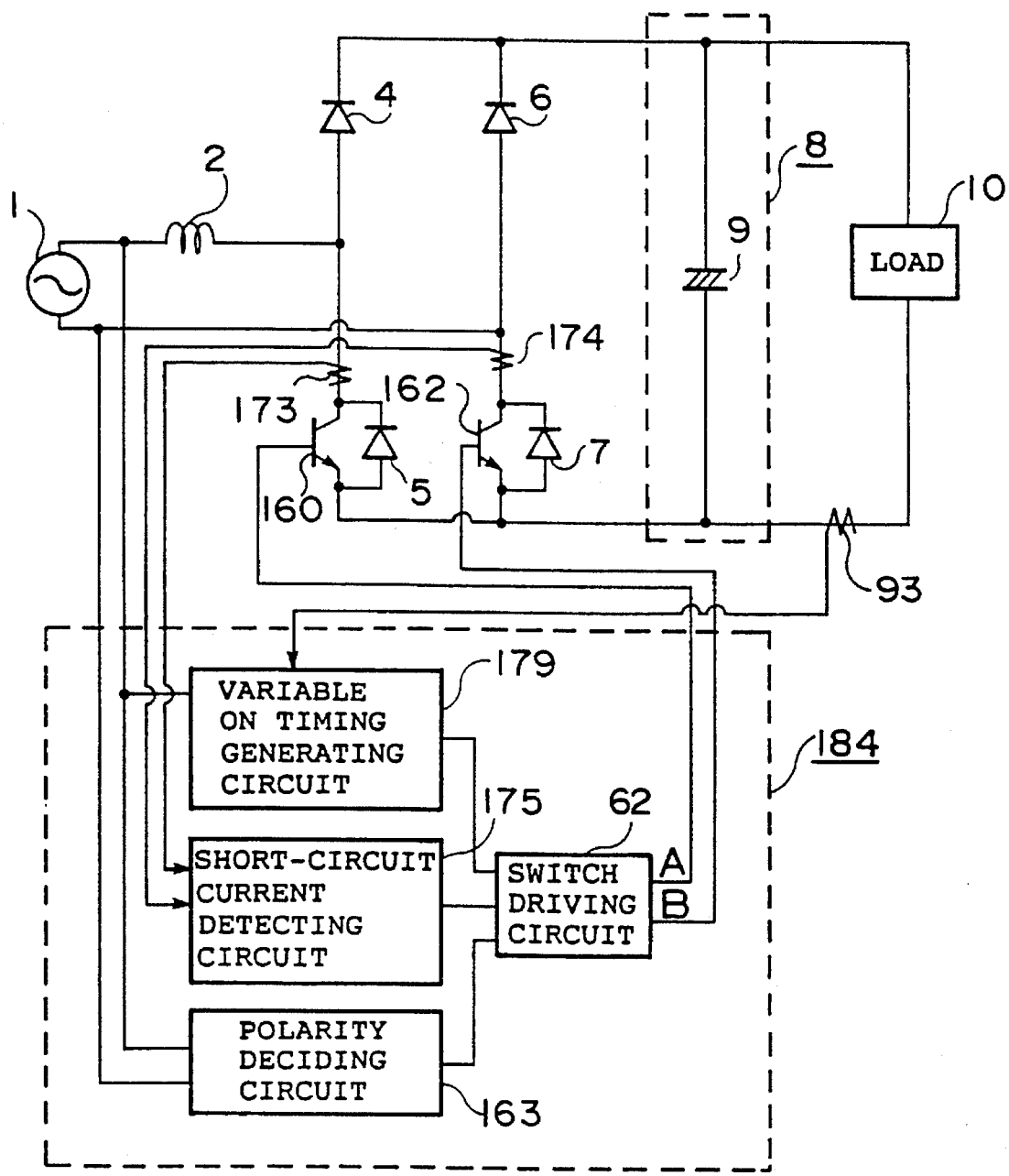
FIG. 116 is a circuit diagram showing another embodiment of the dc power-supply unit according to the twenty-third aspect of the present invention.

FIG. 116 is a circuit diagram showing another embodiment according to the twenty-third aspect of the present invention. In FIG. 116, reference numeral 184 is a switch controlling circuit including a variable ON timing generating circuit 179, a short-circuit current detecting circuit 175, and a switch driving circuit 62.

A description will now be given of the operation. As in the embodiment 40 described before, the polarity deciding circuit 163 detects the polarity of the voltage of an ac power supply 1, and drives a transistor 160 when the polarity of the voltage is positive or drives a transistor 162 when the polarity of the voltage is negative. The variable ON timing generating circuit 179 outputs an ON signal through the switch driving circuit 62 in synchronization with the source voltage of the ac power supply 1 and according to the load condition detected by a current sensor 93. Accordingly, the transistor 160 or 162 is closed so that short-circuit current starts to flow from the ac power supply 1 through a reactor 2 and a diode bridge 7 (or a diode bridge 5), and the short-circuit current gradually increases. When the short-circuit current increases and reaches a preset value, the short-circuit detecting circuit 175 outputs the OFF signal for the transistor 160 or 162 through the switch driving circuit 62 to open the transistors 160 and 162. Subsequently, the short-circuit current which has been flowing in the reactor 2 becomes the charging current in a capacitor 9 of a smoothing circuit 8, and starts to decrease. Thereafter, when the source voltage of the ac power supply 1 is in the vicinity of peak voltage, the diode bridges 4, 7 (or the diode bridges 5, 6) cause the charging current in the capacitor 9 to flow through the reactor 2.

Figure 117:
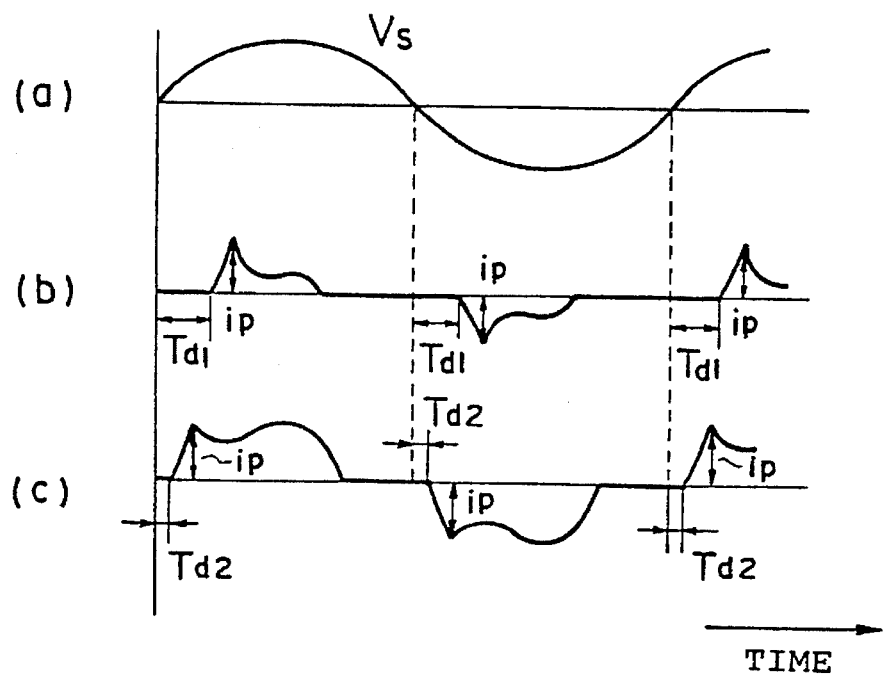
FIG. 117 is an operating waveform diagram showing the operating waveform in each part.

At this time, there are provided a source voltage waveform of the ac power supply 1 (FIG. 117(*a*)), and input current waveforms of the dc power-supply unit under a light load and a heavy load as shown in FIG. 117(*b*) and 117(*c*), respectively. As seen from FIG. 117, the operation is controlled so as to have a later ON signal output timing of the variable ON timing generating circuit 179 under a light load than the ON signal output timing the under a heavy load.

Figure 118:
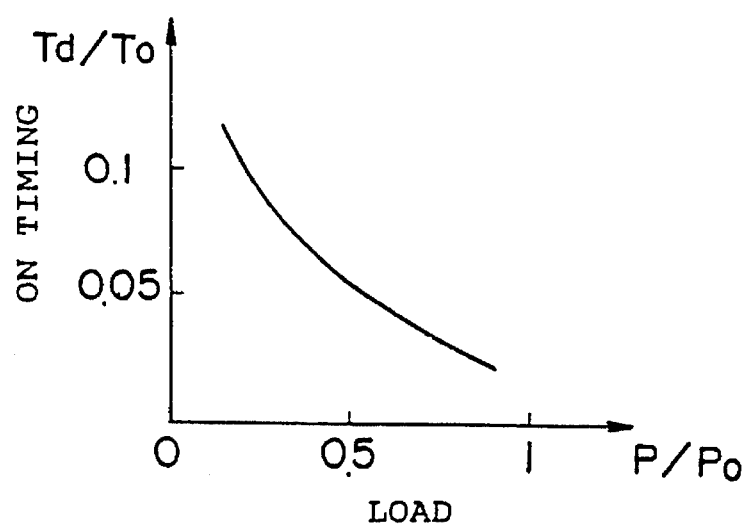
FIG. 118 is a graph diagram showing the relation between the load and the ON timing.

FIG. 118 is a diagram showing a relationship between a load, and the ON signal output timing serving as the overall optimal operating point in view of a power factor and a current higher harmonic characteristic, that is, a delay time $T_d$ from a zero crossing point of the source voltage in case a short-circuit current level to generate the OFF signal for the transistors 160 and 162 is set to a certain period (for example, four-fifths of average current under the maximum load). In FIG. 118, the transverse axis represents a load normalized by rated load $P_0$, and the ordinate axis represents an ON signal output timing normalized by a power supply period $T_0$. In the embodiment, output timing of the variable ON timing generating circuit 179 can be controlled according to the load condition based upon the relationship shown in FIG. 118. Further, it must be noted that the output timing of the variable ON timing generating circuit 179 may be controlled according to the purpose. That is, while a particular weight is given to the power factor, the output timing may be controlled according to the load condition. Alternatively, while the particular weight is given to the current higher harmonic characteristic, the output timing may be controlled according to the load condition.

In addition, as in the embodiment 41, it is to be understood that the present invention should not be limited to the load current detecting means as means for detecting the magnitude of the load condition. For example, it is also possible to detect the magnitude of the load condition by using voltage fluctuation in a capacitor 9 of a smoothing circuit 8, or input current of the dc power-supply unit. Besides, as in the embodiment 40, it must be noted that an arrangement of the transistors should not be limited.

Embodiment 51

Figure 119:
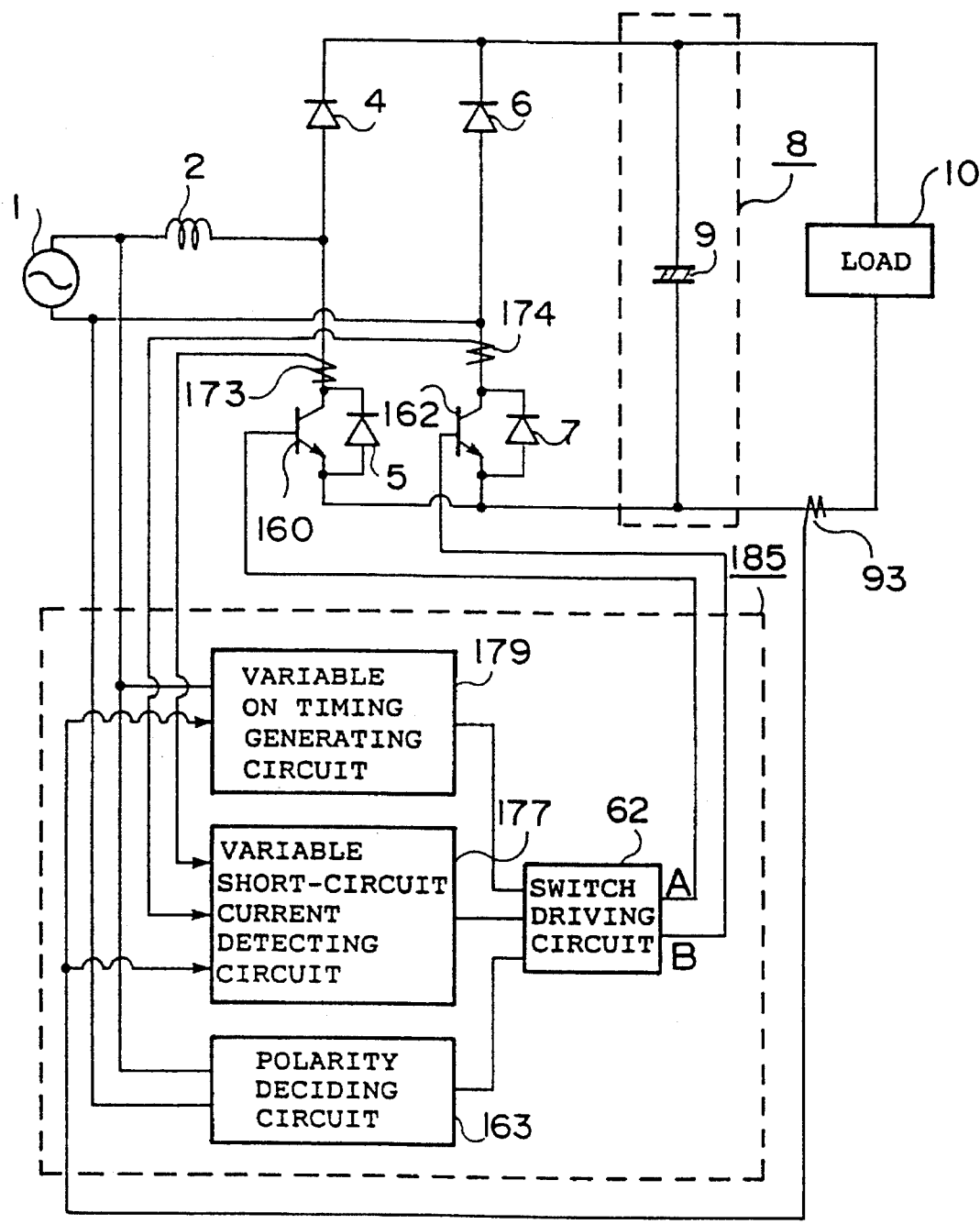
FIG. 119 is a circuit diagram showing another embodiment of the dc power-supply unit according to the twenty-third aspect of the present invention.

FIG. 119 is a circuit diagram showing another embodiment according to the twenty-third aspect of the present invention. In FIG. 119, reference numeral 185 is a switch controlling circuit including a polarity deciding circuit 163, a variable ON timing generating circuit 179, a variable short-circuit current detecting circuit 177, and a switch driving circuit 62.

A description will now be given of the operation. As in the embodiment 40 described before, the polarity deciding circuit 163 detects the polarity of the voltage of an ac power supply 1, and drives a transistor 160 when the polarity of the voltage is positive or drives a transistor 162 when the polarity of the voltage is negative. The variable ON timing generating circuit 179 outputs an ON signal through the switch driving circuit 62 in synchronization with the source voltage of the ac power supply 1 and according to the load condition detected by a current sensor 93. Accordingly, the transistor 160 or 162 is closed so that short-circuit current starts to flow from the ac power supply 1 through a reactor 2 and a diode bridge 7 (or a diode bridge 5), and the short-circuit current gradually increases. When the short-circuit current increases so that a detected value of a current sensor 173 or 174 reaches a value which is set according to the load condition detected by the current sensor 93, the variable short-circuit detecting circuit 177 outputs the OFF signal for the transistor 160 or 162 through the switch driving circuit 62 to open the transistors 160 and 162. Subsequently, the short-circuit current which has been flowing in the reactor 2 becomes the charging current in a capacitor 9 of a smoothing circuit 8, and starts to decrease. Thereafter, when the source voltage of the ac power supply 1 is in the vicinity of peak voltage, the diode bridges 4, 7 (or the diode bridges 5, 6) cause the charging current in the capacitor 9 to flow through the reactor 2.

At this time, there are provided the same source voltage waveform of the ac power supply 1, and the same input current waveforms of the dc power-supply unit under a light load and a heavy load as in the embodiment 47 shown in FIG. 111. In the embodiment, the output timing of the variable ON timing generating circuit 179 and the short-circuit current setting level of the variable short-circuit current detecting circuit 177 can be controlled according to the load condition so as to provide the overall optimal operating point in view of a power factor and a current higher harmonic characteristic. Further, it must be noted that the output timing of the variable ON timing generating circuit 179 and the short-circuit current setting level of the variable short-circuit current detecting circuit 177 may be controlled according to the purpose. That is, while a particular weight is given to the power factor, the output timing and the short-circuit current setting level may be controlled according to the load condition. Alternatively, while the particular weight is given to the current higher harmonic characteristic, the output timing and the short-circuit current detecting level may be controlled according to the load condition.

In addition, as in the embodiment 41, it is to be understood that the present invention should not be limited to the load current detecting means as means for detecting the magnitude of the load condition. For example, it is also possible to detect the magnitude of the load condition by using voltage fluctuation in the capacitor 9 of the smoothing circuit 8, or input current of the dc power-supply unit. Besides, as in the embodiment 40, it must be noted that an arrangement of the transistors should not be limited.

Embodiment 52

The embodiments 37 to 51 have been described with reference to a dc power-supply unit in which at least two or more transistors 159 to 162 are connected to diode bridges 4 to 7. However, where a field-effect transistor (MOSFET) is employed as the switching means, diodes connected in parallel with the switching means may be a parasitic diode of the switching means.

Embodiment 53

Figure 120:
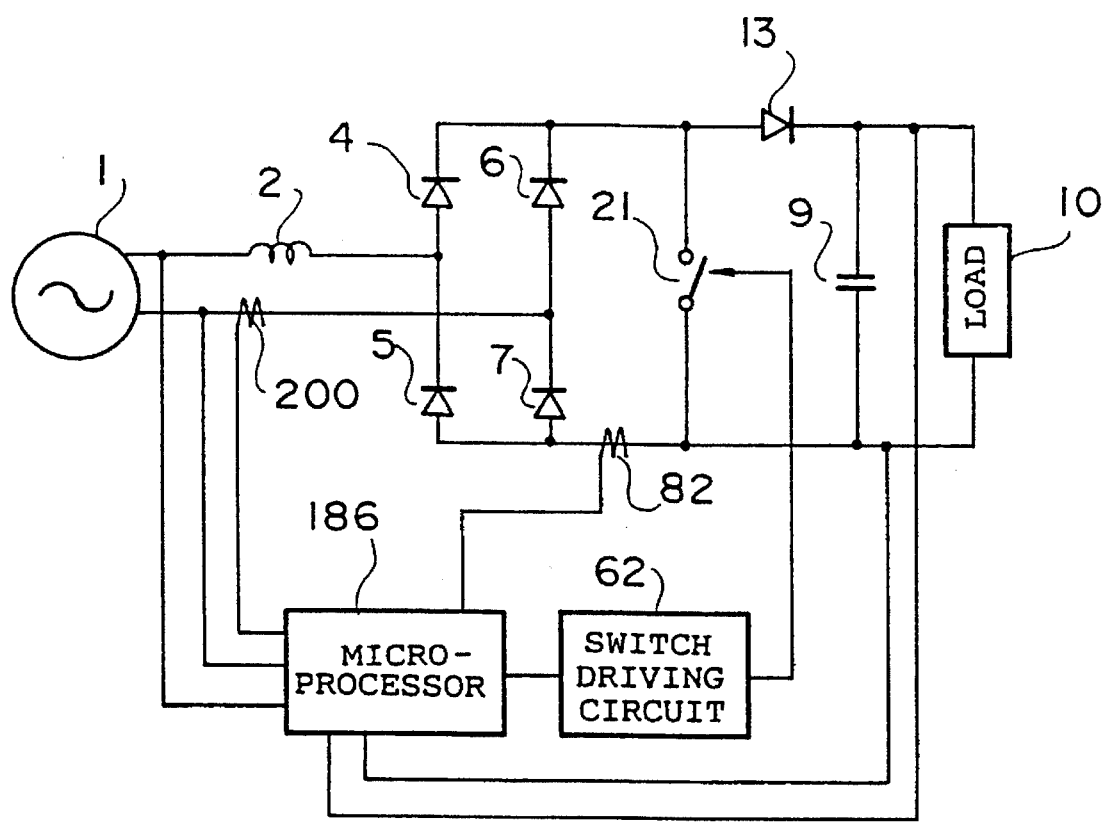

All the switch driving circuits in the embodiments 1 to 53 may be provided by employing a microprocessor. FIG. 120 is a circuit diagram showing one embodiment in case the microprocessor is employed. In FIG. 120, reference numeral 186 means a microprocessor to operate to find ON timing and OFF timing depending upon source voltage of an ac power supply 1, and information from current sensors 200 and 82.

A description will now be give of the operation. The microprocessor 186 detects a zero-cross in synchronization with the source voltage of the ac power supply 1, and subsequently detects the magnitude of a load depending upon a signal from the current sensor 200. The microprocessor 186 outputs an ON signal to a switch driving circuit 62 at a switching start time which is set for a heavy load if the load is heavy, or outputs the ON signal to the switch driving circuit 62 at a switching start time which is set for a light load if the load is light. When a switch 21 is closed in response to the ON signal output to the switch driving circuit 62, the ac power supply 1 is short-circuited through a reactor 2 and a diode bridge 7 (or a diode bridge 5) to conduct current, and the current gradually increases. In the microprocessor 186, an ON time according to a load 10 is set when the switching start time is set according to the load 10. After the elapse of the ON time from the switching start time, an OFF signal is output to a switch 21 through the switch driving circuit 62 to open the switch 21. Then, short-circuit current which has been flowing in a reactor 2 passes through a diode 13 to become the charging current in a capacitor 9 of a smoothing circuit 8, and starts to decrease. Thereafter, when the source voltage of the ac power supply 1 is in the vicinity of peak voltage, the diode bridges 4, 7 (or the diode bridges 5, 6) cause the charging current in the capacitor 9 to flow through the reactor 2 and the diode 13. If the current sensor 82 detects overcurrent before the elapse of the ON time or detects dc overvoltage across the capacitor 9, the OFF signal is immediately output to the switch 21 through the switch driving circuit 62, resulting in opening the switch 21.

Figure 121:
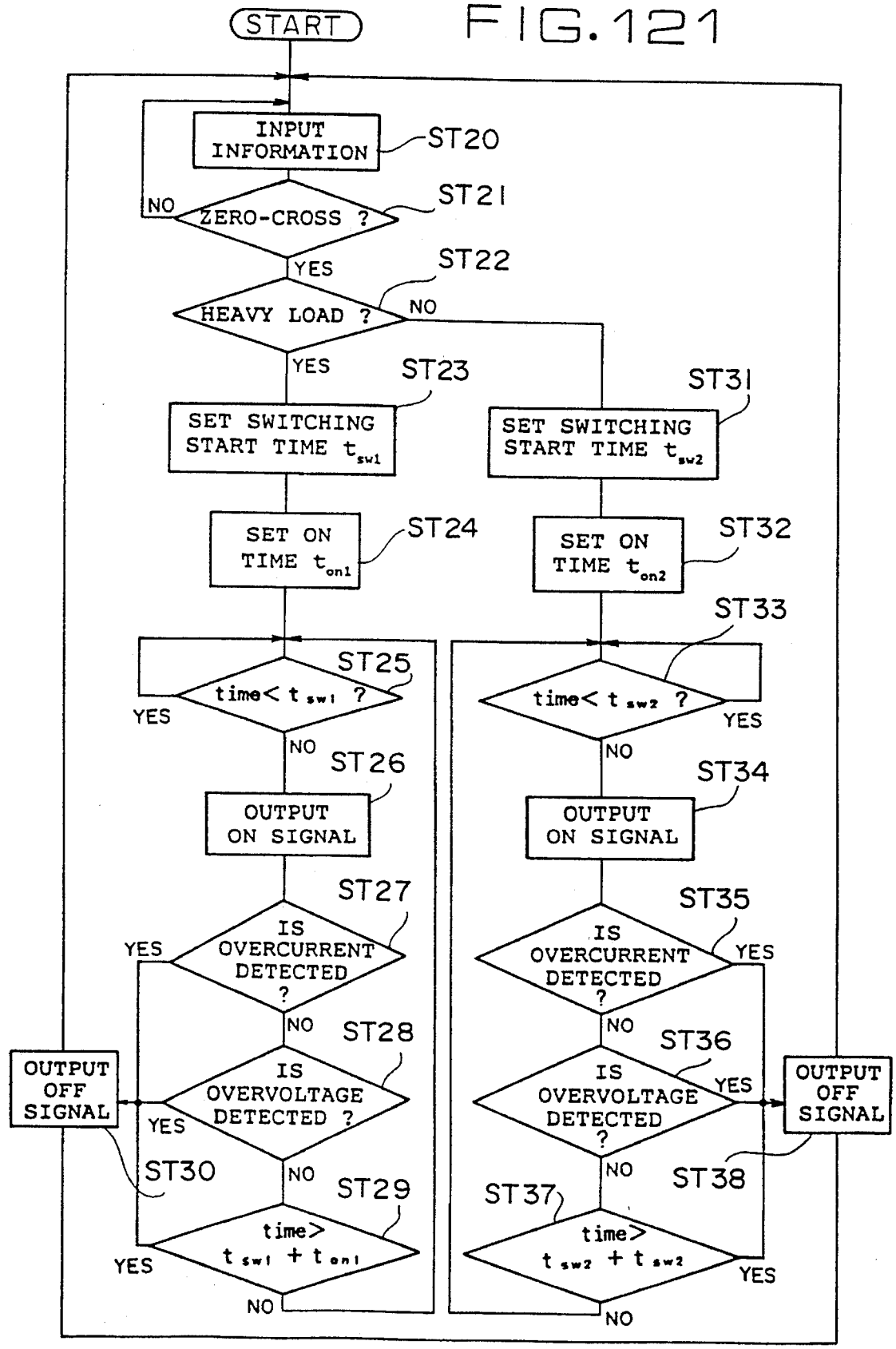

A description will now be given of the operation in the microprocessor with reference to a flowchart. FIG. 121 is a flowchart of a program operating in the microprocessor. Information to be input in Step ST20 are the zero-cross of the source voltage of the ac power supply 1, load current detected by the current sensor 200, the overcurrent detected by the current sensor 82, and the dc overvoltage across the capacitor 9. In Step ST21, it is decided whether or not the source voltage of the ac power supply 1 is at the zero-cross point depending upon these information. The process returns to Step ST20 if the source voltage is not the zero-cross point, or the process proceeds to Step ST22 if it is the zero-cross point. In Step ST22, the magnitude of the load 10 is detected depending upon the load current value detected by the current sensor 200. The process proceeds to Step ST23 if the load 10 is heavy, or proceeds to Step ST31 if the load 10 is light. In Step ST23, the switching start time $t_{sw1}$ used for a heavy load is set. In Step ST24, an ON time $t_{on1}$ used for the heavy load is set. In Step ST25, it is determined whether or not a time counted from the zero-cross point reaches the switching start time $t_{sw1}$. If the counted time does not reach the switching start time, the process waits until it reaches the switching start time. The process proceeds to Step ST26 if the counted time reaches the switching start time. In Step ST26, the ON signal is output to the switch driving circuit 62. In Step ST27, it is determined whether or not the overcurrent is detected by the current sensor 82. The process proceeds to Step ST30 if the overcurrent is detected, and otherwise proceeds to Step ST28. In Step ST28, it is determined whether or not the dc voltage across the capacitor 9 is the overvoltage. The process proceeds to Step ST30 if the dc voltage is the overvoltage, and otherwise proceeds to Step ST29. In Step ST29, it is determined whether or not a time counted from the switching start time reaches the ON time $t_{on1}$. The process returns to Step ST30 if the counted time reaches the ON time, and otherwise returns to Step ST25. In Step ST30, the OFF signal is output to the switch driving circuit 62, and the process returns to Step ST20. If the load is light, the same operation is performed in Steps ST31 to ST38 as those in Steps ST23 to ST30.

Embodiment 54

Figure 122:
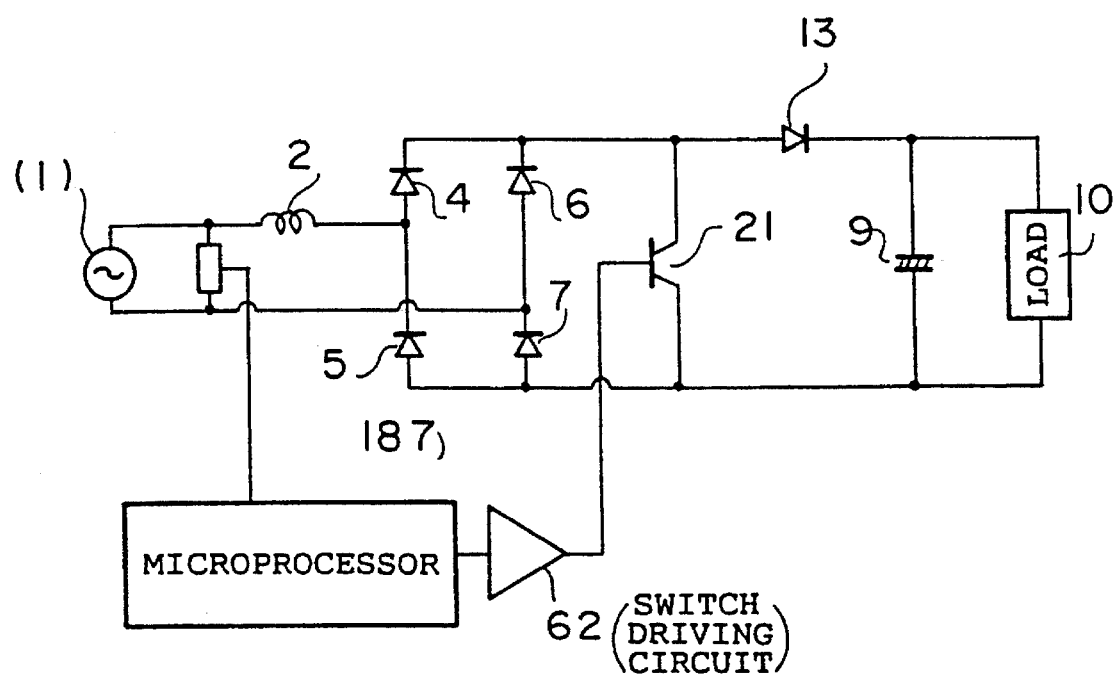

FIG. 122 is a circuit diagram showing another embodiment wherein the microprocessor is employed. In FIG. 122, reference numeral 187 means a microprocessor.

A description will now be give of the operation.

Figure 123:
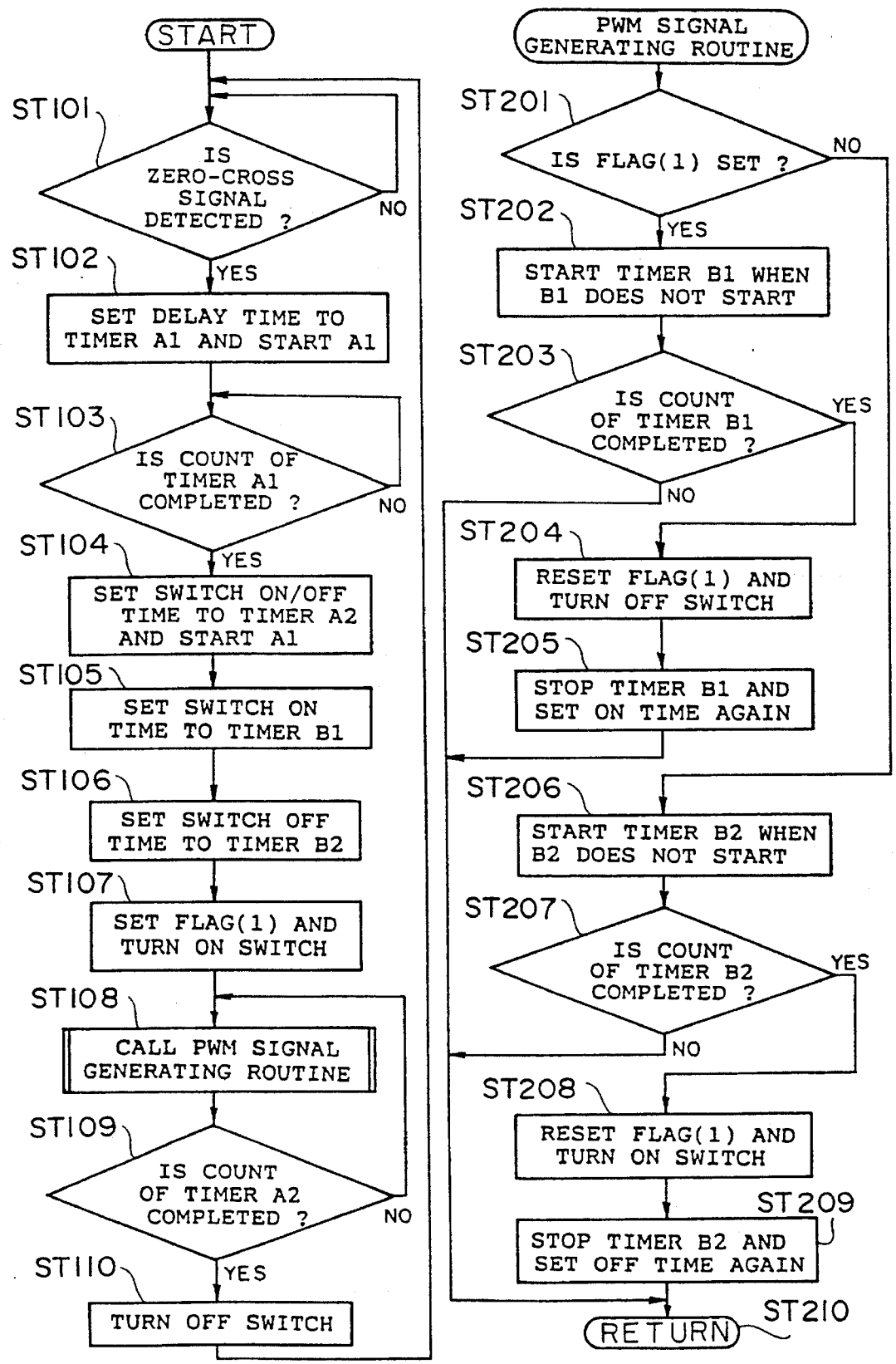

FIG. 123 is a flowchart showing the operation. First, a zero-cross point is detected in Step ST101. Step ST101 is repeated until the zero-cross point is detected. In Step ST102, a delay time is set to a timer A1 after the zero-cross point is detected, and the delay time is counted in Step ST103. After completion of count of the time set to the timer A1, a time period for which ON/OFF states of a switch 21 are repeated is set to a timer A2, an ON time of the switch 21 is set to a timer B1, and an OFF time of the switch 21 is set to a timer B2 in Steps ST104 to ST106. In this case, the timer A2 starts immediately after the time is set to the timer A2, and continues counting irrespective of running of other programs. At this time, the timers B1 and B2 have not started yet. In Step ST107, a flag(1) is set to indicate that the switch 21 is ON, and the switch 21 is turned ON. Step ST108 is a subroutine to call a program to determine the ON/OFF states of the switch 21, and a flowchart thereof is shown in Steps ST201 to ST210. Subsequently, the process proceeds to Step ST10 if the count of the timer A2 is completed in Step ST109, and otherwise returns to Step ST108. Steps ST108 to ST109 are repeated until the count of the timer A2 is completed. In Step ST110, the switch 21 is turned OFF, and the process returns to Step ST101.

A description will now be given of a PWM signal generating routine (in Steps ST201 to ST210). The process proceeds to Step ST202 or Step ST206 from Step ST201 according to the flag(1) set in Step ST107. When the flag(1) is set, the process proceeds to Step ST202 to start the timer B1. However, Step ST202 is bypassed if the timer B1 has started to count. In Step ST203, it is checked whether or not the count of the timer B1 has been completed, and the process exits from the program in Step ST210 if the count has not been completed. When the count is completed, the flag(1) is reset and the switch 21 is turned OFF in Step ST204. Subsequently, the timer B1 is stopped in Step ST205, and the ON time is set again. Then, the process proceeds to Step ST210 to exit the program.

Similarly, in Step ST206, the timer B2 is started. However, Step ST206 is bypassed if the timer B1 has started to count. In Step ST207, it is checked whether or not the count of the timer B2 has been completed, and the process exits from the program in Step ST210 if the count has not been completed. In case the count is completed, the flag(1) is reset and the switch 21 is turned ON in Step ST208. Subsequently, the timer B2 is stopped in Step ST209, and the OFF time is set again. Then, the process proceeds to Step ST210 to exit the program.

Thereby, it is possible to switch the switch 21 for a certain time period after elapse of a predetermined time from the zero-cross point of the voltage.

As set forth above, according to the first aspect of the present invention, the dc power-supply unit is provided to, when the ac voltage of the ac power supply passes through the zero point, close the switching means after the preset first delay time from the passing through time, and open the switching means after the preset second delay time from the passing through time. Therefore, the charging current can flow even if the voltage of the ac power-supply is lower than the capacitor voltage of the smoothing means. As a result, there are some effects such as the optimal improvement of the power factor because the higher harmonic component of the input current is reduced.

According to the second aspect of the present invention, the dc power-supply unit is provided to, when the ac voltage of the ac power supply passes through the zero point, close the switching means after the preset delay time from the passing through time, and open the switching means after the preset time period from the closing time. Therefore, the charging current can flow even if the voltage of the ac power-supply is lower than the capacitor voltage of the smoothing means. As a result, there are some effects such as the optimal improvement of the power factor because the higher harmonic component of the input current is reduced.

According to the third aspect of the present invention, the dc power-supply unit is provided to, when the ac voltage of the ac power supply passes through the zero point, close the switching means after the preset delay time from the passing through time, and open the switching means when the value of the short-circuit current becomes the predetermined value after the closing operation. Therefore, the charging current can flow even if the voltage of the ac power-supply is lower than the capacitor voltage of the smoothing means. As a result, there are some effects such as the optimal improvement of the power factor because the higher harmonic component of the input current is reduced.

According to the fourth aspect of the present invention, the dc power-supply unit is provided to, when the ac voltage of the ac power supply passes through the zero point, select the first delay time or the second delay time depending upon the results of the detection of the load condition detecting means so as to close the switching means after the selected delay time from the passing through time, and open the switching means after the third delay time from the passing through time. Therefore, the charging current can flow according to the magnitude of the load even if the voltage of the ac power-supply is lower than the capacitor voltage of the smoothing means. As a result, there are some effects such as the optimal improvement of the power factor because the higher harmonic component of the input current is reduced even if the magnitude of the load fluctuates.

According to the fifth aspect of the present invention, the dc power-supply unit is provided to, when the ac voltage of the ac power supply passes through the zero point, select the first delay time or the second delay time depending upon the results of the detection of the load condition detecting means so as to close the switching means after the selected delay time from the passing through time, and open the switching means after the predetermined time from the closing time. Therefore, the charging current can flow according to the magnitude of the load even if the voltage of the ac power-supply is lower than the capacitor voltage of the smoothing means. As a result, there are some effects such as the optimal improvement of the power factor because the higher harmonic component of the input current is reduced even if the magnitude of the load fluctuates.

According to the sixth aspect of the present invention, the dc power-supply unit is provided to, when the ac voltage of the ac power supply passes through the zero point, select the first delay time or the second delay time depending upon the results of the detection of the load condition detecting means so as to close the switching means after the selected delay time from the passing through time, and open the switching means when the value of short-circuit current reaches the predetermined value after the closing operation. Therefore, the charging current can flow according to magnitude of the load even if the voltage of the ac power-supply is lower than the capacitor voltage of the smoothing means. As a result, there are some effects such as the optimal improvement of the power factor because the higher harmonic component of the input current is reduced even if the magnitude of the load fluctuates.

According to the seventh aspect of the present invention, the dc power-supply unit is provided to, when the ac voltage of the ac power supply passes through the zero point, close the switching means after the first delay time from the passing through time, and select the second delay time or the third delay time depending upon the results of the detection of the load condition detecting means so as to open the switching means after the selected delay time from the passing through time. Therefore, the charging current can flow according to magnitude of the load even if the voltage of the ac power-supply is lower than the capacitor voltage of the smoothing means. As a result, there are some effects such as the optimal improvement of the power factor because the higher harmonic component of the input current is reduced even if the magnitude of the load fluctuates.

According to the eighth aspect of the present invention, the dc power-supply unit is provided to, when the ac voltage of the ac power supply passes through the zero point, close the switching means after the first delay time from the passing through time, and select the second delay time or the third delay time depending upon the results of the detection of the load condition detecting means so as to open the switching means after the selected delay time from the closing time. Therefore, the charging current can flow according to the magnitude of the load even if the voltage of the ac power-supply is lower than the capacitor voltage of the smoothing means. As a result, there are some effects such as the optimal improvement of the power factor because the higher harmonic component of the input current is reduced even if the magnitude of the load fluctuates.

According to the ninth aspect of the present invention, the dc power-supply unit is provided to, when the ac voltage of the ac power supply passes through the zero point, close the switching means after the preset delay time from the passing through time, and decide whether or not the value of the short-circuit current becomes the predetermined value preset according to the magnitude of the load after the closing operation depending upon the load condition detecting means so as to open the switching means in case the decision is made that the short-circuit current reaches the predetermined value. Therefore, the charging current can flow according to the magnitude of the load even if the voltage of the ac power-supply is lower than the capacitor voltage of the smoothing means. As a result, there are some effects such as the optimal improvement of the power factor because the higher harmonic component of the input current is reduced even if the magnitude of the load fluctuates.

According to the tenth aspect of the present invention, the dc power-supply is provided to, when the ac voltage of the ac power supply passes through the zero point, select the first delay time or the second delay time depending upon the results of the detection of the load condition detecting means so as to close the switching means after the selected delay time from the passing through time, and select the third delay time or the fourth delay time depending upon the results of the detection of the load condition detecting means so as to open the switching means after the selected delay time from the passing through time. Therefore, the charging current can flow according to the magnitude of the load even if the voltage of the ac power-supply is lower than the capacitor voltage of the smoothing means. As a result, there are some effects such as the optimal improvement of the power factor because the higher harmonic component of the input current is reduced even if the magnitude of the load fluctuates.

According to the eleventh aspect of the present invention, the dc power-supply is provided to, when the ac voltage of the ac power supply passes through the zero point, select the first delay time or the second delay time depending upon the results of the detection of the load condition detecting means so as to close the switching means after the selected delay time from the passing through time, and select the third delay time or the fourth delay time depending upon the results of the detection of the load condition detecting means so as to open the switching means after the selected delay time from the closing operation. Therefore, the charging current can flow according to the magnitude of the load even if the voltage of the ac power-supply is lower than the capacitor voltage of the smoothing means. As a result, there are some effects such as the optimal improvement of the power factor because the higher harmonic component of the input current is reduced even if the magnitude of the load fluctuates.

According to the twelfth aspect of the present invention, the dc power-supply unit is provided to, when the ac voltage of the ac power supply passes through the zero point, select the first delay time or the second delay time depending upon the results of the detection of the load condition detecting means so as to close the switching means after the selected delay time from the passing through time, and detects the whether or not the value of the short-circuit current has reached the predetermined value preset according to the magnitude of the load after the closing operation depending upon the load condition detecting means so as to open the switching means in case the decision is made that the short-circuit current has reached the predetermined value. Therefore, the charging current can flow according to the magnitude of the load even if the voltage of the ac power-supply is lower than the capacitor voltage of the smoothing means. As a result, there are some effects such as the optimal improvement of the power factor because the higher harmonic component of the input current is reduced even if the magnitude of the load fluctuates.

According to the thirteenth aspect of the present invention, the dc power-supply unit is provided to detect the power factor of the ac power output from the ac power supply, and compare the power factor with the predetermined value so as to correct the delay time which is set in the switch controlling means to close the switching means depending upon the results of the comparison. Therefore, the power factor of the ac power corresponds to the predetermined value. As a result, there are some effects such as more accurate improvement of the power factor.

According to the fourteenth aspect of the present invention, the dc power-supply unit is provided to detect the power factor of the ac power output from the ac power supply, and compare the power factor with the predetermined value so as to correct the second delay time which is set in the switch controlling means to open the switching means depending upon the results of the comparison. Therefore, the power factor of the ac power corresponds to the predetermined value. As a result, there are some effects such as more accurate improvement of the power factor.

According to the fifteenth aspect of the present invention, the dc power-supply unit is provided to detect the relative harmonic content in the ac power output from the ac power supply, and compare the relative harmonic content with the predetermined value so as to correct the delay time which is set in the switch controlling means to close the switching means depending upon the results of the comparison. Therefore, the relative harmonic content in the ac power corresponds to the predetermined value. As a result, there are some effects such as more accurate improvement of the power factor.

According to the sixteenth aspect of the present invention, the dc power-supply unit is provided to detect the relative harmonic content in the ac power output from the ac power supply, and compare the relative harmonic content with the predetermined value so as to correct the second delay time which is set in the switch controlling means to open the switching means depending upon the results of the comparison. Therefore, the relative harmonic content in the ac power corresponds to the predetermined value. As a result, there are some effects such as more accurate improvement of the power factor.

According to the seventeenth aspect of the present invention, the dc power-supply unit is provided to detect the distortion in the waveform of the ac power supply, and compare the distortion in the waveform with the predetermined value so as to correct the delay time which is set in the switch controlling means to close the switching means depending upon the results of the comparison. Therefore, the distortion in the waveform of the ac power corresponds to the predetermined value. As a result, there are some effects such as more accurate improvement of the power factor.

According to the eighteenth aspect of the present invention, the dc power-supply unit is provided to detect the distortion in the waveform of the ac power supply, and compare the distortion in the waveform with the predetermined value so as to correct the second delay time which is set in the switch controlling means to open the switching means depending upon the results of the comparison. Therefore, the distortion in the waveform of the ac power corresponds to the predetermined value. As a result, there are some effects such as more accurate improvement of the power factor.

According to the nineteenth aspect of the present invention, the dc power-supply unit is provided to detect the power factor and the relative harmonic content in the ac power output from the ac power supply, and compare the power factor with the predetermined value so as to correct the first delay time which is set in the switch controlling means to close the switching means depending upon the results of the comparison, and so as to correct the second delay time which is set in the switch controlling means to open the switching means depending upon the results of the comparison. Therefore, the power factor and the relative harmonic content in the ac power correspond to the respective predetermined values. As a result, there are some effects such as more accurate improvement of the power factor.

According to the twentieth aspect of the present invention, the dc power-supply unit is provided to detect the power factor and the relative harmonic content in the ac power output from the ac power supply, and compare the relative harmonic content with the predetermined value so as to correct the first delay time which is set in the switch controlling means to close the switching means depending upon the results of the comparison, and so as to correct the second delay time which is set in the switch controlling means to open the switching means depending upon the results of the comparison. Therefore, the power factor and the relative harmonic content in the ac power correspond to the respective predetermined values. As a result, there are some effects such as more accurate improvement of the power factor.

According to the twenty-first aspect of the present invention, the dc power-supply unit is provided to open the switching means when the overvoltage is detected by the overvoltage detecting means after the switching means is closed. Therefore, the charging current can flow even if the voltage of an ac power supply is lower than the capacitor voltage of the smoothing means. As a result, there are some effects such as the optimal improvement of the power factor because the higher harmonic component of the input current is reduced.

According to the twenty-second aspect of the present invention, the dc power-supply unit is provided to repeatedly open and close the switching means at predetermined intervals until the switching means is opened after the switching means is closed. Therefore, in case the voltage of the ac power supply is lower than the capacitor voltage of the smoothing means, it is possible to feed charging current while preventing excessive short-circuit current from flowing. As a result, there are some effects such as the optimal improvement of the power factor because the higher harmonic component of the input current is reduced.

According to the twenty-third aspect of the present invention, the dc power-supply unit is provided to short-circuit at least one of the plurality of rectifying devices forming the rectifying means. Therefore, the charging current can flow even if the voltage of an ac power supply is lower than the capacitor voltage of the smoothing means. As a result, there are some effects such as the optimal improvement of the power factor because the higher harmonic component of the input current is reduced.

In the dc power-supply unit according to the twenty-fourth aspect of the present invention, the inductive element is connected between the one terminal on the ac side of the rectifying means and the ac power supply. Therefore, the charging current can flow even if the voltage of the ac power supply is lower than the capacitor voltage of the smoothing means as in the case of the first aspect of the present invention. As a result, there are some effects such as the optimal improvement of the power factor because the higher harmonic component of the input current is reduced.

While preferred embodiments of the invention have been described using specific terms, such description is for illustrative purposes only, and it is to be understood that changes and variations may be made without departing from the spirit or scope of the following claims.

What is claimed is:

1. A dc power-supply unit comprising:

rectifying means for converting ac power output from an ac power supply into dc power so as to feed to a load;

an inductive element whose one end is connected to one terminal on a side of said rectifying means;

switching means connected between the other end of said inductive element and the other terminal on side of said rectifying means to perform a switching operation; and smoothing means connected in parallel with said switching means, and said dc power-supply unit further comprising:

switch controlling means in which first and second delay times are preset so as to, when ac voltage and/or ac current of said ac power supply passes through a zero point, close said switching means after said preset first delay time from a passing through time, and open said switching means after said second delay time form said passing through time.

2. A dc power-supply unit comprising:

rectifying means for converting ac power output from an ac power supply into dc power so as to feed to a load;

an inductive element whose one end is connected to one terminal on a side of said rectifying means;

switching means connected between the other end of said inductive element and the other terminal on said side of said rectifying means to perform a switching operation; and smoothing means connected in parallel with said switching means, and said dc power-supply unit further comprising:

switch controlling means in which a first delay time is preset so as to, when ac voltage and/or ac current of said ac power supply passes through a zero point, close said switching means after said first delay time from a passing through time, and open said switching means after a predetermined time period from a closing time.

3. A dc power-supply unit comprising:

rectifying means for converting ac power output from an ac power supply into dc power so as to feed to a load;

an inductive element whose one end is connected to one terminal on a side of said rectifying means;

switching means connected between the other end of said inductive element and the other terminal on said side of said rectifying means to perform a switching operation; and smoothing means connected in parallel with said switching means, and said dc power-supply unit further comprising:

short-circuit current detecting means for detecting short-circuit current flowing in said inductive element; and switch controlling means in which a first delay time is preset so as to, when ac voltage and/or ac current of said ac power supply passes through a zero point, close said switching means after said delay time from a passing through time, and open said switching means when a value of said short-circuit current becomes a predetermined value after a closing operation.

4. A dc power-supply unit comprising:

rectifying means for converting ac power output from an ac power supply into dc power so as to feed to a load;

an inductive element whose one end is connected to one terminal on a side of said rectifying means;

switching means connected between the other end of said inductive element and the other terminal on said side of said rectifying means to perform a switching operation; and smoothing means connected in parallel with said switching means, and said dc power-supply unit further comprising:

load condition detecting means for detecting magnitude of said load; and switch controlling means in which a first delay time under a light load is preset to be shorter than a second delay time under a heavy load, and a third delay time is preset to, when ac voltage and/or ac current of said ac power supply passes through a zero point, select said first delay time or said second delay time depending upon the results of detection of said load condition detecting means so as to close said switching means after a selected delay time from a passing through time, and so as to open said switching means after said third delay time from said passing through time.

5. A dc power-supply unit comprising:

rectifying means for converting ac power output from an ac power supply into dc power so as to feed to a load;

an inductive element whose one end is connected to one terminal on a side of said rectifying means;

switching means connected between the other end of said inductive element and the other terminal on the side of said rectifying means to perform a switching operation; and smoothing means connected in parallel with said switching means, and said dc power-supply unit further comprising:

load condition detecting means for detecting magnitude of said load; and switch controlling means in which a first delay under a light load is preset, and a second delay time under a heavy load is preset to be shorter than said first delay time under said light load to, when ac voltage and/or ac current of said ac power supply passes through a zero point, select said first delay time or said second delay time depending upon results of detection of said load condition detecting means so as to close said switching means after a selected delay time from a passing through time, and so as to open said switching means after a predetermined time period from a closing time.

6. A dc power-supply unit comprising:

rectifying means for converting ac power output from an ac power supply into dc power so as to feed to a load;

an inductive element whose one end is connected to one terminal on a side of said rectifying means;

switching means connected between the other end of said inductive element and the other terminal on the side of said rectifying means to perform a switching operation; and smoothing means connected in parallel with said switching means, and said dc power-supply unit further comprising:

short-circuit current detecting means for detecting short-circuit current flowing in said inductive element;

load condition detecting means for detecting magnitude of said load; and switch controlling means in which a first delay time under a light load is preset, and a second delay time under a heavy load is preset to be shorter than said first delay time under said light load to, when ac voltage and/or ac current of said ac power supply passes through a zero point, select said first delay time or said second delay time depending upon results of detection of said load condition detecting means so as to close said switching means after a selected delay time from a passing through time, and so as to open said switching means when a value of said short-circuit current becomes a predetermined value after a closing operation.

7. A dc power-supply unit comprising:

rectifying means for converting ac power output from an ac power supply into dc power so as to feed to a load;

an inductive element whose one end is connected to one terminal on a side of said rectifying means;

switching means connected between the other end of said inductive element and the other terminal on said side of said rectifying means to perform a switching operation; and smoothing means connected in parallel with said switching means, and said dc power-supply unit further comprising:

load condition detecting means for detecting magnitude of said load; and switch controlling means in which a first delay time and a second delay time under a light load are preset, and a third delay time under a heavy load is preset to be longer than said second delay time under said light load to, when ac voltage and/or ac current of said ac power supply passes through a zero point, close said switching means after said first delay time from a passing through time, and select said second delay time or said third delay time depending upon the results of the detection of said load condition detecting means so as to open said switching means after a selected delay time from said passing through time.

8. A dc power-supply unit comprising:

rectifying means for converting ac power output from an ac power supply into dc power so as to feed to a load;

an inductive element whose one end is connected to one terminal on a side of said rectifying means;

switching means connected between the other end of said inductive element and the other terminal on said side of said rectifying means to perform a switching operation; and smoothing means connected in parallel with said switching means, and said dc power-supply unit further comprising:

load condition detecting means for detecting magnitude of said load; and switch controlling means in which a first delay time and a second delay time under a light load are preset, and a third delay time under a heavy load is preset to be longer than said second delay time under said light load to, when ac voltage and/or ac current of said ac power supply passes through a zero point, close said switching means after said first delay time from a passing through time, and select said second delay time or said third delay time depending upon results of detection of said load condition detecting means so as to open said switching means after a selected delay time from a closing operation.

9. A dc power-supply unit comprising:

rectifying means for converting ac power output from an ac power supply into dc power so as to feed to a load;

an inductive element whose one end is connected to one terminal on a side of said rectifying means;

switching means connected between the other end of said inductive element and the other terminal on said side of said rectifying means to perform a switching operation; and smoothing means connected in parallel with said switching means, and said dc power-supply unit further comprising:

short-circuit current detecting means for detecting short-circuit current flowing in said inductive element;

load condition detecting means for detecting magnitude of said load; and switch controlling means in which a first delay time is preset to, when ac voltage and/or ac current of said ac power supply passes through a zero point, close said switching means after said delay time from a passing through time, and detect depending upon said load condition detecting means whether or not a value of said short-circuit current becomes a value preset according to said magnitude of said load after a closing operation so as to open said switch means when a decision is made that said short-circuit current becomes said predetermined value.

10. A dc power-supply unit comprising:

rectifying means for converting ac power output from an ac power supply into dc power so as to feed to a load;

an inductive element whose one end is connected to one terminal on a side of said rectifying means;

switching means connected between the other end of said inductive element, and the other terminal on said side of said rectifying means to perform a switching operation; and smoothing means connected in parallel with said switching means, and said dc power-supply unit further comprising:

load condition detecting means for detecting magnitude of said load; and switch controlling means in which a first delay time under a light load and a second delay time under a heavy load are preset such that said second delay time under said heavy load is shorter than said first delay time under said light load, and a third delay time under a light load and a fourth delay time under a heavy load are preset such that said fourth delay time under said heavy load is longer than said third delay time under said light load to, when ac voltage and/or ac current of said ac power supply passes through a zero point, select said first delay time or said second delay time depending upon results of detection of said load condition detecting means so as to close said switching means after a selected delay time from a passing through time, and to select said third delay time or said fourth delay time depending upon results of said detection of said load condition detecting means so as to open said switching means after a selected delay time from said passing through time.

11. A dc power-supply unit comprising:

rectifying means for converting ac power output from an ac power supply into dc power so as to feed to a load;

an inductive element whose one end is connected to one terminal on a side of said rectifying means;

switching means connected between the other end of said inductive element and the other terminal on said side of said rectifying means to perform a switching operation; and smoothing means connected in parallel with said switching means, and said dc power-supply unit further comprising:

load condition detecting means for detecting magnitude of said load; and switch controlling means in which a first delay time under a light load and a second delay time under a heavy load are preset such that said second delay time under said heavy load is shorter than said first delay time under said light load, and a third delay time under a light load and a fourth delay time under a heavy load are preset such that said fourth delay time under said heavy load is longer than said third delay time under said light load to, when ac voltage and/or ac current of said ac power supply passes through a zero point, select said first delay time or said second delay time depending upon results of detection of said load condition detecting means so as to close said switching means after a selected delay time from a passing through time, and to select said third delay time or said fourth delay time depending upon results of said detection of said load condition detecting means so as to open said switching means after a selected delay time from a closing time.

12. A dc power-supply unit comprising:

rectifying means for converting ac power output from an ac power supply into dc power so as to feed to a load;

an inductive element whose one end is connected to one terminal on a side of said rectifying means;

switching means connected between the other end of said inductive element and the other terminal on said side of said rectifying means to perform a switching operation; and smoothing means connected in parallel with said switching means, and said dc power-supply unit further comprising:

short-circuit current detecting means for detecting short-circuit current flowing in said inductive element;

load condition detecting means for detecting magnitude of said load; and switch controlling means in which a first delay time under a light load and a second delay time under a heavy load are preset such that said second delay time under said heavy load is shorter than said first delay time under said light load to, when ac voltage and/or ac current of said ac power supply passes through a zero point, select said first delay time or said second delay time depending upon results of detection of said load condition detecting means so as to close said switching means after a selected delay time from a passing through time, and to detect depending upon said load condition detecting means whether or not a value of said short-circuit current becomes a predetermined value preset according to said magnitude of said load after a closing operation so as to open said switching means when a decision is made that said short-circuit current becomes said predetermined value.

13. A dc power-supply unit according to any one of claims 1 to 12, further comprising correcting means for detecting a power factor of ac power output from said ac power supply, and comparing said power factor with a predetermined value so as to correct said first delay time which is set in said switch controlling means to close said switching means depending upon results of a comparison.

14. A dc power-supply unit according to claim 1, further comprising correcting means for detecting a power factor of ac power output from said ac power supply, and comparing said power factor with a predetermined value so as to correct said second delay time which is set in said switch controlling means to open said switching means depending upon results of a comparison.

15. A dc power-supply unit according to any one of claims 1 to 12, further comprising correcting means for detecting a relative harmonic content in ac power output from said ac power supply, and comparing said relative harmonic content with a predetermined value so as to correct said first delay time which is set in said switch controlling means to close said switching means depending upon results of a comparison.

16. A dc power-supply unit according to claim 1, further comprising correcting means for detecting a relative harmonic content in ac power output from said ac power supply, and comparing said relative harmonic content with a predetermined value so as to correct said second delay time which is set in said switch controlling means to open said switching means depending upon results of a comparison.

17. A dc power-supply unit according to any one of claims 1 to 12, further comprising correcting means for detecting distortion in a waveform of said ac power supply, and comparing said distortion in said waveform with a predetermined value so as to correct said first delay time which is set in said switch controlling means to close said switching means depending upon results of a comparison.

18. A dc power-supply unit according to claim 1, further comprising correcting means for detecting distortion in a waveform of said ac power supply, and comparing said distortion in said waveform with a predetermined value so as to correct said second delay time which is set in said switch controlling means to open said switching means depending upon results of a comparison.

19. A dc power-supply unit according to claim 1, further comprising correcting means for detecting a power factor and a relative harmonic content of ac power output from said ac power supply, and comparing said power factor with a predetermined value so as to correct a first delay time which is set in said switch controlling means to close said switching means depending upon results of a comparison, and comparing said relative harmonic content with a predetermined value so as to correct said second delay time which is set in said switch controlling means to open said switching means depending upon results of a comparison.

20. A dc power-supply unit according to claim 1, further comprising correcting means for detecting a power factor and a relative harmonic content of ac power output from said ac power supply, and comparing said relative harmonic content with a predetermined value so as to correct said first delay time which is set in said switch controlling means to close said switching means depending upon results of a comparison, and comparing said power factor with a predetermined value so as to correct a second delay time which is set in said switch controlling means to open said switching means depending upon results of a comparison.

21. A dc power-supply unit according to any one of claims 1 to 12, wherein said side to which said inductive element is connected between one terminal of said rectifying means and said ac power supply is the ac side.

22. A dc power-supply unit according to any one of claims 1 to 12, wherein said switch controlling means repeatedly opens and closes said switching means at predetermined intervals until said switching means is opened after said switching means is closed.

23. A dc power-supply unit according to any one of claims 1 to 12, wherein said side to which said inductive element is connected between one terminal of said rectifying means and said ac power supply is the dc side.

24. A dc power-supply unit comprising:

rectifying means for converting ac power output from an ac power supply into dc power so as to feed to a load;

an inductive element whose one end is connected to one terminal on a side of said rectifying means;

switching means connected between the other end of said inductive element and the other terminal on said side of said rectifying means for short-circuiting at least one of a plurality of rectifying devices forming said rectifying means; and smoothing means connected in parallel with said switching means, and said dc power-supply unit further comprising:

load condition detecting means for detecting magnitude of said load; and switch controlling means in which a first delay time under a light load and a second delay time under a heavy load are preset such that said second delay time under said heavy load is shorter than said first delay time under said light load, and a third delay time under a light load and a fourth delay time under a heavy load are preset such that said fourth delay time under said heavy load is longer than said third delay time under said light load to, when ac voltage and/or ac current of said ac power supply passes through a zero point, select said first delay time or said second delay time depending upon results of detection of said load condition detecting means so as to close said switching means after a selected delay time from a passing through time, and to select said third delay time or said fourth delay time depending upon results of said detection of said load condition detecting means so as to open said switching means after a selected delay time from a closing time.

25. A dc power-supply unit comprising:

rectifying means for converting ac power output from an ac power supply into dc power so as to feed to a load;

an inductive element whose one end is connected to one terminal on a side of said rectifying means;

switching means connected between the other end of said inductive element and the other terminal on said side of said rectifying means for short-circuiting at least one of a plurality of rectifying devices forming said rectifying means; and smoothing means connected in parallel with said switching means, and said dc power-supply unit further comprising:

short-circuit current detecting means for detecting short-circuit current flowing in said inductive element;

load condition detecting means for detecting magnitude of said load; and switch controlling means in which a first delay time under a light load and a second delay time under a heavy load are preset such that said second delay time under said heavy load is shorter than said first delay time under said light load to, when ac voltage and/or ac current of said ac power supply passes through a zero point, select said first delay time or said second delay time depending upon the results of detection of said load condition detecting means so as to close said switching means after a selected delay time from a passing through time, and to detect depending upon said load condition detecting means whether or not a value of said short-circuit current becomes a predetermined value preset according to said magnitude of said load after a closing operation so as to open said switching means when a decision is made that said short-circuit current becomes said predetermined value.

26. A dc power-supply unit comprising:

rectifying means for converting ac power output from an ac power supply into dc power so as to feed to a load;

an inductive element whose one end is connected to one terminal on a side of said rectifying means;

switching means connected between the other end of said inductive element and the other terminal on said side of said rectifying means to perform a switching operation; and smoothing means connected in parallel with said switching means, and said dc power-supply unit further comprising:

overvoltage detecting means for detecting overvoltage across said smoothing means; and switch controlling means in which a delay time is preset so as to, when ac voltage and/or ac current of said ac power supply passes through a zero point, close said switching means after said delay time from a passing through time, and open said switching means when said overvoltage is detected by said overvoltage detecting means.

27. A dc power-supply unit comprising:

rectifying means for converting ac power output from an ac power supply into dc power so as to feed to a load;

an inductive element whose one end is connected to one terminal on a side of said rectifying means;

switching means connected between the other end of said inductive element and the other terminal on said side of said rectifying means to perform a switching operation; and smoothing means connected in parallel with said switching means, and said dc power-supply unit further comprising:

overvoltage detecting means for detecting overvoltage across said smoothing means;

load condition detecting means for detecting magnitude of said load; and switch controlling means in which a first delay time under a light load is preset, and a second delay time under a heavy load is preset to be shorter than said first delay time under said light load to, when ac voltage and/or ac current of said ac power supply passes through a zero point, select said first delay time or said second delay time depending upon results of detection of said load condition detecting means so as to close said switching means after a selected delay time from a passing through time, and so as to open said switching means when said overvoltage is detected by said overvoltage detecting means.

28. A dc power-supply unit comprising:

rectifying means for converting ac power output from an ac power supply into dc power so as to feed to a load;

an inductive element whose one end is connected to one terminal on a side of said rectifying means;

switching means connected between the other end of said inductive element and the other terminal on said side of said rectifying means to perform a switching operation; and smoothing means connected in parallel with said switching means, and said dc power-supply unit further comprising:

overvoltage detecting means for detecting overvoltage across said smoothing means;

load condition detecting means for detecting magnitude of said load; and switch controlling means in which a delay time is preset to, when ac voltage and/or ac current of said ac power supply passes through a zero point, close said switching means after said delay time from a passing through time, and detect depending upon said load condition detecting means whether or not a value of said short-circuit current becomes a value preset according to said magnitude of said load after a closing operation so as to open said switch means when said overvoltage is detected by said overvoltage detecting means.

29. A dc power-supply unit comprising:

rectifying means for converting ac power output from an ac power supply into dc power so as to feed to a load;

an inductive element whose one end is connected to one terminal on a side of said rectifying means;

switching means connected between the other end of said inductive element and the other terminal on said side of said rectifying means for short-circuiting at least one of a plurality of rectifying devices forming said rectifying means;

smoothing means connected in parallel with said switching means, and said dc power-supply unit further comprising:

switch controlling means in which first and second delay times are preset so as to, when ac voltage and/or ac current of said ac power supply passes through a zero point, close said switching means after said preset first delay time from a passing through time, and open said switching means after said second delay time from said passing through time.

30. A dc power-supply unit comprising:

rectifying means for converting ac power output from an ac power supply into dc power so as to feed to a load;

an inductive element whose one end is connected to one terminal on a side of said rectifying means;

switching means connected between the other end of said inductive element and the other terminal on said side of said rectifying means for short-circuiting at least one of a plurality of rectifying devices forming said rectifying means;

smoothing means connected in parallel with said switching means, and said dc power-supply unit further comprising:

switch controlling means in which a delay time is preset so as to, when ac voltage and/or ac current of said ac power supply passes through a zero point, close said switching means after said delay time from a passing through time, and open said switching means after a predetermined time period from a closing time.

31. A dc power-supply unit comprising:

rectifying means for convening ac power output from an ac power supply into dc power so as to feed to a load;

an inductive element whose one end is connected to one terminal on a side of said rectifying means;

switching means connected between the other end of said inductive element and the other terminal on said side of said rectifying means for short-circuiting at least one of a plurality of rectifying devices forming said rectifying means;

smoothing means connected in parallel with said switching means, and said dc power-supply unit further comprising:

short-circuit current detecting means for detecting short-circuit current flowing in said inductive element; and switch controlling means in which a delay time is preset so as to, when ac voltage and/or ac current of said ac power supply passes through a zero point, close said switching means after said delay time from a passing through time, and open said switching means when a value of said short-circuit current becomes a predetermined value after a closing operation.

32. A dc power-supply unit comprising:

rectifying means for converting ac power output from an ac power supply into dc power so as to feed to a load;

an inductive element whose one end is connected to one terminal on a side of said rectifying means;

switching means connected between the other end of said inductive element and the other terminal on said side of said rectifying means for short-circuiting at least one of a plurality of rectifying devices forming said rectifying means; and smoothing means connected in parallel with said switching means, and said dc power-supply unit further comprising:

load condition detecting means for detecting magnitude of said load; and switch controlling means in which a first delay time under a light load is preset to be shorter than a second delay time under a heavy load, and a third delay time is preset to, when ac voltage and/or ac current of said ac power supply passes through a zero point, select said first delay time or said second delay time depending upon results of detection of said load condition detecting means so as to close said switching means after a selected delay time from a passing through time, and so as to open said switching means after said third delay time from said passing through time.

33. A dc power-supply unit comprising:

rectifying means for converting ac power output from an ac power supply into dc power so as to feed to a load;

an inductive element whose one end is connected to one terminal on a side of said rectifying means;

switching means connected between the other end of said inductive element and the other terminal on said side of said rectifying means for short-circuiting at least one of a plurality of rectifying devices forming said rectifying means; and smoothing means connected in parallel with said switching means, and said dc power-supply unit further comprising:

load condition detecting means for detecting magnitude of said load; and switch controlling means in which a first delay under a light load is preset, and a second delay time under a heavy load is preset to be shorter than said first delay time under said light load to, when ac voltage and/or ac current of said ac power supply passes through a zero point, select said first delay time or said second delay time depending upon results of detection of said load condition detecting means so as to close said switching means after a selected delay time from a passing through time, and so as to open said switching means after a predetermined time period from a closing time.

34. A dc power-supply unit comprising:

rectifying means for converting ac power output from an ac power supply into dc power so as to feed to a load;

an inductive element whose one end is connected to one terminal on a side of said rectifying means;

switching means connected between the other end of said inductive element and the other terminal on said side of said rectifying means for short-circuiting at least one of a plurality of rectifying devices forming said rectifying means; and smoothing means connected in parallel with said switching means, and said dc power-supply unit further comprising:

short-circuit current detecting means for detecting short-circuit current flowing in said inductive element;

load condition detecting means for detecting magnitude of said load; and switch controlling means in which a first delay time under a light load is preset, and a second delay time under a heavy load is preset to be shorter than said first delay time under said light load to, when ac voltage and/or ac current of said ac power supply passes through a zero point, select said first delay time or said second delay time depending upon results of detection of said load condition detecting means so as to close said switching means after a selected delay time from a passing through time, and so as to open said switching means when a value of said short-circuit current becomes a predetermined value after a closing operation.

35. A dc power-supply unit comprising:

rectifying means for converting ac power output from an ac power supply into dc power so as to feed to a load;

an inductive element whose one end is connected to one terminal on a side of said rectifying means;

switching means connected between the other end of said inductive element and the other terminal on said side of said rectifying means for short-circuiting at least one of a plurality of rectifying devices forming said rectifying means; and smoothing means connected in parallel with said switching means, and said dc power-supply unit further comprising:

load condition detecting means for detecting magnitude of said load; and switch controlling means in which a first delay time and a second delay time under a light load are preset, and a third delay time under a heavy load is preset to be longer than said second delay time under said light load to, when ac voltage and/or ac current of said ac power supply passes through a zero point, close said switching means after said first delay time from a passing through time, and select said second delay time or said third delay time depending upon results of detection of said load condition detecting means so as to open said switching means after a selected delay time from said passing through time.

36. A dc power-supply unit comprising:

rectifying means for converting ac power output from an ac power supply into dc power so as to feed to a load;

an inductive element whose one end is connected to one terminal on a side of said rectifying means;

switching means connected between the other end of said inductive element and the other terminal on said side of said rectifying means for short-circuiting at least one of a plurality of rectifying devices forming said rectifying means; and smoothing means connected in parallel with said switching means, and said dc power-supply unit further comprising:

load condition detecting means for detecting magnitude of said load; and switch controlling means in which a first delay time and a second delay time under a light load are preset, and a third delay time under a heavy load is preset to be longer than said second delay time under said light load to, when ac voltage and/or ac current of said ac power supply passes through a zero point, close said switching means after said first delay time from a passing through time, and select said second delay time or said third delay time depending upon results of detection of said load condition detecting means so as to open said switching means after a selected delay time from a closing operation.

37. A dc power-supply unit comprising:

rectifying means for converting ac power output from an ac power supply into dc power so as to feed to a load;

an inductive element whose one end is connected to one terminal on a side of said rectifying means;

switching means connected between the other end of said inductive element and the other terminal on said side of said rectifying means for short-circuiting at least one of a plurality of rectifying devices forming said rectifying means; and smoothing means connected in parallel with said switching means, and said dc power-supply unit further comprising:

short-circuit current detecting means for detecting short-circuit current flowing in said inductive element;

load condition detecting means for detecting magnitude of said load; and switch controlling means in which a delay time is preset to, when ac voltage and/or ac current of said ac power supply passes through a zero point, close said switching means after said delay time from a passing through time, and detect depending upon said load condition detecting means whether or not a value of said short-circuit current becomes a value preset according to said magnitude of said load after a closing operation so as to open said switch means when a decision is made that said short-circuit current becomes said predetermined value.

38. A dc power-supply unit comprising:

rectifying means for converting ac power output from an ac power supply into dc power so as to feed to a load;

an inductive element whose one end is connected to one terminal on a side of said rectifying means;

switching means connected between the other end of said inductive element, and the other terminal on said side of said rectifying means for short-circuiting at least one of a plurality of rectifying devices forming said rectifying means; and smoothing means connected in parallel with said switching means, and said dc power-supply unit further comprising:

load condition detecting means for detecting magnitude of said load; and switch controlling means in which a first delay time under a light load and a second delay time under a heavy load are preset such that said second delay time under said heavy load is shorter than said first delay time under said light load, and a third delay time under a light load and a fourth delay time under a heavy load are preset such that said fourth delay time under said heavy load is longer than said third delay time under said light load to, when ac voltage and/or ac current of said ac power supply passes through a zero point, select said first delay time or said second delay time depending upon results of detection of said load condition detecting means so as to close said switching means after a selected delay time from a passing through time, and to select said third delay time or said fourth delay time depending upon results of said detection of said load condition detecting means so as to open said switching means after a selected delay time from said passing through time.

* * * * *

UNITED STATES PATENT AND TRADEMARK OFFICE
CERTIFICATE OF CORRECTION

PATENT NO. : 5,479,336
DATED : December 26, 1995
INVENTOR(S) : Takahiro MOTOKI et al It is certified that error appears in the above-indentified patent and that said Letters Patent is hereby corrected as shown below:

On the title page:
    Item: [75], delete "Ikura" and insert -- Ikuro --.

Signed and Sealed this

Twenty-seventh Day of February, 1996

Attest:

BRUCE LEHMAN

Attesting Officer      Commissioner of Patents and Trademarks